United States Patent [19]
Gould et al.

[11] Patent Number: 5,920,836
[45] Date of Patent: Jul. 6, 1999

[54] WORD RECOGNITION SYSTEM USING LANGUAGE CONTEXT AT CURRENT CURSOR POSITION TO AFFECT RECOGNITION PROBABILITIES

[75] Inventors: Joel M. Gould, Winchester; Frank J. McGrath, Wellesley, both of Mass.

[73] Assignee: Dragon Systems, Inc., Newton, Mass.

[21] Appl. No.: 08/882,813

[22] Filed: Jun. 26, 1997

Related U.S. Application Data

[60] Division of application No. 08/382,752, Feb. 1, 1995, which is a continuation-in-part of application No. 07/976,413, Nov. 13, 1992, Pat. No. 5,428,707.

[51] Int. Cl.⁶ .................................................. G10L 9/00
[52] U.S. Cl. ..................... 704/251; 704/240; 704/257; 704/255; 704/243
[58] Field of Search .................................. 704/240, 243, 704/245, 251, 253, 255, 256, 275, 241

[56] References Cited

U.S. PATENT DOCUMENTS

| | | | |
|---|---|---|---|
| 4,286,115 | 8/1981 | Sakoe | 704/253 |
| 4,297,528 | 10/1981 | Beno | 179/1 SB |
| 4,336,421 | 6/1982 | Welch et al. | 179/1 SD |
| 4,394,538 | 7/1983 | Warren et al. | 179/1 SD |
| 4,439,161 | 3/1984 | Wiggins et al. | 434/201 |
| 4,509,133 | 4/1985 | Monbaron et al. | 364/513.5 |
| 4,624,008 | 11/1986 | Vensko et al. | 381/43 |
| 4,651,289 | 3/1987 | Maeda et al. | 364/513.5 |
| 4,677,673 | 6/1987 | Ukita et al. | 381/43 |
| 4,720,863 | 1/1988 | Li et al. | 381/42 |
| 4,731,845 | 3/1988 | Matsuki et al. | 381/43 |
| 4,751,737 | 6/1988 | Gerson et al. | 381/43 |
| 4,776,016 | 10/1988 | Hansen | 381/42 |

(List continued on next page.)

FOREIGN PATENT DOCUMENTS 0 618 565 A2   10/1994   European Pat. Off. ......... G10L 5/06

OTHER PUBLICATIONS

Art Cited in Parent Case, U.S. Pat App 08/382,752.
Art Cited in FWC of Parent Case, U.S. Pat. App 08/956,498.
Roszkiewicz, "Back Talk: Lip Service," A+ Magazine, pp. 60–61, date Feb. 1984.
Schmandt, "Augmenting a Window System with Speech Input," Computer, pp. 50–56, date Aug. 1990.
Tough, Carol, "The Design of an Intelligent Transparent Speech Interface," IEE Colloquium on "Systems and Applications of Man–Machine Interaction Using Speech I/O)" (Digest No. 066), p. 2/1–4, date Mar. 1991.
Gliedman, "Turning Talk Into Action: Voice–Dictation and Voice–Command Systems," Computer Shopper, pp. 780–781, date Sep. 1994.
Lane, "Expert's Toolbox: Store–Bought Recognition Tools," AI Expert, pp. 11–12, date Oct. 1994.
Kurzweil Voice User's Guide, Release 1.0, Cover and Copyright pages and pp. 60–61, copyright 1994.

*Primary Examiner*—David R. Hudspeth
*Assistant Examiner*—Vijay B. Chawan
*Attorney, Agent, or Firm*—Edward W. Porter

[57] ABSTRACT

A computerized system performs word recognition. It does pattern matching to select which vocabulary words appears, according to the pattern matching, to most probably correspond to word signals it seeks to recognize. It produces an output corresponding to the vocabulary words selected at a movable cursor position in a body of text. The system improves its recognition by obtaining information about the linguistic context of the current cursor position in the body of text and using that information to vary the probability of which one or more words is selected by its pattern matching. The pattern matching can be speech recognition performed on signals representing the sound of spoken words. In some embodiments, the word recognition is executed on a computer system capable of running multiple programs at once; the recognized word is output to another program for insertion at a cursor position in that other program; and the linguistic context information is obtained from data structures created by the other program.

9 Claims, 81 Drawing Sheets

FIG. 4

U.S. PATENT DOCUMENTS

| | | | |
|---|---|---|---|
| 4,780,906 | 10/1988 | Rajasekaran et al. | 704/251 |
| 4,783,803 | 11/1988 | Baker et al. | 704/252 |
| 4,803,729 | 2/1989 | Baker | 704/241 |
| 4,805,219 | 2/1989 | Baker et al. | 704/241 |
| 4,829,575 | 5/1989 | Lloyd | 381/43 |
| 4,829,576 | 5/1989 | Porter | 704/235 |
| 4,831,653 | 5/1989 | Katayama | 381/43 |
| 4,833,713 | 5/1989 | Muroi et al. | 381/43 |
| 4,837,830 | 6/1989 | Wrench, Jr. et al. | 381/42 |
| 4,837,831 | 6/1989 | Gillick et al. | 381/43 |
| 4,866,778 | 9/1989 | Baker | 704/245 |
| 4,903,305 | 2/1990 | Gillick et al. | 381/41 |
| 4,903,306 | 2/1990 | Nakamura | 381/42 |
| 4,964,077 | 10/1990 | Eisen et al. | 364/900 |
| 4,975,959 | 12/1990 | Benbassat | 381/41 |
| 4,979,213 | 12/1990 | Nitta | 381/43 |
| 4,994,983 | 2/1991 | Landell et al. | 364/513.5 |
| 5,003,603 | 3/1991 | Searcy et al. | 381/43 |
| 5,027,406 | 6/1991 | Roberts et al. | 381/43 |
| 5,036,539 | 7/1991 | Wrench, Jr. et al. | 381/43 |
| 5,065,431 | 11/1991 | Rollett | 381/43 |
| 5,097,509 | 3/1992 | Lennig | 381/43 |
| 5,122,972 | 6/1992 | Richards et al. | 395/157 |
| 5,123,086 | 6/1992 | Tanaka et al. | 395/155 |
| 5,136,654 | 8/1992 | Ganog, III et al. | 381/41 |
| 5,146,503 | 9/1992 | Cameron et al. | 381/43 |
| 5,231,670 | 7/1993 | Goldhor et al. | 704/275 |
| 5,377,303 | 12/1994 | Firman | 395/2.84 |
| 5,384,892 | 1/1995 | Strong | 704/243 |
| 5,386,492 | 1/1995 | Wilson et al. | 395/2.61 |
| 5,386,494 | 1/1995 | White | 395/2.84 |
| 5,390,279 | 2/1995 | Strong | 395/2 |
| 5,425,128 | 6/1995 | Morrison | 704/243 |
| 5,428,707 | 6/1995 | Gould et al. | 395/2.64 |
| 5,513,289 | 4/1996 | Stanford et al. | 395/2.52 |
| 5,613,034 | 3/1997 | Ney et al. | 704/251 |
| 5,623,578 | 4/1997 | Mikkilineni | 704/255 |
| 5,640,490 | 6/1997 | Hansen et al. | 395/263 |
| 5,651,096 | 7/1997 | Pallakoff et al. | 704/275 |

```
-DRAGONDICTATE PROGRAM~144
    -INITIALIZE~204
    -TERMINATE AND STAY RESIDENT~206
    -GET USER INPUT BY MONITORING KEYSTROKE INTERRUPTS AND, IF
    MICROPHONE IS ON, UTTERANCE INTERRUPTS~208
    -IF RECEIVED KEYSTROKE IS:~210
        -"+", CALL VOICE CONSOLE SUBROUTINE
        -"-", CALL OOPS BUFFER SUBROUTINE
        -...
        -ANY OTHER KEY, PASS TO ACTIVE PROGRAM
    -IF RECEIVE UTTERANCE~212
        -CALL RECOGNIZER~214
        -IF BEST SCORING WORD IS:~216
            -CHOICE COMMAND SELECTING A WORD IN ALTERNATE CHOICE
            WINDOW~226
                -IF CHOICE COMMAND SELECTS OTHER THAN BEST SCORING
                 WORD~228
                    -SIMULATE TYPING NUMBER OF BACKSPACE CHARACTERS
                    EQUAL TO NUMBER OF CHARACTERS IN FIRST CHOICE
                    WORD~230
                    -SIMULATE TYPING CHARACTERS OF SELECTED WORD~232
                -REMOVE CHOICE WINDOW~234
                -MAKE SELECTED WORD FIRST CHOICE~236
                -SET UTTERANCE'S CONFIRMED_FLAG~254
                -CALL ADAPTIVE_TRAINING SUBROUTINE FOR CONFIRMED
                UTTERANCE AND FIRST CHOICE WORD~256
            -"CHOOSE-10", OR "SCRATCH THAT"~360
                -BACKSPACE NUMBER OF CHARACTERS IN BEST SCORING
                WORD~362
                -REMOVE CHOICE WINDOW~364
                -REMOVE UTTERANCE'S ENTRY IN OOPS BUFFER~366
            -"OOPS"~368
                -CALL OOPS_SUBROUTINE~370
            -...
            -NOT ONE OF ABOVE COMMANDS~218
                -REMOVE PREVIOUS CHOICE WINDOW IF ANY~223
                -SIMULATE TYPING OF UTTERANCE'S BEST SCORING
                WORD~220
                -PLACE CHOICE WINDOW ON SCREEN NEAR CURSOR~222
                -IF CONFIRMED_TRAINING_ONLY_FLAG IS FALSE OR IF THE
                CONFIRMED_FLAG OF THE OLDEST ENTRY IN THE OOPS
                BUFFER IS SET~392
                    -CALL ADAPTIVE TRAINING SUBROUTINE FOR TOKEN OF
                    THE OLDEST ENTRY IN THE OOPS BUFFER AGAINST THAT
                    ENTRY'S FIRST CHOICE WORD, UNLESS ALREADY
                    DONE~394
                        -CALL UPDATE ONEGRAM, UPDATE DIGRAM, AND
                        UPDATE CONTEXT LANG MODEL SUBROUTINES BASED
                        ON OLDEST ENTRY'S FIRST CHOICE WORD~396
```

FIG. 5A

```
        -IF SAVING_TOKEN_FLAG IS SET, SAVE OLDEST
          ENTRY'S TOKEN LABELED WITH ITS FIRST CHOICE WORD
          IN A FILE, BUFFERING SAVES TO REDUCE DISK
          ACCESS~398
        -ADD NEW ENTRY TO OOPS BUFFER FOR LAST UTTERANCE,
         INCLUDING ITS TOKEN, NINE BEST SCORING WORDS, AND A
         ZEROED CONFIRM_FLAG~400
```

FIG. 5B.

```
-VOICE CONSOLE SUBROUTINE~146
    -IF SYSTEM HAS ONE OR MORE USER FILES DEFINED~402
        -ENABLE FULL VOICE CONSOLE MENU
    -IF NOT~404
        -LIMITED VOICE CONSOLE MENU TO LOAD USER OR EXIT
    -VOICE CONSOLE LOOP~406
        -CLEAR OTHER PROMPTS, IF ANY, AND DISPLAY VOICE CONSOLE
         MENU~408
        -GET USER INPUT~410
        -IF INPUT IS:~412
            -"LOAD USER"~414
                -PROMPT FOR USER NAME~416
                -GET INPUT~420
                -IF USER ENTERS A NEW USER NAME~422
                    -PROMPT IF WANT TO CREATE NEW USER~424
                    -IF NOT, RETURN TO TOP OF VOICE CONSOLE LOOP~426
                    -IF SO~428
                        -PROMPT IF WANT TO RUN TUTORIAL~430
                        -IF USER SELECTS YES~432
                            -EXIT VOICE CONSOLE
                            -LOAD AND RUN TUTORIAL
                        -ELSE~434
                            -EXIT VOICE CONSOLE
                            -LOAD AND RUN SELECT_BASE_VOCAB PROGRAM
                -SELECT USER'S .VOC AND .USR FILES FOR USE BY
                 RECOGNIZER~446
                -EXIT VOICE CONSOLE~448
            -...
            -"UTILITIES"~450
                -DISPLAY UTILITIES MENU~452
```

FIG. 6A

```
                    -GET INPUT~452
        -IF INPUT IS:
            -...
                -"PARAMETERS",~454
                    -DISPLAY PARAMETERS MENU~456
                    -GET INPUT~456
                    -IF INPUT IS
                        -...
                        -"CONFIRMED TRAINING ONLY", SET
                        CONFIRMED_ TRAINING_ONLY_FLAG~468
                        -"SAVE TOKEN", SET SAVE_TOKEN_FLAG~460
                        -...
                    -...
            -...
```

FIG. 6B

```
-OOPS SUBROUTINE~148
    -MAKE 2ND MOST RECENT UTTERANCE IN OOPS BUFFER THE CURRENT OOPS
    WORD~372
    -REPEAT UNTIL EXIT FROM WITHIN~374
        -DISPLAY OOPS MENU WITH ONLY CURRENT OOPS WORD HAVING
        ALTERNATE CHOICES SHOWN~376
        -GET INPUT~378
        -IF INPUT IS:~380
            -CHOOSE-1 OR OKAY, REMOVE OOPS MENUS, MAKE ALL
            CORRECTIONS TO OUTPUT, AND EXIT OOPS SUBROUTINE~381
            -CHOOSE-2, SELECT SECOND CHOICE WORD, REMOVE OOPS MENUS,
            MAKE ALL CORRECTIONS TO OUTPUT, AND EXIT OOPS
            SUBROUTINE~382
            -...~386
            -SELECT-1, REMOVE ALTERNATE CHOICE MENU FROM CURRENT
            OOPS WORD~383
            -SELECT-2, REMOVE ALTERNATE CHOICE MENU FROM CURRENT
            OOPS WORD, MAKE SECOND CHOICE WORD THE FIRST CHOICE~384
            -...~386
            -LEFT-1, MAKE WORD ONE LEFT OF CURRENT OOPS WORD THE
            CURRENT OOPS WORD~388
            -LEFT-2, MAKE WORD TWO LEFT OF CURRENT OOPS WORD THE
            CURRENT OOPS WORD~390
            -...~386
            -RIGHT-1, MAKE WORD ONE RIGHT OF CURRENT OOPS WORD THE
            CURRENT OOPS WORD~394
            -...~386
```

FIG. 7

-OOPS BUFFER~160
    -ENTRY1
    -ENTRY2
    -ENTRY3~238
    -ENTRY4
    -ENTRY5~238
    -ENTRY6~238
    -ENTRY7
    -ENTRY8
    -ENTRY9
    -ENTRY10
    -ENTRY11
    -ENTRY12
    -READ/WRITE POINTER~240

FIG. 8

-OOPS BUFFER ENTRY~238
    -TOKEN~244
    -WORD_1~246A
    -WORD_2
    -WORD_3~246
    -WORD_4
    -WORD_5~246
    -WORD_6~246
    -WORD_7
    -WORD_8
    -WORD_9
    -VOCABULARY~248
    -STATE~250
    -CONFIRMED_FLAG~252

FIG. 9

-USERNAME.VOC FILE~162
    -LIST OF WORDS~260
        -FOR EACH
            -WORD~263
                -PHONEME SPELLING LIST~262
                    -PHONETIC SPELLINGS~263
                -PREFILTERING WORD START~264
    -LIST OF STATES~266
        -FOR EACH
            -STATE~267
                -LIST OF WORDS OR INCLUDED STATES~268
                    -FOR EACH
                        -WORD OR STATE~269

FIG. 10A

-TRANSITION TO ANOTHER STATE~270
            -EXTRA DATA (SUCH AS KEYSTROKE SEQUENCE)~272
        -DEFAULT TRANSITION~274
        -DEFAULT EXTRA DATA~276

FIG. 10B

-USERNAME.USR FILE~164
    -PREFILTERING MODELS~280
    -PIC TABLE~282
        -FOR EACH PHONEME TRIPLE
            -ITS ASSOCIATED SEQUENCE OF PELS~284
            -DURATION MODEL~286
    -PEL MODEL LIST~288
        -FOR EACH PEL
            -PEL ID~291
            -1 AMPLITUDE PARAMETER~290
            -7 SPECTRAL PARAMETERS~292
            -12 CEPSTRAL PARAMETERS~294
    -HELPER MODEL LIST~296
        -FOR EACH WORD FOR WHICH USER UTTERANCES SCORE POORLY
         AGAINST PHONETIC MODEL
            -WORD~298
            -PHONETIC MODEL OF WORD, IF ANY~300
            -SEQUENCE OF PELS~302
            -PREFILTERING WORD START~303

FIG. 11

-ADAPTIVE_TRAINING SUBROUTINE~152
    -ADJUST WEIGHT TO BE GIVEN TOKEN IN TRAINING ACCORDING TO SUCH
     FACTORS AS STATE OF CONFIRMED_FLAG~304
    -CALL WORD_TRAINING FOR WORD, TOKEN, AND WEIGHT~306

FIG. 12

-TRAINING SUBROUTINE (TOKEN LIST, WORD MODEL)~326
    -FOR EACH TOKEN IN TOKEN LIST~330
        -TIME ALIGN AND SCORE PARAMETER VECTORS OF TOKEN AGAINST
         PELS OF WORD MODEL~332
    -UPDATE PELS OF WORD MODEL WITH VECTORS TIME ALIGNED AGAINST
     THEM~334

FIG. 13

-TRAIN_NEW_MODEL SUBROUTINE (TOKEN LIST)~336
    -SET PEL_NUMBER IN PROPORTION TO AVERAGE LENGTH OF TOKENS IN
    TOKEN LIST~338
    -DIVIDE EACH TOKEN INTO PEL_NUMBER SEGMENTS OF APPROXIMATELY
    EQUAL LENGTH~340
    -MAKE AN INITIAL MODEL FOR THE WORD WITH A PEL FOR EACH OF THE
    PEL_NUMBER SEGMENTS MADE IN THE TOKENS, WITH EACH PEL'S
    PARAMETERS BEING BASED ON THE VECTORS OF THE ONE OR MORE TOKENS
    IN ITS ASSOCIATED SEGMENT~342
    -REPEAT UNTIL ITERATION IMPROVES SCORE OF MATCHES BY LESS THAN
    SPECIFIED AMOUNT~344
        -FOR EACH TOKEN IN TOKEN LIST~346
            -TIME ALIGN AND SCORE PARAMETER VECTORS OF TOKEN AGAINST
            PELS OF WORD MODEL~348
        -UPDATE PELS OF WORD MODEL~350

FIG. 14

-BATCH_TRAINING PROGRAM~184
    -FOR EACH WORD FOR WHICH HAVE TOKENS~464
        -CALL WORD_TRAINING FOR THE WORD AND ITS TOKEN~466

FIG. 15

-SELECT_BASE_VOCAB PROGRAM~186
    -DISPLAY SENTENCE AND PROMPT USER TO SEPARATELY SPEAK EACH
    HILITED WORD IN THAT SENTENCE~436
    -FOR EACH WORD IN SENTENCE, STARTING WITH FIRST~438
        -HILITE WORD
        -GET NEXT UTTERANCE
        -LABEL UTTERANCE'S TOKEN AS BEING FOR HILTITED WORD
    -SCORE EACH UTTERANCE'S TOKEN AGAINST ITS LABELED WORD IN EACH
    OF BASE VOCABULARIES~440
    -ADD SCORES OF ALL UTTERANCES FOR EACH VOCABULARY~442
    -SELECT BASE VOCABULARY WITH BEST SCORE, BASING USER'S .VOC AND
    .USR FILES ON SELECTED BASE VOCABULARY~444

FIG. 16

-TUTORIAL PROGRAM~172
    -INITIALIZE~460
    -REPEAT UNTIL EXIT FROM WITHIN~461
        -GET NEXT LINE OF LESSON FILE~462
        -INTERPRET AND EXECUTE THAT LINE~463

FIG. 17

```
-LESSON FILE~182
    -CHAPTER1--BASE FILE SELECTION~464A
        -SET DEFAULTS FOR CHAPTER~475
        -LESSION~468A
            -DISPLAY INTRODUCTORY SCREEN
            -GET INPUT
        -...
        -SELECT BASE FILE LESSON~468B
            -RUN SELECT_BASE_VOCAB
        -...
    -CHAPTER2--INTRODUCTION TO TUTORIAL~464
    -CHAPTER3--HOW DRAGONDICTATE WORDS~464
    -CHAPTER4--THE VOICE CONSOLE AND DISABLING THE MICROPHONE~464
    -CHAPTER5--LEARNING TO DICTATE
    -CHAPTER6--BASIC PUNCTUATION
    -CHAPTER7--CORRECTING DICTATION WITH THE CHOICE LIST~464B
    -CHAPTER8--DELETING UTTERANCES WITH [CHOOSE 10]
    -CHAPTER9--SPELLING WORDS NOT ON CHOICE LIST
    -CHAPTER10-THE DICTIONARY AND ADDING NEW WORDS
    -CHAPTER11-CORRECTING OLD ERRORS WITH THE OOPS BUFFER
    -CHAPTER12-DICTATING DATES, NUMBERS, AND ADDRESSES
    -CHAPTER13-SAVING YOUR VOCABULARY FILES
    -...
    -CHAPTERN~464C
        -SET DEFAULTS FOR CHAPTER
        -BATCH TRAINING LESSON~468C
            -PROMPT USER IF WANTS TO PERFORM BATCH TRAINING~486
            -IF USER SAYS YES, CALL BATCH_TRAINING~488
            -ELSE, CONTINUE TO NEXT LESSION
            -...
        -EXIT LESSON~468D
            -PROMPT USER IF WANTS TO EXIT TUTORIAL~490
            -IF USER SAYS YES, EXIT TUTORIAL~492
            -ELSE, PROMPT USER TO CALL TUTOR MENU FOR OPTIONS~494
            -...
    -...
-DICTATION MODULE~466A
-GLOBAL MODULE~466B
-TUTOR MENU MODULE~466C
    -SET DEFAULTS FOR MODULE
    -DISPLAY TUTOR MENU
    -GET IMPUT
    -BRANCH BASEDD ON INPUT
-...
```

FIG. 18

```
-CHAPTER~464
    -SET DEFAULTS FOR CHAPTER~469
    -LESSON~468
        -OPTIONALLY DISPLAY MESSAGE~470A
        -OPTIONALLY FAKE DICTATION ACTION~470B
        -OPTIONALLY ADD ENTRIES TO STACK~470C
        -GET INPUT~470D
        -CONTINUE OR BRANCH BASED ON INPUT~470E
    -LESSON~468
    -LESSON~468
    -...
```

FIG. 19

```
-GET_EXPECTED_RESPONSE SUBROUTINE~178
    -CALL GET_ALLOWED_RESPONSE SUBROUTINE~520
    -IF RETURNS EXPECTED WORD AS USER RESPONSE~522
        -RETURN
    -IF RETURNS OTHER ALLOWED RESPONSE IN EVENT STACK~524
        -EXECUTE FUNCTION FOLLOWING THAT ALLOWED RESPONSE IN EVENT
        STACK
    -IF FUNCTION CALLED FROM EVENT STACK RETURNS WITH A "REPEAT",
    JUMP TO START OF THIS SUBROUTINE~525
```

FIG. 20

```
-GET_ALLOWED_RESPONSE SUBROUTINE~180
    -SET UTTERANCE_NUMBER TO 0~526
    -UTTERANCE_LOOP: REPEAT UNTIL EXIT FROM WITHIN~528
        -INCREMENT UTTERANCE_NUMBER~530
        -WAIT FOR USER INPUT~532
        -IF KEYSTROKE, RETURN WITH KEY AS RESPONSE~534
        -CALL LARGE VOCABULARY RECOGNIZER TO SCORE UTTERANCE'S TOKEN
        AGAINST LARGE VOCABULARY, REQUESTING SCORE OF BEST SCORING
        25 WORDS~536
        -SET USER_RESPONSE TO ZERO~538
        -WORD_LIST_LOOP: FOR EACH WORD RETURNED BY THE RECOGNIZER,
        IN ORDER OF SCORE WITH BEST SCORING FIRST~540
            -IF ITS SCORE IS WORSE THAN A GIVEN LEVEL~542
                -EXIT WORD_LIST_LOOP
            -IF IT IS AN ALLOWED RESPONSE WORD~546
                -SET USER_RESPONSE TO THE BEST SCORING ALLOWED
                RESPONSE WORD~548
```

FIG. 21A

```
            -CALL ADAPTIVE_TRAINING SUBROUTINE FOR
             TOKEN, AND ANY SIMILAR TOKEN[X]s FROM
             PREVIOUS LOOP, AND BEST SCORING ALLOWED
             RESPONSE WORD, IF THAT WORD IS THE
             EXPECTED WORD~550
        -LABEL TOKEN WITH BEST SCORING ALLOWED RESPONSE
         WORD, IF THAT WORD IS THE EXPECTED WORD~552
        -RETURN~553
    -IF USER_RESPONSE IS ZERO~554
        -SAVE TOKEN AS TOKEN[UTTERANCE_NUMBER]~556
        -IF UTTERANCE_NUMBER = 1~558
            -PROMPT USER TO REPEAT WHAT JUST SAID
        -OTHERWISE~560
            -PROMPT USER TO SAY EXPECTED WORD~562
            -IF UTTERANCE_NUMBER >2~564
                -COMPARE TOKEN[X]s WITH EACH OTHER~566
                -IF THREE SCORE WITHIN A GIVEN DISTANCE OF EACH
                 OTHER~568
                    -LABEL THE THREE CLOSELY SCORING TOKEN[X]s
                     WITH EXPECTED WORD~570
                    -SET USER_RESPONSE TO EXPECTED WORD~572
                    -EXIT UTTERANCE_LOOP~574
                -ELSE IF UTTERANCE_NUMBER = 5,~576
                    -LABEL THREE TOKEN[X]s WHICH COMPARE MOST
                     CLOSELY AS EXPECTED WORD~578
                    -SET USER_RESPONSE TO EXPECTED WORD~580
                    -EXIT UTTERANCE_LOOP~582
    -IF USER_RESPONSE IS NOT ZERO~584
        -CALL ADAPTIVE TRAINING SUBROUTINE FOR UTTERANCE'S THREE
         BEST SCORING TOKEN[X]s AND EXPECTED WORD~
        -SAVE THREE CLOSEST TOKEN[X]s, LABELED BY THEIR ASSOCIATED
         EXPECTED WORD~585
```

```
C:\VT > vt  ⌒200
⌒202
C:\VT > voicetyp.exe
DOS/16M Protected Mode RunTime              Version 4.20
Copyright (C) Rational Systems, Inc.         1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.           1986-1992

DragonD┌VoiceConsole─────────────────────┐1991,1992
   (C) Cop│ Plus Turn microphone on       │
          │  G    GO TO SLEEP             │
     ******│  E    EDIT words             │ on contained herein  ******
     ******│  S    SAVE vocabulary        │ y and should be      ******
     ******│  N    LOAD USER              │ AECI #:BCR-0113.     ******
           │  R    REVERT TO SAVED        │           ⌒401
           │  T    TRAIN                  │
   INHOUSE │  L    TUTORIAL               │
           │  U    UTILITIES              │
           │  C    CONTINUE               │
   Press P │                              │
           │ MIC=OFF [Default Application]│
           └──────────────────────────────┘
C:\VT >
C:\VT >
```

```
C:\VT > vt

C:\VT > voicetyp.exe
DOS/16M Protected Mode RunTime                    Version 4.20
Copyright (C) Rational Systems, Inc.              1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.                1986-1992

DragonD┌─VoiceConsole────────────────────────┐
 (C) Cop│                                     │nc. 1990,1991,1992
        │   Turn microphone on                │
   ****  │   GO TO SLEEP                       │  information contained herein  ******
   ****  │   EDIT words                        │  roprietary and should be      ******
   ****  │   SAVE vocabulary                   │  Agreement AECI #:BCR-0113.    ******
        │ N LOAD USER                         │
        │   REVERT TO SAVED                   │
        │   TUTORIAL                          │         ╲
        │   UTILITIES                         │          401A
        │ C CONTINUE                          │
INHOUSE │                                     │
Press P │ MIC=OFF                             │
        └─────────────────────────────────────┘
C:\VT >
C:\VT >
```

Figure 23

```
C:\VT > vt
C:\VT > voicetyp.exe
DOS/16M Protected Mode RunTime              Version 4.20
Copyright (C) Rational Systems, Inc.        1987 - 1992
Dragon Systems Speech Driver Version 4.04.28 ALPHA INHOUSE ACPA 32PAR
For use with the IBM VoiceType (TM) Speech Recognition System
  (C) Copyright Dragon Systems, Inc.        1986-1992

DragonDictate 100K Version 1.40.00
  (C) Copyright Dragon Systems, Inc. 1990,1991,1992

****    This program and the information contained herein    *****
****    is Confidential and Proprietary and should be        *****
****    treated as such. SEE Agreement AECI #:BCR-0113.      *****

INHOUSE VERSION

Press Plus for menu

┌─────────────────────────┐
    │ Enter user name:        │
    │                         │
    └─────────────────────────┘
                └─ 418
C:\VT >
C:\VT >
```

C:\VT > voicetyp.exe
DOS/16M Protected Mode RunTime                    Version 4.20
Copyright (C) Rational Systems, Inc.              1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.                1986-1992

DragonDictate 100K Version 1.40.00
  (C) Copyright Dragon Systems, Inc. 1990,1991,1992

****      This program and the information contained herein      *******
****      is Confidential and Proprietary and should be          *******
****      treated as such. SEE Agreement AECI #:BCR-0113.        *******

INHOUSE VERSION

Press Plus for menu
                         ┌──────────────────────────────┐
                         │  Create new user  foo2? [Y/N]│
                         └──────────────────────────────┘
                                            426
C:\VT >
C:\VT >
```

C:\VT > voicetyp.exe
DOS/16M Protected Mode RunTime                Version 4.20
Copyright (C) Rational Systems, Inc.          1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.            1986-1992
```

┌─ IMPORTANT! ─────────────────────────────────────┐
│                                                  │
│  As a NEW USER, it is very IMPORTANT to          │
│  run the tutorial. This will teach you           │
│  how to operate DragonDictate correctly and      │
│  allow the system to adapt to your voice         │
│  more quickly.                                   │
│                                                  │
│  This will greatly improve the accuracy          │
│  of your dictation, and allow you to use         │
│  the system more easily.                         │
│                                                  │
│  Would you like to run the tutorial? Y/N         │
│                                                  │
└──────────────────────────────────────────────────┘
                                            436

```
GetValidEvent( mask=1 )                                                    471
        Globals:
472 ───    TIMEOUT 40 (moff) (noclr) --> CALL global-mic-off
           ANYKEY (moff) (noclr) --> CALL global-mic-off
           ANYKEY (norm) (nxpg) (moff) (noclr) --> CALL global-unknown-key
           KEY 'Enter' (norm) (nxpg) (moff) (noclr) --> CALL global-key-not-now
           KEY 'KeyPadEnter' (norm) (nxpg) (moff) (noclr) --> CALL global-key-not-now
           ANYSPELLKEY (norm) (nxpg) (moff) (noclr) --> CALL global-key-not-now
           KEY '+' (norm) (nxpg) (moff) (noclr) --> CALL global-wrong-plus-key
           KEY '-' (norm) (nxpg) (moff) (noclr) --> CALL global-wrong-minus-key
           TIMEOUT 40 (norm) (nxpg) (noclr) --> CALL global-timeout
           KEY 'F1' (norm) (nxpg) (moff) (noclr) --> CALL global-get-help
           UTT "[get help]" (norm) (nxpg) (noclr) --> CALL global-get-help
           UTT_TOO_LOUD (norm) (nxpg) (moff) (noclr) --> CALL global-too-loud
           UTT_TOO_SOFT (norm) (nxpg) (moff) (noclr) --> CALL global-too-soft
           REJECTED_UTT (norm) (nxpg) (moff) (noclr) --> CALL global-rejected-utt
           UTT_STRANGE (norm) (nxpg) (moff) (noclr) --> CALL global-rejected-utt
           TALK_TOO_FAST (norm) (nxpg) (moff) (noclr) --> CALL global-talk-too-fast
           UTT_TOO_LONG (norm) (nxpg) (moff) (noclr) --> CALL global-utt-too-long
           KEY 'Esc' (norm) (nxpg) (moff) (noclr) --> CALL global-escape
           KEY 'Minus' (norm) (nxpg) (moff) (svmsg) --> CALL global-mainmenu
           UTT "[Tutor menu]" (norm) (nxpg) (svmsg) --> CALL global-mainmenu
           KEY 'Plus' (norm) (nxpg) (moff) (svmsg) --> CALL global-voice-console
           UTT "[voice console]" (norm) (nxpg) (svmsg) --> CALL global-voice-console
        Defaults:
474 ───    LASTWORD "[new paragraph]" (norm) (noclr) --> CALL default-lastword
           NEXTWORD ", "comma"" (norm) (noclr) --> CALL default-nextword
           LASTWORD "[new paragraph]" (nxpg) (noclr) --> CALL default-nextpage
           CURWORD "down" (nxpg) (noclr) --> CALL default-nextpage
           NEXTWORD ", "comma"" (nxpg) (noclr) --> CALL default-nextpage
           KEY 'F2' (norm) (noclr) --> CALL default-no-function-keys
           KEY 'F3' (norm) (noclr) --> CALL default-no-function-keys
           KEY 'F4' (norm) (noclr) --> CALL default-no-function-keys
           KEY 'F5' (norm) (noclr) --> CALL default-no-function-keys
           KEY 'F6' (norm) (noclr) --> CALL default-no-function-keys
           KEY 'F7' (norm) (noclr) --> CALL default-no-function-keys
           KEY 'F8' (norm) (noclr) --> CALL default-no-function-keys
           KEY 'F9' (norm) (noclr) --> CALL default-no-function-keys
           KEY 'F10' (norm) (noclr) --> CALL default-no-function-keys
           UTT "[oops!]" (norm) --> CALL d3gd-oops
        Cases:
476 ───    UTT "down" (norm) --> *e
           UTT "[choose 1 ]" (norm) --> GOTO d2gd-said-okay
           UTT "[OKAY]" (norm) --> GOTO d2gd-said-okay
           KEY 'Backspace' (norm) --> CALL d2gd-ignore-backspace
477 ───    LASTSPELLKEY '[' (norm) --> CALL d2gd-one-right
           ANYSPELLKEY (norm) --> CALL d2gd-one-wrong
        Ceiling:
End of Stack.
```

FIG. 28

```
/ *******************************************************************
 | ** MODULE NAME: final7.pln
 | ** Copyright (c) Dragon Systems,Inc. 1992
 | ** OWNER:     Joel Gould
 | ** CREATED:   September 4, 1992
 | ** FUNCTIONS
 | ** DESCRIPTION
502 ** Chapter 7
 | ** This topic teaches the user to correct dictation errors by
 | ** selecting words from the choice list.
 | *******************************************************************
 | ** MODIFICATIONS
 | **  ...
 | **
 \ *******************************************************************
```

504 ─ CHAPTER Correcting Dictation with the Choice List

```
   / DEFAULT NOCLEAR LASTWORD         CALL default-lastword
   | DEFAULT NOCLEAR NEXTWORD         CALL default-nextword
   | DEFAULT NEXTPAGE NOCLEAR LASTWORD  CALL default-nextpage
   | DEFAULT NEXTPAGE NOCLEAR CURWORD   CALL default-nextpage
   | DEFAULT NEXTPAGE NOCLEAR NEXTWORD  CALL default-nextpage
   | DEFAULT NOCLEAR 'F2'             CALL default-no-function-keys
   | DEFAULT NOCLEAR 'F3'             CALL default-no-function-keys
506| DEFAULT NOCLEAR 'F4'             CALL default-no-function-keys
   | DEFAULT NOCLEAR 'F5'             CALL default-no-function-keys
   | DEFAULT NOCLEAR 'F6'             CALL default-no-function-keys
   | DEFAULT NOCLEAR 'F7'             CALL default-no-function-keys
   | DEFAULT NOCLEAR 'F8'             CALL default-no-function-keys
   | DEFAULT NOCLEAR 'F9'             CALL default-no-function-keys
   | DEFAULT NOCLEAR 'F10'            CALL default-no-function-keys
   \ DEFAULT NOCLEAR ANYSPELLKEY      CALL default-no-spelling-keys

* IF INORDER GOTO chap7-start

508 ─ EDITOR RESET

* LESSON chap7-start

510 ─ CONSOLE MIC ON
    ─ CONSOLE SLEEP OFF
512 ─ PROMPT HIDE
514 ─ EDITOR SHOW
    *----------------------------------------------------------------
   /  `{HIGH}TOPIC: CORRECTING DICTATION WITH THE CHOICE LIST{NORM}
   |
   |  `This topic describes how to use the choice list to correct dictation
   |  `errors. You are going to learn how to:
516|
   |  `  \p Accept {NAMENORM}'s default choice
   |
   \  `  \p Choose another word from the choice list
```

FIG. 30A

```
       ⌈`Please say {SAY}"[okay]" to continue.{CR}
       ⌊`Please say {UTT}"[Tutor menu]" to display the menu.

⎾EXPECTING "[okay]"
518 ⎾
      IF INORDER CALL chap7-bonus-text

⌈PROMPT RESET
590 ⎾  PROMPT SHOW
       ⌊PROMPT HIGHLIGHT OFF
        *
        *

* PROMPT /when/suddenly/a/white/rabbit/with/pink/eyes/
       * PROMPT /ran/close/by/her/. \"period\"/
       ⌈PROMPT /[new paragraph]/
        PROMPT /there/was/nothing/so/very/remarkable/in/that/; \"semicolon\"/
        PROMPT /nor/did/Alice/think/it/so/very/much/out/of/the/way/to/
        PROMPT /hear/the/rabbit/say/to/itself/, \"comma\"/" \"open quote\"/
        PROMPT /oh/dear/! \"exclamation point\"/oh/dear/! \"exclamation point\"/
592 ⎰ PROMPT /I/shall/be/too/late/! \"exclamation point\"/" \"close quote\"/
        PROMPT /( \"open paren\"/when/she/thought/it/over/afterwards/, \"comma\"/
        PROMPT /it/occurred/to/her/that/she/ought/to/have/wondered/at/this/,
        \"comma\"/
        PROMPT /but/at/the/time/it/all/seemed/quite/natural/) \"close paren\"/;
       ⌊\"semicolon\"/

596 ⎾PROMPT HIGHLIGHT ON

598 ⎰⌈`Since you are starting a new topic, please start a new paragraph
    ⌊`in your document. Say {SAY}"[new paragraph]".

602 ⎾EXPECTING "[new paragraph]"
604 ⎾CHOICELIST 1="[new paragraph]"

606 ⎰⌈`Please begin dictating this lesson by saying the first word in the
    ⌊`Text Prompter, {SAY}"there".

610 ⎾EXPECTING "there"
612 ⎾CHOICELIST 1="there"

⌈`This is a choice list, which has appeared every time you've dictated a
        word.

616 ⎰  `If the word you said is correctly identified, it is listed first on the
        `choice list. However, you still have to tell {NAMENORM} that this
        `recognition is correct.

⌊`There are three ways to do this.

620 ⎾NEWPAGE

622 ⎰`The first is to say the next word. This
```

FIG. 30B

622 {
- `is the method you used in the previous topic.
- `The second way is to say {UTT}"[okay]". You used this method in earlier topics.
- `The third way is to say {UTT}"[choose 1]", since you want to choose the first word on the choice list.

626 ⎯ NEWPAGE

630 {
- `Until now, the word the Text Prompter asked you to dictate has always appeared as the first word on the choice list. But that doesn't always happen when you dictate in {NAMENORM}.
- `Sometimes the word you dictate will be an alternate choice on the list.
- `Sometimes it won't be on the list at all.
- `Please continue dictating from the Text Prompter, starting with `{SAY}"was".

636 ⎯ EXPECTING "was"
\*_____

638 ⎯ call dictate1-no-error    \* next: "nothing"
640 ⎯ call dictate1-no-error    \* next: "so"

652 {
- `Sometimes {NAMENORM} identifies the word said as a possibility, but not as the most likely choice. When this happens, the word will appear on the choice list, but not as the first choice.
- `Please dictate the next word.

656 ⎯ call dictate1-no-error    \* next: "very"
\*_____

660 ⎯ CHOICELIST 1="vary" 3="very"
666 ⎯ POINTAT CHOICELIST 3

668 {
- `Although you said {UTT}"very", {NAMENORM} thought that the most likely thing that you said was {UTT}"vary".
- `{NAMENORM} learns from its mistakes and adapts to your style of speech. Therefore, you must correct any recognition errors immediately.

NEWPAGE

672 {
- `If you fail to correct {NAMENORM}'s mistake in this case, every time you say `{UTT}"very", it will type {UTT}"vary". If this mistake goes by undetected, other words are also affected.
- `The next time you say {UTT}"merry", {NAMENORM} may think you mean `{UTT}"marry".

NEWPAGE

FIG. 30C

676 {
```
`If, as in this case, the word you spoke is not in the first position
`on the choice list, you must tell {NAMENORM} which word you actually
`spoke. You do this with the {UTT}"[choose n]" command, where {UTT}"n" re
`the number of the word on the choice list.
```
NEWPAGE 680 {
```
`In this case, you want {NAMENORM} to select the third word.
`Please say {SAY}"[choose 3]" now.
```

684 — CASE {NEXTWORD} CALL must-say-choose-n  
686 — EXPECTING "[choose 3]"  
\*_____

688 — CHOOSE 3

692 {
```
`Saying {UTT}"[choose 3]" made {NAMENORM} erase the word {UTT}"vary"
`from the text and type the word {UTT}"very" instead.

`Because you chose the word you spoke, {NAMENORM} no
`longer needs to show a list of possible interpretations of the utterance,
`and it has removed the choice list from the screen.

`As soon as you say the next word, the choice list will re-appear with a
`new set of possibilities.
```
NEWPAGE 696 {
```
`For the rest of this tutorial, the {NAMENORM} Tutorial will allow
`random recognition errors
`to occur while you practice your dictation. Correct them as soon as
`they happen, to prevent corruption
`of your vocabulary.

`If {NAMENORM} correctly identifies the word you say, continue on to
`the next word. If it incorrectly identifies the word you say, correct it
`by saying {UTT}"[choose n]", where {UTT}"n" is the number of the desired
`word on the choice list. If you don't correct your errors, the Tutorial
`will remind you.

`To start dictating again, please say the next word on your
`Text Prompter, {SAY}"remarkable".
```

700 — EXPECTING "remarkable"  
\*_____

702 — call dictate1-no-error      \* next: "in"  
708 — call dictate1-no-error      \* next: "that"

714 — CHOICELIST 1={CURWORD}

720 — `Please say {SAY}"; \"semicolon\"".

FIG. 30D

```
724 ┤ CASE "[choose 1]" CALL dlgd-said-okay
    └ CASE "[okay]" CALL dlgd-said-okay
726 ── EXPECTING "; \"semicolon\""

728 ── call dictate1-no-error                    * next: "nor"
    *------------------------------------------------------------
    ┌ *must-correct-errors
    │
734 ┤ `Notice that the word "nor" did not appear first on
    │ `your choice list. Please choose the correct word now,
    └ `and then continue dictating.

*------------------------------------------------------------
    ┌ CALL dictate1-on-list                     * next: "did"
738 │
    │ CHOICELIST 1={CURWORD}
762 ┤ CASE "[choose 1]" CALL dlgd-said-okay
    │ CASE "[okay]" CALL dlgd-said-okay
    │ EXPECTING "Alice"
    └ *------------------------------------------------------------
                                                expecting:
      *                                         ---------
766 ── CALL dictate1-no-error                   * think
768 ── CALL dictate1-no-error                   * it
770 ── CALL dictate1-on-list                    * so
      CALL dictate1-no-error                    * very
      CALL dictate1-no-error                    * much
      CALL dictate1-on-list                     * out
      CALL dictate1-on-list                     * of
      CALL dictate1-no-error                    * the
      CALL dictate1-no-error                    * way
      CALL dictate1-no-error                    * to
      CALL dictate1-no-error                    * hear
      CALL dictate1-no-error                    * the
      CALL dictate1-on-list                     * rabbit
      CALL dictate1-no-error                    * say
      CALL dictate1-no-error                    * to
      CALL dictate1-on-list                     * itself
      CALL dictate1-no-error                    * , \"comma\"
      CALL twoword1-open-quote                  * " \"open quote\"
                                                * oh
      CALL dictate1-no-error                    * dear `{NAMENORM} has two words for the {UTT}'!' character:
    `{UTT}"! \"exclamation point\"" and
    `{UTT}"! \"exclamation mark\"".

`While you use the {NAMENORM} Tutorial, however,
    `only {UTT}"! \"exclamation point\"" is active.
```

FIG. 30E

```
*********************************************************************
** MODULE NAME: dictate.pln
** Copyright (c) Dragon Systems,Inc. 1992
** AUTHOR:      Joel Gould
** CREATED:     Sept 17, 1992
** FUNCTIONS
** DESCRIPTION
** {NAMESHORT} Trainer lesson plan component
** -Originally part of global.pln, this file contains the lesson plan
** code which handles dictation practice
** ...
*********************************************************************
** ...
*********************************************************************
*
* DICTATION PRACTICE SUBROUTINE - 1
*
* Includes support for
*     - choose words
*
* Each subroutine should be called for one word in the teleprompter.
* Just before calling the subroutine should be an EXPECTING command
* for the word in question.  Each subroutine will end with an EXPECTING
* command and return only if the next word in the teleprompter was
* spoken.
*
* For example:
*
* PROMPT /one/two/three/four/
* EXPECTING "one"
* CALL dictate1-no-error      * one is 1st on choice list; expecting two
* CALL dictate1-no-error      * two is 1st on choice list; expecting three
* CALL dictate1-on-list       * three is put in random slot on choice list
*                  *            upon exit we will be expecting four
* CHOICELIST 1="four"
*
*********************************************************************
*
* ---> DICTATE1-RANDOM
*
* Currently forces an on-list error if we just had a misrecognition.
* Also introduces errors 5% of the time (just to be sure we get one)
*
LESSON dictate1-random
IF SHORTWORD GOTO dictate1-no-error
RANDOMIZE 50 dictate1-no-error
IF MISRECOG  GOTO dictate1-on-list
RANDOMIZE  5 dictate1-on-list
GOTO dictate1-no-error
*-------------------------------------------------------------------
*********************************************************************
```

FIG. 31A

```
*
* ---> DICTATE1-NO-ERROR
*
* Put current word first on choice list, then get the next word
*
640   LESSON dictate1-no-error
640A  CHOICELIST 1={CURWORD}
640B  LESSON dictate1-no-error-after
640C  HIGHLIGHT NEXTWORD              * LASTWORD <- CURWORD
640D  CASE "[okay]"        GOTO dlgd-said-okay
640E  CASE "[choose 1]" GOTO dlgd-said-okay
640F  EXPECTING {CURWORD}
640G  RETURN
      *------------------------------------------------------------------
      * We end up here if the user has said OKAY or something else which
      * accepts the last word and clears the choice list.  Here we expect
      * him, to say the next word.
      *
646   LESSON dlgd-said-okay
646A  CHOOSE {LASTWORD}
646B  EXPECTING {CURWORD}
646C  RETURN
      *------------------------------------------------------------------

***********************************************************************
*
* ---> DICTATE1-ON-LIST
*
* Pick a random slot for the word to appear which is not the first
* slot on the choice list.  Make sure the user says "choose-N",
* then get the next word
*
740   LESSON dictate1-on-list
740A  CHOICELIST ?={CURWORD}
740B  HIGHLIGHT NEXTWORD              * LASTWORD <- CURWORD
740C  CASE {CURWORD}       CALL dlon-say-choose-n
740D  CASE "[okay]"        CALL dlon-say-choose-n
740E  CASE "[choose 1]" CALL dlon-say-choose-n
740F  EXPECTING "[choose {?}]"
740G  CHOOSE {?}
740H  EXPECTING {CURWORD}
740I  RETURN
      *------------------------------------------------------------------
746   LESSON dlon-say-choose-n
746A  AFTERSEEN 1 dlon-short1-say-choose-n ┌ `The performance of {NAMESHORT} improves with every error it makes,
      │ `but only if you correct the mis-recognitions.  If you do not correct
746B ┤ `every error, {NAMESHORT}'s performance will get worse.
      │
      └ `{NAMESHORT} has incorrectly identified the word you just spoke.
```

FIG. 31B

```
        `The correct word {UTT}{LASTWORD} is on the choice list, however,
        `and you can correct {NAMESHORT}'s mis-recognition. Please {WHAT2DO}.

746D   REMOVEUTT
746E   RETURN REPEAT
       *_____

748    LESSON dlon-short1-say-choose-n
748A   RANDOMIZE 25 dlon-short2-say-choose-n
748B   RANDOMIZE 33 dlon-short3-say-choose-n
748C   RANDOMIZE 50 dlon-short4-say-choose-n 748D   `Please correct {NAMESHORT}'s mis-recognition before continuing.
       `Please {WHAT2DO}.

748E   REMOVEUTT
748F   RETURN REPEAT
       *_____

750    LESSON dlon-short2-say-choose-n

`Please {WHAT2DO} to correct that last mis-recognition.

REMOVEUTT
        RETURN REPEAT
        *_____

752    LESSON dlon-short3-say-choose-n

`It is very important to correct all mis-recognitions to
        `prevent your vocabulary files from being corrupted.
        `Please say {SAY}{EXPECTED}.

REMOVEUTT
        RETURN REPEAT
        *_____

754    LESSON dlon-short4-say-choose-n

`Correct the last error before continuing to dictate.

REMOVEUTT
        RETURN REPEAT
        *_____
```

FIG. 31C

```
*  ---> DICTATE3-RANDOM
*
* Currently forces an on-list error if we just had a misrecognition.
* Also introduces errors 5% of the time (just to be sure we get one)
*
* When an error is indicated, we choose on-list 60% of the time and
* off-list 40% of the time.
*
```

- 779  ␣LESSON dictate3-random
- 779A ␣IF SHORTWORD GOTO dictate3-no-error
- 779B ␣RANDOMIZE 50 dictate3-no-error
- 779C ␣IF MISRECOG  GOTO d3-error
- 779D ␣RANDOMIZE 5  d3-error
- 779E ␣GOTO dictate3-no-error
- 779E ␣*------------------------------------------------------------
- 779F ␣LESSON d3-error
- 779G ␣RANDOMIZE 60 dictate3-on-list
- 779H ␣GOTO dictate3-off-list
       *------------------------------------------------------------

FIG. 31D

```
TOPIC: CORRECTING DICTATION WITH THE CHOICE LIST

This topic describes how to use the choice list to correct
dictation errors. You are going to learn how to:

■ Accept DragonDictate's default choice

■ Choose another word from the choice list

Please say "[okay]" to continue.
Please say "[Tutor menu]" to display the menu.
```

F1="get help"   Minus=save/quit   Plus=mic on/off     Pln 1 Topic 8 Ln 6

There was nothing so very remarkable in that; nor did Alice think it so very much out of the way to hear the rabbit say to itself "oh dear!" oh

600

Since you are starting a new topic, please start a new paragraph in your document. Say "[new paragraph]".

F1="get help"   Minus=save/quit   Plus=mic on/off        Pln 1 Topic 8 Ln 6

Figure 33

There was nothing so very remarkable in that; nor did Alice think it so very much out of the way to hear the rabbit say to itself "oh dear! Oh ⌐594

Since you are starting a new topic, please start a new paragraph in your document. Say " [new paragraph] ". ⌐600

F1="get help"   Minus=save/quit   Plus=mic on/off   Pln 1 Topic 8 Ln 6

Figure 34

There was nothing so very very remarkable in that; nor did Alice think it so very much out of the way to hear the rabbit say to itself "oh dear! oh  ⎯594

There ⎯613

| | |
|---|---|
| F1 | there |
| F2 | their |
| F3 | never |
| F4 | they're |
| F5 | better |
| F6 | where |
| F7 | error |
| F8 | bearer |
| F9 | mirror |
| F10 | [reject] |

⎯224

The first is to say the next word. This is the method you used in the previous topic.

The second way is to say "[okay]". You used this method in earlier topics.

The third way is to say "[choose 1]", since you want to choose the first word on the choice list.

say "[next page]" to continue, or "[previous page]"

⎯624

⎯628

F1="get help"   Minus=save/quit   Plus=mic on/off   Pln 1 Topic 8 Ln 6

Figure 37

There was nothing so very very remarkable in that; nor did Alice think it so very much out of the way to hear the rabbit say to itself "oh dear! Oh  —594

613 ⌒ There

| | |
|---|---|
| F1 | there |
| F2 | their |
| F3 | never |
| F4 | they're |
| F5 | better |
| F6 | where |
| F7 | error |
| F8 | bearer |
| F9 | mirror |
| F10 | [reject] |

224

632

Until *now*, the word the Text Prompter asked you to dictate has always appeared as the first word on the choice list. But that doesn't always happen when you dictate in DragonDictate.

Sometimes the word you dictate will be an alternate choice on the list.

Sometimes given won't be on the list at all.

Please continue dictating from the Text Prompter, starting with "was".

or "[previous page]"

634

F1="get help"   Minus=save/quit   Plus=mic on/off       Pln 1 Topic 8 Ln 6

Figure 38

There was nothing so very very remarkable in that; nor did Alice think it so very much out of the way to hear the rabbit say to itself "oh dear! Oh ⌐594

There was ⌐642

```
F1    was
F2    lost
F3    wants
F10   [reject]
```
⌐644

F1="get help"   Minus=save/quit   Plus=mic on/off   Pln 1 Topic 8 Ln 6

Figure 39

There was nothing so very remarkable in that; nor did Alice think it so very much out of the way to hear the rabbit say to itself "oh dear! Oh ⟵ 594

There was nothing ⟵ 648

650

F1  nothing
F2  often
F3  but
F4  button
F5  method
F6  putting
F7  buffet
F8  perfect
F9  - "hyphen"
F10 [reject]

Pln 1 Topic 8 Ln 6

F1="get help"    Minus=save/quit    Plus=mic on/off

Figure 40

There was nothing so very remarkable in that; nor did Alice think it so very much out of the way to hear the rabbit say to itself "oh dear! oh ⎯ 594

There was nothing so ⎯ 650

Sometimes DragonDictate identifies the word said as a possibility, but not as the most likely choice. When this happens, the word will appear on the choice list, but not as the first choice.

Please dictate the next word.

⎯ 654

| F1 | nothing |
|---|---|
| F2 | often |
| F3 | but |
| F4 | button |
| F5 | method |
| F6 | putting |
| F7 | buffet |
| F8 | perfect |
| F9 | - "hyphen" |
| F10 | [reject] |

⎯ 658

F1="get help"  Minus=save/quit  Plus=mic on/off  Pln 1 Topic 8 Ln 6

There was nothing so very remarkable in that; nor did Alice think it so very much out of the way to hear the rabbit say to itself "oh dear! oh There was nothing so vary

664

| | |
|---|---|
| F1 | vary |
| F2 | Mary |
| F3 | very |
| F4 | married |
| F5 | varied |
| F6 | merit |
| F10 | [reject] |

674

If you fail to correct DragonDictate's mistake in this case, every time you say "very", it will type "vary". If this mistake goes by undetected, other words are also affected. The next time you say "merry", DragonDictate may think you mean "marry".

say "[next page]"

F1="get help"  Minus=save/quit  Plus=mic on/off  Pln 1 Topic 8 Ln 6

Figure 43

```
-Initialization()¯1002
    ¯...
    -take start time¯1008
    -run integer tasks¯1010
    -take end time¯1012
    -subtract start time from end time to get task duration¯1014
    -set NumberToPassPrefilter and ScoreThreshold in correspondence
    to task duration¯1016
    ¯...
    -detect if DSP board is present¯1018
    -if DSP board is not present, set DSPBoardPresent to false¯1020
    -else¯1021
        -set DSPBoardPresent to true¯1022
        -download DSP code to DSP board¯1024
        -initialize DSP board¯1026
    ¯...
    -call MSW SetWindowsHookEx with WH_CALLWNDPROC to set hook for
    CallWndProc procedure that monitors menu messages¯1028
    -call MSW SetWindowsHookEx with WH_KEYBOARD to set hook for
    KeyboardProc procedure that monitors keystrokes¯1030
    -initialize and clear MenuStack¯1034
    -initialize and clear HWndToAppTable¯1038
    -display the VoiceBar¯1042
    -set RecognizerOn to true¯1044
    -set ChoiceListOperative to false¯1046
    ¯...
```

FIG. 47

```
-DSP board code¯1025
    ¯...
    -every 1/100 second¯1050
        -perform utterance detection¯1052
        -if detect utterance, notify host¯1054
        ¯...
        -increment OddEvenCount¯1056
        -calculate an FFT of the last 1/100 second of audio
        signal¯1058
        -calculate the Cepstrum of the last 1/100 second of audio
        signal¯1060
        -place the FFT and selected Mel Cepstrum values into a frame
        format¯1062
        -if OddEvenCount is even save the just calculated frame¯1064
        -if OddEvenCount is odd¯1066
            -add the individual values of the just calculated frame
            to the corresponding values of the frame saved in the
            previous 1/100 second¯1068
            -divide each value in the frame by two¯1070
            -send the averaged frame, representing FFT and Mel
            Cepstrum values for last 1/50 second, to the host
            processor for addition to the frame buffer¯1072
    ¯...
```

FIG. 48

```
-CallWndProc(code, wParam, lParam)~1029
    -if message is WM_INITMENU, indicating a menu is about to become
    active~1664
        -clear MenuStack~1666
        -place a MenuEntry with the MenuHandle indicated by
        WM_INITMENU in the MenuStack~1668
    -if message is WM_INITMENUPOPUP, indicating a popup menu is
    about to become active~1670
        -if a MenuEntry with the pop-up menu's menu handle in the
        MenuHandle field is not currently at the end of the
        MenuStack, add such an entry and place in the preceding
        entry in the MenuStack the MenuItemID corresponding to the
        item in the parent menu from which the popup menu came~1672
    -if message is WM_MENUSELECT, indicating a user has selected a
    menu item~1674
            -scan the MenuStack for an entry with MenuHandle
            matching that in the WM_MENUSELECT message~1676
            -if find a match~1678
                -if find the match other than at the end of the
                MenuStack, delete the MenuEntries after the matching
                MenuEntry from the stack~1680
                -record the menu item ID returned by WM_MENUSELECT
                in the MenuItemID field of the MenuEntry with the
                matching MenuHandle~1682
            -else use calls to MSW GetSubMenu to do a tree search,
            starting with menu handle returned by GetMenu, until
            find the menu with selected item, and then reestablish
            the MenuStack with the path in the menu tree which leads
            to menu of the selected item.~1684
    -if message is WM_NCDESTROY, indicating a window is being
    closed~1686
        -if WM_NCDESTROY is being sent to a window having a handle
        in the HWndToAppTable, delete that handle's entry in
        table~1688
    -if message is WM_ACTIVATE, indicating a window is being
    activated~1690
        -call ApplicationTracking with the window's HWnd~1692
        -pop-up any key alteration windows, if any, appropriate for
        the new active window~1693
    -if message is WM_CREATE, indicating a window is being
    created~1694
        -if the new window's handle is already in HWndToAppTable,
        delete the handle's entry in table~1696
    -if message is WM_SHOWWINDOW, indicating a window that was
    previously covered is being uncovered~1698
        -if a call to MSW GetWindow with GW_OWNER for the window
        indicates it is a application window or a dialog window,
        call ApplicationTracking with the window's HWnd~1700
    -return~1702
```

FIG. 49

```
-KeyboardProc(code, wParam, lParam)~1032
    -...
    -if ChoiceListOperative is true and the last message group
     header before the read pointer in the JournalPlaybackProc's
     message queue indicates the current message group was created
     for a word recognized from the "Choice List" state~1033
        -use MSW PostMessage to send keystroke information
         represented by wParam and lParam to ChoiceList~1035
        -return with indication the keystroke message which caused
         KeyboardProc to be called should be discarded~1037
    -...
```

FIG. 50

```
-MenuStack~1036
    -list of MenuEntry structs~1854, each containing
        -MenuHandle~1856
        -MenuItemID~1858
```

FIG. 51

```
-HWndToAppTable~1040
    -a list of entry structs each containing~1654
        -HWnd~1656
        -AppState~1658
        -AppMode~1660
        -ShiftKeyOn~1704
        -ControlKeyOn~1706
        -AltKeyOn~1708
```

FIG. 52

```
-FastDemon()~1048
    -if DSPBoardPresent is true~1074
        -if RecognizerOn is false~1076
            -if the DSP board is on, stop it~1078
        -else~1080
            -if the DSP board is stopped, start it~1082
            -if have received notification of an utterance detection
             from the DSP board, call RecSetupCallAndOutput for the
             utterance~1083
    -else if DSPBoardPresent is false~1084
        -if RecognizerOn is true~1086
            -perform incremental utterance detection on new signals
             in audio buffer~1088
            -if an utterance is detected, call RecSetupCallAndOutput
             for the utterance~1090
            -while there is more than 1/50 of a second of audio
             signal in the audio buffer~1092
                -for every 1/50 second of the signal~1094
                    -calculate its FFT and Cepstrum~1096
                    -place the FFT and selected Mel Cepstrum values
                     into a frame format~1098
                    -add the frame to end of a frame buffer~1100
    -if  choice list is displayed and ChoiceListOperative is
    false~1104
        -increment DelayCount~1106
        -if DelayCount is => ChoiceListRemovalDelay, remove display
         of choice list~1108
    -...
```

FIG. 53

```
-RecSetupCallAndOutput(Utterance)~1102
    -if CurrentMode is BaseVocabSelectMode~1154
        -clear StateList and then place in it the state having
        versions of the PromptedWord from each base vocabulary~1156
        -call Recognize for the utterance with current StateList and
        with LanguageContext and StartString Nulled~1158
        -use MSW PostMessage to send BaseVocabSelection routine a
        PromptedUtterance message, with a pointer to the recognition
        results, including the recognition's score for each of the
        words from the PromptedWord's corresponding state~1160
        -return~1162
    -else if CurrentMode is TrainWordMode~1164
        -clear StateList and then place PromptedWord in it~1166
        -if the PromptedWord is not a word listed in the "Train
        Word" state and if OnlyListenForWordsBeingTrained is false,
        add the "Train Word" state to the StateList~1168
        -call Recognize for the utterance with the current
        StateList, and with LanguageContext and StartString
        NULLed~1170
        -use MSW PostMessage to send TrainWordDialog a
        PromptedUtterance message, with a pointer to the recognition
        results and with a pointer to the recognition's
        utterance~1172
        -return~1174
    -else if CurrentMode is CommandMode or DictateMode~1176
        -clear StateList and then add the it the "Always Active" and
        "Global Commands" states~1178
        -if a call to MSW GetSystemDebugState returns SDS_MENU
        indicating a menu is currently active~1180
            -set CurrentMode to CommandMode~1182
        -else~1184
            -call ApplicationTracking with a Null HWnd to get the
            current entry in the HWndToAppTable~1186
            -set CurrentAppState and CurrentMode equal to the
            AppState and AppMode in the table entry returned~1188
            -add CurrentAppState to StateList~1190
        -if CurrentMode is DictateMode~1192
            -if ChoiceList routine has not been initialized,
            initialize it~1193
            -if ChoiceListOperative is true add "Choice List" state
            StateList~1194
            -add "DictateMode" state to StateList~1196
            -call LanguageContextTracking to set the current
            LanguageContext~1198
        -if CurrentMode is CommandMode~1200
            -call CommandTracking to set the
            CurrentTrackingState~1202
            -add the CurrentTrackingState to the StateList~1204
            -set LanguageContext to Null~1206
```

FIG. 54A

```
-call Recognize for the utterance with its associated
 LanguageContext and StateList and with StartString Null~1208
-store the utterance just recognized, and the
 LanguageContext and StateList for the utterance, and its up
 to nine best scoring words and their associated states in a
 WordHistoryBuffer~1210
-call PerformWordsOutput for the best scoring word, its
 associated state, and pointer into utterance's entry in
 WordHistoryBuffer, if any~1212
-return~1214
-...
```

FIG. 54B

-Recognize(Utterance, LanguageContext, StateList, StartString)~1110
    -if StartString is not empty, limit active vocabulary to words
    in states of StateList which start with the letters of the
    StartString, independent of case~1114
    -if CurrentMode is DictateMode add an initial language context
    component, which depends in part from LanguageContext, to each
    prefilter score~1116
    -score the prefilter start of each word model in the entire
    vocabulary~1118
    -limit active word model candidates to the NumberToPassPrefilter
    words with best scoring prefilter scores, ensuring that all of
    the words in the active vocabulary up to the
    NumberToPassPrefilter are included~1120
    -for each active word model candidate~1122
        -if it is a helper model, create in RAM a list of pointers
        to the PELs listed in that model~1124
        -else if it is a phonetic model,~1126
            -create an empty PEL pointer list in RAM for the
            model~1128
            -for each phoneme in its phonetic spelling~1130
                -define a corresponding PIC according to the phoneme
                and its preceding phoneme or silence and its
                following phoneme or silence~1132
                -add to the model's PEL pointer list a pointer to
                each PEL associated with that PIC~1134
    -for each successive frame of Utterance in frame buffer until
    scoring of all active word candidates is complete~1136
        -for each active word model candidate~1138
            -use the frame to update the relative score of the match
            of the word model against the frame sequence of the
            current Utterance~1140
            -if CurrentMode is DictateMode, if the match procedure
            makes a transition to one of the word models first four
            nodes, add a language context component, which depends
            in part from LanguageContext, to the score~1142
            -if the word model's score is worse than ScoreThreshold,
            remove it from the list of active word model
            candidates~1144
    -place word IDs of the up to NoOfWordsToReturn best scoring
    words from the active vocabulary which score above a given
    threshold, and their corresponding scores, in a results
    buffer~1146
    -for each such word ID, scan active states in the StateList in
    order of the state's priorities, to find the first state in
    which the Word ID occurs and place that state in association
    with the word's ID in the results buffer~1148
    -return with a pointer to the results buffer~1150

```
-if StartString is not empty~2112
    -for each word in the states of the StateList~2114
        -add the word to the active vocabulary if its spelling
        contains a MatchingString which meets the following
        three conditions:~2116
                -each uppercase letter in StartString is matched by
                the same upper case letter in a corresponding
                position in the MatchString~2118
                -each lower case letter in in StartString is match
                by the same letter in either case in a corresponding
                position in the MatchString~2120
                -The MatchString starts the spelling of the word,
                except if the word's spelling contains a "[", the
                matching string can start immediately after the
                "["~2122
```

FIG. 55A

```
-BaseVocabSelection()~1216
    -display Create User dialog box and obtain up to eight character
    file name from the user~1218
    -display Identify Microphone dialog box and obtain description
    of user's microphone~1219
    -clear scores for each base vocabulary~1220
    -if user identifies a microphone type, weight scores of the base
    vocabularies associated with that microphone type~1222
    -load SELECTION.VOC and SELECTION.USR file~1224
    -display Sample Voice dialog box~1226
    -set CurrentMode to BaseVocabSelectMode~1228
    -for each word in prompted word list~1230
        -set PromptedWord equal to the current word~1232
        -prompt user to say PromptedWord by displaying it~1234
        -message loop~1236
            -call MSW GetMessage~1238
            -if receive PromptedUtterance message~1240
                -add score associated with each base vocabulary's
                version of the word to a total for that base
                vocabulary~1242
                -if the score of one of the base vocabularies
                exceeds that of all the others by more than a
                specified threshold, exit for loop~1244
                -skip to for loops iteration for next word in
                prompted word list~1246
    -select the base vocabularies whose associated word models have
    the best score~1248
    -...
    -create a new directory for the user~1250
    -create a copy of the selected base vocabulary's .USR file, with
    the pre-extension portion of its file name the name entered by
    the user, in the user's directory so the PIC table and PEL
    models in that .USR file will be used in the recognition of that
    user's utterances~1254
    -Set CurrentMode to CommandMode~1256
```

FIG. 56

```
-TrainWordDialog(WordList)~1256
    -display Train Word dialog box~1260
    -set CurrentMode to TrainWordMode~1262
    -for each active word on WordList~1264
        -set PromptedWord equal to the word's ID~1266
        -prompt user to say PromptedWord by displaying~1268
        -if the Repetitions button pressed is~1270
            -"Light": set MinRepetitions to 1 and MaxRepetitions to
            3~1272
            -"Normal": set MinRepetitions to 3 and MaxRepetitions to
            5~1274
            -"Intense": set MinRepetitions to 6 and MaxRepetitions
            to 9~1276
        -display MinRepetitions unlit indicator lights~1278
        -set TokensForWord and GoodScoringTokensForWord both to
        zero~1280
        -message loop~1282
            -call MSW GetMessage~1284
            -...
            -if receive PromptedUtterance message~1286
                -if the best scoring word in the recognition results
                associated with the PromptedUtterance message is
                other than the PromptedWord and if that best scoring
                word has a score above a certain threshold, call
                PerformWordsOutput for the best scoring word and its
                associated recognized state~1287
                -else, if the best scoring word in the recognition
                result associated with PromptedUtterance message is
                the PromptedWord and if it has a score above a
                certain threshold~1288
                    -increment TokensForWord~1290
                    -save utterance associated with
                    PromptedUtterance message as a token for
                    PromptedWord~1292
                    -light first unlit indicator light~1294
                    -if score of utterance against the previous
                    model of PromptedWord is better than a specified
                    GoodScore threshold, increment
                    GoodScoringTokensForWord~1296
                    -if TokensForWord => MaxRepetitions or if
                    GoodScoringTokensForWord => MinRepetitions, exit
                    message loop~1298
                        -else if there is no unlit indicator light, add
                        one~1300
            -if [Alt+s]~1304
                -remove Train Word dialog box~1306
                -return~1308
            -...
        -call WordTraining Program subroutine for PromptedWord with
        utterances saved for that word~1310
    -remove Train Word dialog box~1312
    -return~1314
```

FIG. 60

```
-PerformWordsOutput(Word, State, WordHistoryBufferPointer)~1112
    -if ChoiceListOperative is true and the choice list is not the
    active window~1390
        -if State is not "Choice List"use MSW PostMessage to send
        RemoveChoiceList message to ChoiceList routine~1392
    -if Word has any ExtraData in its State~1394
        -if first byte in the ExtraData field indicates following
        bytes are DragonDictate script~1396
            -call MacroInterpreter to interpret the script~1398
            -return~1400
        -else if the first byte in the ExtraData field indicates the
        following bytes are to be fed to the
        JournalPlaybackProc~1402
            -copy the following ExtraData bytes to TextOutput~1404
    -else if Word has no ExtraData in its State~1406
        -copy the word's spelling (prior to " []", if any) to
        TextOutput~1408
    -if ShiftKeyOn is true for the currently active window~1410
        -capitalize first letter of TextOutput~1412
        -set ShiftKeyOn to false for the currently active
        window~1414
    -if ControlKeyOn is true for the currently active window~1416
        -replace first character of TextOutput with its control key
        equivalent~1418
        -set ControlKeyOn to false for the currently active
        window~1420
    -if AltKeyOn is true for the currently active window~1422
        -replace first character of TextOutput with its alt key
        equivalent~1424
        -set AltKeyOn to false for the currently active window~1426
    -copy a message group header, indicating whether or not the
    characters in TextOutput are associated with a word from the
    "Choice List" state, into the JournalPlaybackProc's message
    queue~1427
    -copy each character in TextOutput into the
    JournalPlaybackProc's message queue following the message group
    header~1428
    -call MSW SetWindowsHookEx with WH_JOURNALPLAYBACKPROC to
    install the hook for the JournalPlaybackProc~1430
    -if CurrentMode is DictateMode, and if the state of the best
    scoring word is other than "Choice List", use MSW PostMessage to
    send DisplayChoiceList message to ChoiceList routine with
    WordHistoryBufferPointer, which points to Word's associated the
    utterance just recognized in WordHistoryBuffer~1432
```

FIG. 64

```
-ChoiceList()˜1393
   ˜...
      -message loop˜1433
         -call MSW GetMessage˜1435
         -if message is˜1437
            -DisplayChoiceList message containing a pointer to a
            specified Utterance in WordHistoryBuffer˜1439
               -set ChoiceListOperative to true˜1441
               -if the choice list window is not displayed, display
               it˜1443
               -display the up to nine best scoring words stored in
               the utterance's entry in the WordHistoryBuffer in
               numbered order˜1445
               -clear StartString˜1447
            -a printable keystroke message˜1449
               -add the key, with its case, to StartString˜1451
               -call Recognize for ChoiceList's original utterance,
               StateList, LanguageContext and current
               StartString˜1453
               -if Recognize comes back with fewer than 9 words,
               word search .VOC file and backup dictionary for
               words which match StartString, independent of case,
               up to the number of remaining unfilled slots in the
               ChoiceList˜1455
               -if best scoring word does not match case of
               StartString, designate StartString as first choice
               word, and other words after it in choice order˜1457
               -re-display choice list with results of re-
               recognition and word search, if any˜1459
               -use highlighting to indicate which letters of the
               first choice word in ChoiceList belong to the
               StartString˜1461
            -a "Choose N" message˜1463
               -if there is an Nth word in ChoiceList˜1465
                  -set ChoiceListOperative to false˜1467
                  -remove display of ChoiceList˜1469
                  -if first choice word stored in
                  WordHistoryBuffer for ChoiceList's current
                  utterance had a spelling output, output enough
                  keystrokes to delete keystrokes, if any,
                  associated with that prior spelling output˜1471
                  -call PerformWordsOutput for Nth word and it
                  corresponding state if any˜1475
               -else beep for error˜1477
            -RemoveChoiceList message˜1479
               -set ChoiceListOperative to false˜1481
               -set DelayCount to zero˜1483
         ˜...
```

FIG. 65

```
-MacroInterpreter(MacroScript)~1382
    -create a MacroInstance for running of current MacroScript~1434
    -...
    -until reach end of the MacroScript~1386
        -find the next macro statement in the MacroScript~1438
        -if statement is~1440
            -"MenuPick[string]": call MenuPick subroutine for the
            string~1442
            -"ControlPick[string]": call ControlPick subroutine for
            the string~1444
            -"SpellMode": and if ChoiceListOperative is true~1446
                -make choice list the active window~1448
                -set CurrentMode to CommandMode~1450
            -"CommandMode":~1452
                -set CurrentMode to CommandMode~1454
                -set the AppMode associated with the currently
                active window in HWndToAppTable to CommandMode~1456
            -"DictateMode":~1458
                -set CurrentMode to DictateMode~1460
                -set the AppMode associated with the currently
                active window in HWndToAppTable to CommandMode~1462
            -"MicrophoneOff":~1464
                -set RecognizerOn to false~1466
                -set MicOffConfirmed to false~1468
            -"MicrophoneOn":~1470
                -set RecognizerOn to true~1472
                -set MicOffConfirmed to false~1473
            -"ShiftKey": set the ShiftKeyOn value in the currently
            active window's entry in the HWndToAppTable to true~1476
            -"ControlKey": set the ShiftKeyOn value in the currently
            active window's entry in the HWndToAppTable to true~1478
            -"AltKey": set the ShiftKeyOn value in the currently
            active window's entry in the HWndToAppTable to true~1480
            -...
    -delete current MacroInstance~1482
    -return~1484
```

FIG. 67

```
-JournalPlaybackProc(code, wParam, lParam)~1403
    -if code equals HC_GETNEXT~1487
        -copy the unread message element pointed to by, or
        following, the JournalPlaybackProc's read pointer to the
        location in memory pointed to by lParam~1488
    -else if code equals HC_SKIP~1489
        -increment the read pointer to the next unread message
        element, if there is one~1490
        -if the read pointer points past the last unread message
        element in the message queue~1492
            -call MSW UnhookWindowsHookEx for the
            JournalPlaybackProc to de-active its hook~1494
            -clear the message queue and zero the read and write
            pointers~1496
    -return~1498
```

FIG. 68

```
-WordTraining(Word, TokenList)~1311
    -if Word has one or more models~1502
        -if Word has more than one word model~1504
            -score each token in the TokenList against each of
            Word's word models~1506
            -associate each token with the word model against which
            it scores best~1508
        -else, associate each token with Word's single model~1510
        -for each of Word's pronunciations with which tokens have
        been associated ~1512
            -set GoodSpelledModelTokens and GoodHelperModelTokens to
            0~1516
            -if the pronunciation has a spelled model, call Training
            to adapt that spelled model with all the tokens
            associated with the pronunciation's phonetic or helper
            model, adding the number of such tokens that were
            successfully used to adapt the spelled model to
            GoodSpelledModelTokens~1518
            -if the pronunciation has a helper model, call Training
            to adapt that helper model with all the tokens
            associated with the pronunciation's phonetic or helper
            model, adding the number of such tokens that were
            successfully used to adapt the spelled component as
            GoodHelperModelTokens~1520
            -if GoodHelperModelTokens and GoodSpelledModelTokens are
            both 0~1522
                -if pronunciation has a helper model, delete it~1524
                -call TrainNewModel to build a new helper model for
                the pronunciation using all of the tokens associated
                with the pronunciation~1526
            -else, if there is a helper model and GoodHelper-
            ModelTokens is 0~1528
                -delete the helper model~1530
    -else if Word had no models~1532
        -call TrainNewModel to build a helper model for Word using
        all of the token in the TokenList~1534
    -return~1536
```

FIG. 69

```
-States
    -vocabulary System
        -group System
            -group "Always Active"~1568
                -"[Command Mode]" /script "CommandMode"~1570
                -"[Dictate Mode]" /script "DictateMode"~1572
                -"[Go to Sleep]" /script "GoToSleep"~1574
                -[Oops] /script "WordHistory 1"~1576
                -"[What Can I Say]" /script
                "ShowRecognitionGroups"~1578
            -group "Global Commands"~1580
                -...
                -"[Shift Key]" /script "ShiftKey"~1582
                -"[Alt Key]" /script "AltKey"~1584
                -"[Control Key]" /script "ControlKey"~1586
                -...
                -"a [alpha]"~1588
                -"b [bravo]"~1588
                -"c [charlie]"~1588
                -"d [delta]"~1588
                -"e [echo]"~1588
                -"f [foxtrot]"~1588
                -"g [golf]"~1588
                -"h [hotel]"~1588
                -"i [india]"~1588
                -"j [juliett]"~1588
                -"k [kilo]"~1588
                -"l [lima]"~1588
                -"m [mike]"~1588
                -"n [november]"~1588
                -"o [oscar]"~1588
                -"p [papa]"~1588
                -"q [quebec]"~1588
                -"r [romeo]"~1588
                -"s [sierra]"~1588
                -"t [tango]"~1588
                -"u [uniform]"~1588
                -"v [victor]"~1588
                -"w [whiskey]"~1588
                -"x [xray]"~1588
                -"y [yankee]"~1588
                -"z [zulu]"~1588
                -...
                -"[Spell Mode]" /script "SpellMode"~1590

-group "Choice List"~1712
                -...
                -"[Choose 1]" /keys {Alt+1}{Enter}
                -"[Choose 2]" /keys {Alt+2}{Enter}
                -"[Choose 3]" /keys {Alt+3}{Enter}
                -"[Choose 4]" /keys {Alt+4}{Enter}
```

FIG. 70A

```
                -"[Choose 5]" /keys {Alt+5}{Enter}
                -"[Choose 6]" /keys {Alt+6}{Enter}
                -"[Choose 7]" /keys {Alt+7}{Enter}
                -"[Choose 8]" /keys {Alt+8}{Enter}
                -"[Choose 9]" /keys {Alt+9}{Enter}
                -"[Choose 10]" /keys {Alt+0}{Enter}
                -...
        -vocabulary Voicebar
            -group Voicebar
                -...
                -group "Train Word"~1285
                    -"[Stop Training]" /keys {Alt+s}~1289
                -...
```

FIG. 70B

```
-AddWordDialog(State)~1316
    -...
    -message loop~1318
        -call MSW GetMessage
        -...
        -if message is "OK"~1320
            -...
            -if there is a valid word name string in the Word Name
            edit box and a valid state selected in the
            Vocabulary/Group ComboBox~1322
                -call FindOrMakeMatchingWord for the string to find
                or make a word ID corresponding to that string~1326
                -if the word ID is not listed in the selected state,
                create an entry for it in the selected state~1328
                -if there is a string in the Resulting Actions edit
                box, place string in word's ExtraData field in
                state, preceded by Keystrokes or Script byte,
                depending upon whether keystroke or Script radio
                button is selected~1330
            -remove Add Word dialog box~1332
            -return~1334
            -...
        -...
```

FIG. 71

```
-FindOrMakeMatchingWord(String)⁻1336
    -scan .VOC file for word with a spelling matching String⁻1338
    -if find one, return with matching word's ID⁻1340
    -else ⁻1342
        -create a new word ID in .VOC file, set its spelling equal
        to String, and give it an empty phonetic spelling list⁻1344
        -if String contains a portion of text inside a top level
        "[]", set String equal to that portion of text⁻1346
        -strip all punctuation characters besides apostrophes⁻1348
        -clear IDQueue⁻1350
        -for each successive word in String⁻1352
            -scan .VOC file for word with spelling matching the
            successive word⁻1354
            -if find one, place ID of word in IDQueue⁻1356
            -else⁻1358
                -return with the new word's ID⁻1360
        -place one empty phonetic spelling in the new word's
        phonetic spelling list⁻1362
        -for each ID in IDQueue⁻1364
            -if the ID's word has no phonetic spelling⁻1366
                -empty the word's phonetic spelling list⁻1368
                -return with the new word's ID⁻1370
            -for each phonetic spelling of the ID's word⁻1372
                -for each prior spelling in the new word's phonetic
                spelling list⁻1374
                    -if the total number of spelling's in the
                    phonetic spelling list created in conjunction
                    with the current ID is less than
                    SpellingNumberLimit, create a spelling which
                    concatenates the ID's current phonetic spelling
                    to the end of the prior phonetic spelling,
                    altering phonemes near the boundary of its
                    concatenated spelling if required by
                    coarticulation rules⁻1376
            -remove the prior phonetic spellings⁻1378
        -return with new word's ID⁻1380
```

FIG. 72

```
-FindWordDialog⁻1550
    -...
        -message loop⁻1552
            -call MSW GetMessage⁻1554
            -if message is⁻1556
                -...
                -"Delete"⁻1558
                    -if a word has been selected for deletion in
                    conjunction with a given path listed in the
                    Vocabulary/Group ComboBox, delete the selected word
                    from the state indicated in the Vocabulary/Group
                    ComboBox⁻1560
                    -...
                -...
            -...
```

FIG. 73

```
-ApplicationTracking(HWnd)~1594
    -if HWnd is Null~1596
        -call MSW GetActiveWindow to get the handle of the currently
        active window~1598
        -set HWnd equal to active window handle~1600
    -if HWnd has an entry in HWndToAppTable, return with that entry
    as the SelectedEntry~1602
    -else~1604
        -add a new entry to HWndToAppTable with HWnd, CommandMode as
        its AppMode, an empty AppState, and ShiftKeyOn,
        ControlKeyOn, and AltKeyOn all set to false~1606
        -make the new entry the SelectedEntry~1608
        -call MSW GetWindowWord to get the hinstance of the program
        module running the HWnd's window~1610
        -call MSW GetModuleFileName for that hinstance to get the
        file name of the program which is running HWnd's window~1612
        -compare the file name returned against a list of file names
        associated with stored application states~1614
        -if find a match, set the new entry's AppState equal to the
        state associated with the matching file name~1618
        -else if the file name returned by MSW GetModuleFileName is
        that associated with a MSW file for running MS-DOS
        applications in a window~1620
            -call MSW GetWindowText for HWnd to get the text of its
            window's title bar~1622
            -compare the text returned with a list of text
            associated with application states~1624
            -if find a match, set the new entry's AppState equal to
            the state associated with the matching text~1628
        -if the new entry's AppState is still empty~1630
            -create a new temporary logical state for its
            application~1632
            -set the new entry's AppState equal to the new temporary
            logical state~1634
        -if a call to MSW GetWindow with GW_OWNER for HWnd's window
        indicates the window is a dialog box~1636
            -call MSW GetWindowText for the caption text of the
            dialog box~1638
            -if that text corresponds to the name of a sub-state
            within the AppState of the new entry~1640
                -change the new entry's AppState to that sub-
                state~1642
            -else~1644
                -create a temporary sub-state in the state stored in
                the current entry's AppState~1646
                -place that sub-state in the current entry's
                AppState~1648
    -return with the SelectedEntry~1650
```

FIG. 74

```
-LanguageContextTracking()~1714
    -call MSW GetFocus to get the handle of the window currently
    having the focus~1716
    -use MSW SendMessage to send the focus window the WM_GETDLGCODE
    message to find out if the focus window is a Multi-Line Edit
    control (MLE)~1718
    -if it is an MLE~1720
        -use MSW SendMessage to send EM_GETSEL to the MLE to get the
        character index of the starting position of the current
        selection~1722
        -use MSW SendMessage to send EM_LINEFROMCHAR to the MLE with
        the character index of the start of the current selection to
        get the line number in the MLE of the line on which the
        current selection starts~1724
        -use MSW SendMessage to send EM_GETLINE to the MLE with the
        line number of the current line to get a copy of that
        line~1726
        -use MSW SendMessage to send EM_LINEINDEX to the MLE with
        the line number of the current line to get the character
        index of start of that line~1728
        -subtract the index of the start of the current line from
        the index of the start of the current selection to determine
        the position in the copy of the current line of the start of
        the current selection~1730
        -starting backward from that position, look in the current
        line for last complete word before the current selection,
        and if that last complete word extends back into the
        previous line look for it in that previous line by using
        EM_LINEFROMCHAR AND EM_GETLINE~1732
        -if there is such a last complete word, set LanguageContext
        equal to it~1734
        -else, set LanguageContext to Null~1736
        -return~1738
    -else if CurrentAppState is associated with an external
    application which has a predefined interface for providing
    language context~1740
        -send a message to that predefined interface to obtain its
        language context~1742
        -set language context equal to that context~1744
        -return~1746
    -...
    -set LanguageContext to Null~1748
    -return~1750
```

FIG. 75

```
-CommandTracking()~1752
    -clear the CommandPhraseList~1754
    -if a call to MSW GetSystemDebugState returns SDS_MENU,
    indicating a menu is currently active~1756
        -for the menu handle of each entry in MenuStack~1758
            -call GetMenuCommandPhrases~1760
    -else~1762
        -call MSW GetActiveWindow to get the handle of the currently
        active window~1764
        -if a call to MSW GetMenu for the active window returns a
        menu handle, call GetMenuCommandPhrases for the menu~1766
        -if a call to MSW GetSystemMenu returns a menu handle to a
        copy of the system menu, call GetMenuCommandPhrases for the
        copy of the system menu~1768
        -use one or more calls to MSW GetWindow to perform a tree
        search for the handles of all windows, if any, included in
        active window~1770
        -for each window handle obtained~1772
            -if a call to MSW SendMessage sending the window a
            WM_GETDLGCODE message returns an indication the window
            is not a control window, skip to the iteration for the
            next window handle~1774
            -else if a call to IsWindowClickable indicates the
            window is not clickable, skip to the iteration for the
            next window handle~1776
            -else~1778
                -add an empty CommandPhraseEntry in the
                CommandPhraseList~1780
                -call MSW SendMessage to send the window a
                WM_GETTEXT message to get the control's associated
                text~1782
                -if the value returned in response to the
                WM_GETDLGCODE message indicated the window is a
                static control~1784
                    -if the control's text has an accelerator, save
                    a command to feed the accelerator key to the
                    JournalPlaybackProc in the CommandPhraseEntry's
                    CommandOutput~1788
                    -else~1790
                        -delete the empty CommandPhraseEntry created
                        for this window handle~1792
                        -skip to the iteration for the next window
                        handle~1794
                -call StripControlOrMenuItemName with String equal
                the control's text and TextType equal Control~1796
                -if StripControlOrMenuItemName returns with an empty
                ReturnStringList, delete the current window's
                CommandPhraseEntry and skip to iteration for next
                window~1798
                -else~1800
```

FIG. 76A

```
            -place the ReturnStringList's first string in
            the CommandPhraseEntry's CommandPhrase field,
            enclosed in "[]"˜1802
            -if the CommandPhraseEntry's CommandOutput is
            empty fill it with a "ControlPick[first string]"
            script command˜1804
            -if the ReturnStringList has a second
            string˜1806
                  -add a copy of the CommandPhraseEntry to the
                  CommandPhraseList and copy the second string
                  enclosed in "[]" into its CommandPhrase
                  field˜1808
                  -if the additional CommandPhraseEntry's
                  CommandOutput is empty fill it with a
                  "ControlPick[second string]" script
                  command˜1810
      -check to see if there is a tracking state in the tracking state
      cache which includes the exact same collection of command
      phrases as the active window's CommandPhraseList˜1812
      -if so˜1814
            -make the matching tracking state the
            CurrentTrackingState˜1816
            -set the matching tracking state's LastUsedTime to the
            current time˜1818
      -else˜1820
            -create a new, empty, tracking state˜1822
            -for each CommandPhraseEntry of the CommandPhraseList˜1824
                  -call FindOrMakeMatchingWord for the CommandPhrase˜1826
                  -place the word ID, if any, returned by
                  FindOrMakeMatchingWord in the new tracking state˜1828
                  -load the word ID's associated ExtraData field in the
                  new tracking state with the value of the
                  CommandPhraseEntry's CommandOutput˜1830
            -if the tracking state cache has the maximum number of
            tracking states recorded in it, delete from the cache the
            tracking state with the oldest LastUsedTime˜1832
            -store the new tracking state in the tracking state
            cache˜1834
            -make the new tracking state the CurrentTrackingState˜1836
            -set the new tracking state's LastUsedTime to the current
            time˜1838
      -return˜1840
```

FIG. 76B

```
-CommandPhraseList,˜1842
      -a list of CommandPhraseEntry structs˜1844, each containing
            -CommandPhrase˜1846
            -CommandOutput˜1848
            -MenuHandle˜1850
            -MenuItemPosition˜1852
```

FIG. 77

-GetMenuCommandPhrases(hmenu)¯1860
    -set NumberOK and LastItemWasSeparatorOrNumber to false¯1862
    -call MSW GetMenuItemCount to get number of items in the menu
    for which this subroutine was called¯1864
    -for each of those items starting with the first¯1866
        -call MSW GetMenuItemID to get the menu item's ID¯1868
        -if MSW GetMenuItemID returns an indication the menu item is
        a separator, set LastItemWasSeparatorOrNumber to true¯1870
        -else¯1872
            -create an additional CommandPhraseEntry in the
            CommandPhraseList¯1874
            -call MSW GetMenuString to get the menu item's
            spelling¯1876
            -if LastItemWasSeparatorOrNumber is true, set NumberOK
            to true¯1878
            -else set NumberOK to false¯1880
            -call StripControlOrMenuItemName with String equal to
            the menu item's spelling, with TextType equal Menu, and
            with the current value of NumberOK¯1882
            -if StripControlOrMenuItemName returns with an empty
            ReturnStringList, delete the CommandPhraseEntry¯1884
            -else¯1886
                -place the first string in the ReturnStringList in
                the CommandPhraseEntry's CommandPhrase enclosed in
                "[]"¯1888
                -place a "MenuPick[first string]" script command in
                the CommandPhraseEntry's CommandOutput¯1890
                -place the menu's menu handle in the
                CommandPhraseEntry's MenuHandle and the menu item's
                position in the CommandPhraseEntry's
                MenuItemPosition¯1892
                -if there is a second string in the
                ReturnStringList¯1894
                      -add a copy of the CommandPhraseEntry to the
                    CommandPhraseList¯1896
                    -place the second string into the copy's
                    CommandPhrase field enclosed in "[]"¯1898
                    -place a "MenuPick[second string]" script
                    command in the copy's CommandOutput¯1900
    -return¯1902

FIG. 78

-StripControlOrMenuItemName(String, TextType, NumberOK, LastItemWasSeparatorOrNumber)~1904
    -if TextType is Menu, if NumberOK is true, and if first character in first String is an "&" followed by a numeral and then a space or tab~1908
        -set String equal to spelling of the numeral~1910
        -place String in ReturnStringList~1912
        -set LastItemWasSeparatorOrNumber to true~1914
        -return with ReturnStringList~1916
    -set LastItemWasSeparatorOrNumber to false~1917
    -if String contains a top level matching pair of parenthesis~1918
        -place two strings in the ReturnStringList, one corresponding to the part of String before the parenthesis, and one corresponding to the entire String~1920
    -else place String in the ReturnStringList~1922
    -for each string in the ReturnStringList~1924
        -strip any "&" associated with an accelerator from a String~1926
        -strip any leading spaces~1928
        -strip any trailing combination of spaces, periods, colons, and exclamation marks~1930
        -strip any character, such as a tab, with a value of 20 Hex or less, and any characters following it~1932
        -if the string contains three or more numeric fields separated by non-numeric characters remove the string from the ReturnStringList~1934
    -return with the ReturnStringList~1938

FIG. 79

-IsWindowClickable (HWnd)~1940
    -call MSW GetWindowRect to get the screen coordinates of the window's bounding rectangle~1942
    -for each of the center point and four corner points of the bounding rectangle~1944
        -if a call to MSW WindowFromPoint indicates the window is the top window at that point, return with the current point~1946
        -else~1948
            -if using MSW SendMessage to send the WM_NCHITTEST message returns HTTRANSPARENT, assume the top window is a group box and return with the current point~1950
    -return with an indication that there is no clickable point in the window~1952

FIG. 80

```
-MenuPick(String)~1954
    -clear the KeystrokeHistoryString~1958
    -if a call to MSW GetSystemDebugState returns SDS_MENU,
    indicating that a menu is currently active~1960
        -for each MenuEntry in MenuStack, starting at the end~1962
            -clear CommandPhraseList~1964
            -call GetMenuCommandPhrases for the MenuEntry's
            MenuHandle~1966
            -for each CommandPhraseEntry placed in the
            CommandPhraseList by GetMenuCommandPhrases~1968
                -if the spelling within the "[]" of its
                CommandPhrase matches String~1970
                    -add to the KeystrokeHistoryString the arrow
                    keystrokes necessary to move from the position
                    of the MenuEntry's MenuItemID to that associated
                    with the CommandPhraseEntry's
                    MenuItemPosition~1972
                    -add "enter" to the KeystrokeHistoryString~1974
                    -use the JournalPlaybackProc to playback the
                    KeystrokeHistoryString~1976
                    -return~1978
            -add an "escape" key to the KeystrokeHistoryString~1980
            -delete the last MenuEntry from the end of the
            MenuStack~1982
    -else~1984
        -call MSW GetActiveWindow, GetMenu, and GetSystemMenu to get
        the active window's main menu and its system menu~1986
        -clear the CommandPhraseList~1988
        -for the active window's menu call
        GetMenuCommandPhrases~2000
        -for the active window's system menu call
        GetMenuCommandPhrases~2002
        -for each CommandPhraseEntry in the CommandPhraseList~2004
            -if the spelling within "[]" of its CommandPhrase
            matches String~2006
                -if the CommandPhraseEntry's MenuHandle is that of
                active window's main menu, add to the
                KeystrokeHistoryString an "Alt" followed by the
                arrow keystrokes necessary to go from first item in
                the menu to the CommandPhraseEntry's
                MenuItemPosition, followed by an "Enter"~2008
                -else if its menu handle is that of the active
                window's system menu, add to the
                KeystrokeHistoryString an "Alt-Spacebar" followed by
                the arrow keystrokes necessary to go from the first
                item in the system menu to the item represented by
                the MenuItemID of the matching CommandPhraseEntry,
                followed by an "Enter"~2010
                -use the JournalPlaybackProc to play keystrokes back
                to active application~2012
                -return~2014
    -display an error message~2016
    -return~2018
```

FIG. 81

-ControlPick(String)~1956
    -call MSW GetActiveWindow to get the handle of the currently
    active window~2020
    -use one or more calls to MSW GetWindow to perform a tree search
    for the handles of all child windows, if any, included in the
    active window~2022
    -for each child window handle obtained~2024
        -if using MSW SendMessage to send the child window the
        WM_GETDLGCODE message returns an indication the child window
        is not a non-static control, skip to the iteration for the
        next child window~2026
        -call MSW SendMessage to send the child window a WM_GETTEXT
        message to get the control window's associated text~2028
        -call StripControlOrMenuItemName with window's text as
        String and with TextType equal to Control~2030
        -if any string in the ReturnStringList returned by
        StripControlOrMenuItemName matches the String with which
        ControlPick was called~2032
            -if a call to IsWindowClickable for the window returns a
            clickable point, uses the JournalPlaybackProc to send
            the window the WM_LBUTTONDOWN and then the WM_LBUTTONUP
            messages at that point~2034
            -return~2036
    -if no control window with text matching ControlPick's String is
    found, display an error message.~2038
    -return~2040

FIG. 82

-PropertiesTabOfAdvancedModifyWordDialog(Word, State)~2054
    -...
    -message loop~2056
        -call MSW GetMessage~2058
        -if message is~2060
            -...
            -OK~2062
                -if Forget Training button is pressed, remove word's
                helper model from .USR file~2064
                -...
            -...
        -...

FIG. 85 B

-if Forget Training button is pressed, remove word's
helper model from .USR file and reset the PIC and
PEL counts on each of the word's PIC's and
PEL's~2064A

FIG. 85A

-SlowDemon()~2074
    -...
    -if HandsFree is true, RecognizerOn is false,
    MicOffConfirmed is false, and if (either there are no
    MacroInstances or there is at least one MacroInstance
    waiting for user input), call MicrophoneWarning~2076
    -...

FIG. 87

-MicrophoneWarning()~2078
    -set CurrentMode to CommandMode~2080
    -set RecognizerOn to true~2082
    -call MSW MessageBox to display, get input from, and remove
    Microphone Warning message box~2084
    -if MSW MessageBox returns with~2086
        -Yes~2088
            -set RecognizerOn to false~2088
            -set MicOffConfirmed to true~2090
    -return~2092

FIG. 88

WORD RECOGNITION SYSTEM USING LANGUAGE CONTEXT AT CURRENT CURSOR POSITION TO AFFECT RECOGNITION PROBABILITIES

RELATED APPLICATIONS

This is a division of a parent application Ser. No. 08/382,752, filed Feb. 1, 1995. This parent application has since been abandoned in favor of a file wrapper continuation application Ser. No. 08/956,498, which is currently pending. The parent application, itself, was a continuation-in-part of U.S. patent application Ser. No.07/976,413 filed Nov. 13, 1992, which has issued as U.S. Pat. No. 5,428,707.

FIELD OF THE INVENTION

The present invention relates to apparatuses and methods for improving the performance and ease of operation of systems which recognize signals generated by users to represent words, such as speech or handwriting recognition systems.

BACKGROUND OF THE INVENTION

Systems capable of performing speech recognition are well known in the prior art. These are systems which respond to a spoken word by producing the textual spelling, or some other symbolic output, associated with that word. Commonly, speech recognition systems operate in the following manner. First, they receive from a microphone an electrical representation of the acoustic signal generated by the utterance of the word to be recognized. In FIG. 1 a simplified representation of such an acoustic signal 100 is shown in the form of a spectrogram, which plots frequency along the vertical axis, time along the horizontal axis, and the intensity of the sound at any given frequency and time by degree of darkness. Such systems normally receive such signals as an analog waveform generated by a microphone, which corresponds to the variations in air pressure over time associated with the sound of a spoken word. As they receive such signals they perform an analog to digital conversion, which converts the amplitude of the acoustic signal into a corresponding digital value at each of a succession of evenly spaced points in time. Commonly, such sampling is performed between 6,000 to 16,000 times per second for speech recognition Once a digital representation of the amplitude waveform is obtained, digital signal processing is performed upon that digital waveform. For example, in prior art DragonDictate speech recognition systems digital signal processing is used to take an FFT, or fast Fourier transform, of the signal. This produces a digitized spectrogram representation 102 of the signal shown in FIG. 2. This spectrogram provides a vector, or frame, 104 for each 50th of a second. Each such frame is an ordered succession of values which represents the intensities at each of seven frequency ranges for each such 50th of a second. Although not shown in FIG. 1 or FIG. 2, the vector 104 also includes an energy term which represents the overall sound energy for each fiftieth of a second, and eight cepstral parameters. These cepstral parameters provide frequency-related information for each fiftieth of a second which focuses on that part of the total speech signal which is generated by a user's vocal tract, and, thus, which is particularly relevant in speech recognition.

Once a series 102 of frames 104 is produced for an utterance, as is shown in FIG. 2, that series 102, which we call a token, is matched against each of a plurality of word models 108 to find which of them it most closely matches. As is shown in FIG. 2, when this matching is performed, a process known as time aligning seeks to stretch or compress successive portions of the word model 108 as it is fitted against the token model 102 to achieve the best match. On FIG. 2, this is shown, for example, by the mapping of the two token vectors 104A against the single word model vector 109A, and the mapping of the three vectors 104B against the single model vector 109B. When this comparison is done, silence models 110 and 112, respectively, are put at the beginning and end of each word model. This is done because the utterance to be recognized will normally be preceded and followed by silence in a discreet utterance recognizer, in which words to be recognized are to be spoken separately.

FIG. 3 schematically represents the recognition process, in which the process of time aligning shown in FIG. 2 is performed between the utterance model 102 and each of the plurality of word models labeled 108A through 108N. The circles with loop arrows on top of them shown in FIG. 3 correspond to the model vectors 109 shown in FIG. 2, which also have looped arrows on top of them. The looped arrow represents the fact that when the time aligning occurs a given frame, or vector, in the word model can be mapped against one or more vectors of the token. A score is given to each of the mappings, indicating how similar the vectors of the token are to those of each of the word models they are mapped against. The word whose word model has the best score is normally considered the recognized word.

The above description of the basic operation of a speech recognition system is a highly simplified one. Much more detailed descriptions of such systems is given in U.S. Pat. Nos. 4,783,803, issued to James K. Baker et al. on Nov. 8, 1988, and entitled "Speech Recognition Apparatus And Method"; U.S. Pat. No. 4,903,305, issued to Laurence Gillick et al. on Feb. 20, 1990, and entitled "Method for Representing Word Models For Use In Speech Recognition"; U.S. Pat. No. 4,866,778, issued to James K. Baker on Sep. 12, 1989, and entitled "Interactive Speech Recognition Apparatus", and U.S. Pat. No. 5,027,406, issued to Jed Roberts et al. on Jun. 25, 1991, and entitled "Method For Interactive Speech Recognition And Training". The patents have all been assigned to the assignee of the present invention, and they are all hereby incorporated by reference herein.

SUMMARY OF THE INVENTION

It is an object of the present invention to provide apparatuses and methods for increasing the ease, convenience, and accuracy with which a user of a word recognition system, such as a speech recognition system, can train that system to understand his words.

It is another object of the present invention to provide apparatuses and methods which increase the ease and accuracy with which a major portion of the population can use such a recognition systems which come with pre-trained word models.

It is still another object of the present invention to provide apparatuses and methods which increase the ease with which users can correct errors in word recognition.

It is yet another object of the present invention to provide apparatuses and methods which improve the ability to control a speech recognition system by voice alone.

It is still another object of the present invention to provide apparatuses and methods which reduce the number of training samples of a word a user has to generate to achieve a given level of word recognition performance.

It is yet another object of the present invention to provide apparatuses and methods which increase the ability of word recognition to control and/or provide input to other programs running on the same computer system as it is.

It is still another object of the present invention to provide apparatuses and methods which enable a word recognition system to achieve better recognition when used for the purpose of creating and editing text.

It is yet another object of the present invention to provide apparatuses and methods which improve word recognition in a system which has both spelled word models and custom word models.

It is still another object of the present invention to increase the ease with which a speech recognition system can be made to recognize phrases composed of multiple words.

It is yet another object of the present invention to provide a speech recognition system which can provide satisfactory performance when run on computers having substantially different computational resources.

The present invention relates to methods and apparatuses for enabling a user to obtain improved recognition performance, ease of training, hands free operation, and control of other programs with a word recognition system, such as one designed to recognize speech.

According to one aspect of the present invention, a word recognition system is provided which receives a given user generated alphabetic signal in association with a given word signal to be recognized. It responds to the receipt of the given alphabetic signal by increasing the probability that it will recognize, as corresponding to the given word signal, a vocabulary word having a spelling containing the character represented by the given alphabetic signal, even though the case of that character in the recognized vocabulary word's spelling may not be represented by the given alphabetic signal. This enables the user to use alphabetic filtering to limit recognition to words starting with a desired letter without having to worry about whether the case of the letter he enters mattes that of the letter in the desired word. In many embodiments, such alphabetic filtering is used in re-recognition, that is, to re-recognize a word signal which was not recognized as desired in the system's first attempt to recognize it. It is preferred that the user be able to enter multiple such alphabetic signals, to further increase the chance that the system will select the desired word.

According to another aspect of the invention, a system for training a word recognizer prompts the user to generate a word signal representing a given vocabulary word, scores a word signal generated after the user is so prompted against one or more of vocabulary words other than the prompted word; and determines the degree to which the post-prompt word signal should be used to train pattern information associated with the prompted word as a function of how well that word signal scores against those other vocabulary words. Preferably the other vocabulary words against which the post-prompt word signal is scored are command words, and, if the post-prompt word has a certain score against such a command word, the system causes that command to be executed. This is valuable because it enables a user to control the system by generating word signals, even when the system is performing training. For example, when used to train a speech recognition system, it enables a user to control the system by voice even when it is being used to train acoustic models.

According to another aspect of the invention, a system for training a word recognizer is provided in which the number of training word signals a user is prompted to generate for a given word is a function of how well the training word signals generated score against signal models associated with the word. In some embodiments of the invention, the training word signals are scored against each other, with more training signals being required if the initial models received do not score well against each other, indicating that at least some of them are not proper training signals for the given word. In other embodiments, the training signals are scored against prior pattern information for the given word, and if the training signals do not score well against the prior pattern information, more of them are requested. This is done because the more poorly the training signals for a given word score against the pattern information the system has for that word, the more the system needs training data to improve its model for the word.

According to another aspect of the present invention, a speech recognition system is provided which can automatically create an acoustic model of a phrase by concatenating the acoustic models of each of a succession of individual vocabulary words whose spellings match those of the successive words of the phrase. Preferably, the system changes the concatenated acoustic model to reflect the coarticulation which takes place when words are spoken continuously together. In some embodiments of the invention the phrase for which the concatenated acoustic model is made is specified by the user. In others, it comes from text, such as the name of an active command, associated with another program running on the same computer as the speech recognition system.

According to another aspect of the invention a word recognition system obtains information about the state of another program running on the same computer as it is, and uses that information to dynamically vary the probability of which words it will recognize. In some embodiments of this aspect of the invention, the recognition system initiates the exchange of information, such as by evoking an operating system function which transfers such information. In some embodiments the information transferred identifies commands available in another program and the recognizer increases the chance that command words corresponding to those commands will be recognized. In such systems, it is preferred that the information transferred also identify the output which the recognition system should make when a given command word is recognized to cause the other program to perform the command's corresponding function. In some embodiments, the information obtained is about the text adjacent to a cursor in the other program, and this information is used to alter the probability of what word will be recognized as a function of the linguistic context of the cursor.

According to another aspect of the invention, a word recognition system obtains information on which program unit, such as an application program or dialog box, currently has input focus on the word recognizer's associated computer system. It uses this information to create a vocabulary state associated with that program unit into which the user can place vocabulary words. All the words placed in such a vocabulary state will be included in the active vocabulary of words eligible for recognition whenever the system detects that the vocabulary state's associated program unit currently has the focus.

According to another aspect of the invention, a word recognition system finds items in the text adjacent a cursor in a text editor, uses them to define a current language context, and varies the probability of which words will be selected by its recognition process as a function of that current language context. In some embodiments, the cursor and text are part of the same program as the word recognition system, and in others they are part of a different program.

According to another aspect of the present invention, a word recognition program designed to run on different computer systems having different computational resources available for use by the recognition program detects the computational resources currently available to it and alters the instructions it executes in response. In some embodiments of this aspect of the invention, the program causes less computationally intensive signal processing to be performed on word signals to be recognized in response to a detection that certain computational resources, such as a digital signal processor, are not available to it. In some embodiments, the recognition process uses different thresholds for winnowing down the number of word models a word signal to be recognized is compared against as a function of the computational resource available to the program.

According to another aspect of the invention, a speech recognition system tests to see if its voice response, that is, its ability to respond to a voice input by performing an associated function, has been shut off without having been explicitly confirmed by the user. If so, it turns voice response back on and prompts the user to confirm if voice response is to be turned off. If the user confirms that the system's voice response is to be shut off, the system shuts it off with an indication that the user has confirmed the shut off. Otherwise it leaves it on. This is useful because it virtually prevents the voice response from being turned off for any length of time by accident, which can be very important for users, such as handicapped users, who cannot manually turn such voice response back on.

According to another aspect of the present invention, a word recognition system stores both a first and a second set of pattern information for each of a plurality of vocabulary words. For example, the first set of pattern information can be phonetic word models and the second set of pattern information can be custom word models built if training samples for a word from a user vary too much from the spelled model. The system includes a user interface designed to enable the user to selectively cause the recognizer to disregard the second set of pattern information for a selected vocabulary word during recognition. For example, where the second sets of pattern information are custom word models, this makes it easy for the user to get rid of a custom word model which is based on bad training data.

According to another aspect of the invention, a word recognition system has a plurality of word model sets, each of which defines a word model for each of a common set of vocabulary words. The system scores the match of a word signal representing a given vocabulary word against word models for that vocabulary word from each of the word model sets. Preferably this scoring is relative, so the scores give an accurate indication of relatively how well each of the different sets represents the word signal. It is also preferred that this scoring be repeated for word signals of multiple vocabulary words. The system selects the word model set whose word models have the best score against the word signals, and it increases the likelihood that its recognition will expend more computational resources performing pattern matching against the selected word model set than against any other word model set.

The above summary of the invention is provided for the purpose of providing an overview. It is not intended to be as accurate, or as complete, as the description of the invention contained in the claims. Where there is any disagreement between the two, the language of the claims should be considered the more accurate description of the invention.

DESCRIPTION OF THE DRAWINGS

These and other aspects of the present invention will become more evident upon reading the following description of the preferred embodiment in conjunction with the accompanying drawings, in which:

FIGS. 5A and 5B provide a partial, simplified pseudocode representation of the main MS-DOS DragonDictate Program, representing features relevant to the present invention;

FIGS. 6A and 6B provide a partial, simplified pseudo-code representation of the Voice Console routine of MS-DOS DragonDictate program, which allows the user to control certain aspects of that program;

FIG. 7 is a partial, simplified pseudo-code representation of the Oops routine of the MS-DOS DragonDictate program, which allows users to correct recent misrecognitions;

FIG. 8 is a schematic representation of the Oops Buffer, which is used by the MS-DOS DragonDictate program in conjunction with the OOPS routine of FIG. 7;

FIG. 9 is a schematic representation of the data stored in each of the, up to twelve, entries of the Oops Buffer shown in FIG. 8;

FIGS. 10A and 10B provide a schematic representation of the data contained in the VOC File, which stores information on vocabulary words and vocabulary states for each user in both the MS-DOS DragonDictate program and the MS Windows DragonDictate program, DDWin;

FIG. 11 is a schematic representation of the .USR File, which stores acoustic information used to create models of vocabulary words in both MS-DOS DragonDictate and DDWin;

FIG. 12 is a simplified pseudo-code representation of the Adaptive Training routine used in both MS-DOS DragonDictate and DDWin;

FIG. 13 is a simplified pseudo-code representation of the Training routine used in both MS-DOS DragonDictate and DDWin;

FIG. 14 is a simplified pseudo-code representation of the Train New Model routine used in both MS-DOS DragonDictate and DDWin;

FIG. 15 is a simplified pseudo-code representation of the Batch Training Program which can be used with MS-DOS DragonDictate;

FIG. 16 is a simplified pseudo-code representation of the Select Base Vocab Program used in conjunction with MS-DOS DragonDictate;

FIG. 17 is a simplified pseudo-code representation of the Tutorial Program which can be used to train users how to use the MS-DOS DragonDictate while at the same time training DragonDictate to better recognize the user's speech patterns;

FIG. 18 is a simplified pseudo-code representation of the Lesson File which contains the instructional material used by the Tutorial Program of FIG. 17;

FIG. 19 is a simplified pseudo-code representation of the general form of each chapter in the Lesson File shown in FIG. 18;

FIG. 20 is a simplified pseudo-code representation of the Get Expected Response routine used by the Tutorial Program of FIG. 17;

FIGS. 21A and 21B provide a pseudo-code representation of the Get Allowed Response routine used by the Tutorial Program of FIG. 17;

FIGS. 22 through 26 show screen prompts produced by the Voice Console Subroutine of FIGS. 6A and 6B when a new user seeks to use MS-DOS DragonDictate;

FIG. 28 is a representation of the Event Stack used by the Tutorial Program of FIG. 17;

FIG. 30 is a copy of the actual text of selected parts of Chapter 7 in the Lesson File which is represented schematically in FIG. 18;

FIG. 31 is a copy of the actual text of selected parts of the Dictate Module of the Lesson File which is represented schematically in FIG. 18:

FIGS. 32–45 are a sequence of screens which can result from execution of the portion of Chapter 7 of the Lesson File shown in FIG. 30.

FIG. 47 is a partial, simplified pseudo-code representation of the Initialization routine used to initialize DDWin;

FIG. 48 is a partial, simplified pseudo-code representation of the DSP board code which DDWin can cause to be run on a DSP board, if it detects that the computer system running DDWin has such a DSP board;

FIG. 49 is a partial, simplified pseudo-code representation of the CallWndProc procedure which DDWin uses to monitor and respond to certain types of MS Windows messages;

FIG. 50 is a partial, simplified pseudo-code representation of the KeyboardProc procedure which DDWin uses to direct keystrokes from the user to the choice list window when it is not the active window;

FIG. 51 is a representation of the MenuStack, a data structure which DDWin uses to keep track of the state of the currently active menu, if any, for the purpose of creating voice commands corresponding to those in such an active menu;

FIG. 52 is a simplified representation of the HWndToApp-Table, a data table which DDWin uses to keep track of all the application windows and dialog boxes currently on the screen, and to store information associated with each, including a possible list of voice commands;

FIG. 53 is a partial, simplified pseudo-ode representation of the FastDemon routine; which is called many times a second to perform signal processing and utterance detection when there is no DSP board and to call for a recognition to be performed on any utterance which is detected, whether or not there is a DSP board;

FIGS. 54A and 54B provide a partial, simplified pseudo-ode representation of the RecSetupCallAndOutput routine, which the FastDemon routine calls when an utterance is detected to have the proper type of recognition performed upon the utterance and, when appropriate, to produce an output in response the recognition results;

FIGS. 55 and 55A provide a simplified pseudo-ode representation of the Recognize routine, which performs DDWin's actual word recognition against an utterance;

FIG. 56 is a partial, simplified pseudo-code representation of the BaseVocabSelection routine, which is DDWin's rough equivalent of the Select Base Vocabulary program shown in FIG. 16;

FIG. 60 is a partial, simplified pseudocode representation of the TrainWordDialog procedure, which DDWin utilizes when the user is training one or more word models for a given word;

FIG. 64 is a simplified pseudo-code representation of the PerformWordsOutput routine, which DDWin uses to generate the output associated with a recognized word;

FIG. 65 is a partial, simplified pseudo-code representation of the ChoiceList procedure, which DDWin uses to display and operate a choice list window of the type shown in FIG. 66;

FIG. 67 is a partial, simplified pseudo-code representation of the MacroInterpreter routine, which DDWin uses to interpret macro scripts, such as the macro scripts associated with the outputs of many voice commands;

FIG. 68 is a simplified pseudo-code representation of the JournalPlaybackProc procedure, which DDWin uses to feed simulated keystrokes associated with voice commands to the currently active window;

FIG. 69 is a simplified pseudo-code representation of the WordTraining routine which is used by DDWin's TrainWordDialog procedure of FIG. 60 in training word models;

FIGS. 70A and 70B provide a simplified representation of the some of the vocabulary states which can be used with DDWin;

FIG. 71 is a partial simplified pseudocode representation of the AddWordDialog procedure which operates the Add Word dialog box of FIG. 62;

FIG. 72 is a simplified pseudo-code representation of the FindOrMakeMatchingWord routine, which DDWin uses to find or make new vocabulary words having a given sequence of characters, and which can concatenate the acoustic models of prior vocabulary words to create the acoustic model of a new vocabulary word representing a phrase comprised of such prior vocabulary words;

FIG. 73 is a partial, simplified pseudocode representation of the FindWordDialog procedure, which operates the Find Word dialog box of FIG. 63;

FIG. 74 is a simplified pseudo-code representation of the ApplicationTracking routine, which DDWin uses to vary the active vocabulary to reflect voice commands which DDWin or the user has previously associated with the currently active application or dialog box;

FIG. 75 is a simplified pseudo-code representation of the LanguageContextTracking routine, which DDWin uses to alter the language context uqed to improve recognition performance as a function of the textual context of the cursor in the screen window which currently has the input focus;

FIGS. 76A and 76B provide a simplified pseudo-code representation of the CommandTracking routine, which DDWin uses to automatically create a vocabulary state having voice commands corresponding to menu and control window commands currently available in the currently active application or dialog box;

FIG. 77 is a representation of the CommandPhraseList, a data structure DDWin uses in the CommandTracking, GetMenuCommandPhrases, MenuPick, and ControlPick routines of FIGS. 76A, 76B, 78, 81, and 82;

FIG. 78 is a simplified pseudo-code representation of the GetMenuCommandPhrases routine, which DDWin uses to create a CommandPhraseList containing data about the commands available in a given menu;

FIG. 79 is a simplified pseudo-code representation of the StripControlOrMenuItemName routine, which DDWin uses to strip unpronounceable characters from the text associated with a menu item or control window to increase the chance of making a proper voice command from that text;

FIG. 80 is a simplified pseudo-code representation of the IsWindowClickable routine, which DDWin uses to find if and where a control window can be clicked by mouse;

FIG. 81 is a simplified pseudo-code representation of the MenuPick routine, which DDWin uses to select a menu item in the active window in response to the recognition of a CommandTracking voice command corresponding to that menu item;

FIG. 82 is a simplified pseudo-code representation of the ControlPick routine, which DDWin uses to select a control window in the active window in response to the recognition of a CommandTracking voice command corresponding to that control window;

FIGS. 85A and 85B provide a partial, simplified pseudo-code representation of the PropertiesTabOfAdvancedModify-WordDialog procedure, which DDWin uses to operate the dialog box tab shown in FIG. 83;

FIG. 87 is a partial, simplified pseudo-code representation of the SlowDemon routine, which is called about once a second to determine if DDWin's voice response has been shut off without confirmation and if the user should be asked for such confirmation;

FIG. 88 is a simplified pseudocode representation of the MicrophoneWarning routine, which DDWin utilizes to display, and respond to the user's response to, the Microphone Warning message box shown in FIG. 89;

DETAILED DESCRIPTION OF PREFERRED EMBODIMENTS

Figure 4:
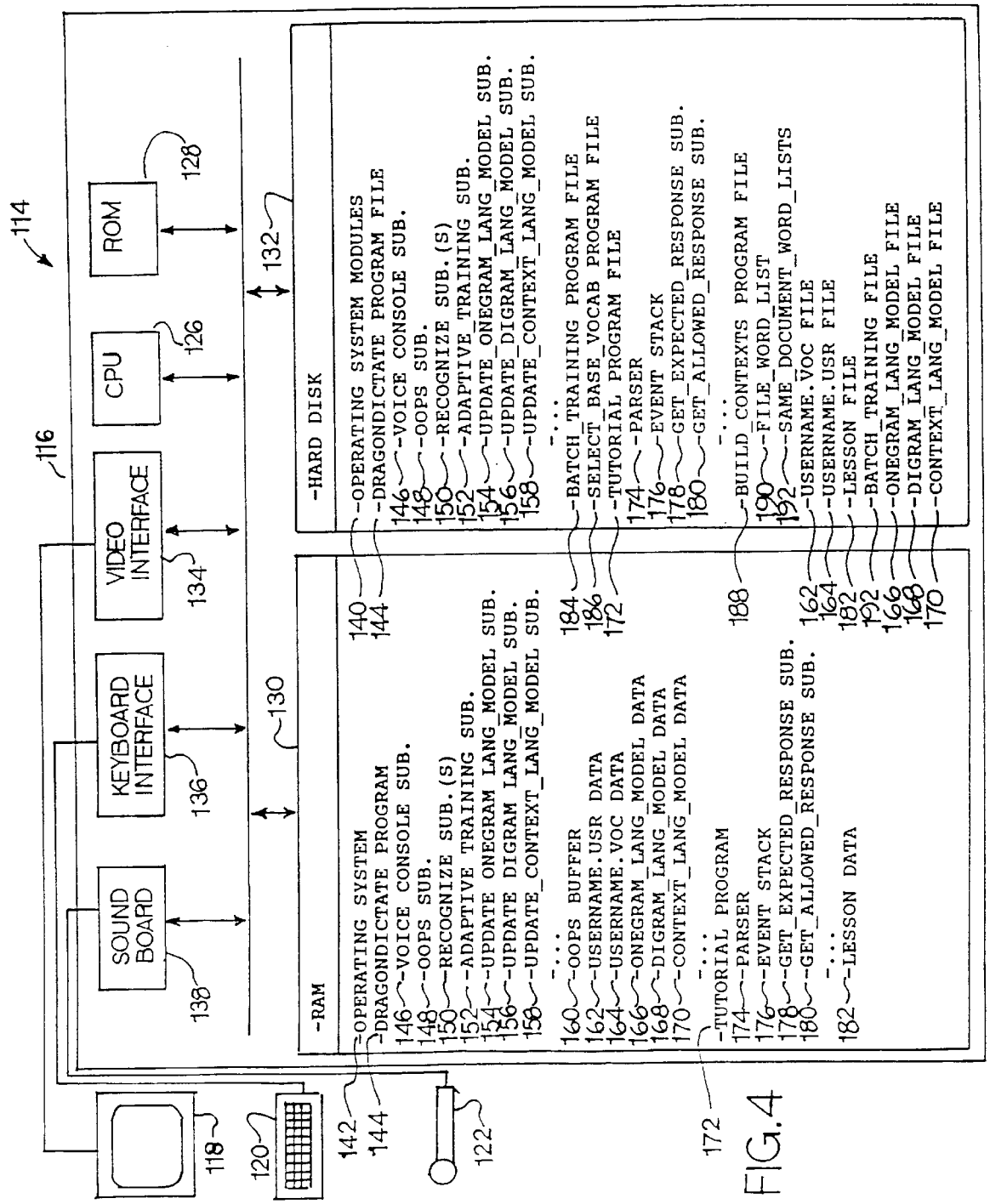
FIG. 4 is a schematic representation of a computer system which contains program information causing it to function as apparatus for performing the functions of the present invention.

FIG. 4 represents apparatus for performing certain speech recognition related functions of the present invention. This apparatus, 114, includes a computer 116, which in the described embodiment is preferably a 486 or Pentium IBM-PC compatible personal computer using the MS-DOS operating system, a video display 118, a keyboard 120, and a microphone 122. The personal computer 116 includes, among other things, a bus 124, a CPU, or central processing unit, 126, a portion of read-only memory, or ROM, 128, a portion of random-access memory, or RAM, 130, a hard disk 132, a video interface 134, a keyboard interface 136, and a sound board 138.

As is well known in the prior art, the CPU 126, is a piece of circuitry designed to execute instructions recorded in the ROM and RAM memories 128 and 130, respectively. In response to those instructions, it is capable of reading and writing information from various devices connected to it over the bus 124, and for performing tests and calculations based on that information. The ROM, 128, stores basic operating system functions, including those enabling the computer to initialize when first turned on. This initialization includes reading more of the operating system program 140 from the hard disk 132 into the RAM 130, from which it can then be executed. This is done because the ROM is capable of storing information even when the computer 116, is turned off, whereas the RAM 130, can only store information while the computer remains on.

The RAM 130, besides storing the portions of operating system instructions 142 which are currently being executed, is also capable of storing the instructions and data of an MS-DOS version of the DragonDictate Program, 144. This version includes several of the features of the current invention. As is indicated in FIG. 4, when the DragonDictate Program is loaded in RAM, the instructions of the Voice Console, Oops, Recognize, Adaptive Training, Update Onegram Language Model, Update Digram Language Model, and Update Context Language Model subroutines, 146, 148, 150, 152, 154, 156, and 158, respectively, which are part of DragonDictate are also loaded. When DragonDictate is loaded to RAM, it also contains the OOPS buffer 160, and data from the .USR File 162, the VOC File 164, the Onegram Language Model 166, Digram Language Model 168, and Context Language Model 170. In the situation shown in FIG. 4, the RAM 130 also has loaded into it the Tutorial Program 172, including its parser 174, Event Stack 176, Get Expected Response Subroutine 178, Get Allowed Response Subroutine 180, and one or more portions of the Tutorial's associated Lesson File 182.

As those skilled in the computing art understand, all of the programs contained in the hard disk 132 can be loaded into RAM 130, when the user, or the programs being executed by the user, so desire, provided there is room left to do so. When this is done the instructions contained in those programs function in conjunction with the CPU 126 as means for performing the functions which those instructions dictate, and the data structures created by those programs or read in from data files on the hard disk function as means for providing and storing various forms of information needed by, or produced by, those functions.

The other programs on the hard disk 132 which are relevant to the present invention include the Batch Training Program 184, the Select Base Vocabulary Program 186, and the Build Contexts Program 188. The hard disk also includes the .VOC file 162, and the .USR files 164, which provide information on a given user's word models, and the Lesson File 182, which is used with the Tutorial Program 172. A Batch Training File 192 can be used either by the Tutorial Program or the DragonDictate Program itself to store tokens of utterances for later training uses. The Onegram, Digram and Context Language Model files provide Onegram, Digram and Context language model information which is used by the recognizer of the MS-DOS DragonDictate Program.

The computer 116 also includes a video interface 134 for communicating with the video monitor 118, a keyboard interface 136 for receiving input from a keyboard 120, and a sound board 138. The sound board includes circuitry for receiving an electric signals representing an acoustic amplitude waveform from the microphone 122, and for performing various digital signal processing, or DSP, operations upon those signals. These DSP operations include deriving the amplitude parameter, seven spectral parameters, and twelve cepstral parameters which make up the parameter vector associated with each fiftieth of a second of the acoustic signal received from the microphone.

FIGS. 5A and 5B provide a highly simplified pseudo-ode representation of certain features of the main routine of the MS-DOS DragonDictate Program. MS-DOS DragonDictate is a terminate and stay resident, or TSR, program, of a type well known to programmers of IBM PC-compatible computers. When the user types the command to execute DragonDictate, the instructions contained in its program 144 are loaded from the hard disk into RAM and the CPU starts to execute its instructions. Once this is done, step 204 initializes the program, including installing special interrupt handlers. These will cause the program to be called every time an utterance is received from the microphone by the sound board 138 or a keystroke is received from the keyboard by the keyboard interface 136. Once the initialization step 204 is complete, step 206 causes the DragonDictate Program to terminate, that is, it causes the CPU to stop executing its instructions, and to return to executing instructions of the operating system. However, once this is done, the instructions of the Dictate program remain loaded in memory, and step 208 will be called by the interrupt handlers previously loaded by step 204 whenever an utterance or a keystroke is received by the computer.

When such input is received, if step 208 detects that it is a keystroke, step 210 causes the Voice Console Subroutine 146 to be called if the keystroke is that of the plus key on the keyboard's number pad and the OOPS Subroutine 148 to be called if it is the minus key associated with that number pad. If any other key is received, step 210 will normally merely return to whatever other program was being executed before the keystroke was received, passing the keystroke back to the operating system for use by that other program.

If the input detected by DragonDictate's interrupt handlers is a an utterance, step 212 causes step 214 to call DragonDictate's recognize subroutine 150, shown in RAM in FIG. 4. This recognition subroutine compares the utterance against each of the words in the currently active subset of DragonDictate's 30,000 word vocabulary. It then normally returns with a list of the nine words whose word models scored best against the token of the utterance just received, with the score for each. Then step 216 branches to whichever one of the conditions listed below it is met by the best scoring word just returned by the recognizer.

Figure 36:
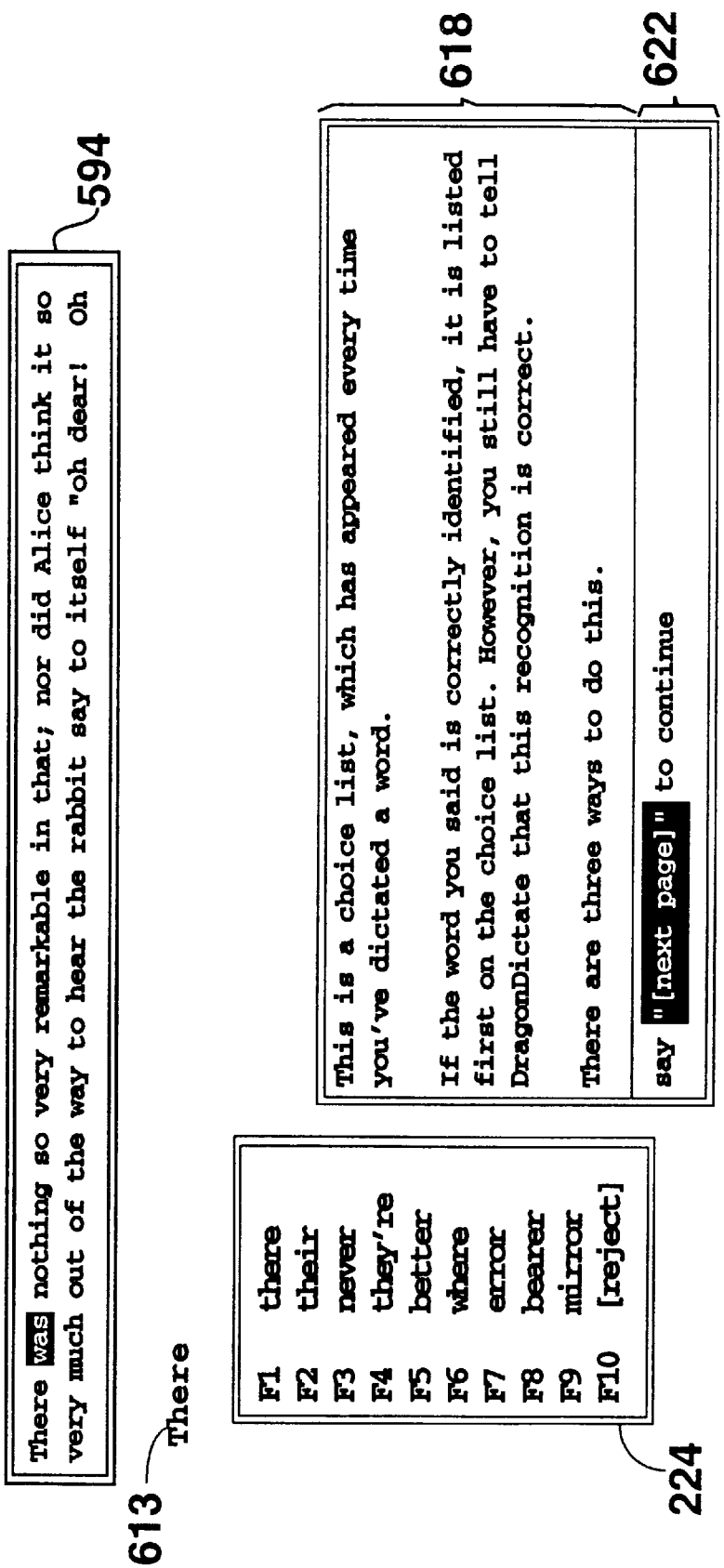

Most of the time the condition 218 of the test 216 is met. This condition is met when the user dictates any word other than certain command or correction words. When this condition is met, a step 223 removes any choice window which might have existed from a previous recognition, as is described below. Then step 220 simulates the typing of a text sequence associated with the best scoring word. It does this by supplying them to the operating system as if they had been received from the keyboard. Normally the text sequence corresponds to the spelling of the best scoring word. DragonDictate has been designed to operate as a TSR so that its recognizer can be used to simulate keyboard input for virtually any normal MS-DOS program. After step 220, step 222 causes a choice window to be placed on the screen of the MS-DOS program which just received keystrokes from step 222. This choice window lists the nine best scoring words returned by the recognizer with the inscription F1–F9, respectively, next to each such word, as is shown in the choice window, 224, in FIG. 36. Also included is a tenth choice indicate by F10 which indicates a choice to reject all of the words in the choice window. If the recognizer returns less than nine best choice words, the choice window will only show as many best scoring words as the recognizer returns.

If the best scoring word returned by the call to the recognizer in step 214 is a Choice Command, such as "Choose-1", "Choose-2", or "Choose-3", indicating that the user wishes to select a specifically numbered word shown on a currently displayed choice menu as the intended word for the utterance represented by that choice window, the condition 226 will be met and the steps under that condition in FIG. 5A will be executed. If the Choice Command selects any word other than that listed first in the choice window, which is the best scoring word which had its corresponding text entered into the program with which DragonDictate is being used, the condition of step 228 will be met. When this occurs, step 230 simulates the typing of a number of backspace characters equal to the number of characters in the choice window's first choice word. This normally has the effect of deleting the text associated with that word from the program with which DragonDictate is being used. Then step 232 simulates the typing of the characters of the word selected by the Choice Command. Whenever a Choice Command selects a word in the choice menu, whether or not the word selected is of the first choice in that window, step 234 removes the choice window associated with the previous recognition, if any. Then step 236 makes the word selected by the Choice Command the first choice word, WORD_1, in the OOPS buffer entry shown in FIG. 9 for the utterance for which the selection was made.

FIG. 8 describes the MS-DOS DragonDictate's OOPS buffer 160. This buffer can store an entry 238 for each of up to the last twelve utterances received by the DragonDictate Program which corresponded to text output by the program (i.e., words other than most commands). The OOPS buffer operates as a cyclical buffer with a Read/Write Pointer 240, which points to both the last entry placed in the buffer, and the location for the next entry. When the buffer has had twelve or more entries placed in it, the location for the next entry is also the location of the oldest entry in the buffer. Each entry 238 in the OOPS buffer, has the structure shown in FIG. 9. This includes the token 244 for the utterance associated with the entry and the nine best scoring words 246 against that token, including the word 246a which is indicated as the first choice word for that utterance. The entry also includes vocabulary information 248, which indicates which of the possible vocabularies which can be used with DragonDictate was in effect at the time of the recognition, and state information 250, which indicates which state in that vocabulary was active at the time of the recognition. In addition, the entry includes a Confirmed_Flag 252, which is used to indicate whether or not the user has specifically confirmed the first choice word stored in the Word_1 slot, 246a.

Returning to FIG. 5A, the step 236 performed after a Choice Command has been detected by step 226 makes the selected word indicated by Choice Command, the first choice word, WORD_1, 246a shown in FIG. 9. Then step 254 sets the Confirmed_Flag 252, shown in FIG. 9, for that utterance's OOPS buffer entry 238 to indicate that the user has specifically selected the first choice word associated with the entry's token. This usually indicates that the token has a much higher chance of having been property labeled than if the Confirmed_Flag had not been set, and, thus, that the token provides more reliable data for training. Next step 256 calls the Adaptive Training Subroutine for the utterance and first choice word of the OOPS buffer entry in which the user has just specifically selected the Word_1. This is done because, since the user has explicitly selected Word_1 for the token with a Choice Command, it is presumed that the token has been properly labeled, and thus is safe to use for adaptive training.

FIG. 12 describes the Adaptive Training Subroutine 152. Before this subroutine is described, the data structures used to store word models contained in the .VOC and .USR Files shown in FIGS. 10A, 10B, and 11 will be described. The .VOC and .USR Files contain all the information necessary to define a vocabulary, the word models of that vocabulary, the states of that vocabulary, and the character output which DragonDictate is to produce in response to recognition of each word in that vocabulary. The text "USERNAME" shown in FIGS. 10A, 10B, and 11 before the file extension names ".VOC" and ."USR" takes the place of the actual, up-to-eight-character, user name which is entered by the user for whom these models are kept.

As shown in FIGS. 10A, and 10B the .VOC file contains a list 260 of each word in the vocabulary. This list contains for each such word, its text spelling 263, its phonemic spelling list 262, which contains one or more phonetic spellings 265 of the word if it is a word which comes predefined with DragonDictate, and a pre-filtering word start 264.

Each of the one or more phonetic spellings 265 in the phonetic spelling list 262 for a given word corresponds to the one or more pronunciation of that word. Most of these phonetic spellings 265 have been derived from the phonetic spellings contained in a computer readable version of a traditional English or other language dictionary. Each such phonetic spellings constitutes an acoustic model, since it gives the sequence of one or more phonemes which describe the speech sounds which make up the pronunciation of its associated word. Each vowel phoneme in the phonetic spelling has a duration association with it, indicating the duration of the vowel's sound in the word's pronunciation.

The pre-filtering start 264 identifies the pre-filter model associated with that word. As has been described in U.S. Pat. No. 4,783,803, referred to above, and U.S. Pat. No. 4,837,831 issued to Laurence Gillick et al. on Jun. 6, 1989, and entitled "Method For Creating And Using Multiple Word Sound Models in Speech Recognition" which has been assigned to the assignee of the present application and which is hereby incorporated herein by reference, pre-filtering models are used to rapidly winnow down the number of words which remain viable candidates for a successful match against a given utterance. This is done by scoring the start of the token upon which a recognition is being performed against each of the pre-filtering models and then only performing more complete comparisons, of the type indicated in FIGS. 2 and 3, against words whose associated pre-filtering word start model scores did well in that pre-filtering.

The .VOC file, 162, also includes a list of states 266, which lists for each state 267 a list 268 of the words or included states 269 which are in that state. Then for each of those words or included states it lists the transition 270 to another state, if any, which should be made from that state when a word listed for that state or one of its included states is recognized. In addition, for each word or state in the list 268, there is also an extra data field 272, which indicates the output, either a keystroke sequence or macro script, which should be simulated or executed, respectively, when that word or a word from that included state is recognized, if that output is other than the spelling 263 associated with a recognized word. The list of states 266 also includes for each state a default transition 274 and default extra data field 276, which work like the transition 270 and extra data 272 fields, just described, except that they define the transition and the data output which should be produced for any word or included state of a state 267 which do not have such values explicitly defined for them in their associated fields 270 and 272.

FIG. 11 describes the .USR file 164. This file includes the pre-filtering models 280 referred to by the prefiltering word start fields 264 of the .VOC file. These prefiltering models are somewhat similar to the word models 108 shown in FIGS. 2 and 3, except that they model the beginning sounds of words and except that most of them are associated with a plurality of word models. The .USR file also includes a PIC, or phoneme-in-context, table 282. This table contains for each possible combination of three phonemes found in the phoneme spellings 265 in the .VOC file, a sequence 284 of phoneme elements, or PELs. The .USR file also includes the PEL model list 288 which defines for each PEL an ID 291, and the values of its one amplitude parameter 290, seven spectral parameters 292, and twelve spectral parameters 294. Each of these parameters includes both an arithmetic mean and a weighing factor, which is a function of the statistical deviation of the values from which that mean has been derived. When recognition occurs, an acoustic model for a vocabulary word is created which has a structure like the model 108 shown in FIG. 2. It is formed out of a sequence of PELs, each of which has a structure corresponding to one of the vectors 109 shown in FIG. 2. This sequence of PELs is formed by concatenating the sequences of PELs associated with the successive PICs which correspond to the successive phonemes in the vocabulary word's phonetic spelling.

The .USR file also includes a helper model list 296 which includes a list of zero or more helper models. These are word models which the system creates if the user defines a new word for which it does not have a phonetic model, or if a word has a phoneme-based model which does not match well against the user's training data for that word. The system allows one helper model for a word without any phonetic spellings, and up to one helper model per phonetic spelling (i.e., per pronunciation) for words with one or more phonetic spellings. For each helper model in the list 296 there is stored an identification 298 of the word it represents, the ID of the phonetic model 300, if any, associated with the helper model, and a sequence of PELs, or phonetic elements, 302 defined in the PEL model list 288. The phonetic model 300 is stored with the helper models made for words which have more than one phonetic spelling, such as the word "live", which can rhyme with either "give" or "hive". This is done so the system which will know with which phonetic version of its word the helper model is associated.

Returning to FIG. 12, we can now explain the Adaptive Training Subroutine 152. This is the subroutine called to incrementally improve the models in a user's .USR File by causing those models to include information derived from a token labeled as representing a given word. When the Adaptive Training Subroutine is called for a given token and word, step 304 adjusts a relevancy parameter which is used to determine the extent to which PIC and PEL models associated with the word should be changed to reflect data from the token.

For example, if the CONFIRMED_FLAG is false, indicating the user has not specifically confirmed the word as corresponding to the token, the token will be given less relevancy in adaptive training. This is because, if the correct word was the original first choice word in the recognition, as it will normally be in this case, the correct word's models probably needs little training. It is also because, if the token is mis-recognized, it would undesirable to significantly change the mis-recognized word's models to be more like the token. If the CONFIRMED_FLAG is true, meaning the user has specifically confirmed that the word corresponds to the token, the token is given greater relevancy. Although not shown, the system assigns an even greater relevancy to such confirmed tokens if their corresponding confirmed word did not appear on the original choice list produced for the recognition of the token. This is done because, in such cases, the confirmed word's model probably is not functioning well and probably needs to be radically adapted toward the token.

Once step 304 has selected the proper weighting to be used for the token in adaptive training, step 306 calls the word training routine for the token and its associated word.

FIG. 69 illustrate the WordTraining routine 1311. This routine is called not only by the Adaptive Training Subroutine of FIG. 12, but also the Batch Training Program and the TrainWordDialog routine discussed below with regard to FIGS. 15 and 60, respectively.

Step 1502 of the WordTraining routine tests to see if the Word for which it has been called currently has more than one word model, including either phonetically spelled or helper models. If so it causes steps 1504–1530 to be performed. If Word has more than one such word model, step 1504 causes step 1506 to score each token in the TokenList with which WordTraining has been called against each of the Word's word models, and step 1508 then associates each such token with the word model against which its scored best. If Word has only one model, either a spelled or helper model, step 1510 associates all of the tokens in the TokenList with that one model.

Once the tokens in the Token list have each been associated with one of the Word's word models, step 1512 performs a loop comprised of steps 1516–1530 for each of Word's pronunciations that has any such tokens associated with it. By "pronunciation" we mean a phonetic model and its associated helper model, if it has one. If Word does not have any phonetic models, it can have only one pronunciation, that corresponding to its helper model, if any.

Step 1516 initializes two variables, GoodSpelledModelTokens and GoodHelperModelTokens, which are used to keep track of how many tokens, if any, score well against the pronunciation's phonetic and helper models, respectively. If the pronunciation for which the current iteration of loop 1512 is being performed has a phonetic model, step 1518 calls the Training routine of FIG. 13 for that spelled model and any tokens associated with the pronunciation's phonetic model and/or helper model. Step 1518 uses such information to add the number of tokens which were successfully used to train the spelled word model to the variable GoodSpelledModelTokens.

Step 1520 functions exactly like step 1518, except that it calls the Training routine for the current pronunciation's helper model, if any, and except that it updates the variable GoodHelperModelTokens with the a number of tokens which are successfully used to train the helper model.

After steps 1518 and 1520 have trained either the current pronunciation's spelled or helper model, or both, step 1522 tests to see if the values of GoodSpelledModelTokens and GoodHelperModelTokens are both zero. If this is the case, none of the tokens associated with the pronunciation sounded very much like either the pronunciation's spelled or helper model, and, thus, step 1524 will delete the pronunciation's helper model if any, and step 1526 will call the TrainNewModel routine of FIG. 14 with all of the tokens associated with the pronunciation, to build a new helper model. This is appropriate because if the pronunciation had no helper model, it is clear that it needs one, and if it had a helper model it is clear that it needs a new one.

If the test in step 1522 does not find both GoodHelperModelTokens and GoodSpelledModelTokens to be zero, step 1528 tests to see if both 1) the current pronunciation has a helper model and 2) GoodHelper-ModelTokens is zero. If these two conditions are met, GoodSpelledModelTokens must be greater than zero, indicating the pronunciation's spelled model is working, and is working better than its helper model, and step 1530 will delete the pronunciation's helper model.

If the test in step 1502 indicates the Word for which WordTraining has been called has no word models at all, steps 1532–1534 call the TrainNewModel routine of FIG. 14 to build a helper model for Word, with all of the tokens in the Token list. Although not shown in FIG. 14, the TrainNewModel routine preferably includes steps for excluding tokens which deviate by more than a specified amount from other tokens in the Token List.

Once either steps 1504–1530 or step 1534 has been performed for a given call to the WordTraining routine, step 1536 will return to the routine that called it.

FIG. 13 describes this Training Subroutine. It is designed to be called with a list of one or more tokens and a given word model, either a helper model or one constructed from the phonemic spelling of a word against which each of the tokens in the token list is to be scored. A step 330 causes a step 332 to time-align and score the parameter vectors of each token against the phonetic elements of the word model, in a manner to that shown in FIG. 2. Such time alignment by dynamic programming is well known in the art of automatic speech recognition Once this is done for all the tokens, step 334 updates the phonetic elements in the word model to reflect the information contained in the token parameter vectors which have been time-aligned against it. This is done by combining the values in each PEL with the corresponding values in the vectors which have been time aligned against it in a weighted fashion.

Each PEL contains a PEL count which represents the amount of previous training the PEL has received. For example, if the PEL has received only one prior training the count may be set to one. Each time such training occur on a subsequent training utterance, the PEL count is increased, causing each subsequent training utterance to have a lesser effect on the PEL's parameters. The pre-defined PELs which come standard with DragonDictate get an intermediate initial PEL count This is done because although these PELs have received a large amount of training from multiple speakers, they have not yet received any training from the particular speaker whose words they are to learn to recognize.

Each time a PEL is trained in step 334 of FIG. 13, the new value calculated for each of its parameters is calculated according to the following formula:

New value=(((Old value)×(PEL Count))+((Sum of new values from the vectors time aligned against the PEL)×(number vectors time aligned against the PEL)))/((PEL Count)+(number of vectors time aligned against the PEL))

This formula can be used on PEL parameters which represent the average of the corresponding values of vectors which have been time aligned against the PEL, as well as on the associated parameters which represent the average deviation of such values. When the Training Subroutine is called by WordTraining in response to a call by the Adaptive Training subroutine of FIG. 12, the relevancy parameter is taken into account by varying the PEL count to increase the weight given to the token in updating PELs in proportion to the relevancy assigned to that token.

Although not shown in FIG. 13, the Training routine excludes tokens which score poorly against the already existing model of the word being trained and returns an indication of which tokens are not so excluded. Also although not shown, the Training routine takes into account the weight calculated by the ADAPTIVE_TRAINING subroutine in associated with the word being trained should be adapted toward the data contained in the tokens.

FIG. 14 describes this Train New Model Subroutine 336. Step 338 sets a variable PEL_Number based on the average length of the tokens in the token list. Then step 340 divides each token in the token list into PEL_Number segments with each segment having as close to the same number of 1/50th of a second acoustic parameter vectors 104, of the type shown in FIG. 2, as is possible. Then step 342 makes an initial model for the word which has one new PEL 109, of the tppe shown in FIG. 2, for each of the PEL Number segments created in step 340, with the parameters of each such PEL being derived from the vectors 104 of the one or more tokens which are in that PEL's associated segment. Then step 344 performs an iteration, comprised of step 346–350, which repeatedly time aligns, scores, and updates the PELs of the word's model against the tokens. This is done until the improvement in scores from iteration to iteration is less than some specified amount, meaning the training of the word's PEL's from the tokens has approached an optimum.

Returning to FIG. 12, if the tests in the steps 304 and 314 of the Adaptive Training Subroutine both fail, indicating that the word to be trained has no phonetic or helper model, step 324 calls the Train New Model Subroutine, just described, to make a new helper model for it. Although not shown in FIG. 12, if the word has one or more phonetic models and the word model against which the token scores best is a phonetic model with no helper model, and if the token scores worse than a specified amount against that phonetic model, the system will call the Train New Model routine for the token to create a new helper model for that closest, but still poorly scoring phonetic model.

Returning now to FIG. 5A, we have described how, if DragonDictate receives an utterance whose best scoring word is a Choice Command which selects a word in the alternate choice window, step 256 calls the Adaptive Training Subroutine to train the word selected by that Choice Command against the token of the utterance for which a choice window was displayed.

If, however, the best scoring word for an utterance received by DragonDictate is "Choose-10" or "Scratch That", the system interprets this as an instruction by the user that none of the words displayed in the current choice window, including the first choice word, were intended for that window's utterance. If "Choose-10" or "Scratch-That" is recognized, the condition of step 360 will be met, and step 362 will cause a number of backspace keystrokes corresponding to the number of characters in the best scoring word in the choice window to be sent to the operating system, so as to erase the characters inserted for the former best scoring word by the step 220, when that best scoring word was originally recognized. Step 364 removes the choice window associated with the erroneous utterance, and step 366 removes the utterance's entry in the Oops Buffer shown in FIG. 8.

If the best-scoring utterance returned by the recognizer in step 214 is the OOPS command, the condition in step 368 is met, and step 370 will call the OOPS subroutine 148.

FIG. 7 provides a partial description of the Oops Subroutine. It shows that when that subroutine is called, step 372 makes the second most-recent utterance in the Oops Buffer the current Oops Word. This is done because users can correct the error of the most recent utterance in the Oops Buffer by means of the Choice Commands described above with regard to steps 226 and 360 in FIG. 5A. It is also done because when speakers are dictating rapidly they often detect recognition errors after they have said one more word in addition to that for which the misrecognition occurred.

Once step 372 has been performed, a loop 374 repeatedly performs the steps 376, 378, and 380 until it is exited from within. Step 376 displays the Oops Menu, which shows the first choice word, Word_1, for each of the last twelve utterances for which there are entries in the OOPS Buffer 160, shown in FIG. 8. It display these first choice words in a special bar across the display screen. Step 376 also displays an alternate choice window immediately above or below the current Oops Word, which, when the subroutine is first called, is the second to the most recent entry in the OOPS Buffer. Then step 378 get input from the user, and step 380 branches based upon that input.

If the input is the word "Choose-1" or "Okay", step 381 removes the Oops Menu and exits the Oops Subroutine, since the user has indicated that the current first choice for the current Oops Word is okay, and this is interpreted as an indication that the user desires to exit the OOPS menu. Before step 381 exits the Oops Subroutine, it sends to the operating system the keystrokes necessary to makes the corrections, if any, made to any first choice words displayed in the Oops Menu. It does this by simulating the typing of a sufficient number of backspaces to erase all the way back to the oldest utterance corrected in the OOPS buffer, and then simulates all the keystrokes necessary to cause the entry of all the first choice words in the buffer from that oldest corrected word forward.

If the user says "Choose-2", step 382 selects the second choice word in the alternate choice menu, makes it the first choice word for the current Oops word, sets the Confirmed Flag for the current Oops Word, and then removes the Oops Menu and makes all the corrections which have been made to any first choice words in the Oops Menu by sending backspaces and keystrokes to the operating system, as described in the paragraph above with regard to step 381. As is indicated by the ellipses 386 following step 382, the system responds to "Choose-3" through "Choose-9" in a manner which corresponds to that in which it responds to "Choose-2".

The "Choose-n" command just describe is used not only to choose a word in the current choice menu, but also to exit the Oops Menu and make all the corrections entered while that menu was up. The "Select-n" commands 383 and 384 shown in FIG. 7 are similar, in that they make the nth word in the current choice window of the Oops Menu the first choice word for the current Oops word, and set the current Oops Word's Confirmed Flag. But they do not cause the Oops Menu to be remove, send keystrokes to the operating system to make the corrections which have been made to the Oops Menu, or exit the Oops Subroutine. The "Select-n" command allows the user to make multiple corrections in the Oops Menu before exiting it.

If the user says "Left-1", step 388 moves the current Oops Word left by one word. Similarly, if the user says "Left-N", other steps will move the Oops Word left by N words. If the user says "Right-N", step 394 or similar steps move the Oops Word right by N words.

The Oops Buffer allows much more rapid dictation, since it frees the user from the need to wait until verifying the results of one recognition before advancing to the next.

Returning to FIG. 5A, when step 218 detects that the user has said an utterance other than a command, after steps 223, 220, and 222 are performed, step 392 tests to see if DragonDictate's Confirmed Training Only Flag is false or the Confirmed Flag of the oldest entry in the Oops Buffer is set. This test is performed at this time, because a new entry is added to the Oops Buffer for each utterance other than a command, and, thus, the system should decide whether it wants to use the recognition information in the oldest entry in the Oops Buffer to update word and language models before it overwrites that oldest entry with a new one. Such word and language model updates are normally not performed until a word is removed from the OOPS buffer to give the user time to correct that word, while it is in the OOPS buffer.

The test in step 392 will be met if either the user has actually confirmed an utterance's first choice word, as indicated by a True value for the Confirmed Flag 252, shown in FIG. 9, or if the Confirmed Training Only Flag is false, indicating that the user wants all normal utterances to be used for adaptive training. This flag is provided because, when a user is being careful and watching the output associated with each recognition, he or she is, in effect, confirming the recognition of words by speaking the next word. In such a case, the tokens received from each such utterance would have a high chance of being accurately labeled, and, thus, should be useful for adaptive training. In this case the user should set the Confirmed Training Only Flag to False. In some instances, however, users do not want to take the time necessary to correct most recognition errors. In this instance, the user can set the Confirmed Training Only Flag to True, indicating that only utterances for which the user has explicitly taken the trouble to either correct or confirm the first choice word should be used to train the models.

If the test in step 392 is met, meaning that the utterance should be used for adaptive training, step 394 calls the Adaptive Training Subroutine for the oldest entry in the Oops Buffer, causing its token to be trained against that entry's first choice word, unless that adaptive training has already been called for the utterance in response to a Choice Command or Oops command specifically selecting the first choice for that utterance. Then step 396 calls the Update Onegram, Update Digram, and Update Context Language Model Subroutines 154, 156, and 158 shown in the RAM in FIG. 4.

The Onegram Language Model indicates the probability that an individual word will be spoken, based on the frequency with which that word has been spoken in previous text relative to other words.

The Digram Language Model indicates the probability of a second word being spoken, given a first word just spoken. This probability is based on the ratio of the number of times the second word has followed the first, to the number of times the first word has occurred, in a given body of training text. If there has been insufficient data to reliably calculate the probability for the next word, given the previous word, such a digram probability will not be used for that next word.

The Context Language Model describes the probability that a given word will occur when a given vocabulary context is active and the probability that the words in that context will occur if that given word has been spoken.

Figure 1:
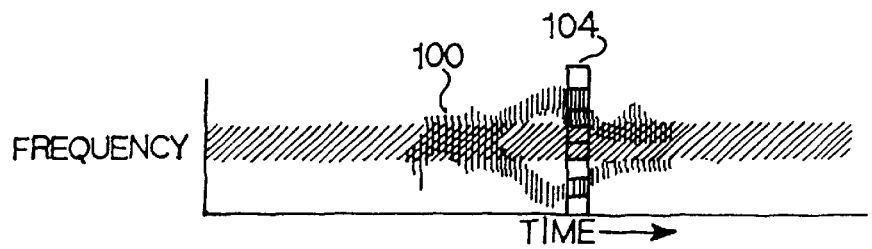
FIG. 1 is a schematic spectrographic representation of the utterance of a word.
Figure 2:
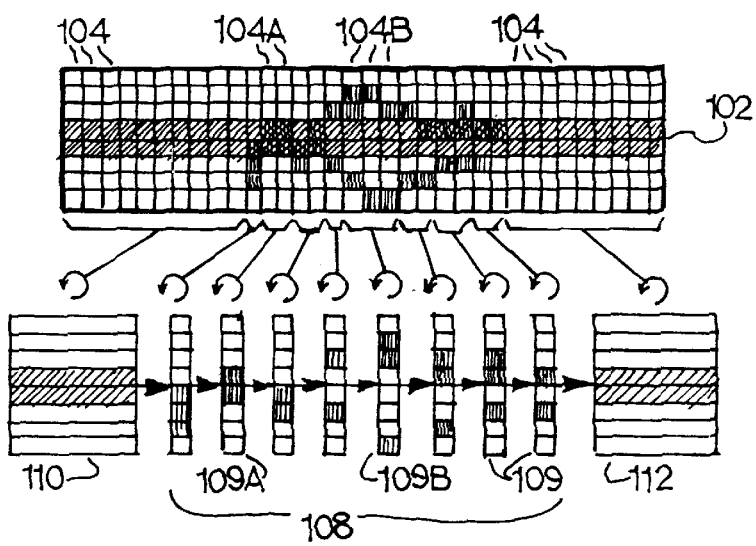
FIG. 2 is a schematic representation of a token, comprised of a series of parameter vectors, used to represent an utterance, and of the time-alignment and comparison of that token against a word model comprised of a sequence of corresponding parameter vectors.
Figure 3:
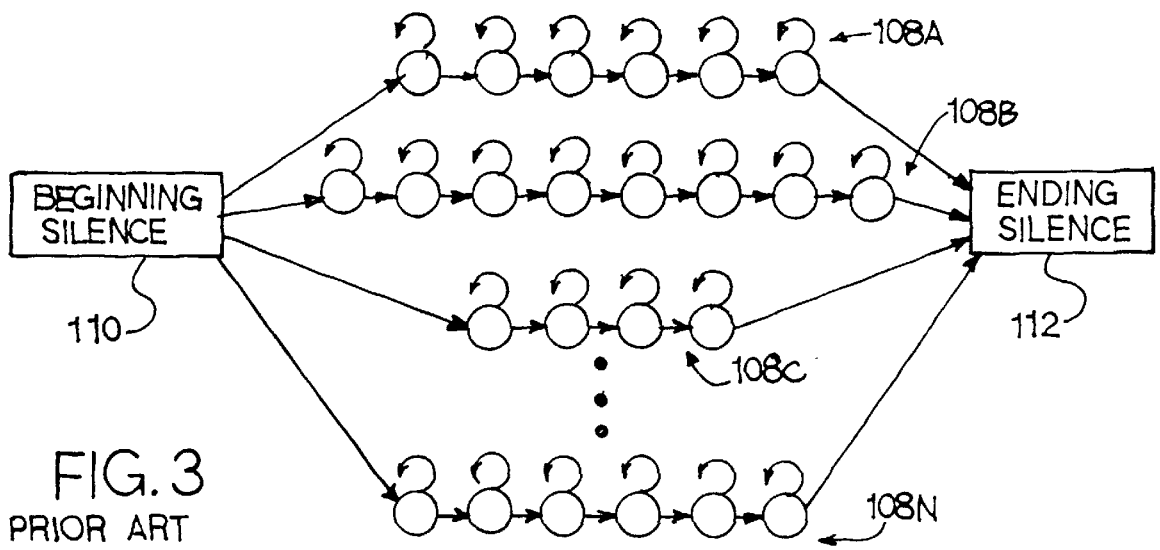
FIG. 3 is a schematic representation of the matching of a token against each of a plurality of models representing different vocabulary words.

The probabilities from these respective language models are combined and used to alter the score produced by the acoustic matches, of the type shown in FIG. 2 and 3, performed by the recognizer. This is done to improve the accuracy of the recognizer's scores by taking into account the linguistic information contained in those language models. A more detailed explanation of the concepts behind language models is given in U.S. Pat. No. 4,783,803, described above.

The language model update subroutines called by step 396 are used to update the language model statistics for the Onegram, Digram, and Context Language Models to reflect the recognition of the first choice word of the oldest entry in the OOPS buffer. The Onegram language score is updated merely by incrementing both a count of total words and a count for the particular first choice word. The digram language model is updated by increasing the score for the digram associated with the last word which was used to update the language models and the current word being used to update the language model, and the method of updating the context language model is described in detail in U.S. patent application Ser. No. 07/976,413, the parent application of the present application.

Once the language models have been updated, step 398 causes a copy of the oldest entry's token to be saved in conjunction with the entry's first choice word if the Saving Token Flag has been set. This flag indicates that the user wants tokens to be saved in a file for purposes of batch training. Once this is done, step 400 adds a new entry to the OOPS buffer for the most recent utterance, including its token, 9 best scoring words, and a zero confirmed flag indicating that the user has not yet specifically confirmed its first choice word.

As is described above, when DragonDictate operates in the background as a TSR, it normally responds to utterances by inserting characters or backspaces into the MS-DOS program which is currently being executed and by putting up Oops Menu or Choice windows. If, however, the user presses the plus key or says an utterance associated with the Voice Console Subroutine, either step 210, or another step not in FIGS. 5A and 5B will cause the Voice Console Subroutine 146 of FIGS. 6A and 6B to be called up.

FIGS. 6A and 6B describes portions of the Voice Console Subroutine which are relevant to the present invention. When it is called, step 402 checks to see if the system has .VOC and .USR Files defined for any users. If so, it will enable the full Voice Console Menu 401 shown in FIG. 22. If not, step 404 will cause the Voice Console Menu to have only the Load User and Exit commands active, which causes that menu to appear as shown at 401A in FIG. 23. Then the subroutine advances to step 406, which is its command loop. At the top of this loop, the subroutine performs a step 408 which clears other Voice Console prompts, if any, and displays the Voice Console Menu 401 shown in FIG. 22, or 401A shown in FIG. 23. Then step 410 waits for user input and step 412 branches upon that input once received.

If the input is Load User 414, step 416 prompts for a user name with the window 418 shown in FIG. 24. After step 420 gets such a user name, step 422 tests to see if the name entered is a new one, that is one for which there are no associated .VOC and .USR files. In the preferred embodiment, the actual characters entered in response to the user name window 418 must be limited to a string of no more than eight characters, and that string is used to define the part of the .VOC and .USR file names which proceeds the "." in those file's names.

If the test of step 422 is met, indicating that the user has typed a name for which there are no associated .VOC and .USR files, step 424 asks the user if he wants to create a new user, as is indicated by the window 426 shown in FIG. 25. This window lists the user name typed in response to window 418, following it by a "YIN", asking for a "Yes" or "No" answer, respectively. If the user presses "N", step 426 returns to the top of the Voice Console loop 406. If the user presses "Y", indicating that the user does want to create a new user, step 428 causes step 430 and step 432 or 434 to be performed. Step 430 places the prompt window 436 on the screen, as shown in FIG. 26. The prompt explains that it would be beneficial for the user to run the Tutorial Program 172, and asks whether or not to start the tutorial with a "YIN". If the user responds "Y", step 432 exits from the Voice Console Subroutine and then loads and runs the tutorial. The operation of this tutorial will be described at length below. If the user decides not to run the tutorial, step 434 will exit the Voice Console and will then load and run the Select Base Vocabulary Program 186 shown in FIG. 16.

Running the tutorial is very beneficial because it not only teaches the user how to use DragonDictate, including its error correction, but also because it is designed to reliably capture utterances of a significant number of known words with can be used for both adaptive and batch training. These tokens enable the speech models which come with Dragon-Dictate to be significantly improved for use at recognizing an individual user's speech patterns. If, however, the user doesn't wish to take the time to run the tutorial, step 434 at least forces him to perform the very quick Select Base Vocabulary Program 186.

FIG. 16 shows the Select Base Vocabulary Program used by the MS-DOS version of DragonDictate. In step 436 it displays a sentence of text and prompts the uses to separately read each highlighted word in that sentence. Then a loop 438 successively highlights each word, waits for the user to utter that word in response to its being highlighted, and then labels that utterance's token as being for the highlighted word. Once this has been performed for the whole sentence, step 440 scores each utterance's token against its labeled word in each of more than one base vocabularies. Base vocabularies correspond to separate .USR files, of the type shown in FIG. 11, containing separate phoneme-in-context tables 282 and separate PEL model lists 288 to reflect the speech patterns of different populations of speakers. In the current embodiment, there are two base vocabularies which correspond approximately to models for male and female speakers. It should be appreciated, however, that in other embodiments different base vocabularies could be used, including base vocabularies for people with each of plurality of types of accents.

Once step 440 has scored the utterances associated with the displayed sentence against each base vocabulary, step 442 finds the total of the scores of all of those words against each of the base vocabularies, and step 444 selects the base vocabulary with the total best score as the user's initial .USR file, and causes all further recognition and training for that user to be performed with and upon the acoustic models in that .USR file.

Returning now to FIG. 6A, if the user types a user name in response to the prompt of step 416 for which the system already has .VOC and .USR files, step 446 selects those .VOC and .USR files for use by the DragonDictate Program. And then step 448 exits the Voice Console. It should be appreciated that when the program exits the Voice Console, as is shown in step 432, step 434, or step 448, the Dragon-Dictate Program continues to stay resident as a TSR.

If the user input in response to the Voice Console menu displayed by step 408 is the selection of the Utilities Command 450, steps 452 will display a Utilities Menu and wait for input. If that input is the Parameters Command 454, steps 456 will display a Parameters Menu and wait for input. If the resulting input corresponds to the Confirmed Training Only Command 468, the system will set the Confirmed Training Only Flag, referred to above in step 392 of FIG. 5B. Similarly, if the user selects the Save Tokens Command 460 in the Parameters Menu, the system sets the Save Token Flag, referred to above in step 398 of FIG. 5B.

As was stated above in the discussion of FIGS. 5A, 5B and 12, DragonDictate normally performs adaptive training, either on every normal utterance received, or on only those for which the user has specifically selected or confirmed the first choice word by use of a choose command or the equivalent. Such adaptive training has the benefit of improving recognition performance as soon as the user starts to use the system. It also has the benefit of being performed in the background without requiring any effort on the part of the user, or taking any noticeable time away from the use of the program for recognition purposes. However, it is well known in the art, that given a certain number of utterances which have each been labeled as being associated with given words, one can better train word models from those utterances by using batch training rather than adaptive training. This results for two major reasons. First, when training is performed upon a relatively large number of utterances at once, all the utterances which correspond to a given word can be compared against each other and those which do not appear to be similar to the other utterances for the word can be rejected as erroneously labeled utterances. This substantially reduces the chance that utterance that don't sound anything like a given word will be used to train, and, thus, corrupt the model for that word. Secondly, in batch training the iteration 328 of the Training Subroutine shown in FIG. 13 can be performed using all the utterances associated with the given word rather than being performed for only one word. As a result, this iteration process weights all the words evenly and tends to produce a model which more accurately represents all of those words. Thus, the resulting word model tends to provide a more statistically accurate model of the utterances of the word it is to represent.

FIG. 15 describes the Batch Training Program 184 used by the MS-DOS DragonDictate. It includes a loop 464 which is performed for each word in the batch training file for which there is one or more tokens. For each such word, step 466 calls the WordTraining routine, described above, with the list of tokens associated with that word.

As can be seen from the discussion of the DragonDictate speech recognition system, above, it is important for that system to obtain properly labeled utterances of a several hundred words in order for the system to properly train the acoustic models in the .USR file to reflect his or her own speech patterns. If the user does not properly correct misrecognitions when they occur, utterances used to perform adaptive or batch training may be erroneous, and thus cause such training to produce far from optimal performance, or perhaps even degrade recognition. Thus, it is important to help users adaptively train speech models in a way that reduces the chance that training will be performed upon erroneously labeled utterances. It is also desirable that such tokens be derived from utterances which are spoken in the same way in which the user speaks when actually using DragonDictate. In addition, it is desirable to properly train users how to operate the speech recognizer, including, in particular, its error-correction capabilities, so that as they continue to use the system, they will get satisfactory performance, and that future adaptive training will have a positive effect. To help accomplish all these goals, the inventors of present application have designed a Tutorial Program 172. This program interprets and executes instructions contained in a Lesson File 182, which causes it to provides a sequence of programmed instruction and exercises for the user.

FIG. 17 provides a highly simplified description of the Tutorial Program 172. It shows a first step 460 which initializes the Tutorial Program, and then a loop 461 which is repeated as long as the user stays in the Tutorial Program. This loop repeatedly performs steps 462 and 463. Step 462 reads the next line from the lesson program and step 463 interprets and executes the instructions contained in that line. Step 463 includes the use of an interpreter which parses each line of the Lesson File to determine what should be done in response to that line and then it performs that function. How to make such interpreter is well known in the computing arts. Loop 461 is continued until the user or the lesson cause the loop to be exited.

As is shown in FIG. 18, the Lesson File 182 is comprised of a sequence of chapters 464 and plurality of modules 466, including a Dictation Module 466A, a Global Module 466B, and a Tutor Menu Module 466C.

FIG. 19 represents a typical chapter. Each chapter normally starts with a DEFAULT step 469 which places entries for the chapter in the Defaults section 474 of the Tutorial Program's Event Stack 471 shown in FIG. 28.

FIG. 28 displays the contents of the Event Stack at a given point in time. This stack contains a listing of the events to which the tutorial will respond to at any given point. Most of these events correspond to user inputs. The user responses specified in the Event Stack, combined with the expected response defined by the current lesson, described below, define the tutorial's currently allowed responses. These are the only responses for which the tutorial has a defined response. As can be seen from FIG. 28, most entries in the Event Stack are followed by a command to CALL or GOTO a given named lesson in the Lesson File. Each such command will be executed when a user's input corresponds to the event which precedes it on the left in the Event Stack. The Event Stack includes a Globals section 472 which includes responses always allowed when in the tutorial. These include saying the "get help" command, which causes help information to be displayed and "Tutor menu", which places the Tutor Menu shown in FIG. 29 on the screen and allows the user to jump to any selected chapter in the Lesson File. Entries placed in the Defaults section 474 of the Event Stack normally remain there, and in effect, as long as the Tutorial Program is executing the chapter which installed them. Entries placed in the Cases section 477 of the stack only remain their during the lesson which placed them there. The Ceiling section 479 is used to temporarily store entries which were in the Cases section when a call to another lesson is being executed.

Returning now to FIG. 19, after the DEFAULT step, each chapter normally contains a plurality of lessons 468. Each such lesson can contain an optional step 470A in which it displays a message to the user, an optional step 470B in which it fakes or simulates a dictation action, and an optional step 470C in which it adds entries to the Cases section 477 of the Event Stack 471 shown in FIG. 28. When such entries are added to the Cases section of the Event Stack, they normally are for words which represent common mistakes which users often make in the exercise associated with the particular lesson, or they are alternate response words which normally are other words which accomplish the same thing as the expected response. Usually each lesson includes a step 470D, which causes the tutorial to wait for the user to provide an expected response, in the form of an expected word or keystroke. If the response is recognized as an utterance of one of the limited number of an allowed response words, a token of the utterance is used to perform adaptive training on the models for that allowed response word and is stored in a batch training file as a token of that allowed response word. Once an allowed response is received from the user, step 470E advances to the next lesson 468 if the user's input is the expected response, or else it branches to a location in the Lesson File indicated by the function following that response in the Event Stack.

Figure 27:
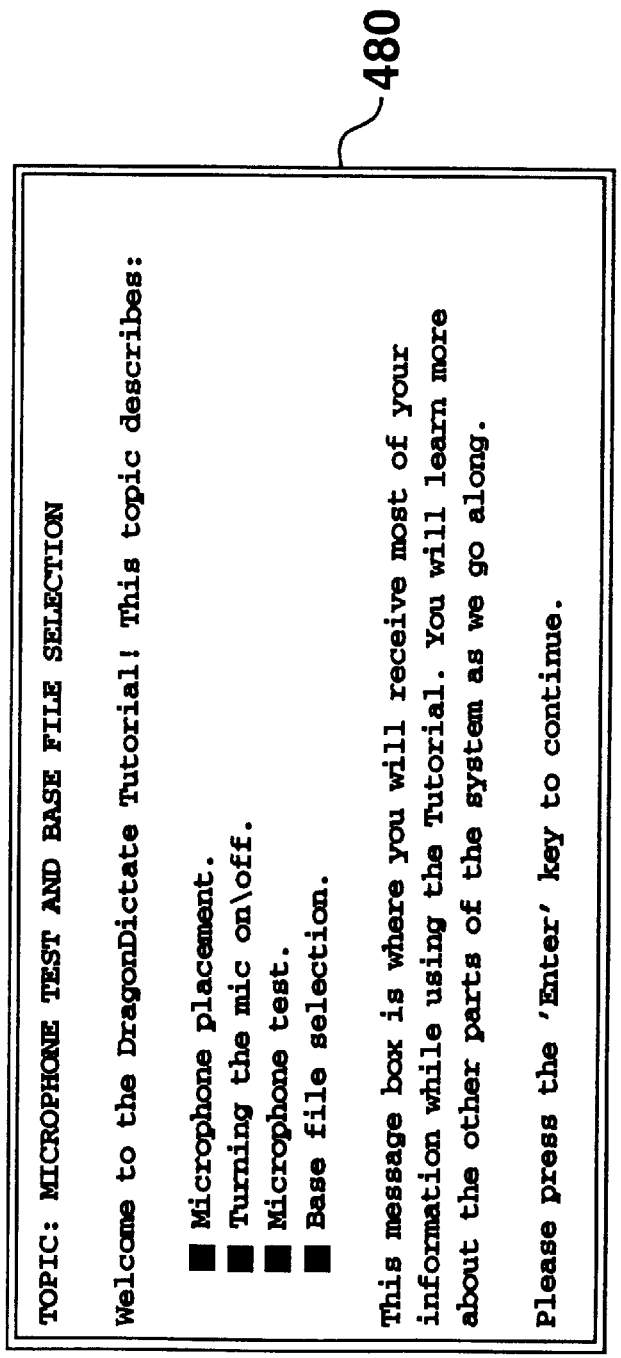
FIG. 27 is a representation of the screen prompt which results when a new user first enters the Tutorial Program of FIG. 17.

Returning now to FIG. 18, as was described above with regards to step 422 of FIG. 6A and FIGS. 22 through 26, when a new user is defined with the Voice Console Subroutine, the user is encouraged to run the Tutorial Program. If the user selects to do so, the Tutorial Program is loaded and it starts to interpret and execute the Lesson File. This will cause the Tutorial to start executing chapter 1 of the Lesson File. In Chapter 1, step 475 places allowed responses for the chapter in the Defaults section 474 of the Event Stack. Then, a lesson 468A displays the introductory screen shown in FIG. 27 and waits for the user to press the "Enter" key as is prompted in the message box 480 shown in that figure. In a subsequent lesson 468B in that chapter, the user is prompted to run the Select Base Vocabulary lesson. When the user does so, the Lesson File contains instructions which cause the Tutorial Program to be temporarily exited while the Select Base Vocabulary subroutine 186 described above with regard to FIG. 16 is executed. This selects the .USR file which is best for the user, providing the user with a set of initial models for use with adaptive training which most closely represent his or her speaking patterns. It also improves the reliability of recognition during the Tutorial, increasing the accuracy of adaptive training and batch training performed as a result of the tutorial.

The Lesson File includes a plurality of chapters which instruct the user how to operate different aspects of DragonDictate, such as the chapters 2–13 shown in FIG. 18. It also contains a chapter 464C which includes a lesson 468C which asks the user in a step 486 whether or not he or she wishes to exit the Tutorial and perform batch training. If the user says yes, the Tutorial Program will be exited and the Batch Training Subroutine described above with regard to FIG. 15 will be called. This causes batch training to be performed using all the tokens for allowed response words received by the Tutorial. If the user selects not to perform batch training, the Tutorial will continue on to an Exit Lesson 468D in which a message window asks the user if he wishes to exit the Tutorial in step 490. If the user selects to do so, step 492 will exit the Tutorial. If not step 494 will prompt the user to call a tutor menu which describes his options if he should decide to stay within the Tutorial.

Figure 29:
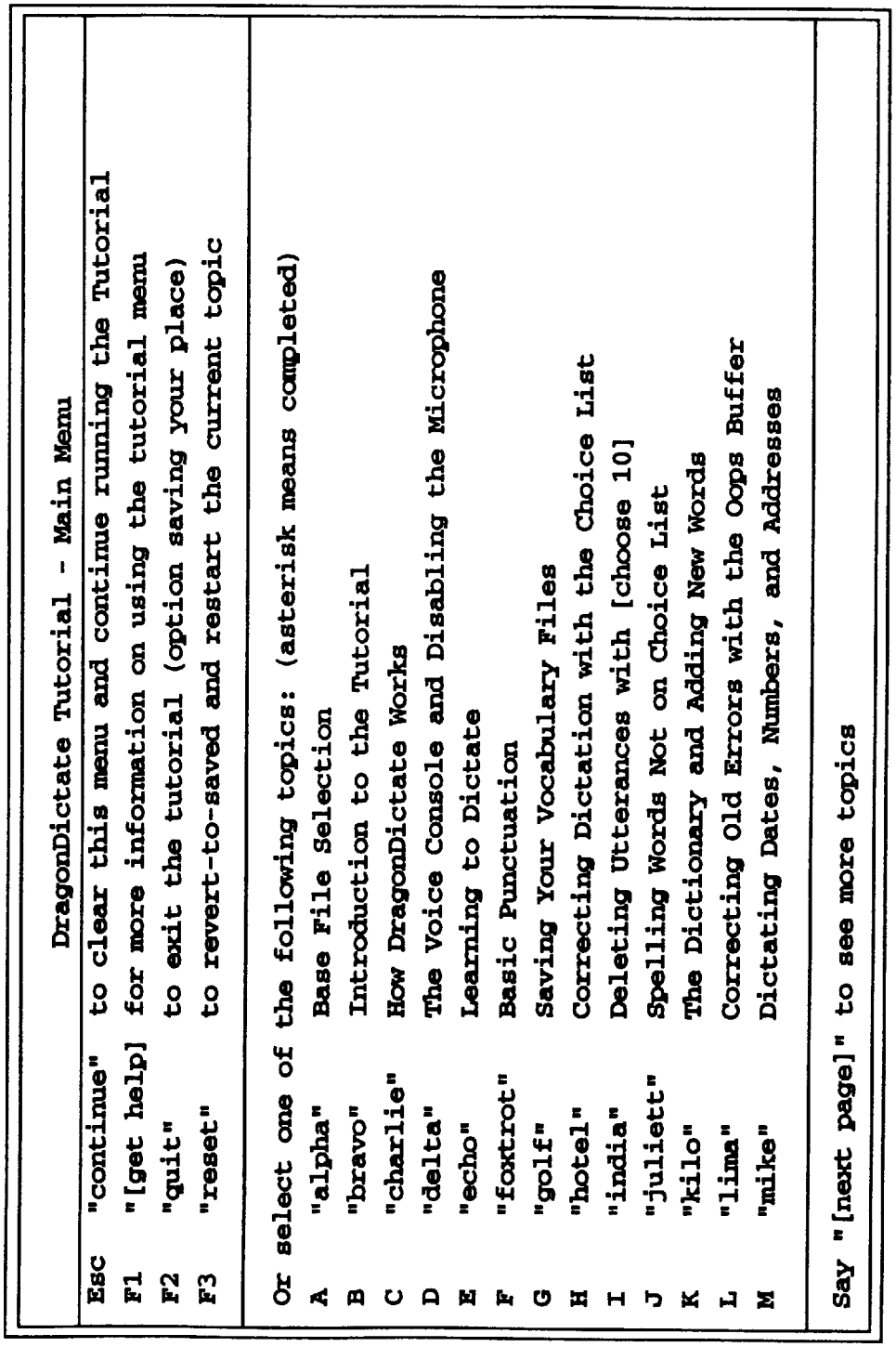
FIG. 29 represents the screen prompt when the user selects the tutorial menu of the Tutorial Program of FIG. 17.

In addition to the chapters 464, the Lesson File also includes a plurality of modules 466. These include a Dictation Module 466A which includes lessons called by other lessons 468 to receive and respond to user input, including utterances, in specified ways. The Global Module 466B include other non-dictation lessons which are called or jumped to by other lessons. The Tutor Menu Module 466C includes lessons which display a Tutor Menu, the first page of which is shown in FIG. 29 and which responds to each of the commands shown in that menu by performing the function indicated next to that command. As is indicated by FIGS. 22 and 23, the user can execute the Tutorial Command from the Voice Console Menu which causes the Tutorial Program to load and start executing Tutor Menu Module, popping up the Tutorial menu shown in FIG. 29. This enables the user to refer to any of the Chapters contained within the Tutorial at any time when using DragonDictate, and to branch to any of those chapters as desired. The Tutor Menu can also be accessed at any time when using the Tutorial Program by saying "Tutor menu", as is indicated in the Globals section 472 of the Event Stack in FIG. 28. This enables the user to selectively move to, or skip over, individual chapters as desired.

FIGS. 30 and 31 provide examples of text from the Lesson Files used with a preferred embodiment of the invention. This text is shown in an uncompiled format. However, the actual Lesson File interpreted by the Tutorial Program is compiled to reduce memory space.

The lines 502 at the top of FIG. 30 start with "*", indicating the lines are comments intended to be read by humans, not the Tutorial's interpreter. Since they are not meant for the interpreter, all lines starting with a "*" are not placed the compiled version of the Lesson File. The lines 502 show that the portion of the lesson shown in FIG. 30 corresponds to chapter 7, 464B, of the Lesson File shown in FIG. 18. This chapter relates to correcting dictation with the choice list. The text on line 504 identifies the starts of a chapter. When the lesson text is compiled, it causes the address of this location in the compiled lesson file to be identified as that of the start of the specified chapter. Lines 506 all include DEFAULT statements, which cause event words following those DEFAULT statements and their associated function to be loaded into the Defaults section 474 of the Event Stack 471. These events and their associated functions will remain loaded in the events stack as long as the Tutorial continues to execute their associated chapter.

Line 508 causes the simulated text editor used in the screens of the Tutorial shown in FIGS. 32 through 45 to be cleared. As will be explained below, when the user simulates dictation, the Tutorial will insert words into the simulated editor in a manner similar to that in which DragonDictate would insert words into a text editing program used in conjunction with it. Lines 510 are CONSOLE commands which cause the sound board 136 to respond to the microphone 122 shown in FIG. 4 and which turn on the sleep mode of the system, which causes it to ignore all words except a special wake-up command, off. Then line 512 hides the prompt window. As will be shown in FIGS. 33 through 45, the prompt window is a window used to supply the user with text to read when simulating dictation. Next, line 514 causes the simulated editor to be shown. At this time, however, the simulated editor is empty, since no words have been entered into it.

The interpreter of the Tutorial responds to a sequence of lines, such as the lines 516, which start with "'" by placing the following text in each of those lines in a window on the screen. Normally it will place such text in a message box, which is usually a long box near the center of the screen. But if there is already a message box on the screen when a sequence of lines starting with "'" occurs in the lesson text, the text on those lines is placed in a help box, which is a smaller box often located in the upper left-hand corner of the screen. The sequence of lines 516 results in the display of the message box shown in FIG. 32.

The next line 518 is an EXPECTING command, stating that the program is expecting an utterance of the word "Okay". The EXPECTING command calls the Get Expected Response Subroutine 178.

FIG. 20 describes this Get Expected Response Subroutine. Its step 520 calls the Get Allowed Response Subroutine 180 shown in FIGS. 21A and 21B As will be explained below, this subroutine will only return if the user responds with an allowed response; that is, either the expected response defined by the EXPECTING command calling the Get Expected Response Subroutine or a response defined in the current Events Stack. Once the Get Allowed Response Subroutine returns with the user's allowed response, step 522 returns to the EXPECTING line of the Lesson File if the user's response was the expected word. If not, step 524 finds the function associated with that response in the events stack and execute it. As can be seen from FIG. 28, these functions normally call other lessons in the lesson program, as is indicated by the "CALL" functions, or jump to such lessons, as is indicated by the "GO TO" functions. If the Event Stack function performed by step 524 is a CALL to a lesson, and if, after that lesson is executed it returns to the Get Expected Response Subroutine with a "REPEAT" value, step 525 will cause the program to jump to step 520, so as to repeat the performance of the Get Expected Response Subroutine all over again.

For example, if the user says "Tutor menu" when the EXPECTING command is expecting another word, step 524 will cause a CALL to the global-mainmenu lesson in the Global Module 466B, as is indicated in the Globals section of FIG. 28. If the user does not use the Tutor menu to branch to another part of the program, but instead returns, it will return to step 525 with a "REPEAT" value. This will cause the Get Expected Response Subroutine to wait for the user to say the response expected by the EXPECTING command before returning to the line after that command in the Lesson File. This is done so that the user will not advance in the tutorial unless he or she has entered the expected response, or its equivalent. This allows the Lesson File to assume that the user has entered a given set of responses by the time it gets to a certain location in the tutorial. It also helps ensure that the tutorial gets utterances of all the words it expect. the Get Allowed Response Subroutine 180, called by the Get Expected Response Subroutine, just described. As stated above, the Get Allowed Response Subroutine does not return until the user has entered what the subroutine considers to be an allowed response, that is, either the expected word defined by the EXPECTING command which caused the call to Get Allowed Response or an event on the current Event Stack.

In step 526 this subroutine sets a variable Utterance Number to zero. Then an Utterance Loop 528 repeats a sequence of steps until exited from within. The first step of the Utterance Loop, step 530, increments the Utterance Number variable, causing that variable to provide the number of the current pass through the Utterance Loop. Then a step 532 waits for user input. If the input is a keystroke and if it is an allowed response, step 534 exits the subroutine, returning the key as the response. If on the other hand, the response is an utterance, Step 536 calls the large vocabulary recognizer to score the utterance against a large vocabulary, such as the fall 30,000 words DragonDictate vocabulary. The call in step 536 requests the recognizer to return the best-scoring 25 words produced by the recognition attempt, with the score for each. Once the call to the recognizer has been completed, step 538 sets a variable User Response to zero. Then step 540 advances to the Word List Loop.

The Word List Loop is performed for each word returned by the recognizer in order of its recognition score, with best-scoring words first. The first step of the Word List Loop, step 542, tests to see whether the score for the current word is worse than a given level. If so, it exits the Word List Loop, causing the program to advance directly to step 554, described below. If the current word for the current pass through the Word List Loop is an allowed response word, then steps 548, 550, 552, and 553 are performed. Step 548 sets the User Response variable to the current word for which the word list loop is being performed. This word will be the best-scoring allowed response word returned by the call to the large vocabulary recognizer in step 536. This will be the case since the Word List Loop starts with best-scoring words first, since step 546 will only allow step 548 to be performed if the current word is an allowed response, and since when step 548 is reached the Get Allowed Response Subroutine will be exited before any subsequent pass through the Word List Loop can be made. Next, step 550 calls the Adaptive Training Subroutine 152, described above, to update the acoustic models associated with the best scoring allowed response word from the token of the current utterance if that word is the currently expected word. In the call to the Adaptive Training Subroutine in step 550, if there are currently any token[x]s which have been stored from previous passes through the Utterance Loop 528 which closely match the token of the current utterance which score well against the expected word, they are also used in the adaptive training. Then, if the best scoring allowed response is the expected word, step 552 labels that token with the expected word in a file for use in possible batch training. In step 553 the program exits the Get Allowed Response Subroutine and returns to its calling program with the best scoring allowed response word as the User Response.

If the Word List Loop is completed, the program advances to step 554. It tests to see whether the User Response variable is zero. If so, this indicates either that none of the twenty-five words returned by the large vocabulary recognizer was recognized as an allowed response word, or that, if any of those words did correspond to an allowed response word, their recognition scores were all worse than a given level.

It should be noted that the call in step 536 to the recognizer uses a large, multi-thousand word, vocabulary even though the system is only seeking an utterance which corresponds to a small number of allowed responses. This is purposely done to improve the reliability of the Tutorial's recognition. When traditional recognizers seek to determine if an utterance corresponds to a word in a small active vocabulary, they usually only score that word against the words of that small vocabulary. Unfortunately, this often causes utterances which do not correspond to any of the small number of active words to be recognized as one of those words. This happens because such an utterance will always score best against one word in such a small vocabulary, and since it is possible that its score against that word might not be bad enough to cause it to be rejected. In the Get Allowed Response Subroutine, however, a word will be rejected as not corresponding to an allowed response not only if its recognition score falls below a certain level, but also if it is not one of the twenty-five best-scoring words returned by the thirty-thousand word recognition. Thus, for example, if the user says a word which is only roughly similar to one of the allowed response words, it is likely that utterance will be rejected, since it is likely that out of the vocabulary of thirtythousand words more than 25 words will score better against it than one of the allowed response words.

Although this concept of scoring utterances against large vocabularies when there is only a small active vocabulary could be used in many different contexts, it is particularly useful in the Tutorial, where preventing mislabeling of utterances is particularly important, since they are being used to perform a new user's initial adaptive training of base vocabulary models.

If the test of step 554 is met as was stated above, it indicates that the last utterance was rejected as likely not being an utterance corresponding to either the expected word or any other allowed response word. But, since the Tutorial is training new users, and since it is possible for some people to speak words very differently than indicated by the models contained in the .USR files which comes standard with DragonDictate, the Get Allowed Response Subroutine does not merely reject the utterance. If the User Response variable for a given utterance is zero, steps 556, 558 and 560 are performed. Step 556 saves the token in an array of tokens with an index corresponding to associated Utterance Number. Then step 558 places a prompt window on the screen asking the user to repeat what he just said if the utterance number is 1, indicating that the rejected utterance was the first utterance received in the current call to Get Allowed Response. If, however, the current utterance number is greater than 1, the test of step 560 is met, which causes steps 562 and 564 to be performed. Step 562 places a help window on the screen which prompts the user to explicitly say the current expected word specified by the EXPECTING statement in the lesson which gave rise to the current call to Get Allowed Response.

Then, if the Utterance Number is three or greater, steps 566, 568 and 576 are performed. Step 566 compares all of the tokens which have been stored in the token array by passes through the Utterance Loop with each other. Step 568 tests to see if any three of those tokens score within a given distance of each other, indicating that the user has most probably said an utterance of the same word three times. If this occurs the system assumes the user is saying the expected word since at least one of those utterances has been made after step 562 has explicitly prompted the user to say the expected word. If this is the case, step 570, 572 and 574 are performed. Step 570 labels the 3 closely-scoring tokens with the expected word and saves them for use in adaptive training and possibly batch training. Then step 572 sets the User Response to the expected word, and step 574 exits the Utterance Loop which causes the program to advance to step 584, which calls the Adaptive Training Subroutine for the currently expected word and the 3 best-scoring tokens and then exits the Get Allowed Response Subroutine.

If the test 568 is not met, indicating that none of the three utterances score sufficiently close to each other, step 576 will be performed. It tests to see if the utterance number equals five. If so, steps 578, 580 and 582 are performed. Step 578 finds the three tokens which compare most closely to each other and labels them as the expected word for future use in adaptive training and possible batch training. Then step 580 sets the user response to the expected word and step 582 exits the utterance loop, causing the program to advance to step 584 which performs adaptive training on the three best-scoring tokens found by step 578 and then exit the subroutine.

The Get Allowed Response Subroutine will always return with an allowed response. As can be seen its Utterance Loop 528 will be repeated until either step 534 returns with a keystroke, step 553 returns with an utterance which scores reasonably well against an allowed word, step 574 exits the Utterance Loop with three utterances which score well against each other, or step 582 exits it after five passes through that loop. Thus, the subroutine will only return with an allowed response other than an expected word if that allowed response word scores better against an utterance than some minimum required score and is one of the 25 best-scoring words from among a multi-thousand word vocabulary against that utterance. It will only return with the expected response if A) an utterance has been performed which meets the test just described for other allowed responses, B) the user has made five utterances which do not pass that test for any allowed word, three of which utterances were made after the user has been explicitly prompted to say the expected word, or C) the user has made three such utterances which, although they do not score favorably against any of the allowed responses, score favorably against each other, at least one of which was made after the user was explicitly prompted to say the expected word. Thus, the subroutine provides an effective mechanism for obtaining tokens of utterances which are accurately labeled with an associated word and, thus, provide good utterances for adaptive and batch training. At the same time, the subroutine is flexible enough to deal with users which speak certain words very differently than is indicated by the standard models for those words. The system will also normally reject utterances, such as coughs or brief conversation with other people which might occur during a user's performance of the Tutorial.

It can be seen that the MS-DOS DragonDictate Tutorial program, and its Get Allowed Response subroutine, perform command recognition during training. This is because the Tutorial prompts the user to say expected words, and if he does, step 550 of the Get Allowed Response subroutine uses the resulting one or more utterances of that word to train models associated with the expected word. But step 536 first compares all the utterances generated after the user has been prompted to say the expected word against a large vocabulary of words, including commands corresponding to allowed response words in the Event Stack. If such a post-prompt utterance scores well against an allowed response word other than the expected word which is a command, the system executes the function indicated as corresponding to that recognized command in the event stack. This is valuable, among other reasons, because it allows the user to maintain voice control over the system while training is taking place.

It can also be seen that the MS-DOS DragonDictate Tutorial program, and its Get Allowed Response subroutine, vary the number of times a user is prompted to say a word as a function of how well the one or more utterances generated in response to the prompt score against a prior model for the prompted word, as indicated in steps 536, 546–553. In the case that the post-prompt utterances do not score well against the expected word, or any allowed response word, the Get Allowed Response subroutine also varies the number of times a user is prompted to say the prompted word as a function of how well the post-prompt utterances score against each other, as indicated in 566–574. This is valuable, because it automatically reduces the prompting for multiple training utterances of a given word to situations in which more training utterances appear to be needed.

Returning to FIG. 30, the lines 590 reset the prompt window, make it visible and turn off its highlight function. The highlight function causes the currently selected word in the window to be highlighted on the screen when that function is turned on. Lines 592 causes each of the words enclosed in slashes ("/") which follow the word PROMPT to be inserted into the prompt window as is indicated in the prompt window 594 shown in FIG. 33. The prompt window is only two lines wide, and, thus, only two lines of the text inserted into the prompt window by the lines 592 are shown in FIG. 33. Line 596 turns the highlighting on in the prompt window, which causes the currently selected word to be highlighted, which is currently the first word in the prompt window, "There", as is indicated by the box around that word in FIG. 33. Lines 598 causes the text in those lines to be inserted in a message window 600 shown in FIG. 33. Line 602 calls the Get Expected Response subroutine 178 with the utterance "new paragraph" being the expected response. This causes the system to wait with the screen having the appearance shown in FIG. 33 until the user enters a response.

Figure 35:
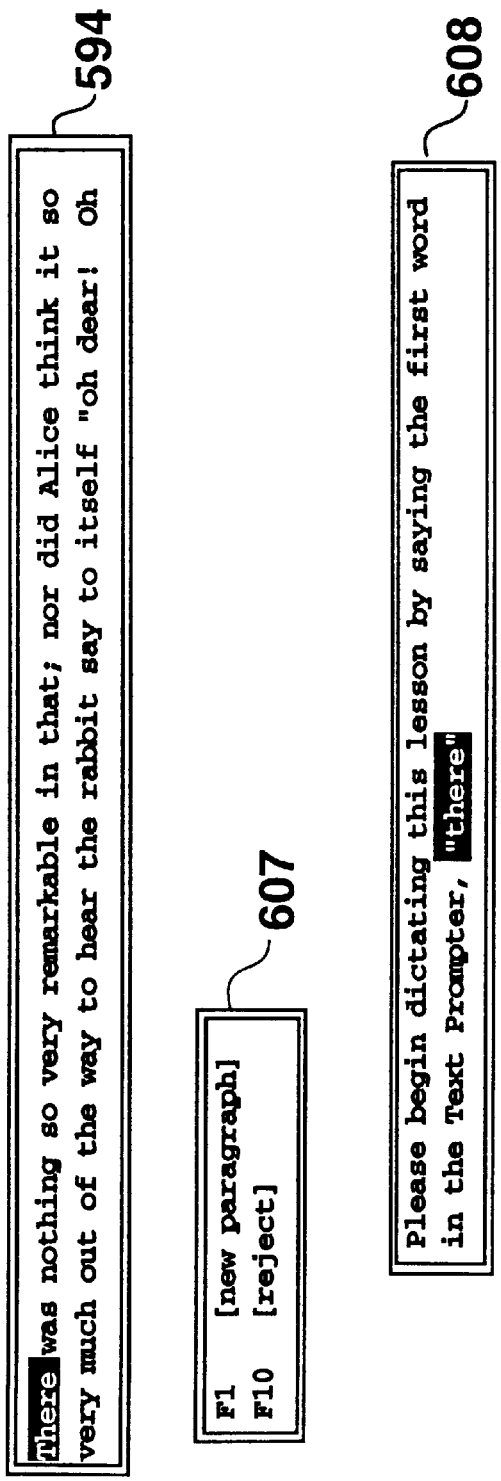

When the user responds by making one or more utterances which are recognized as the expected response, "new paragraph", line 604 causes a choice list 607 to be placed on the screen, as is shown in FIG. 35. In this choice list the expected word New Paragraph is the first choice word. The command "CHOICELIST 1="604 indicates that recognition of the expected word is to be simulated in the text editor, but simulating the entry of its associated keystroke sequence into an editor and by placing a choice menu on the screen which places it as the first choice word. This is done regardless of whether or not the expected word is the best scoring word. The CHOICELIST command uses the best scoring words from the recognizer to fill the slots of the choice window other than that specified by the number before the "=" in the CHOICELIST command. If there are not enough words returned from the recognizer to fill the list, it goes to the word list 260 contained in the .VOC file and randomly picks words which are close to the spelling of the expected word. This is done because there will almost always be enough words to fill the choice list, unless the user has performed alphabetical filtering which limits the vocabulary used by the recognizer to words which start with a certain sequence of letters.

In the current example, the system simulates the recognition of "new paragraph" by skipping a line, going to the start of the next line, and causing the next word to be entered to start with a capital letter. Next, line 606 places another message box on the screen, which instructs the user to say the first word in the prompt window, which is the word "There". Then line 610 call the Get Expected Response Subroutine expecting the word "There". At this point, the screen waits with the appearance shown in FIG. 35.

When the user says the expected word "there", the EXPECTING command on line 610 returns. The "CHOICELIST 1=" command on line 612 simulates a recognition of that word, causing it to be inserted into the simulated editor as is shown at 613 in FIG. 36 and for a choice list 224 to be displayed which shows it as the first choice. Lines 616 causes the portion of the message box 618 shown in FIG. 36 to be placed on the screen. Line 620 in FIG. 30 causes a prompt 622 to be added to the message box, instructing the user to say "next page" to see the next page of that message box. The NEWPAGE command 620 includes a call to the Get Expected Response subroutine with the phrase, "Next Page" as the expected word. When the user responds by saying "Next Page" the NEWPAGE command causes the text in lines 622 to be placed on the screen in the portion of the message box 624, shown in FIG. 37. The NEWPAGE command on line 626 causes the portion of the message box 628 to be added, which makes the word "next page" the expected response, and the word "previous page" an allowed response, since there is currently a previous page to the current page of the message box being shown. When the user responds by saying "Next Page", lines 630 cause the text 632 shown in FIG. 38 to be placed on the screen. Since this text is in a message box with a previous page, it contains a portion 634 which makes the phrase "Previous Page" an allowed response. Then the EXPECTING command on line 636 hilites the word "was" and waits for the user. When the user says "was", line 638 calls the lesson dictatel-no-error.

FIG. 31 shows the text of the dictatel-no-error lesson 640. Its first line, line 640A, simulates correct recognition of the currently hilited word, CURWORD. This causes the currently hilited word, "was" in our example, to be inserted in the editor's text, as shown at 642 in FIG. 39 and a choice window 644 to display it as the first choice. Then dictatel-no-error continues with the steps 640C-G of its included lesson dictatel-no-error-after. Line 640C advances the currently hilited word, CURWORD, to the next word "nothing" in the prompt window, as shown in FIG. 39. Lines 640D and 640E place "Okay" and "Choose-1" into the Cases section 477 of the Event Stack, making them allowed responses, and causing jumps to dlgd-said-okay if the user says either of those words.

FIG. 31 shows the dlgd-said-okay lesson 646. If the program jumps to dlgd-said-okay, the CHOOSE command on line 646A merely causes the last word hilited in the prompt window, which in the case shown in FIG. 39 would be the word "was", to be chosen. This would merely have the affect of removing the choice window for the recognition of that word. Once this was done, the last two lines of the lesson would be executed. These lines are identical to the last two lines of dictatel-no-error. They both wait for the user to say the current hilited word, "nothing" in our example, and once that word is said, return to the lesson from which dictatel-no-error was called.

Returning to FIG. 30, in the example, such a return would place the interpreter at step 640. This step again calls dictatel-no-error. This causes a simulated recognition of the word "nothing", inserting it into the simulated editor at 648 and into the choice window 650 as first choice, as shown in FIG. 40. Dictatel-no-error then advances the hilite to "so" and then waits for the user to say that word. When the user does so line 640 returns. Then lines 652 cause the message text 654 to be placed on the screen, as is shown in FIG. 41, and line 656 calls dictatel-no-error. This simulates the recognition of "so", as indicated at 650 and 658 in FIG. 41, advances the hilite to "very", and waits for the user to say that word.

Figure 42:
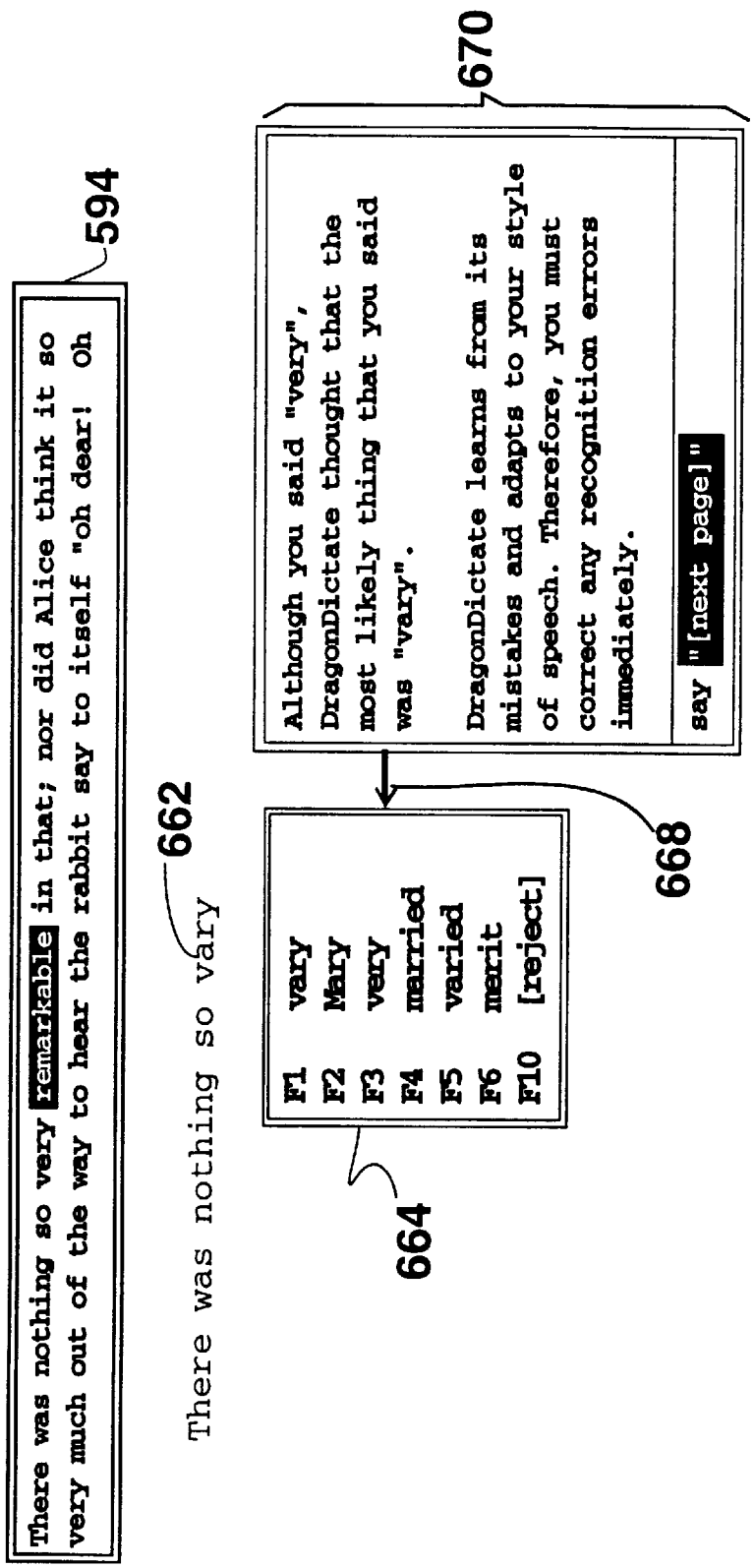
Figure 44:
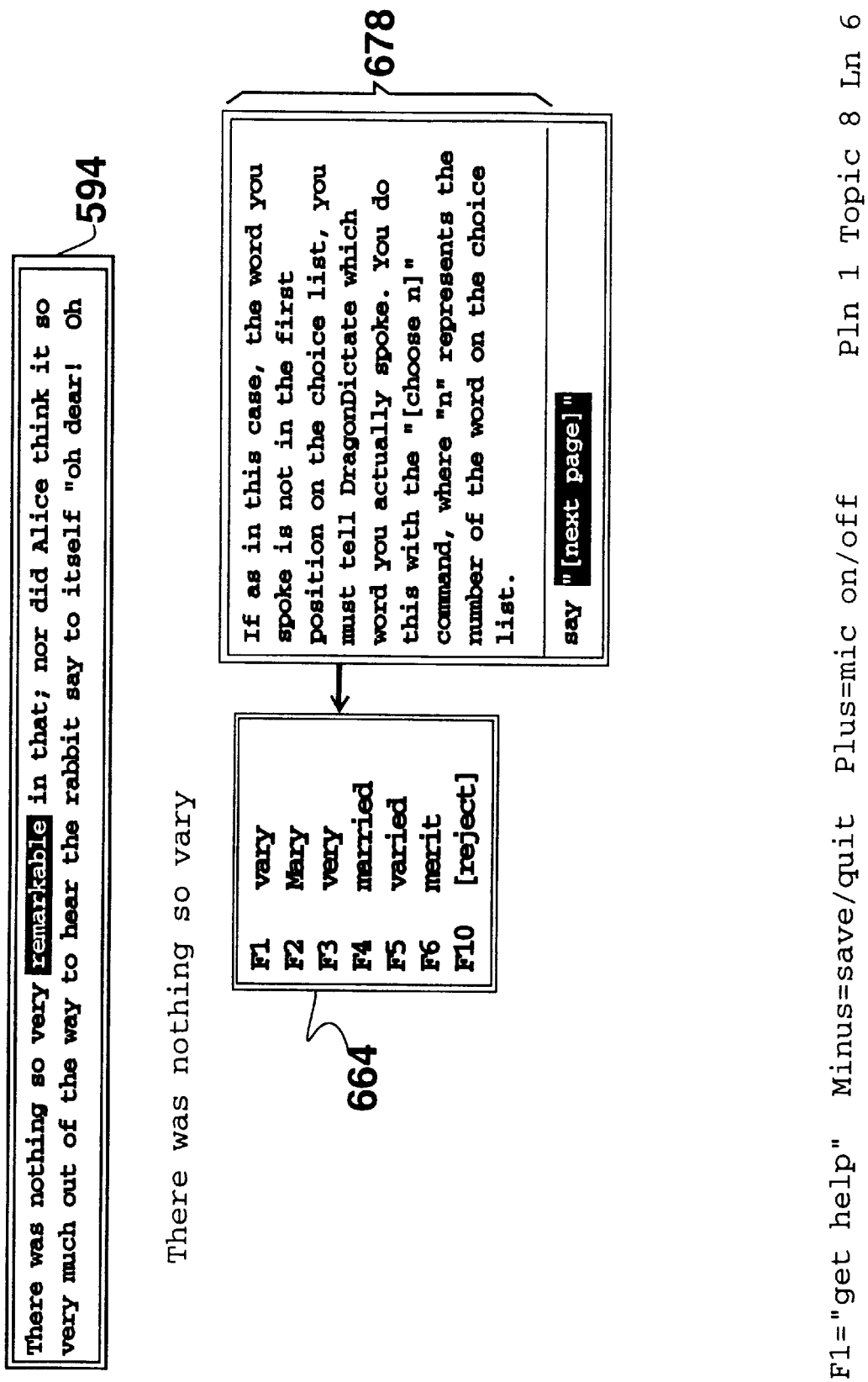
Figure 45:
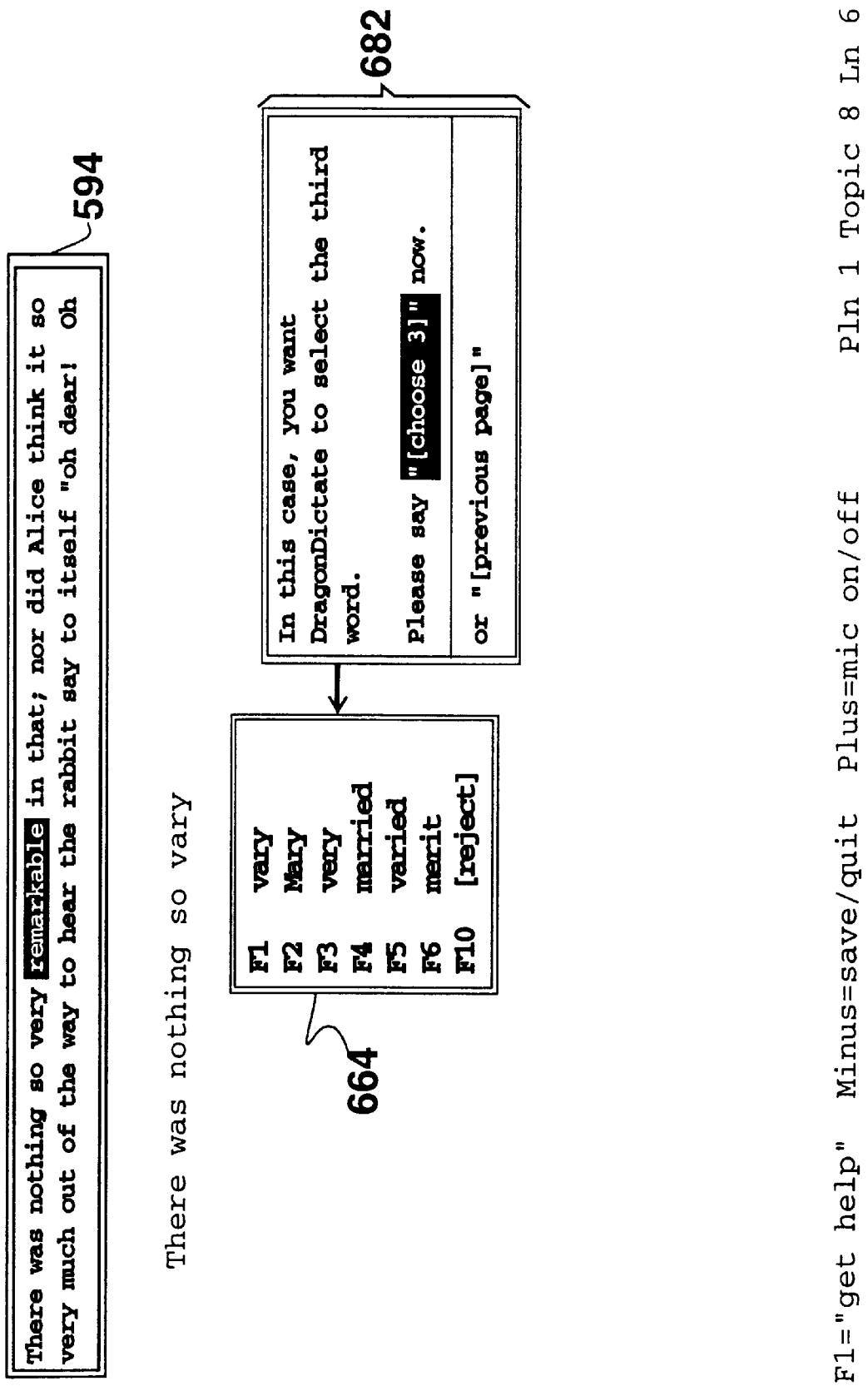

When the user says "very", line 660 simulates a misrecognition, placing the word "vary" in the simulated editor and first place in the choice menu, as is shown in FIG. 42. It also cause the expected word "very" to be listed as the third choice. Finally, it advances the hilite to the word "remarkable". Then line 666 causes the pointer 668 to point to the third choice word "very" to help the user find it, and lines 668 place the message 670 up on the screen, causing the screen to appear as is shown in FIG. 42. This message points out the error and explains the need to correct such errors when they occur. When the user says "Next Page" the program advances to line 672, which displays the message box 674 shown in FIG. 43. Saying "Next Page" a second time, causes lines 676 to display the message box 678 shown in FIG. 44. Saying "Next Page" a third time causes lines 680 to display the message box 682 shown in FIG. 45. The text associated with these message boxes explains how to perform error correction using the "choose-n" command.

Line 684 adds an entry to the Cases portion 477 of the Events Stack which indicates that if the user makes the common mistake of saying the next word in the prompt window, "remarkable", rather than correcting the simulated error, the subroutine must-say-choose-n will send a screen message telling the user that he or she must use the "choose" command. Then the EXPECTING command on line 684 waits for the user to say "choose-3". At this time, the screen has the appearance shown in FIG. 45. A further explanation of the operation of the tutorial program is contained in the present application's parent application, cited above at the start of the present application, which parent application, to the extent its contents are not contained in the continuation-in-part application, is hereby incorporated by reference herein.

FIGS. 46–88 illustrate aspects of the invention which occur in, or are expected to occur in DragonDictate for Windows, or DDWin, as it is called for short.

DDWin is a version of DragonDictate designed to run on a computer like the computer 116 shown in FIG. 4 except that it is running Microsoft Windows as its operating system. Microsoft Windows is an extremely popular operating system shell sold by Microsoft Corporation, One Microsoft Way, Redmond, Wash. 98052. As is well know in the personal computing arts, Microsoft Windows (or "MS Windows" for short) currently runs on top of MS-DOS. Together with MS-DOS it forms a multi-tasking operating system having a graphical user interface. It is multi-tasking because it can run multiple applications at the same time. In current MS Windows systems such multi-tasking is performed by having multiple programs loaded in memory at the same time and by enabling the computer to switch many times a second between executing instructions each of a plurality of such programs.

Many aspects of DDWin are similar to corresponding aspects of the MS-DOS version of DragonDictate described above. For example the actual speech recognition algorithm used by the two programs are very similar, as are the .VOC and .USR files. Both programs are designed to insert text into other programs. Both programs use choice lists and the Oops command to allow users to correct recognition errors, although there are some differences between these two functions in the different versions of DDWin.

There are, however, many differences between the MS-DOS and MS Windows versions of DragonDictate For example, the fact the MS Windows is a multi-tasking operating system means that DDWin does not need to operate as a terminate-and-stay-resident program, as does the MS-DOS version of DragonDictate, but rather can operate as one of a plurality programs which can run under MS Windows at the same time. The fact that MS Windows is a graphical operating system means that DDWin can have a much more graphically attractive and intuitive user interface than the MS-DOS DragonDictate. In addition, in designing DDWin, the inventors have added some new features which are applicable to the MS-DOS version of DragonDictate as well. Those skilled in the programming art will recognize that such features can be incorporated into the MS-DOS DragonDictate in a rather straight forward manner, given the disclosure of their embodiment in DDWin given below.

DDWin is a complex program made up of hundreds of thousands of lines of code and of many different software modules, some of which run as DLLs, or dynamic linked library modules, and some of which run as separate executable .EXE files. For purposes of simplification we will ignore this modularization and treat DDWin as if it were one program made up of various routines that call one another. For similar reasons we will ignore many aspects of DDWin which do not directly relate to our current invention, and we will greatly simplify many aspects of DDWin which we do disclose.

Figure 46:
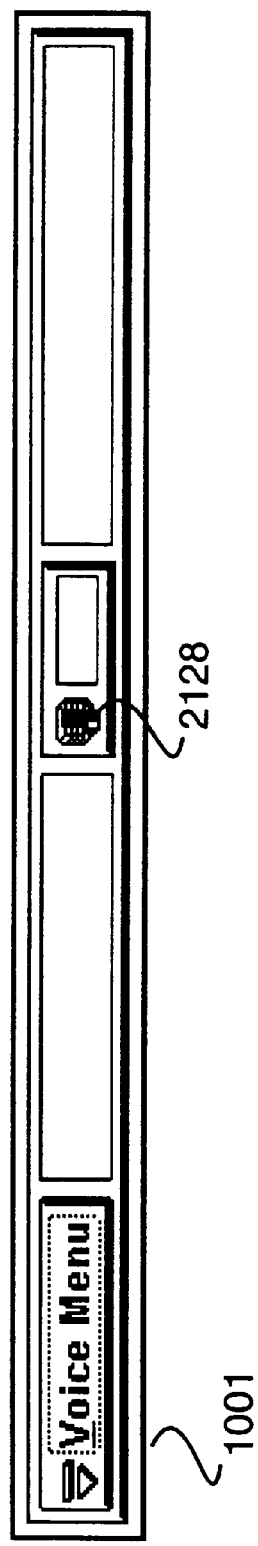
FIG. 46 is screen image showing the VoiceBar which allows a user to control DDWin, an MS Windows compatible speech recognition system which embodies certain aspects of the present invention.

DDWin normally displays a VoiceBar window 1001, shown in FIG. 46, on the computer's screen through which the user can enter commands to DDWin by clicking on buttons or selecting menu items, and through which the user can be provided visual feedback in the form of text and graphic displays.

Since many of the functions provided as part of the MS Windows have spellings which run the spelling of words having initial capital letters together, the pseudo-ode which we use with regard to DDWin will use mainly lowercase letters except where capitals are used in such run-together names, or except where MS Window's itself uses all caps.

FIG. 47 illustrate portions of the Initialization routine 1002 which initializes DDWin that are relevant to the current invention.

Steps 1008–1016 and 1018–1026 of this routine are all designed to vary the instructions performed by DDWin as a function of the computational resources available on the particular computer on which it is running. Steps 1008–1016 vary thresholding used during DDWin's recognition as a function of the computational power of the computer DDWin is running on. Step 1008 records a start time. Step 1010 runs a set of integer arithmetic tasks. Step 1012 records an end time for the task. And Step 1014 subtracts the start time from the end time to get the time duration it took to execute the task. This time duration is a reflection on the computational power of the computer on which DDWin is running. Step 1016 varies two thresholds, NumberToPassPrefilter and Score-Threshold, as a function of this time duration. As is explained below with regard to the Recognize routine of FIG. 55, NumberToPassPrefilter controls the number of the best scoring word models from the Recognizer's prefiltering which are used as word candidates in more detailed comparison against an utterance to be recognized, and Score-Threshold limits the how much more poorly than the currently best scoring word model a given word model can score during successive stages of recognition and still remain a word model candidate.

When the duration calculated by Step 1014 is long, indicating a relatively slow computer, NumberToPass-Prefilter and ScoreThreshold are set to decrease the number of word model candidate used by recognition, so as to decrease the amount of computation it takes, enabling its response time to remain relatively snappy even on a slow computer. When the duration calculated is short, indicating a more rapid computer which can perform recognition against more word models and still produce a snappy response time, the thresholds are made less restrictive to increase the recognizer's chance of recognizing the correct word.

Steps 1018–1028 of the Initialization routine respond to whether or not DSP hardware is present. Step 1018 detects whether the sound board used with the computer on which DDWin is running, such as the sound board 138 shown in FIG. 4, is a known type of board with a digital signal processor, or DSP, on it, or is a standard, non-DSP, MS Window's compatible sound card. This is an important distinction, because if the sound board is a standard MS Window's compatible sound card, it merely produces a digitized version signals produced by the microphone 122, and the CPU 126 of the computer on which DDWin is running must perform the FFT and cepstral signal processing calculations necessary to convert that digitized audio signal into the succession of frames 104, shown in FIG. 2, which are used for actual recognition. If, on the other hand, the computer has a known type of DSP board, that board's digital signal processor can be used to perform such computationally intensive calculations, saving the CPU significant computation.

The exact method Step 1018 uses to detect if a DSP board is present or not depends on the type of DSP board to be detected. If the DSP board is a board using Microsoft's so-called "Plug-and-Play" standard, which provides a uniform method for boards to identify themselves, that method can be used to determine if the sound board is one of the known type of DSP boards. If the DSP board is a non-Plug-and-Play board with memory registers containing a unique code which can be read without first requiring a write to some address which might interfere with other boards, Step 1018 can scan possible locations in the computer's I/O or memory address space looking for that unique code. If there is no way to safely look for the board without possibly having adverse effects on other boards which may be in the computer, Step 1018 can assume the sound card is a standard MS Windows compatible sound card unless the user has previously identified the card as one of the known type of DSP boards through a dialog box accessible through the VoiceBar.

In the future when DSP chips are mounted on personal computer motherboards and MS Window's standard interface for controlling such chips becomes more widely used, the equivalent of step 1018 can be performed by using that standard interface to determine if a DSP chip is available.

If Step 1018 detects that the known DSP board is not present, Step 1020 sets a variable DSPBoardPresent to false, to record that the board is not present. If Step 1018 detects that the known DSP board is present, Step 1021 causes Steps 1022–1026 to be performed. Step 1022 sets DSPBoardPresent to True to records that the DSP board has been detected. Step 1024 downloads code 1025 shown in FIG. 48 to the DSP board. As is explained below in greater detail, this code performs utterance detection and performs the FET and cepstral calculations necessary to convert the waveforms recorded by a microphone into the frames 104 used in recognition. Once this code has been loaded, Step 1026 initializes the DSP board so it can execute that code.

Step 1028 of the Initialization routine calls the MSW, or Microsoft Windows, function SetWindowsHookEx with WH_CALLWNDPROC as a parameter. Like all the MS Window functions described in the figures, this function's behavior is defined in well-known documentation which is publicly available from Microsoft and which is used by tens of thousands of programmers.

The MSW SetWindowHookEx function, when called with WH_CALLWNDPROC, sets a hook for a programmer definable CallWndProc function. The hook set by WM_CALLWNDPROC causes the CallWndProc procedure to be called every time a program or MS Windows, itself, makes a call to the MSW SendMessage function.

Like many operating systems, MS Windows is a message driven operating system in which programs can communicate with selected windows, with each other, and with the operating system by sending and receiving messages. MSW SendMessage sends a message to a specified window by calling that window's associated procedure with the parameters with which it, itself, has been called. MSW SendMessage waits until the call to this destination window procedure returns before it, itself, returns to the procedure that called it. MSW PostMessage, on the other hand, merely places a message on the destination windows message queue and returns without waiting for the destination window's associated procedure to process that message. The destination window will then have a chance to respond to the message later when it requests a message using either the MSW GetMessage or MSW PeekMessage functions.

In DDWin the CallWndProc function 1029 has been programmed to function as illustrated in FIG. 49, described below. This CallWndProc routine monitors messages sent by MS Windows and all programs running under it, looking for messages which help DDWin's application tracking feature keep track of which program or dialog box is associated with the currently active window and DDWin's command tracking feature to keep track of the current state of any active menus.

Once step 1028 of FIG. 47 has installed the CallWndProc hook, step 1030 calls MSW SetWindowsHookEx again, this time with WH_KEYBOARD as a parameter, to set a hook for a program-defined KeyboardProc procedure. This will cause DDWin's KeyboardProc procedure, shown in FIG. 50, to be called every time an application calls GetMessage or PeekMessage and there is a keyboard message to process.

Under MS Windows, every time a key on the keyboard 120, shown in FIG. 4, is pressed or released, a message is placed on the system's message queue, identifying that key's identity and other information, such as whether the alt-key is concurrently pressed. When the active window, that is, the highest level window whose associated procedure is currently selected by MS Windows to receive most user input, calls either MSW GetMessage or MSW PeekMessage it will normally receive any such keystroke message which is on the top of the system message queue. If the KeyboardProc hook is set, before the active window will receive such a keystroke message the KeyboardProc gets a chance to see it first. Once the KeyboardProc is done doing what ever it wants to do with the message, it can either let the message remain on the queue for passage to the active window, or it can delete it so the active window never receives it.

Figure 66:
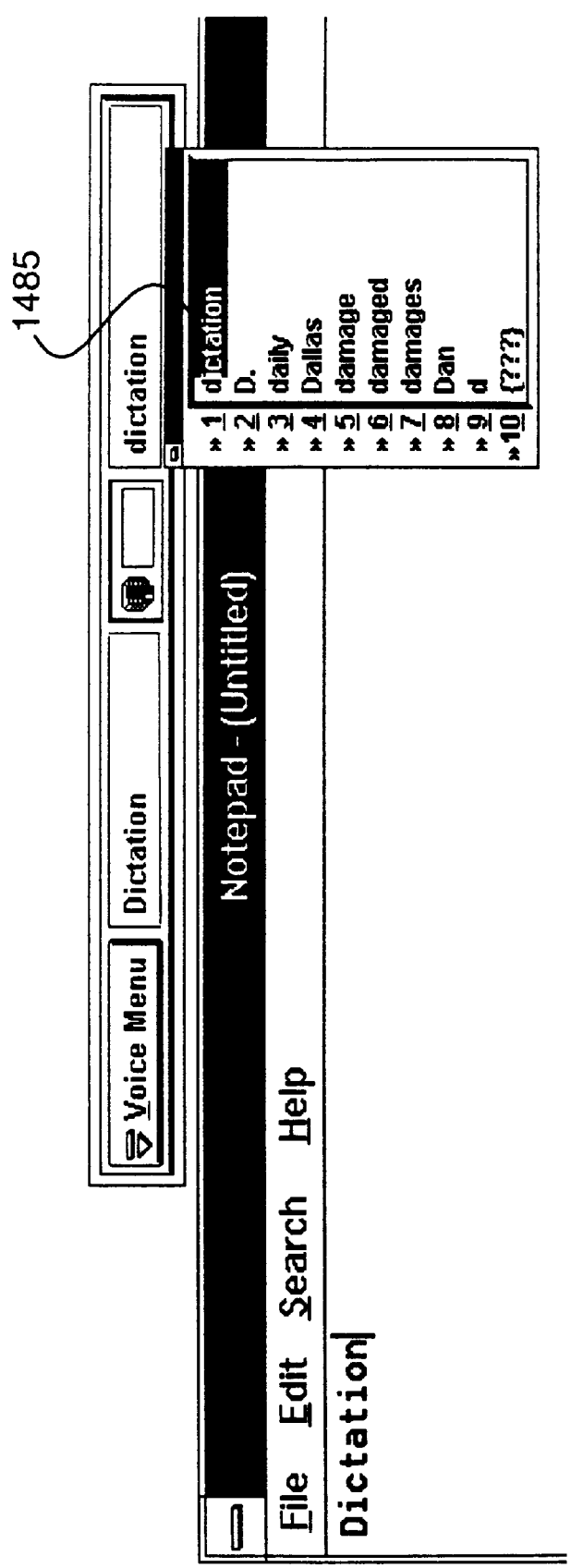
FIG. 66 is a partial screen image of a choice list which allows users to select alternate choice words and to perform re-recognition with case-insensitive alphabetic filtering.

FIG. 50 shows the portion of the KeyboardProc function 1032 defined for use in DDWin which is of interest to the present invention. Its step 1033 tests to see if both of the following two conditions are met: 1) a variable ChoiceListOperative is True; and 2) the last message group header before the read pointer in the JournalPlaybackProc's message queue indicates the current message group was created for a word reconized from the "Choice List" state. If the first condition is met, a choice list of the type shown in FIG. 66 is displayed and operative. If the second condition is met, the keystroke with which the KeyboardProc has been called has been generated by the JournalPlaybackProc, described below with regard to FIG. 68, in response to the recognition of a word from the "Choice List" vocabulary state. This state contains command words for use in a choice list window. If both conditions 1) and 2) of step 1033 are met, then steps 1035 and 1037 are performed. Step 1035 uses MSW PostMessage to send the keystroke message with which MS Windows has called the KeyboardProc to the ChoiceList procedure of FIG. 65 which operates the displayed choice list. Then step 1037 returns to MS Windows with an indication that the Keystroke with which KeyboardProc was called should be removed from the system message queue, so as to not receive any further processing. As will be explained below, these steps allow, amoung other things, the user to direct a StartString of one or more keystrokes to the choice list, which causes the ChoiceList procedure to perform a re-recognition on the utterance for which the choice list was created. In this re-recognition the active vocabulary list was limited to words which start with the characters of StartString, irrespective of those character's case. The KeyboardProc allows these characters to be sent to the choice list even when the choice list is not the active window.

The concept of the active window is important to several aspects of the present invention. As we stated, the active window is the highest level screen window selected by MS Windows, in that absence of hooks like CallWndProc or KeyboardProc, to receive input. By highest level window, we are referring to the fact that in MS Windows many screen windows have sub-windows within them, such as document windows, push buttons, radio buttons, scroll bars, and edit boxes. In MS Windows the active window has its title bar highlited. The active window has a form of input focus, as that term is used in the claims that follow. In MS Windows, however, the term "focus" is has a more specific meaning. Since it is possible for the active window to have many sub-windows, the term "focus" is used to describe the particular window or sub-window which will receive input which, by its content, is not specifically associated with any particular window. For example, if one is in a word processor which has several document windows showing different views of different documents, the word processor window would be the active window and the particular document window, if any, in which the user is entering text would be the focus window. If the user types specific keystrokes associated with the word processor's main menu, the procedure associated with the word processor window, which is the active window, will receive them even though it is not the focus windowv, because such menu command keystrokes are associated with the active window. But if the user types normal text characters, they will go into the sub-window within the active window which has what MS Window's refers to as the "focus", because such keystrokes are not associated with any particular window.

Once the call to MSW SetWindowHookEX in step 1030 of the Initialization routine returns, Step 1034 initializes and clears the MenuStack 1036 shown in FIG. 51 and Step 1038 initializes and clears the HWndTo-AppTable 1040 shown in FIG. 52. As is explained below in greater detail, the MenuStack is a data structure used by the DDWin's command tracking feature to track the current state of any active menus, and HWndToAppTable is a data structure used by DDWin's application tracking feature to keep track of which program or dialog box within a program is associated with the currently active window.

After Step 1038, step 1042 displays the VoiceBar window 1001 shown in FIG. 46, step 1044 sets variable RecognizerOn to True to turn on recognition and step 1046 set ChoiceListOperative to False to indicate that there is no currently operative ChoiceList window.

Once the Initialization routine is complete, the system is normally ready to perform recognition. When in this state, the system monitors the audio input for an indication of the start of an utterance to be recognized and calculates FFTs and cepstral parameters to form frames 104 which can be used by DDWin's Recognize routine for pattern matching against word models. If step 10 18 of FIG. 47 has detected the presence of a known DSP board and caused steps 1024 and 1026 to load and initialize the DSP board, this utterance detection and signal processing is performed by the DSP board code 1025. If not, it is performed by steps in the FastDemon routine 1048 which are executed by the computer's CPU.

Referring to FIG. 48, if a known DSP board has been detected and RecognizerOn is True, the DSP board code 1025 is repeatedly executed. It include a step 1050 which is called every 1/100 of a second by a timer on the board's DSP chip, causing sub-steps 1052–1066 to be executed. Step 1052 performs utterance detection upon the audio waveform signal received by the DSP board. This detection is similar to the audio detection described in U.S. Pat. No. 4,829,578, issued to Jed M. Roberts on May 9, 1989 and entitled "Speech Detection And Recognition Apparatus For Use With Background Noise Of Varying Levels", which is hereby incorporated by reference herein. Basically this method detects an utterance when the amplitude of the audio signal exceeds a moving average threshold value, based on the signal's amplitude during periods which the method has previously determined do not include utterances, and based on the variability of the amplitude during such periods. The portion of the audio signal associated with an utterance starts a brief period before the amplitude first exceeds that threshold, since the spoken sound of a discrete utterance starts with, and builds up amplitude from, silence.

If Step 1052 detects an utterance, step 1054 notifies the CPU by causing a message to be written into the RAM 130 which is addressed by the CPU.

Whether or not an utterance is detected by step 1052, step 1056 increments an OddEvenCount variable. This variable is used to distinguish the odd from the even numbered calls to step 1050, so the system can perform certain operations once every 1/50 of a second instead of once every 1/100 of a second. Next steps 1058 and 1060 calculate FFT and the Cepstral values for the last 1/100 of a second of the audio signal, and step 1062 places the resulting values into the form of a frame 104, of the type represented symbolically in FIG. 2. On every other 1/100 of a second, when the OddEvenCount is odd, step 1066 causes steps 1068–1072 to be performed. Step 1068 adds each of the individual values from the just calculated frame to the corresponding value calculated for the previous 1/100 of a second. Step 1070 causes each of the resulting values to be divided by two to create an average value for the two time periods. And step 1072 sends the frame formed from these averaged values to a frame buffer in the RAM memory addressable by the DDWin routines executed by the CPU 126.

If no DSP board was detected by step 1018 in the Initialization routine, the utterance detection and the signal processing necessary to form frames is performed by the CPU 126 in the FastDemon subroutine 1048 shown in FIG. 53. DDWin instructs MS Windows to generate timer messages which call this routine many times a second.

Each time the FastDemon is called, step 1074 tests to see if DSPBoardPresent is True, indicating that a know DSP board is available. If so step 1074 causes steps 1076–1083 to be performed. Step 1076 tests to see if the variable RecognizerOn is False, indicating that DDWin is not to respond to dictation or voice commands. If RecognizerOn is False, step 1078 tests to see if the DSP board is currently running, and, if so, it stops the board so it will not perform utterance detection and digital signal processing. If RecognizerOn is True, indicating DDWin is to respond to spoken input, step 1080 causes steps 1082 and 1083 to be performed. Step 1082 tests to see if the DSP is running, and, if not, it turns the board on. Step 1083 tests to see if any new utterance detection has been received from step 1054 in the DSP board code. If so, it calls RecSetupCallAndOutput routine 1102 shown in FIGS. 54A and 54B, which sets up recognition for the utterance, calls the recognition routine for it, and then outputs the appropriate response for the results of the recognition.

If DSPBoardPresent is False, indicating the system has no known DSP board available, step 1084, causes step 1086 to test to see if RecognizerOn is True. If so, steps 1088–1100 cause the CPU 126 to perform utterance detection and digital signal processing. Step 1088 performs utterance detection on any new portions of the audio signal received in an audio signal buffer which is placed in the RAM 130 when there is no DSPBoardPresent. If step 1088 detects an utterance start, step 1090 calls the above mentioned RecSetupCallAndOutput routine 102 to recognize and respond to that utterance. Regardless of whether or not an utterance is detected, step 1094 causes steps 1096–1100 to be performed for every 1/50 second of audio in the audio buffer. Step 1096 calculates the FFT and cepstral values for the 1/50 second of audio, step 1098 places them into a frame format, and step 1100 adds the resulting frame to the end of the frame buffer used to store recently received sound frames.

DDWin is written so the FastDemon is called even during the execution of RecSetupCallAndOutput and the programs RecSetupCallAndOutput calls. This enables RecSetupCallAndOutput to start processing and recognizing the start of an utterance as soon as it is detected, before all of its frames have been processed by FastDemon, and it lets FastDemon feed frames to the frame buffer for use by the recognizer as they come in. This allows the recognition of a word to take place as it is being said, and often allows such recognition to be completed almost as soon as the utterance is.

It should be noted that when DSPBoardPresent is True, the DSP board calculates the FFT and cepstral parameters every 1/100 of a second, whereas when DSPBoardPresent if False, FastDemon's digital signal processing steps calculate those parameters only once every 1/50 of a second. But both methods produce one frame every 1/50 of a second, so the same recognition process and word models can be used against the frames produced by both methods. The DSP board makes its FFT and Cepstral calculations every 1/100 of a second and then averages them every 1/50 of second to produce values that are more independent of short term fluctuations, and, thus, more likely to provide good recognition results. The DSP board can afford to do these extra calculations because of the extra computational resources it provides. When the CPU performs the digital signal processing, it has less computational resources, so it takes a short cut by merely calculating FFT and Cepstral values once every 1/50 of a second.

The FastDemon routine also includes a step 1104 which tests to see if a choice list window is displayed when ChoiceListOperative is False. If so, step 1106 increments a DelayCount variable and step 1108 tests to see if the DelayCount is greater than a given value, in which case step 1108 removes the choice list from the screen. If a choice list is displayed for a given utterance and the user dictates a new word unrelated to the choice list, the choice list is no longer needed for the given utterance. But chances are that a choice list will be needed for the new utterance. Steps 1104–1108 wait long enough before removing the choice list to determine if it is needed for the new utterances, at which time ChoiceListOperative will be set to True by RecSetupCallAndOutput. If ChoiceList-Operative is not set to True within that delay, step 1108 removes the choice list.

FIGS. 54A and 54B illustrates the RecSetupCallAndOutput routine 1102, which is called when a new utterance has been detected. It sets the parameters with which the Recognize routine 1110 of FIG. 55 will be called for the utterance, calls that Recognize routine, and, during normal operation, calls the PerformWordsOutput subroutine 1112 of FIG. 64 to produce the output associated with the word recognized for that utterance. Since the major function of RecSetupCallAndOutput is to set up calls to the Recognize routine 1110, we will discuss the Recognize routine first.

The Recognize routine 1110 of FIG. 55 is called for a given Utterance, LanguageContext, StateList and StartString.

The Utterance identifies the sequence of frames 104 which the Recognize routine should perform recognition against.

The LanguageContext is used during DictateMode to identify the word which precedes the current word to be dictated. As is discussed above with regard to the digram language model scores calculated in step 396 of FIG. 5A the probability of what words are likely to correspond to an utterance to be recognized vary as a function of the context in which that utterance is spoken, including its immediately preceding word indicated by LangugeContext. The Recognize routine adds the Digram language model score indicated by the LanguageContext for each of a plurality of word candidates to the respective word candidate's score during recognition to increase the chance that the word selected will be one which is probable given the language context.

The StateList is an ordered list of all the VOC. file states 267, shown in FIGS. 10A and 10B which are to be used in a given recognition. It is used to define the active vocabulary for the recognition and to determine what output is to be associated with the recognized word.

The StartString is a sequence of zero or more characters which is used to limit the active vocabulary to words whose spelling starts with the same sequence of letters during a re-recognition of an utterance.

Step 1114 of the Recognize routine tests to see if StartString is empty. If so, it skips to step 1116. If not it limits the active vocabulary to words in the states of the StateList whose associated spellings 263 (shown in FIG. 10A start with the sequence of letters of the StartString. The individual letters in StartString and in the word spellings 263 can be of either upper or lower case, but step 1114 allows any word to remain active whose initial letters match the StartString, independently of the case of those letters in either the StartString or the word spelling. This has the advantage of allowing a user to enter a letter to perform alphabetic filtering in a choice list or the Oops buffer, without having to make sure the letter has the proper case. It also enables the user to utilize alphabetic filtering to activate the spelling of a word even if he or she can't remember the case of the letters used in that word's spelling. StartString is used when the Recognize routine is called to perform re-recognition from either the ChoiceList routine, described below with regard to FIG. 65, or DDWin's WordfistoryBuffer routine, which is not described below, but which corresponds to the OOPS subroutine shown in FIG. 7.

In different embodiments of the invention the manner in which alphabetic filtering selects the active vocabulary as a function of the StartString can be varied. For example, in some embodiments it is preferred that the alphabetic filtering be smart enough to not always require an exact match between StartString and the start of the desired word's spelling. FIG. 55A show a step 1114A, which is one such alternate version of the alphabetic filtering step 1114 shown in FIG. 55.

Step 1114A starts with a step 2112 which tests to see if the StartString has any characters in it. If so, alphabetic filtering is desired and, thus, step 2112 causes a loop 2114 to be performed for each word in each state of the current StateList. This loop adds each such word to the active vocabulary if it contains a string, MatchingString, which meets three conditions 2118, 2120, and 2122. Condition 2118 requires that each upper case letter in StartString be matched by the same upper case letter in a corresponding position in the MatchString. Condition 2120 requires that each lower case letter in in StartString be match by the same letter, in either upper or lower case, in a corresponding position in the MatchString. The final condition, condition 2122, requires that MatchString start the spelling of the word, unless the word's spelling contains a "[", in which case the MatchingString can start immediately after the"[".

Conditions 2118 is required because it is assumed that if a user goes to the trouble of typing a letter in upper case, he or she probably wants that letter to be upper case in the recognized word. Condition 2120 is used because if the user merely types a lower case letter, it is very possible he or she wants to signify a word having a corresponding letter in either upper or lower case. The condition 2122 is included so that if the user wants to specify a word, such as a command, having its pronunciation in square brackets, he or she does not have to enter the square brackets or other characters which proceed the initial characters of the desired pronunciation.

Returning now to FIG. 55, once step 1114 has performed prefiltering, if any is required, step 1116 tests to see if the CurrentMode is DictateMode, indicating DDWin is being used to dictate text. If so, it adds an initial language context component to the score of each active word's prefilter score. The initial component added to each word has three components: 1) a context-independent onegram score, 2) a recent history onegram score, and 3) a digram score derived from the LanguageContext with which Recognized is called. The context independent onegram score improves a given word's score in proportion to the relative frequency with which the given word has appeared in a large corpus of text from which language model statistics have been derived. The recent history onegram score improves the given words score in proportion to the number of times the word has appeared in recent use of the system, such as during the last one thousand words. The digram score improves the given word's score in proportion to the frequency with which that given word has occurred after the previous word indicated by the LanguageContext in the large corpus of text.

Step 1118 scores the initial frames of the Utterance against the prefilter models 280 associated with all the word models in DDWin's entire vocabulary. The identity of the prefilter model associated with each vocabulary word's one or more word models are stored in the field 264 in the user's .VOC file, shown in FIG. 10A, or in the field 303 of the user's .USR file, shown in FIG. 11. The prefilter models themselves are stored in the user's .USR file, shown in FIG. 11. As stated above with regard to the MS-DOS DragonDictate, since many words share the same prefilter start, scoring the Utterance against the prefilter starts and then selecting the words associated with the best scoring starts provides a rapid way to winnow down the field of word model candidates.

Once step 1118 has scored each word model's prefilter start, step 1120 limits the word model candidates to the NumberToPassPrefilter word models which have the best current scores after the introduction of the initial language model score, if any, added in step 1116 and the prefiltering of step 1118. As described above, the NumberToPassPrefilter is set during the Initialization routine as a function of the speed of the computer's processor. Step 1120 first selects up to NumberToPassPrefilter best scoring word models whose corresponding word are in the active vocabulary. If the number of such word models selected from the active vocabulary is between NumberToPassPrefilter and NumberToPassPrefilter minus forty, Step 1120 adds the forty best scoring word models from the remainder of DDWin's vocabulary to the set of word model candidates. If the number of word models selected from the active vocabulary is less than NumberToPassPrefilter minus forty, a sufficient number of the best scoring word models from outside the active vocabulary is added to the set of word model candidates to make the total number of such candidates equal to NumberToPassPrefilter.

Recognize performs the entire recognition process, up to, but not including the selection of best choice words in step 1146, on all of the word model candidates selected in step 1120, including the forty or more models with the best prefilter scores selected from outside the active vocabulary. This is done so the final recognition scores produced for the best scoring active vocabulary words selected by step 1146 will tend to be relative to the best final recognition scores from the entire DDWin vocabulary. This enables the scores produced for the best scoring active vocabulary words to provided a much more accurate indication of whether or not their associated words correspond to the utterance being recognized. Since the system vocabulary includes acoustic models for vocabulary words representing sounds such as coughs, sneezes, door slams, and telephone rings, as well as between five and sixty thousand spoken words, the use of such relative scores greatly decreases the chance that utterances representing words outside the active vocabulary or common, non-verbal, sounds will score well against active vocabulary words.

Once step 1120 has limited the word model candidates, the loop of step 1122 loads a sequence of pointers into memory for each word model candidate. These pointers identify the sequence of PEL models which form the acoustic model 108, of the tppe shown in FIG. 2, for the word model candidate. These pointers are loaded into memory for rapid access during recognition. All the PEL models contained in the PEL model list 288 of the user's USR file will have been previously loaded into RAM for such rapid access.

The loop of 1112 causes these sequences of PEL pointers to be loaded into RAM by performing steps 1124–1134 for each active word candidate. Step 1124 tests to see if the word model is a helper model of the type stored in list 296 of the .USR file. If so, it copies the sequence of pointers to PEL models contained in that helper model's field 302, shown in FIG. 11. If, instead, the word model is defined by a phonetic spelling 265 contained in the user's .VOC file, step 1126 causes steps 1128–1134 to be performed. Step 1128 creates an empty PEL pointer list for the word model in memory and then Step 1130 performs steps 1132 and 1134 for each phoneme in the model's phonetic spelling. Step 1132 determines which PIC, or phoneme-in-context model, from the PIC table 282 contained in the user's .USR file should be associated with the current phoneme, based on a phoneme triple defined by 1) the phoneme or word start which precedes the current phoneme in the phonetic spelling, 2) the current phoneme itself, and 3) the phoneme or word end which follows the current phoneme in the phonetic spelling. Once this determination is made, step 1134 adds to the word model's PEL pointer list the pointer to each PEL in the selected PIC's associated sequence of PELs 284. Once this is done for each phoneme in the phonetic spelling, the word model's PEL pointer list will contain a pointer to a complete set of PELs which create a word model 108 of the type represented in FIG. 2 for the word.

Once PEL models for each word candidate have been loaded into memory, step 1136 performs the basic dynamic programming loop which is illustrated symbolically in FIG. 3 for each successive frame 104 of the Utterance to be recognized until scoring for all active word candidates is complete. For each such frame, step 1138 performs a loop, comprised of steps 1140–1144 for each active word model candidate. Step 1140 uses the current frame to update the relative score of the match of the word model against the frame sequence of the Utterance. Step 1142 tests if CurrentMode is DictateMode, and, if so, it tests to see if the matching performed in step 1140 has caused the current frame to be the first frame matched against one of the first four PEL models, or vectors, 109 associated with the word model. If both these conditions are met, step 1142 adds a language model component to the word model's current score. This language model component is calculated using the same method as the language model score component described above with regard to step 1116. This score is dribbled in over four successive PELs so it does not improperly overwhelm, and is not improperly overwhelmed by, the scoring produced by the acoustic matching at any one point in the recognition process. Step 1144 then tests to see if the word model's current score differs from the current score of the currently best scoring word by more than ScoreThreshold. If so, it removes the word model from the list of active word model candidates.

As was pointed out above, ScoreThreshold is set during the Initialization routine as a function of the computer's computational speed, so that if the computer is more powerful and, thus, capable of running recognition against more word models within a given time, Score-Threshold is increased to allow more words to be retained as word candidates.

Once the loop of step 1136 is complete and frames of the Utterance have been matched against all the PELs of the active word models, step 1146 places the word IDs of the NoOfWordsToReturn best scoring words from the active vocabulary, and their corresponding scores, into a results buffer. Then for each Word ID in the results buffer, step 1148 scans the active states in the StateList, in order of the state's relative priorities, to find the first active state in which the Word ID occurs. When it finds such a state, it places it in the results buffer in association with its associated Word ID. Finally step 1150 returns with a pointer to the results buffer.

Returning to FIGS. 54A and 54B when RecSetupCallAndOutput receives an utterance and calls the Recognize routine, CurrentMode usually has one of four values, BaseVocabSelectMode, TrainWordMode, CommandMode, or DictateMode. As is indicated by the "if" statements in steps 1154, 1164, 1176, 1192, and 1200 of FIG. 54A, the steps which RecSetupCallAndOutput perform are largely determined by the value of CurrentMode.

If CurrentMode equals BaseVocabSelecteMode, step 1154 causes steps 1156–1162 to be performed. CurrentMode only equals this value when DDWin is performing base vocabulary selection for a given user by means of the BaseVocabSelection procedure 1216 shown in FIG. 56. This procedure performs a roughly similar function to steps 414–434 of FIG. 6A and the steps of the Select Base Vocabulary program of FIG. 19 described above with regard to the MS-DOS DragonDictate. It selects which of a plurality of .USR files, and their acoustic PIC and PEL models, should be selected for use by a given user. In the MS-DOS DragonDictate there are only two base vocabularies, one which produces better recognition for most men and one which produces better recognition for most women. DDWin currently ships with four base vocabularies. One which is generally designed for men using a certain Shure microphone, one for women using that microphone, one for men using a Primo microphone, and one for women using the Primo microphone. As stated above, in other embodiments of the invention, many other base vocabularies could be used, including base vocabularies for different types of accents, different types of background noise, or different kinds of acoustic distortions.

Figure 57:
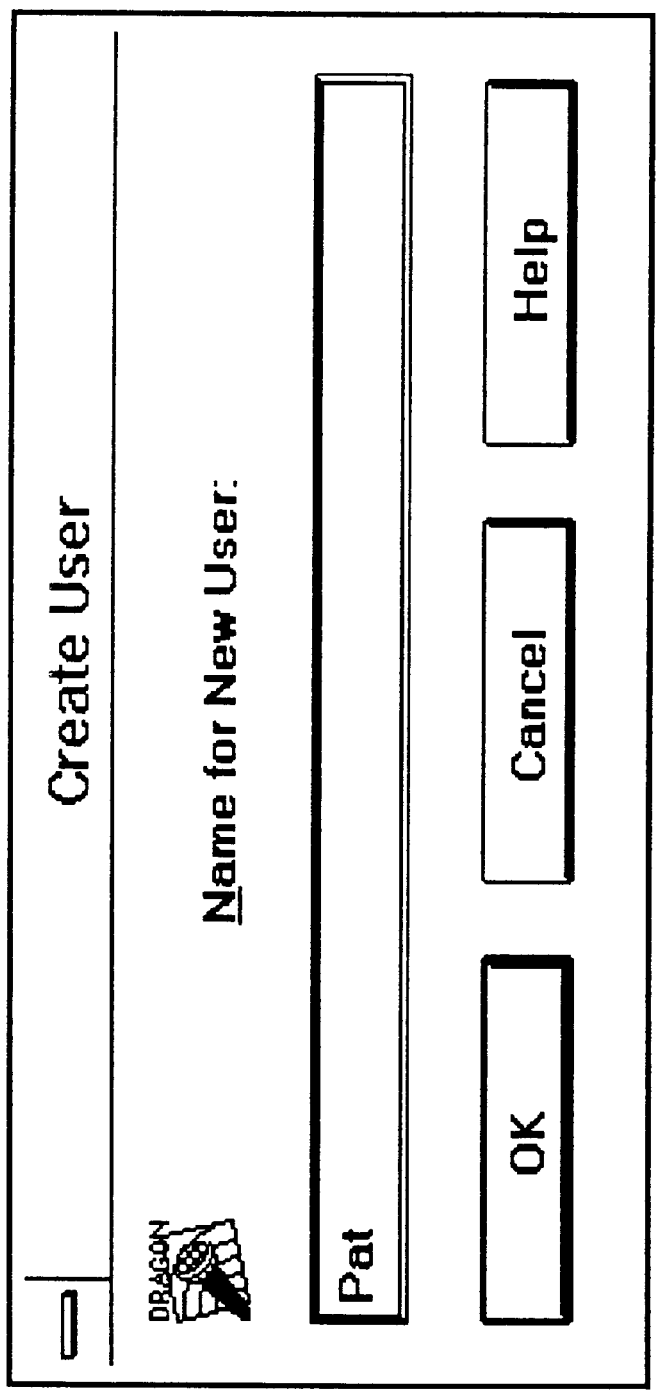
FIG. 57 is a partial screen image showing the Create User dialog box, which DDWin uses when enrolling a new user in conjunction with the BaseVocabSelection routine of FIG. 56.
Figure 58:
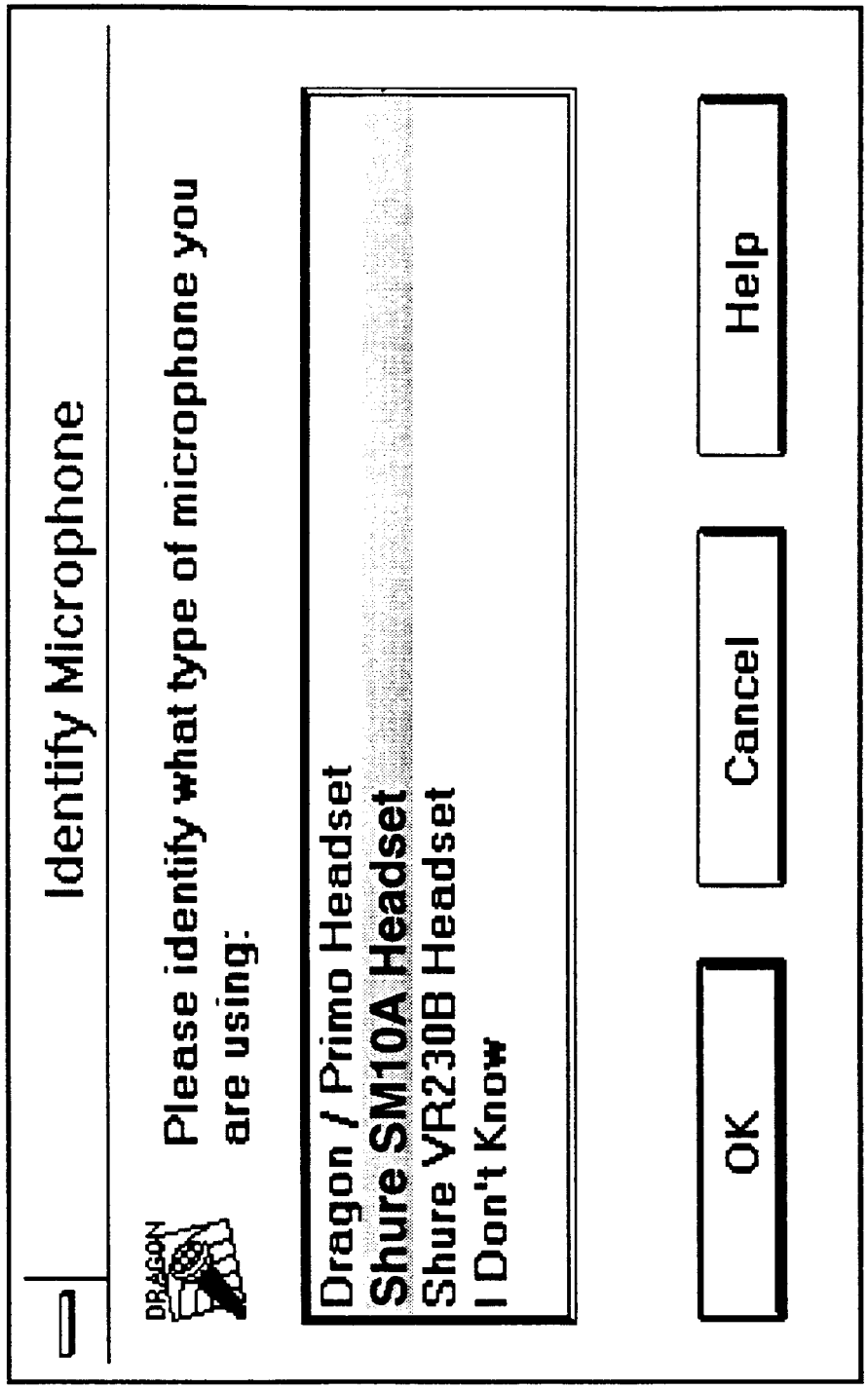
FIG. 58 is a partial screen image showing the Identify Microphone dialog box, which DDWin uses in conjunction with the BaseVocabSelection routine of FIG. 56.

FIG. 56's BaseVocabSelection routine starts with a step 1218, which displays a Create User dialog box, shown in FIG. 57. Like step 416 of FIG. 6A, this dialog box requests the user to enter a user name made from up to eight characters. When it obtains this name, step 1219 displays a Identify Microphone dialog box, shown in FIG. 58, which asks the user to indicate the type of microphone the system is running on, or to indicate that he does not know which it is running on. Once this information has been obtained, step 1220 sets the score for each base vocabulary to zero, and then step 1222 weights the score of the two base vocabulary associated with the microphone type, if any, identified by the user. Step 1224 loads the SELECTION.VOC and SELECTION.USR files for use by the recognizer.

The SELECTION.VOC file is a .VOC file having the structure shown in FIG. 10A and 10B except that: 1) its word list is comprised only of vocabulary words corresponding to prompt words from a prompted word list whose words the user is instructed to say during BaseVocabSelection; 2) it includes four such vocabulary words for each such prompt word, one for each of the four base vocabularies to be selected from; 3) it contains no phonetic spellings for any of its vocabulary words; 4) each state in its list of states 266 are associated with one of the prompt words; and 5) each such state includes the four vocabulary words associated with its prompt word. The SELECTION.USR file, is like a normal .USR file shown in FIG. 11, except that its PIC table is empty, since the SELECTION.VOC file has no phonetic spellings, and it has a helper model for each of the vocabulary words in SELECTION.VOC. Each of these helper models has a sequence of PELs having the same acoustic parameter values as the sequence of PELs which would be created by steps 1128–1134 of the Recognize routine from the phonetic spelling of that helper model's corresponding prompt word in the helper model's associated base vocabulary.

Figure 59:
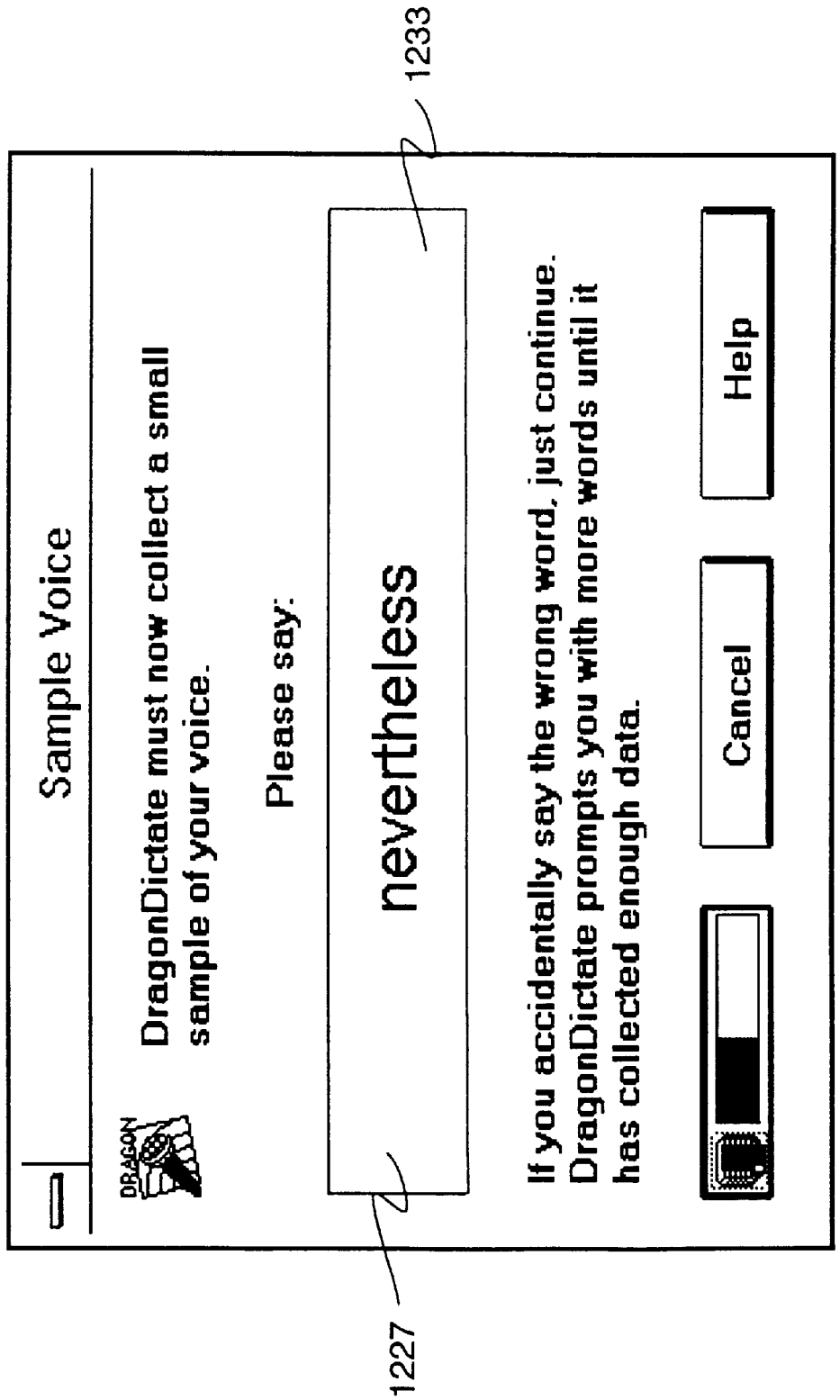
FIG. 59 is a partial screen image showing the Sample Voice dialog box, with which DDWin prompts the user to speak certain words in conjunction with the BaseVocabSelection routine of FIG. 56.

Once step 1224 has loaded the SELECTION.VOC and SELECTION.USR files, step 1226 displays the Sample Voice Dialog box 1227 shown in FIG. 59 and step 1228 sets the Currentmode to BaseVocabSelectMode, so RecSetup-CallAndOutput will respond to the next utterance as a base vocabulary selection utterance. Then step 1230 performs a loop comprised of steps 1232–1246 for each word in the prompted word list. Step 1232 sets the variable PromptedWord equal to the word in the prompted word list for which the current iteration of the loop 1230 is being performed. Step 1234 prompts the user to say the Prompted word by displaying it in the large window 1233 of the Sample Voice dialog box shown in FIG. 59. Then step 1236 enters a message loop. In step 1238 this loop calls MSW GetMessage function. This call does not return until a message has been generated for the BaseVocabSelection procedure, as will be done if an utterance is detected while in BaseVocabSelectMode.

Referring back to FIGS. 54A and 54B if the RecSetupCallAndOutput routine is called in response to an utterance when CurrentMode equal BaseVocabSelectMode, the test of step 1154 causes steps 1156–1162 of RecSetupCallAndOutput to be performed. Step 1156 clears the StateList and then places in it the state of the SELECTION.VOC file having versions of the PromptedWord from each of the four base vocabularies. Then step 1158 calls the Recognize routine for the utterance, with this StateList, and with LanguageContext and StartString both empty. As can be seen from FIG. 55, Recognize will perform recognition with the four versions of the prompted word as the active vocabulary, and will return pointing to a recognition results data structure containing the word ID's and scores for each of them. Then step 1162 calls MSW PostMessage to send the BaseVocabSection routine of FIG. 56 a PromptedUtterance message with a pointer to the recognition results structure produced by the recognition.

After this message is posted to BaseVocabSelection, MS Windows will cause the call to MSW GetMessage in step 1238 of the BaseVocabSelection routine of FIG. 56 to return. Once this happens step 1240 of that routine tests to see if the received message is a PromptedUtterance message. After the recognition of an utterance in BaseVocabSelectMode it will be, and, thus, step 1240 will cause steps 1242–1246 to be performed. Step 1242 adds the score produced by Recognize for each base vocabulary's version of the PromptedWord to a total score for that base vocabulary. Step 1244 then tests to see if the score of any one of the base vocabularies exceeds that of all other base vocabularies by more than a specific threshold. If so, it does not need to prompt the user to say any more words, and it exits the loop of step 1230. If not, step 1246 skips to the iteration of loop step 1230 for the next word on the prompted word list.

After the loop of step 1230 is exited, step 1248 selects the base vocabulary with the best score. After other steps which don't concern us, step 1250 creates a new directory for the user which has the name entered by the user in step 1218. Then step 1254 creates a copy of the .USR file associated with the selected base vocabulary in the user's directory having a file name comprised of the name entered by the user in step 1218 followed by ".USR". A standard .VOC file is also loaded into the directory have the same pre-extension file name. This causes future recognition by the Recognize subroutine for the user to use models constructed from the PICs and PELs in this .USR file. These models will originally be direct copies of those in the selected base vocabularies .USR file. But over time, as the system performs adaptive training in a manner similar to that described above with regard to MS-DOS version of DragonDictate, and as the user specifically trains word models using the TrainWordDialog routine described below, the PEL models will become customized to the user's own pronunciations. After this is done, the final step of the BaseVocabSelection routine sets CurrentMode to CommandMode.

Returning to FIGS. 54A and 54B if CurrentMode is set to TrainWordMode when RecSetupCallAndOutput is called to respond to the detection of an utterance, the test of step 1164 will be met and will cause its substeps 1166–1174 to be performed. CurrentMode is only set to TrainWordMode when the TrainWordDialog routine 1256 is active.

FIG. 60 illustrates the TrainWordDialog routine. This routine is often entered from the Training Console dialog box 1257 shown in FIG. 61, by selecting the "Start" button 1258 in that dialog box. It can be called for one or more words in a WordList. When the TrainWordDialog procedure is called, step 1260 displays the Train Word dialog box 1259 also shown in FIG. 61, and step 1262 sets the CurrentMode to TrainWordMode. Then step 1264 performs a loop for each active training word in the WordList for which TrainWord-Dialog has been called.

Which training words are active in the current WordList depends upon whether the user has selected the Minimal, Automatic, or All Words button in the Word Selection group box 1261 in the Training Console Dialog box 1259. When the Minimal radio button 1263 is selected, the only active training words are words in the WordList which have neither phonetic spellings nor helper models. When the Automatic radio button 1265 is selected, the only active training words are words in the WordList whose PELs have not all received any training from the user. Since most PELs are used in many words, it is possible for all the PELs associated with a given word to have received training before the user has performed training on that word, itself. When the All Words radio button 1267 is selected, all training words in the WordList are active.

The loop of step 1264 performs steps 1266–1310 for each active training word. Step 1266 sets PromptedWord equal to the active training word for which the current iteration of loop 1264 is being performed. Step 1268 then prompts the user to say the PromptedWord by displaying it in the window 1269 of the Train Word dialog box. Steps 1270–1276 test to see which of the radio buttons in the Repetitions group box 1271 of the Training Console has been selected. If the Light button 1273 is selected, step 1272 sets MinRepetitions to 1 and MaxRepetitions to 3. If the Normal button 1275 is selected, step 1274 sets MinRepetitions to 3 and MaxRepetitions to 5. If the Intense button 1277 is selected, step 1276 sets MinRepetitions to 6 and MaxRepetions to 9. As is explained below, MinRepetitions and MaxRepetitions are used to control the minimum and maximum number of times a user will be prompted to enter an utterance of a word being trained.

Next, step 1278 displays a number of unlit indicator lights 1279 on the Train Word dialog box equal to the value of MinRepetitions. This prompts the user to say at least Min-Repetition utterance of the PromptedWord. Then step 1280 sets variables TokensForWord and GoodScoringTokensFor-Word to zero. TokensForWord keeps track of the number of training tokens received for the prompted word and Good-ScoringTokensForWord keeps track of how many of those tokens have scored better than a certain threshold against a previous word model for the word.

Next the TrainWordDialog procedure enters a message loop 1282, which repeatedly calls MSW GetMessage in step 1284 and responds to the messages returned by each such call in steps 1286, 1306, and other steps not shown, until the message loop is exited from within.

Each time step 1284 calls MSW GetMessage, the call does not return until there is a message for the TrainWord-Dialog procedure. Since the procedure's associated dialog box, the Train Word Dialog Box, is that active window at this time, MS Windows will direct all keyboard input not specifically addressed to MS Windows, itself, to step's 1284 calls to GetMessage.

The user's usual input when the Train Word dialog box is active is to say the PromptedWord. When this happens an utterance is detected and FastDemon calls RecSetupCal-lAndOutput. When the Train Word dialog box is displayed, CurrentMode has been set to TrainWordMode by step 1262 of the TrainWordDialog procedure, and thus step 1164 of the RecSetupCallAndOutput routine causes steps 1166–1174, shown in FIG. 54A, to be performed.

Figure 61:
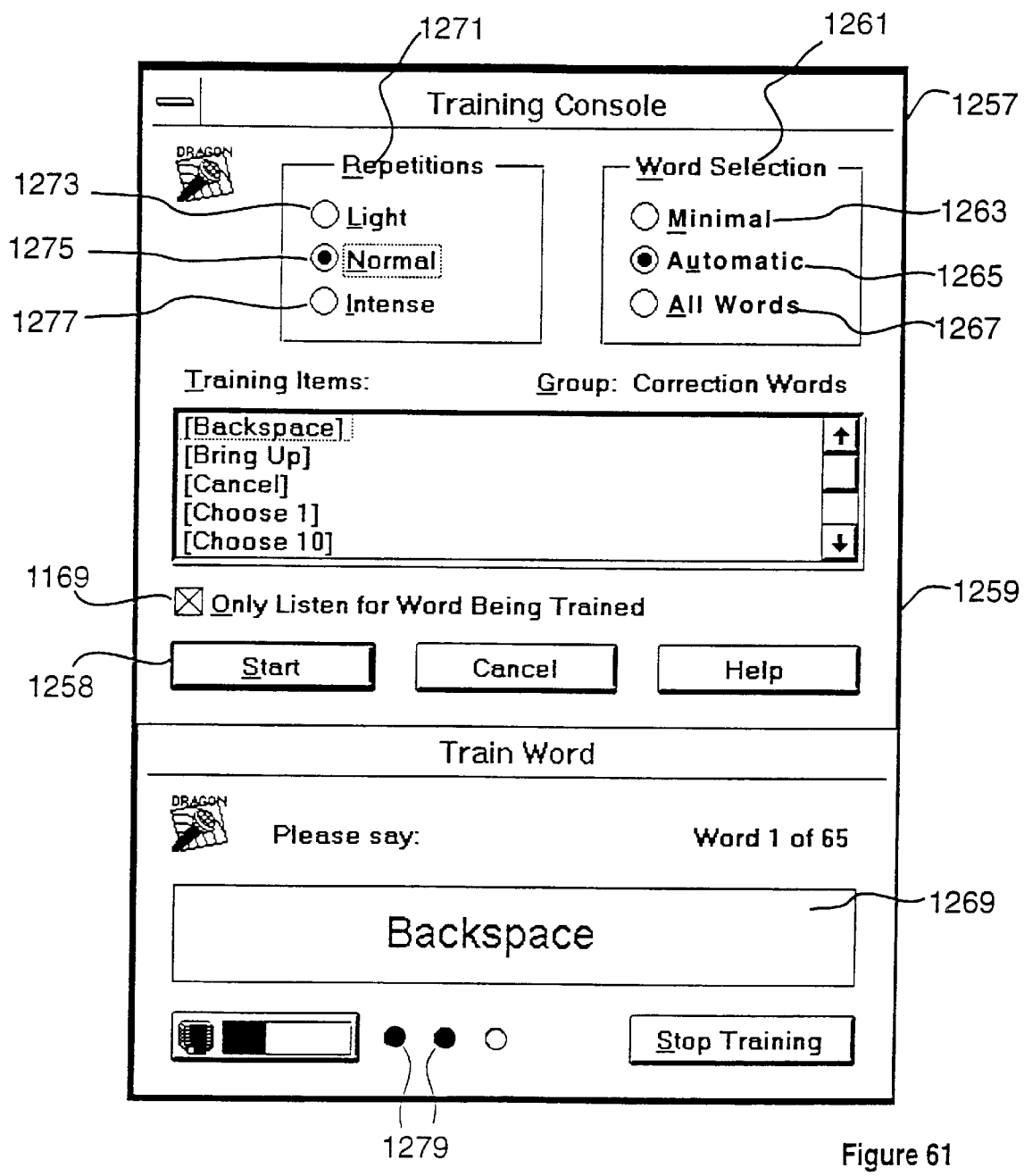
FIG. 61 is a partial screen image showing the Training Console and Train Word dialog boxes, which are used in conjunction with the TrainWordDialog procedure of FIG. 60.

Returning to FIG. 54A, step 1166 clears the StateList and places the PromptedWord in it. Then steps 1168 tests to see if both of the following two conditions are met: 1) the PromptedWord is not in the Train Word state and 2) Only Listen For Words Being Trained check box 1169 in the Training Console of FIG. 61 is not checked. If both these conditions are met the Train Word state is added to the StateList for use in the recognition of the current utterance, otherwise it is not. The Train Word state 1285 is shown in FIG. 70B.

FIGS. 70A and 70B is a schematic outline representation of part of the state list 266 of the .VOC file. In it vocabulary states are called "groups". Vocabulary words included in a given state, or group, are represented by a line of text indented under that state. The line of text associated with a given vocabulary word, starts with that vocabulary word's spelling 263. If the vocabulary word is to have a data placed in its ExtraData field, such data is indicated after a "/" in FIG,. 70. If the text following the "/" is "script 'string", the vocabulary word's associated ExtraData field will have a macro instruction corresponding to string. If the text following "/" is "Keys string" the ExtraData field is to be filled with a command to simulate a sequence of one or more keystrokes corresponding to those indicated in string.

Returning FIG. 54A, The TrainWord state includes zero or more words to be recognized against training utterances unless the user has checked the Only Listen For Words Being Trained check box. DDWin currently comes with one word "[Stop Training]" in the Train Word state. "[Stop Training]" has "{alt-S}" keystroke output placed in its ExtraData field 272. When this alt-S is produced as output, it causes the TrainWordDialog to be exited, as is described below. As is also, explained below, the Add Word Dialog Box shown in FIG. 62 and the Find Word Dialog Box shown in FIG. 63 can be used to allow the user to add and subtract words from the Train Word state, as well as from any other state.

The next step of RecSetupCallAndOutput, step of 1170, calls Recognize for the utterance with the current StateList, which contains the PromptedWord and, if the conditions of step 1168 have been met, the "Train Word" state, and with the LanguageContext and StartString empty. When Recognize returns with a pointer to the recognition results, step 1172 uses MSW PostMessage to send the TrainWordDialog a PromptedUtterance message with a pointer to the recognition results and a pointer to the recognition's utterance.

Returning to FIG. 60, when this PromptedUtterance message is sent to the TrainWordDialog procedure, the call to MSW GetMessage in step 1284 of that procedure returns. Since MSW GetMessage returns with the PromptedUtterance message, the test in step 1286 is met, causing steps 1287–1300 to be performed. Step 1287 tests to see if the following two conditions are met: 1) the best scoring word in the recognition results associated with the PromptedUtterance message is other than the prompted word; and 2) that best scoring word has a score above a given threshold, indicating the best scoring word was the word spoken. If both these conditions have been met, it is very likely the user spoke a command from the "Train Word" state, and step 1287 calls the Perform-WordsOutput routine 1112 of FIG. 64 to cause the output associated with that command to be output.

FIG. 64 illustrates the PerformWordsOutput routine. As shown there, it is called with a recognized Word, that Word's associated State selected by the recognition, and a pointer to the word's current entry in the WordHistoryBuffer, if any.

PerformWordsOutput's first step 1390 tests to see if ChoiceListOperative is True while a choice list, of the type shown in FIG. 66, is not the active window. This condition is normally true when a choice list is displayed, unless the user has clicked the mouse on the choice list or has said a command such as "Spell Mode" which makes the choice list the active window. If the test of step 1390 is met, step 1392 tests to see if the recognized State of the Word for which PerformWordsOutput has been called is other than the "Choice List" state, indicating the recognized word is not a command directed to the choice list, such as "Choose N", where "N" is a number from one to ten,. If Word's State is other than "Choice List", it indicates that the user does not intend to use the choice list for the utterance for which it was displayed, and, thus, step 1392 calls MSW PostMessage to send the RemoveChoiceList Message to the ChoiceList procedure 1393 shown in FIG. 65. As is described below, the ChoiceList procedure responds to this RemoveChoiceList message by setting ChoiceListOperative to False and Delay-Count to zero, causing steps 1104–1108 of FastDemon, shown in FIG. 53, to remove the choice list, unless a new call is made to the ChoiceList procedure for another utterance within a fraction of a second.

Step 1394 tests to see if the recognized Word has any bytes in its ExtraData field 272 in the recognized State. If so, steps 1396–1404 are performed. Step 1396 tests to see if the first byte of the ExtraData field starts with a byte indicating the remainder of the ExtraData is a script to be executed by DragonDictate's Macro-Interpreter routine 1382 shown in FIG. 67. If so, step 1398 calls the MacroInterpreter routine with the remainder of the ExtraData.

FIG. 67 illustrates the MacroInterpreter routine. When the MacroInterpreter is called with a given script, step 1434 creates a MacroInstance, that is a data structure associated with the execution of that given script, in a list of such MacroInstances. This is done because a script can contain statements which are themselves other macro scripts and which cause the MacroInterpreter to make recursive calls to itself for such other scripts. The list of MacroInstances keeps track of this possible nesting of calls to the MacroInterpreter and allows status information to be recorded for each such call, including information indicating whether or not its MacroInstance is waiting for user input.

Step 1386 of the MacroInterpreter performs a loop until reaching the end of the script with which the current MacroInstance was called. This loop is comprised of step 1438, which finds the next macro statement in the macro script, and step 1440 and its substeps, which respond to each different type of statement found in step 1438 by performing that statement's associated function. FIG. 67 illustrates only a few of these statement specific sub-states.

For example, if the macro statement found by step 1438 is "MenuPick[string]", step 1442 calls the MenuPick routine 1954 of FIG. 81 for string, which will simulate the sequence of "escape", arrow key, and "enter" keystrokes necessary to cause the active window to select a menu item having a name corresponding to string.

If the macro statement is "ControlPick[string]", step 1444 calls the ControlPick subroutine 1956 of FIG. 82 for string, which will cause a simulated mouse click to be sent to a control window, such as a push button, radio button, or check box in the active window, having a name corresponding to string. If the control window having a name corresponding to string is a static control, such as a group box, having an accelerator key in its text, ControlPick will generate an accelerator key sequence corresponding to that accelerator key, so as to selected the static control window.

If the macro statement is "SpellMode", and if ChoiceListOperative is True, meaning there is an operative choice list to make active, steps 1446–1450 make the choice list MS Window's currently active window and set CurrentMode to CommandMode. Once the choice list is the active window, the user can dictate words 1588 from the International Communications Alphabet, such as "a [alpha]", "b [bravo]", and "c [charlie]", shown in FIG. 70A, to define a StartString for the utterance represented by the choice list which will limited the words displayed in the choice list to those starting with that StartString. If the user dictates such International Communication Alphabet words when a displayed choice list is not the active window, their associated simulated keystrokes will be inserted at the cursor in the active window, not the choice list.

If the macro statement is "CommandMode" steps 1452–1456 set CurrentMode to CommandMode, so RecSetupCallAndOutput will respond to any subsequent utterances as commands, and set the AppMode associated with the currently active window in HWndToAppTable to CommandMode. Similarly, if the macro statement is "DictateMode", steps 1458–1462 set CurrentMode to DictateMode and set the AppMode associated with the currently active window in HWndToAppTable to CommandMode. As is explained below, HWndToAppTable is a table used by DDWin's application tracking feature to keeps track of the vocabulary state associated with each application window and dialog box windows which have been active recently on the computer's screen. It stores whether CurrentMode was CommandMode or DictateMode when each such window was last active, so if the user temporarily leaves it and then returns, the system will be able to automatically return to that window's former CurrentMode.

If the macro statement is "MicrophoneOff" steps 1464–1468 set RecognizerOn to False and MicOffConfirmed to False, and if the macro statement is "MicrophoneOn" steps 1470–1473 set RecognizerOn to True and MicOffConfirmed to False. As is explained above with regard to the FastDemon routine 1048 of FIG. 53, RecognizerOn determines whether utterance detection is performed, and thus it controls whether or not the system responds to voice input. As is explained below with regard to FIGS. 85–88, MicOffConfirmed is used by DDWin to enable a user to ensure that the system's voice response, that is, its ability to respond to a voice input by performing an associated function, is not turned off by accident If the macro statement is "ShiftKey", step 1476 sets the ShiftKeyOn field 1704 in the HWndToAppTable entry of FIG. 52 associated with the currently active window to True. Similarly if it is "ControlKey", step 1478 sets ControlKeyOn field 1706 in the currently active window's entry in HWndToAppTable to True, and if it is "AltKey", step 1480 sets the AltKeyOn field 1708 in that entry to True. As is explained below, the values of these ShiftKeyOn, ControlKeyOn, and AltKeyOn fields for a given entry in the HWndToAppTable are used to control whether or not the next simulated keystroke generated by PerformWordsOutput when their associated window is active will be a capitalized keystroke, a Control key, or an Alt key, respectively.

Once all of the statements in a macro script have been found and executed by the loop 1386, step 1482 removes the current MacroInstance from the MacroInstance list, to indicate the current call to MacroInterpreter is no longer active, and then step 1484 returns to the routine that called MacroInterpreter.

Returning to FIG. 64, once PerformWordsOutput's call to MacroInterpreter in step 1398 returns, step 1400 will return to the program that called PerformWordsOutput, because the output for the recognized Word will have been completed.

If step 1396 of PerformWordsOutput finds the ExtraData field of the recognized Word's State does not contain a macro script, steps 1402 tests to see if that field's first byte indicates the remaining ExtraData bytes are to be generated as simulated keystrokes. If this test is met, step 1404 causes the remaining ExtraData bytes to be copied to a TextOutput string, which is ultimately to be fed to the JournalPlaybackProc.

Similarly if the recognized Word has no ExtraData bytes in its recognized State, step 1406 cause step 1408 to copy Word's .VOC file spelling to the TextOutput string. If the Word's spelling includes a sequence of characters preceding a space followed by a pair of square brackets with one or more characters between them, step 1408 only copies the characters preceding the space and square brackets to TextOutput. This is done because, DDWin often represents text symbols which have a pronunciation spelled differently than the symbol itself by a word spelling comprised of the characters of such a text symbol followed by a space and the spelling of its pronunciation in square brackets. For example, the spelling of the word representing the numeral "3" is "3[three]" and that of the punctuation mark "," is ", [comma]". Since only the keystrokes of the text symbol themselves are to be simulated, only the characters before "[spelled pronunciation]" are copied to the TextOutput.

Once text for the recognized Word has been copied to TextOutput, step 1410 tests to see if the ShiftKeyOn field 1704 in the entry in the HWndToAppTable of FIG. 52 for the current active window is True. As described above, this variable is set to True by step 1476 in the MacroInterpreter of FIG. 67. If this test is met, steps 1410–1414 of PerformWordsOutput capitalize the first character in the TextOutput string and set the ShiftKeyOn field to False for the currently active window, because the "ShiftKey" command is only intended to operate on the next letter of the next spoken word or phrase.

In a similar manner, if ControlKeyOn or if AltKeyOn are True for the currently active window, steps 1416–1420 or steps 1422–1426 ensure that the first character of TextOutput is made a Control key or an Alt-key character, respectively.

Then step 1427 creates a message group header which indicates whether or not the characters in TextOutput are associated with a word from the "Choice List" state and it copies this header into a message queue used by the JournalPlaybackProc procedure 1403 of FIG. 68 which has been defined by DDWin. The JournalPlaybackProc's queue is a standard cyclical queue with read and write pointers, and the message group header is written to the position in the queue pointed to by the queue's write pointer. This queue is used to store the Window sequence of messages associated with keystrokes or mouse input which the JournalPlaybackProc is to simulates. The message group header is used to indicate the start of each new sequence of such messages associated with a given output, such as the recognition of a given word. It is also used to allow step 1033 of the KeyboardProc shown in FIG. 50 to determine if a simulated keystroke it is receiving is associated with a "Choice List" vocabulary state command.

Once step 1427 has copied the message group header to the JournalPlaybackProc's queue, step 1428 copies the Window messages necessary to simulate each character in the TextOutput string into the same queue at successive locations pointed to by its write pointer. Then step 1430 calls MSW SetWindowsHookEx with a WH_JOURNALPLAYBACKPROC parameter to set a hook so that MS Windows will call JournalPlaybackProc every time the active window makes a call to MSW GetMessage or MSW PeekMessage.

FIG. 68 illustrates DDWin's JournalPlaybackProc. As described above, it has an associated queue of message structures into which one or more messages representing keystrokes or mouse inputs to be simulated can be written by DDWin, and it has a read pointer which indicates the next message in that queue which is to be sent to MS Windows. When a program requests input from MS Windows using MSW GetMessage, Windows calls the JournalPlaybackProc with the value of its parameter "code" equal to HC_GETNEXT. When this is the case, step 1487 of FIG. 86 causes step 1488 to copy the message queue's message currently pointed to by the queue's read pointer to the location in memory pointed to by the lParam parameter with which MS Windows has called JournalPlaybackProc and the JournalPlaybackProc returns.

When this happens MS Windows causes the message copied to the location pointed to by lParam to be treated as if it came directly from the computer's keyboard or mouse. If the message corresponds to a command addressed directly to MS Window's itself, such as an {Alt-Escape} keystroke which causes MS Windows to change which screen window is active, MS Window's will receive the input. Otherwise the message will be supplied to the currently active screen window. If the currently active window has a sub-window with what MS Windows calls the "focus", the simulated keystroke will be addressed to that focus window, unless it is a keystroke, such as the accelerator key for a main menu item, associated with the active window itself. As those familiar with MS Windows will know, an accelerator is a character which is underlined in the display of a menu item or control window's text to indicate that one can select its associated menu item or control window by typing that underlined character.

When MS Windows determines that the processing of the simulated keystroke or mouse messages associated with a particular message produced by step 1488 has been completed, either by the operation of the KeyboardProc described above with regard to FIG. 50 or by an application program which has called MSW GetMessage, it calls JournalPlaybackProc with "code" equal to HC_SKIP. When this happens step 1489, causes steps 1490–1496 to be performed. Step 1490 increments the JournalPlaybackProc's read pointer so it points the next message in the message queue. Step 1492 then tests to see if the message pointer points past the last unread message in the queue. If so, the JournalPlaybackProc has no more messages to be sent to MS Windows. In this case, step 1494 calls MSW UnhookWindowsHookEx to unhook the JournalPlaybackProc so it will no longer be called by MS Windows, and step 1496 clears the message queue and points the read and write pointers to the beginning of the queue.

Returning to FIG. 64, once step 1430 of PerformWordsOutput has caused the TextOutput to be supplied to DDWin's JournalPlaybackProc for feeding, as simulated keystrokes, to MS Windows, step 1432 tests to see if both of the following two conditions have been met: 1) the CurrentMode is DictateMode and 2) the state of the recognized Word is other than "Choice List", meaning that it is not a command directed to the choice list. If these two conditions are both met, step 1432 calls MSW PostMessage to send the ChoiceList procedure shown in FIG. A65 the DisplayChoiceList message with the WordHistoryBufferPointer for the recognized Word's utterance. This will cause the ChoiceList procedure to display a choice list for the utterance.

FIG. 65 provides a partial illustration of the ChoiceList procedure. It includes a message loop 1433 which repeatedly calls MSW GetMessage to get a message addressed to it, and, when that call returns with a message, then responds to that message.

If the call the MSW GetMessage returns with a DisplayChoiceList message, step 1439 causes steps 1441–1447 to be performed. Step 1441 sets the variable ChoiceListOperative to True to indicate that a choice list window will be displayed and will be operative to receive user input. Step 1443 tests to see if a choice list window is currently displayed, and, if not, it displays it. As is indicated above, when a choice list is made inoperative by step 1479–1483 of the ChoiceList procedure, it is allowed to remain on the screen for a fraction of a second by the operation of steps 1104–1108 of the FastDemon routine of FIG. 53. This is done because the display of a choice list for a first word is often immediately followed by the display of a choice list for a second word. In this case, leaving the choice list window up from the first word so it can be used for the second prevents the need to undraw and then redraw the choice list window. Step 1445 then displays the up to nine best scoring words stored in the Word-HistoryBuffer entry associated with the utterance for which the DisplayChoiceList message was sent. Then step 1447 clears the StartString, since at this time the user has not yet had a chance to enter any characters defining a StartString to be used to limit the words allowed in the choice list. Once this has been done the choice list for the utterance just recognized will have been displayed, and then the ChoiceList procedure will start another iteration of its message loop 1433 in which it calls MSW GetMessage and waits for that call to return.

If the choice list window is the active window, as it is during SpellMode, its associated procedure, the ChoiceList procedure, automatically receives any keystroke generated by the user. But normally when the user is dictating text, the window into which he dictating the text is the active window, rather than the Choice List, as is necessary for that window to receive the output generated for that dictation by the JournalPlaybackProc. To enable the user to easily perform alphabetic filtering upon words in the choice list during such recognition, steps 1033–1037 of the KeyboardProc, shown in FIG. 50, will cause the choice list to receive keystrokes when the ChoiceList-Operative value is True, indicating a choice list is displayed and operative, and the keystrokes were associated with a recognized command from the "Choice List" vocabulary state.

If the call to MSW GetMessage returns with a printable keystroke message, the user has entered a character to be used as part of the StartString for performing alphabetic filtering, and, thus, steps 1449 will cause steps 1451–1461 to be performed. Step 1451 adds the byte representing the keystroke, including its case, to the StartString. Step 1453 then calls the Recognize routine of FIG. 55 for the utterance in the WordHistoryBuffer for which the choice list was originally displayed in steps 1439–1447. It makes this calls with the current value of StartString, and with the LanguageContext and StateList stored in the WordHistoryBuffer for that utterance. This performs a re-recognition upon the choice list's utterance in which the active vocabulary is limited to words which start with the sequence of letters in the StartString, independent of the case of those letters.

When this call to Recognize returns, step 1455 tests to see if the recognition comes back with fewer than nine words which score better than a certain threshold. If so, it searches the .VOC file and a backup dictionary for words which start with the characters of StartString, independent of the case of those characters, and independent of the StateList associated with the choice list's utterance. The backup dictionary is a list of words without word models which are provided for this purpose. The step keeps searching for such words until the number of such words, when added to the number of words returned by the recognizer, equals nine, or until it has completely examined the .VOC file and backup dictionary. This is valuable because it means that if the user keeps entering characters to the StartString, he or she, will have a very high chance of having the desired word appear in choice list.

Step 1457 tests to see if the starting characters of the best scoring word returned by the recognizer matches the case of the characters in the StartString, if not it treats the StartString itself as the first choice word, for purposes of display in the choice list, so that the text of the StartString, itself, can be selected as the output for the choice list's utterance, with the capitalization the user has entered for it. If there are no words returned by the re-recognition, step 1457 tests to see if any of the words returned from step 1455's search of the .VOC file and backup dictionary start with characters of the same case as StartString. If so, it will treat one such word as the first choice word. If not, it will treat the StartString, itself, as a separate first choice word, so it can be selected as the choice list's associated output.

Then step 1459 re-displays the words in the choice list to show the results of the re-recognition in step 1453 and the search in step 1455, if any. The best scoring words returned by the re-recognition will be displayed before those returned by the search of the .VOC file and backup dictionary, in the ordering of the choice list's nine words. If none of the words returned in steps 1453 or 1455 match the capitalization of the StartString, the StartString will be displayed as the first choice word. Step 1461 then uses reverse video 1485, shown in FIG. 66, to highlight the portion of the first choice word which is not included in the current StartString, so the user will be able to determine which letters he or she has already entered into that string. Once this is done the re-recognition and re-display of the choice list is complete for the last character received from the user for inclusion in the StartString, and the ChoiceList procedure will start another iteration of its message loop 1433.

If the message returned by the message loop 1433's call to MSW GetMessage is a "Choose N" message, where N corresponds to a number from one to nine, the user has entered a key selecting the Nth word in the choice list, and, thus, step 1463 will cause steps 1465–1477 to be performed. Step 1465 tests to see if there is an Nth word in the choice list. If not, step 1477 will beep to indicate an error. If so, steps 1467–1475 are performed. Step 1467 sets ChoiceListOperative to False, because once the user selects a word in the choice list as the desired output for its associated utterance, it is assumed he will have no further use for the choice list. Then step 1469 removes the display of the choice list. Note that the choice list is immediately removed here, rather than being made inoperative so it will be removed within a fraction of a second by the FastDemon routine. This is done in this case because the system does not currently have an utterance for which to display a choice list, as it does when step 1479 of the ChoiceList procedure receives the RemoveChoiceList message from step 1392 of the PerformWords-Output routine.

Once the choice list window has been removed, step 1471 erases the previous output created for the choice lists utterance, and step 1475 calls PerformWordsOutput for the Nth word of the choice list, so as to perform its associated output. Then, although the choice list has been removed from the screen, ChoiceList makes another call to MSW GetMessage in step 1435. This will normally cause the procedure to remain inactive until PerformWords-Output sends a DisplayChoiceList message to it for another utterance.

If the ChoiceList procedure's message loop receives a RemoveChoiceList message from step 1392 of the Perform-WordsOutput routine, a choice list is displayed and operative for a first utterance, at a time when the system has just recognized a second utterance which does not appear to be a command directed to the choice list. In this case, the user has indicated he does not want to use the choice list for the first utterance, but, there is a good chance the system will want to use the choice list window to display a choice list for the second utterance. Thus, step 1479 causes step 1481 to set ChoiceListOperative to False and step 1483 to set Delay-Count to zero. This will cause the choice list window to be removed by steps 1104–1108 of the FastDemon of FIG. 53 within a fraction of a second, unless step 1432 of the PerformWordsOutput routine causes the ChoiceList procedure to display a choice list for the second utterance. Once this is done, the ChoiceList procedure's message loop will make another call to MSW GetMessage which will not return until the next message directed to that procedure.

It can be seen that the ChoiceList procedure allows the user to perform case insensitive alphabetic filtering on the list of word choices presented by the choice list window. Each time the user enters a given letter a re-recognition will be performed on the choice list's associated utterance with the active vocabulary limited to words starting with the current sequence of characters in StartString, up to and including that given character, independently of the case of the letters in StartString. The user can enter such characters either by typing on his keyboard, or by dictating International Communications Alphabet words while in SpellMode. Such characters can be made either upper or lower case by selectively using the Shift key or Shift Lock key on the keyboard or the ShiftKey command when dictating in SpellMode.

Although not described in this specification, DDWin displays a similar choice list for, and allows similar case-independent alphabetic filtering to be performed on, any word in the WordHistoryBuffer which is brought to the screen by using an Oops command similar to that described above with regard to the MS-DOS version of DragonDictate. Although not disclosed, similar case-independent alphabetic filtering could be used with the choice list and Oops buffer of the MS-DOS DragonDictate.

Returning now to FIG. 60, once the TrainWordDialog procedure's call to PerformWordsOutput in step 1287 has returned after performing the output for a command recognized during training, program execution skips to the start of the next iteration of the message loop 1282.

If the call to MSW GetMessage in an iteration of the TrainWordDialog's message loop 1282 returns with a PromptedUtterance message indicating that the Prompted-Word is the best scoring word for an utterance, the test of step 1287 will fail and the test in step 1288 will be met. If so, steps 1290–1300 are performed and the utterance will be treated as a training token. In this case, step 1290 increments TokensForWord to indicate that another token has been received for the PromptedWord. Step 1292 saves the utterance associated with the PromptedUtterance message as a token for the PromptedWord. Step 1294 lights the first unlit indicator light 1279 to indicate that another token has been received. Step 1296 tests to see if the score of the utterance for the PromptedWord, produced by matching the utterance against the current acoustic model for the prompted word, is better than a specific GoodScore threshold. If so, it increments GoodScoringTokensForWord.

Then step 1298 tests to see if TokensForWord equals or exceeds MaxRepetitions or if GoodScoring-TokensForWord equals or exceeds MinRepetitions. If either of these is true, it exits the message loop 1282, since it has received enough training utterances for the PromptedWord. This will cause step 1310 to call the WordTraining routine 1311 of FIG. 69 for all the tokens which have been saved for the Prompted-Word in step 1292 by the current and any previous iterations of the TrainWordDialog message loop 1282. This is the same WordTraining routine used by, and described above with regard to, the Batch Training Program used by the MS-DOS DragonDictate.

Once the call to the WordTraining routine is complete, the loop of step 1264 will be repeated for the next active word to be trained in the WordList. If there are no more active words on the WordList to be trained, the loop of step 1264 will be complete and the program flow will advance to steps 1312 and 1314 which remove the TrainWord dialog box and then exit the TrainWordDialog routine, returning to the routine that called it.

If the conditions of step 1298 are not met, indicating not enough training utterances have been obtained for the current PromptedWord, the program flow advances to step 1300, which tests to see if there is any unlit indicator light 1279 in the Train Word Dialog box, and, if not, it adds one. This is done to prompt the user to say another utterance of the PromptedWord. After performing step 1300, the Train-WordDialog procedures goes back up to the top of the Message loop 1282 to wait for the next PromptedUtterance message bearing another training utterance.

It can be seen that steps 1296 and 1298 of the TrainWord-Dialog routine cause this routine to vary the number of times it prompts the user to say utterances of a word being trained depending on how well the utterances score against prior models of the prompted word. This is useful because if the utterances received to train a word score reasonably well against one or more models the system already has for the word, it indicates less acoustic information is required from the user to train such models to properly recognize his utterances of the word. It is also useful because if one or more tokens received for a word to be trained score poorly against models for that word, there is a chance that some the tokens might be accidental utterances of words other than the prompted word. In this case, prompting for more utterances of the word increases the chance that a higher percent of the training utterances received will correspond to the prompted word.

As is explained with regard to step 1287, the TrainWord-Dialog procedure also allows commands to be recognized during training. This is particularly valuable for many handicapped users of DragonDictate who may have no way to control the systems other than by voice. It allows such users to stop or temporarily interrupt training, which is important since training can take many minutes.

For example, if such a user wants to interrupt training, he or she can say the "Stop Training" command 1289 shown in FIG. 70B. This is the only word in the "Train Word" state 1285, shown in FIG. 70B, when DDWin is first purchased. If the user says this command, and it is properly recognized by the Recognize routine, Step 1287's call to PerformWordsOutput would feed the {Alt+s} character in that command's associated ExtraData field as a simulated keystroke to the active window. Since, during training, the Train Word dialog box is the active window, the call to MSW GetMessage in step 1284 of the next iteration of the TrainWordDialog routine's message loop 1282 would return with the simulated {Alt+s} keystroke. If this happens, the test of step 1304 of the TrainWordDialog procedures message loop will be met, and steps 1306 will remove the TrainWord dialog box and step 1308 will return, exiting the TrainWordDialog procedure. This will normally return the user to the Training Console dialog box, or some other place in which the user will be placed in CommandMode so the user could control the operation of the system by voice command.

The user can add or subtract commands to the list of commands contained in the "Train Word" state, which can be recognized during training, in the same manner words or commands can be added to or subtracted from any other state used with DDWin. This is done by use of the Add Word and Find Word dialog boxes shown in FIGS. 62 and 63.

Figure 62:
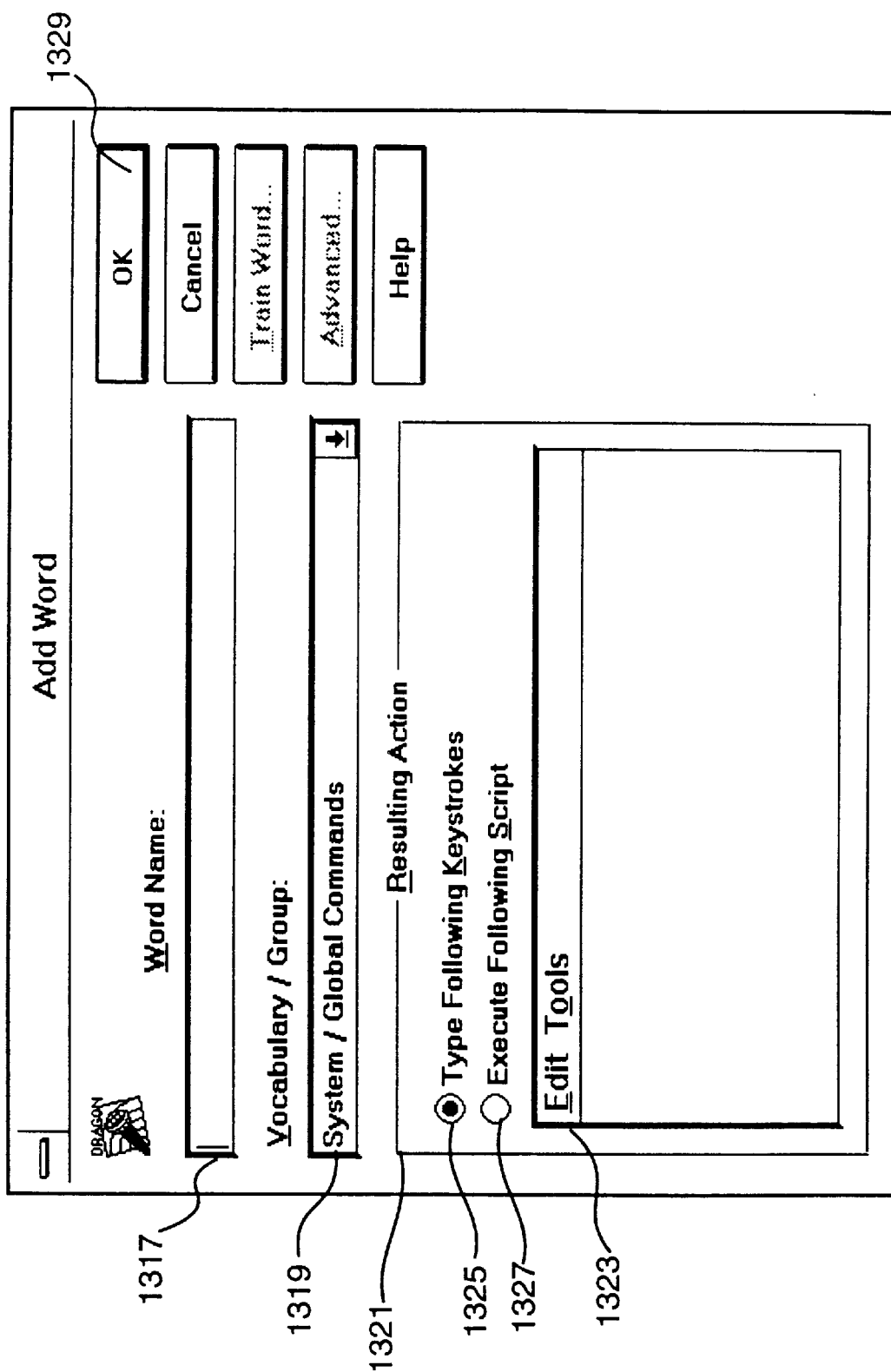
FIG. 62 is a partial screen image showing the Add Word dialog box, which DDWin utilizes to allow users to add words to a vocabulary state.

FIG. 62 illustrates the Add Word dialog box. It contains a Word Name edit box 1317 into which a user can type the name of a desired vocabulary word, such as a command, to be associated with a give state. It has a Vocabulary/Group edit box 1319 into which the user can enter the name of a desired state, or group as it called in the dialog box. The state entered in the Vocabulary/Group edit box 1319 is the state into which the word entered in the Word Name edit box 1317 is to be added. The Vocabulary/Group edit box can also be used to enter a desired path for the desired state, including the names of any states from the which the desired state descends in the hierarchical grouping of states made possible by the list of included states 268 shown in FIGS. 10A and 10B.

The dialog box also has a Resulting Actions group box 1321. This groups control windows to be used if the desired vocabulary word is a command, that is, a vocabulary word whose intended output is other than all or a portion of its .VOC file spelling 263. The group box 1321 includes an edit box 1323 into which the user can type the sequence of simulated keystrokes or the macro script which is to be inserted into the desired word's ExtraData field in its desired .VOC file state. The Resulting Actions section also includes a Type Following Keystrokes radio button 1325 which, if selected, indicates the text in the edit box 1323 is to be fed to the JournalPlaybackProc in step 1428 and 1430 of the PerformWordsOutput routine if the desired word and state are recognized. The Execute Following Script radio button 1327, if selected, indicates that the text in the edit box 1323 is intended to be executed as a MacroScript by a call from step 1398 of the PerformWordsOutput routine to the MacroInterpreter shown in FIG. 67.

The Add Word dialog box also includes an "OK" button 1329 which the user can click when he or she is pleased with the entries in the Word Name and Vocabulary/Group edit boxes and, if the desired word is a command, in the Resulting Actions edit boxes and radio buttons.

FIG. 71 illustrates that part of the AddWordDialog procedure 1316 associated with the Add Word dialog box once the user clicks the "OK" button 1329. When the procedure's message loop 1318 receives a message indicating the Add Word dialog box's "OK" button 1329 has been pressed, a step 1322 tests to see if a valid word name string has been entered in the Word Name edit box 1317 and valid state name selected in its Vocabulary/Group edit box 1319. If so, steps 1326–1330 are performed. Step 1326 calls FindOrMake-MatchingWord routine 1336 shown in FIG. 72 for the state name found in the Word Name edit box.

FIG. 72 illustrates the FindOrMakeMatchingWord routine. Its basic function is to return a .VOC file word ID corresponding to the String with which it is called. If a word having the exact spelling of String already exists in the .VOC file, it returns with that word's ID. If not, it 1) adds a new word having the spelling of String to the .VOC file's word list 260, 2) attempts to make a phonetic spelling for the new word by concatenating the phonetic spellings of VOC file words whose spellings match the one or more words contained in the pronounced part of String, and 3) returns with the new words ID.

The FindOrMakeMatchingWord routine starts with a step 1338 that scans the .VOC file looking for a word in DDWin's list of vocabulary words 260 having a spelling 263 identical to the spelling of the String with which that routine was called. If it finds such a match, the routine's work is done and step 1340 returns with the ID of the matching vocabulary word.

If it doesn't find such a match, step 1342 cause steps 1344–1380 to be performed. Step 1344 creates a new word entry in the word list 260 of the .VOC file having a new word ID and a spelling 263 equal to String, and an empty phonetic spelling list 262. Then if String contains a portion of text inside a top level pair of square brackets, step 1346 sets String equal to that portion. This is done because DragonDictate represents command's spelling as a string inside a pair of square brackets, such as "[Command Mode]" or "[Spell Mode]". It is also done because, as has been stated above, DragonDictate represents text symbols which have a pronunciation spelled differently than the text symbol itself by a string including the characters of the text symbol followed by a space and then the spelling of the symbol's pronunciation in square brackets, such as "5[five]", ", [comma]", or "a [alpha]". In either case, the portion of the string in square brackets represents the pronunciation associated with the word, and since steps 1348–1378 seek to create a phonetic spelling for the pronunciation of the word, they deal only with the characters inside square brackets if the word's spelling has them.

Next step 1348 strips all punctuation characters out of the string except apostrophes associated with the possessive case. This is done, because usually such punctuation characters have no significant effect upon pronunciation. Then step 1350 empties an IDQueue, a queue in which the word ID's of one or more words whose concatenated spellings match the spelling of String can be placed. Then step 1352 performs a loop comprised of steps 1354–1360 for each successive word in String.

Step 1354 of loop 1352 scans the .VOC file for a word with a spelling matching the current word for which the loop is being performed. For purposes of this match, where a .VOC file's word spelling has square brackets, both the strings within and preceding the square brackets is matched. If such a match is found, step 1356 places the word ID of that matching word in the IDQueue. If more than one such match is found, a group of ID's corresponding to the current word in String are placed on the IDQueue and marked as being grouped together. If no such match is found, the step 1360 returns from FindOrMakeMatchingWord with the word ID of the new word it has created.

The new vocabulary word which the routine will return with in step 1360 has an empty phonetic spelling list, meaning that it has no word model that can be recognized against. But the user can latter train the word, since, as is indicated above in the discussion of the TrainWordDialog and WordTraining routine of FIGS. 60 and 69, if a user tries to train a word having no word models, steps 1532–1534 of the WordTraining routine will create a helper model for the word.

If the loop of Step 1352 finds a .VOC file word to match the spelling of every word in String, the program advances to step 1362 which places one empty spelling in the new word's phonetic spelling list. The step 1364 performs a loop comprised of steps 1366–1378 for each successive ID or ID) group in the IDQueue. Step 1366 tests to see if the word associated with the current ID, or if any of the words associated with a current ID group, have a phonetic spelling. If not, step 1368 empties the word's phonetic spelling list, since no concatenated phonetic spelling can be created for the word, and step 1370 returns with the new word ID. This creates a situation identical to that caused by a return from step 1360, described above.

If the current ID, or ID group, does have one or more phonetic spellings, step 1372 performs a loop, comprised of sub-steps 1374–1376 for each of those phonetic spellings. The first of these sub-steps, step 1374 performs another loop, which performs a sub-step 1376 for each of the newly created word's prior spelling, that is, for each of the spellings in the new word's phonetic spelling list created by the previous iteration of loop 1364. Step 1376 tests to see if the total number of spellings in the new word's phonetic spelling list already created in association with the current iteration of loop 1364 exceeds a SpellingNumberLimit. If so, it will not create any more such new phonetic spellings. If SpellingNumberLimit has not been exceeded, step 1376 creates a new phonetic spelling which concatenates the current phonetic spelling of loop 1372 onto the end of the current prior phonetic spelling of loop 1374.

Since these phonetic spellings are used in conjunction with phoneme-incontext, or PIC, triples, the word models that result from the concatenation in step 1376 will automatically alter the PICs associated with phonemes at the boundaries between concatenated words. Assume for example String was comprised of the phrase "[Turn Off Alarm]", and the words "turn", "off", and "alarm" were found in the .VOC file. In this case the phoneme corresponding to "n" in the phonetic spelling of "turn" would be represented by the PEL sequence associated with a PIC triple having the spelling "r-n-endOfWord". Similarly the phoneme corresponding to the "o" in the phonetic spelling of "off" would be represented by the PEL sequence associated with a PIC triple spelled "startOfWord-ô-f". However, in the concatenated phonetic model of the continuously spoken phrase "Turn Off Alarm" the "n" would be represent by a different PEL sequence, that corresponding to the PIC "r-n-ô" and the "o" by a different PEL sequence corresponding to the PIC "n-ô-f". Thus, the sequence of PELs associated with the concatenated phonetic word model differs at the boundary of the concatenated word models from a mere concatenation of the PELs sequences associated with the concatenated vocabulary words, themselves. This difference represents the coarticulation between phonemes which results when the sounds at the boundaries of concatenated words are spoken together as part of one continuously spoken utterance.

In addition to the automatic coarticulation which result from concatenating phonetic spellings because of the use of PICs and PELs, other forms of coarticulation can be performed on the concatenated word models.

For example, the phonetic spellings stored in the VOC files for most words contain one of three duration values associated with each of their vowel phoneme. In normal speech, the last vowel phoneme in a word has its duration increased if no other word is pronounced immediately after it. This is done to reflect a well-know speech phenomena called prepausual lengthening. Since DDWin is a discrete word recognizer, which recognizes separately spoken predefined vocabulary words representing individual words or word phrase, almost all of the phonetic word models for its vocabulary words extend the duration of the phonemes associated with their last vowel sound to represent the prepausual lengthening which occurs when such words or phrases are spoken separately. When such phonetic spellings are concatenated by FindOrMakeMatchingWord, such prepausual lengthening is removed from each vowel phoneme which was previously the last vowel sound in a vocabulary word model, but which no longer is so in the concatenated model.

Given the disclosure above, speech scientist should realize that in other embodiments of the invention even more sophisticated steps could be used to model the removal of such prepausual lengthening. For examples, speech studies show that the duration of consonants following the final vowel of a word are often lengthened in much the same fashion as is the final vowel itself When a phonetic model of a word ending with such consonants has another phonetic model concatenated onto its end, the duration of such consonants can have their prepausual lengthening removed also.

Another example of coarticulation which should be modeled in step 1376 occurs in French language versions of DDWin. In such versions, when a second word which starts with a vowel sound is concatenated to the end of a first word which end with a silent final consonant, the portion of the concatenated phonetic spelling corresponding to the end of the first word should be have a phoneme corresponding to the silent consonant added to it to reflect the fact that, in French, silent final consonants are pronounced when they proceed a word that starts with a vowel sound.

Once loop 1372 has been completed for each phonetic spelling of the current ID's word, step 1378, deletes all the prior phonetic spellings created in the last pass through loop 1364. At this point, the new word's phonetic spelling list will includes a separate spelling for each possible combination of phonetic spellings associated with the all the words in String represented by the ID's processed so far in the IDQueue, up to SpellingNumberLimit such spellings. This is important because some individual words have phonetic spellings which differ substantially and when FindOrMakeMatchingWord receives a phrase representing a sequence of words, it does not necessarily know which of the possible pronunciations associated with each word in that phrase is intended. Thus, FindOrMakeMatchingWord seeks to keep models representing all the possible pronunciations of the phrase's words up to a limit. If there is a large number of words in String, the structure of steps 1364–1378 causes the up to SpellingNumberLimit alternate phonetic spelling to be allocated to variations in possible word pronunciation associated with the words at the beginning of String. This is good, because by the time the Recognize subroutine has scored a token corresponding to the phrase against the portions of its one or more concatenated phonetic models which corresponding to its first several words, one or more of the phrase's concatenated models will normally already match the token so much better than any model for any other vocabulary word, that the phrase will be virtually sure to be selected as the recognized word.

Once the loop of step 1364 is completed for each ID in the IDQueue, the phonetic spelling list of the new word will have one or more complete phonetic spellings. At this time step 1380 returns from FindOrMake-MatchingWord with the word ID for the new word which has these phonetic spellings.

Returning now to FIG. 71, once the call, in step 1326 of the AddWordDialog procedure, to FindOrMake-MatchingWord returns with the prior or new word ID for the string in the Add Word dialog box's Word Name edit box 1317, step 1328 tests to see if the word ID is already in the state indicated in the Vocabulary/Group edit box 1319. If not, it adds the word ID to that state. If there is a valid string in the Resulting Actions edit box 1323 of the Add Word Dialog box, step 1330 adds that string to the ExtraData field 272 associated with specified word in the specified state. If the Type Following Keystroke radio button 1325 is selected, the string will be preceding in the ExtraData field by a byte indicating the string is to be fed to the JournalPlaybackProc to create sequence of simulated keystrokes when the word is recognized in that state. If the Execute Following Script radio button 1327 is selected instead, the string will be preceded in the ExtraData field by a byte indicating the string is to be fed as a macro to DDWin's MacroInterpreter routine 1382 shown in FIG. 67.

Once step 1330 is complete, step 1332 removes the Add Word dialog box and step 1334 returns from the AddWord-Dialog procedure.

It can be seen that the Add Word dialog box and its associated procedure AddWordDialog allows a user to add commands to a desired state, including the "Train Word" state whose word can be recognized during training. The Find Word Dialog Box of FIG. 63 allows a user to remove words or commands from a state, including the "Train Word" state.

Figure 63:
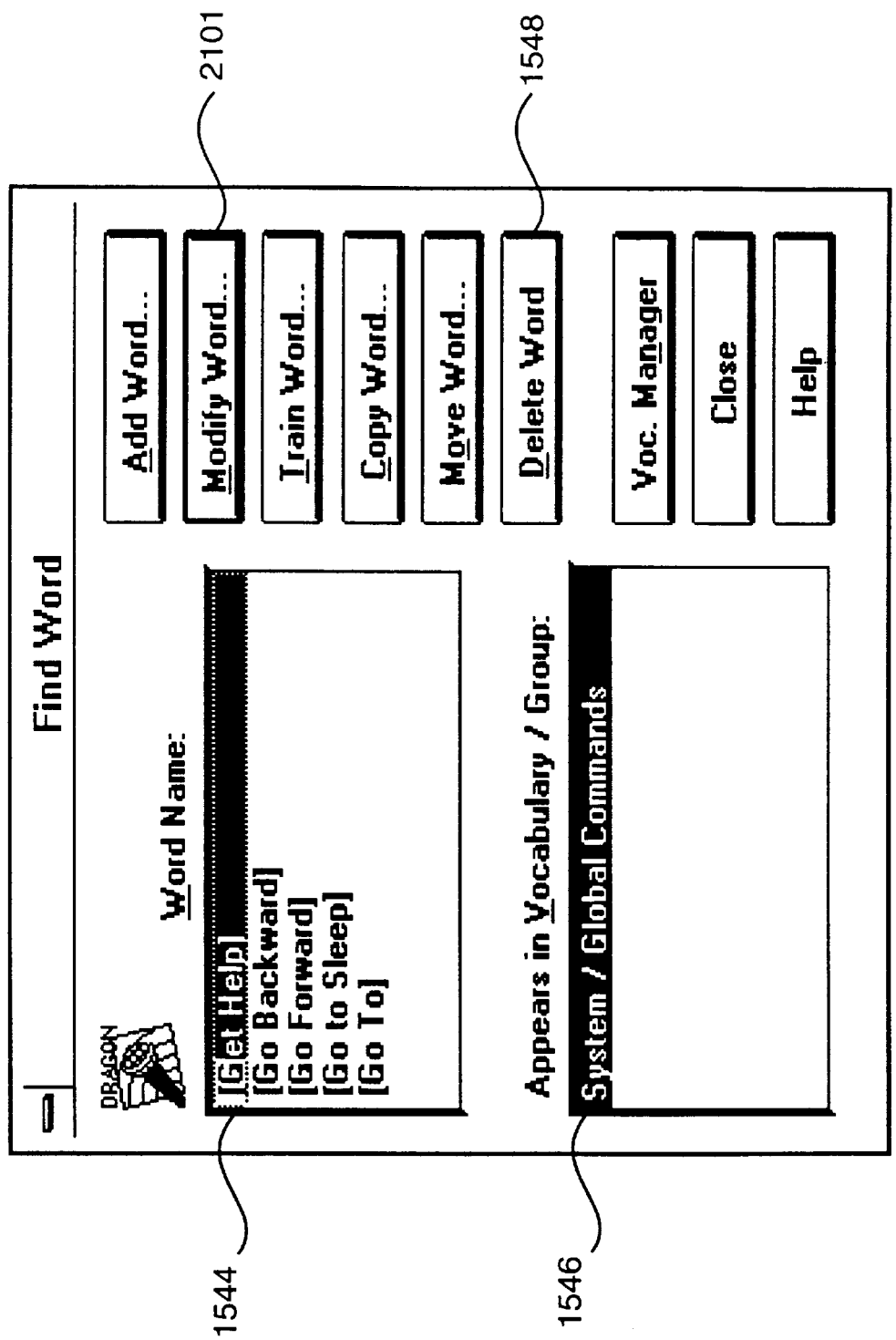
FIG. 63 is a partial screen image showing the Find Word dialog box, which DDWin utilizes to allow users to delete words from a vocabulary state.

FIG. 63 illustrates the Find Word dialog box. It contains an Appears in Vocabulary/Group combination box 1546 in which the user can enter, or scan for, a given vocabulary state, or group. The dialog box also includes a "Word Name" combination box 1544, in which the user can scan for, or enter, the name of a given word in the state listed in the "Appears in Vocabulary/Group" box 1546. It also includes a Delete button 1548, which the user can press to delete the word listed in the box 1544 from the state listed in the box 1546.

FIG. 73 illustrates the instructions in the FindWordDialog procedure 1550 which actually delete a word listed in the "Word Name" box 1544 from the state listed in the "Appears in Vocabulary/Group" box 1546 when the user presses the "Delete" button 1548. When the user presses this button, the call to MSW GetMessage in step 1554 of the procedure's message loop 1552 returns, and since the message is that the "Delete" button has been pressed the test of step 1558 is met, causing step 1560 to be performed. If the combination box 1544 contains the name of a word in the state listed in the combination box 1546, step 1560 deletes the word from the list of words or included states 268 for that state in the .VOC file.

Returning now to FIGS. 54A and 54B we have explained how the RecSetupCallAndOutput routine responds to utterances during the special cases of base vocabulary selection, when CurrentMode is BaseVocabSelectMode, or training, when CurrentMode is TrainWordMode. Normally, however, DDWin is used to either recognize commands or dictate text. At such times CurrentMode equals either CommandMode or DictateMode. In these modes DDWin performs either application and/or command tracking, two functions which are part of the present invention. As will be explained below, in application tracking the system monitors which program, or which dialog box within each program, has the active window and modifies the active vocabulary accordingly. In command tracking, the system 1) monitors which window is active, 2) reads the names of menu items or control windows in that active windows, and 3) dynamically adds a command vocabulary word corresponding to each of those names to a tracking vocabulary state active during recognition, which vocabulary word includes an ExtraData field that causes the command's corresponding menu item or control window to be selected when the command vocabulary word is recognized.

If CurrentMode equals either CommandMode or Dictate-Mode when FastDemon responds to the detection of an utterance by calling RecSetupCallAndOutput, the tests of steps 1154 and 1164 will fail, causing the program flow to skip to the test of step 1176, which test will be met. As a result, the program will perform steps 1178–1214. Step 1178 clears the StateList which will be used in the call to Recognize for the detected utterance and adds the Always Active state and the Global Commands state that StateList.

The Always Active state 1568, shown in FIG. 70A, contains five commands that are always active during the operation of DDWin except during a few special modes, such as Base Vocabulary Selection and Training. The Always Active state includes the commands "[Command Model]" 1570, "[Dictate Mode]" 1572, "[Go to Sleep]" 1574, "[Oops]" 1576, and "[What Can I Say]" 1578. The "[Command Mode]" command has the macro script "CommandMode" stored in its associated ExtraData field. When this word is recognized, that macro script is fed to the MacroInterpreter of FIG. 67, causing steps 1452–1456, described above, to switch the system to CommandMode. Similarly the "[Dictate Mode]" command's ExtraData field includes the macro script "Dictate Mode" which causes steps 1458–1462 of the MacroInterpreter to switch the system to DictateMode. The instructions for executing the "[Go to Sleep]", "[Oops]", and "[What can I say]" commands are not shown in the figures. The "[Go to Sleep]" command causes DDWin to enter a SleepMode in which the system will only responds to the "[wake up]" command. The "[Oops]" command is used to bring up an Oops buffer very similar to that discussed above with regard to the MS-DOS version of DragonDictate. Finally, the "[What Can I Say]" command causes the user to be given a display of the words and commands which were currently active at the time the user utters that commands. After looking at these words the user can return to his prior state knowing what voice commands are active.

The commands of the Global Commands state are always active during CommandMode and DictateMode. It includes many command words, only a few of which are shown in FIG. 70A. These include "[Shift Key]" 1582, "[Alt Key]" 1584, and "[Control Key]" 1586, which have the associated macro scripts "ShiftKey", "AtKey", and "ControlKey", respectively, and which cause steps 1476, 1480, and 1478 of the MacroInterpreter to set ShiftKeyOn, AltKeyOn, or "ControLKeyOn" to True, respectively. The Global Commands state also include the words 1588 of the International Communications Alphabet (ICA), "a[alpha]", "b[bravo]", "c[charlie]", etc., which are used to input alphabetic characters into DDWin. As stated above with regard to steps 1406 and 1408 of FIG. 64, if a word is without ExtraData in a given state, as are the ICA words in the "Global Commands" state, the spelling of the word prior to the square brackets, if any, are fed to TextOutput for later feeding to the Journal-PlaybackProc, which causes that spelling to be generated as simulated keystrokes. For example, if the word "a[alpha]" is recognized, an "a" is fed to the TextOutput and later generated as a simulated keystroke.

The ICA words are important to the present invention because they can be used to input characters to define the StartString which is used in choice lists to limit the active vocabulary used re-recognition of a given utterance to words starting with the letters of the StartString. The "[Shift Key]" command can be used before saying a word of the International Communications Alphabet to cause the simulated keystroke generated for that letter to be an uppercase version of that letter, through the operation of steps 1410–1414 of PerformWordsOutput The "Global Commands" state also includes the "[Spell Mode]" command 1590 which has the script "SpellMode" in its ExtraData field, which causes steps 1446–1450 of the MacroInterpreter to make the choice list the active window if one is currently displayed and operative.

Returning to FIG. 54A, once step 1178 of the RecSetupCallAndOutput routine has cleared the StateList and added the Always Active and Global Commands states to it, step 1180 tests to see if a call to MSW GetSystem-DebugState returns with a value SDS_MENU indicating that a menu is currently active. In MS Windows a menu is made active after user has taken some action to give a menu the input focus, so that arrow keystrokes will cause menu navigation. If this is true, step 1182 sets CurrentMode to CommandMode, because when a menu is active and has the input focus the system is expecting a command.

If the test of step 1180 finds that no menu is active, step 1184 causes steps 1186–1190 to be performed. Step 1186 calls the Application-Tracking routine 1594 of FIG. 74 to perform the application tracking function described above. It call Application-Tracking with a Null value for the window handle parameter, HWnd, because at the time of this call RecSetupCallAndOutput does not know what window is active.

FIG. 74 illustrates the steps of the ApplicationTracking routine.

Step 1596 of the ApplicationTracking routine tests to see if ApplicationTracking was called with a Null value for HWnd, as it is when it is called by RecSetupCallAndOutput. As is explained below, when CallWndProc, which constantly monitors the messages generated by MS Windows, and all the programs running under, it detects a WM_ACTIVATE message, indicating MS Windows has made a new window active, or a WM_SHOWWINDOW message, indicating that MS Windows has caused a window previously invisible to become visible, CallWndProc will call the ApplicationTracking routine with HWnd set to the window handle, or value, MS Windows uses to identify the newly active or visible window. If ApplicationTracking is called with a Null HWnd, step 1598 calls MSW GetActiveWindow to get the handle of the currently active window and step 1600 sets HWnd equal to the value of that window handle.

Step 1602 checks to see if the value of window handle of the currently active window, i.e., the HWnd value with which ApplicationTracking has been called or that found by step 1598, equals the value of the HWnd field 1656 of any entry in the HWndToAppTable 1040 shown in FIG. 52. If so, a prior call to the ApplicationTracking routine has already found all the information on the currently active window necessary for application tracking and has placed it in that matching entry in the HWndToAppTable. If this is the case, step 1602 returns to the program that called ApplicationTracking with the matching HWndToAppTable entry as the SelectedEntry.

If no entry matching the handle of the currently active window is found in the HWndToAppTable, step 1604 causes steps 1606–1650 to be performed for the purpose of making and filling out such an entry. Step 1606 adds the new entry to HWndToAppTable with an HWnd field 1656 equal the window handle of the currently active window, with an AppMode field 1660 equal the current value of CommandMode, with an AppState field 1658 which is Null, and with the ShiftKeyOn, ControlKeyOn, and AltKeyOn fields, 1704, 1706, and 1708, respectively, all set to False. Step 1608 then makes the new entry the SelectedEntry, that is, the entry with which ApplicationTracking will return.

Step 1610 calls MSW GetWindowWord to get the handle of the instance, or hinstance, of the program module running the currently active window. Since windows can run multiple instances of the same program, it uses instance handles to keep track of, and access, each separate instance of a program running at a given time. Then step 1612 calls MSW GetModuleFileName for the hinstance of the active window to get the file name of the program which is running that window. Step 1614 compares the file name returned against an AppStateByFile-NameList. This list contains applications states, that is, .VOC file states which DDWin stores in associations with various application programs. In this list, the application states are listed in conjunction with the file names of their associated application programs. If the file name associated with the active window matches a file name in this list, step 1618 sets the AppState field 1658 of the new HWndToAppTable entry equal to the application state associated with that matching file name.

If no such match is found, step 1620 tests to see if the file name returned by MSW GetModuleFileName is that associated with a particular MSW utility program used for running MS-DOS applications in a screen window under MS Windows. If this is the case, the active window corresponds to an MS-DOS application being run in a screen window, and steps 1622–1628 will be performed. Step 1622 calls MSW GetWindowText to get the text of the active window's title bar, which should include the name of the MS-DOS program. Step 1624 compares the text returned with an AppStateByFileTextList which DDWin stores. This list contains a listing of application states indexed by such texts. If a match is found, step 1628 sets the AppState field 1658 of the new HWndToAppTable entry to the state associated with the matching text.

If neither the file name nor file text associated with the active window is contained in DDWin's AppStateByFileNameList or AppStateByFileTextList, steps 1630–1634 create a new temporary logical state for the current window's application and set the new entry's AppState field equal to that new temporary logical state. A temporary logical state functions like a normal .VOC file state, except that it will not be recorded back to the .VOC file on disk when the user ends a session of DDWin, unless the user adds some commands or sub-states to it. If the user does add such commands or sub-states, the temporary logical state will be made permanent and will be stored in the user's associated .VOC file on disk. In addition, the user's AppStateByFileNameList or AppStateByFileText-List will have an entry added which associates the new permanent vocabulary state with the file name obtained in step 1612 or the file text obtained in step 1622, respectively. This is done so the new vocabulary state will be selected by ApplicationTracking if the user makes the same application active in a future session with DDWin.

If a call to MSW GetWindow with GW_OWNER returns values other than "no" or "desktop", indicating that the active window is a dialog box, step 1636 causes steps 1638–1648 to be performed. Step 1638 calls MSW GetWindowText for the caption text of the dialog box. If that text corresponds to the name of a sub-state which already exists within the AppState of the new HWndToAppTable entry, steps 1640–1642 change the new entry's AppState to that sub-state. If no such state corresponding to the name of the currently active dialog box currently exist within the state associated with the active application program, steps 1644–1648 create a temporary logical sub-state in the state previously stored in the new HWndToAppTable entry's AppState field, and then sets the value of that AppState field equal to that new sub-state. This is done so a user can associate a special application state, or active vocabulary, with each dialog box in an application, if desired.

When the program flow reaches step 1650, the ApplicationTracking routine returns to the routine which called it. By this time, the new HWndToAppTable entry contains an HWnd value equal to the handle of the currently active window, an AppState value which names an application state associated with either the application program running the active window or a dialog box currently active in that application, an AppMode value set equal to Command mode, and ShiftKeyOn, ControlKeyOn, and AltKeyOn values which are all False.

DDWin currently comes with application states for roughly ten of the most common application used on IBM compatible personal computers, as well as application states for the VoiceBar, itself, and many of its dialog boxes. As stated above, the program also automatically creates a temporary logical application state for each program and dialog box with which it is used, if it does not already have a permanent application state for that application or dialog box. As soon as the user adds any commands to such a temporary logical state it will become a permanent state that will be saved in the users .VOC file for use in future session with DDWin. Thus, it can be seen that the ApplicationTracking routine provides a means for enabling separate sets of commands to be associated with each application, and each dialog box within an application, and for causing those commands to automatically be made active whenever a window associated with such an application or dialog box is made active. Thus, it automatically changes the words which DDWin is likely to recognize in correspondence with changes in which application or dialog window has the form of input focus which active windows have.

As mentioned above, the ApplicationTracking routine is also called by the CallWndProc of FIG. 49. CallWndProc monitors messages which MS Windows or any window running under MS Window generates, When a WM_ACTIVATE message is generated, indicating that a window is being activated, steps 1690–1692 of CallWndProc cause ApplicationTracking to be called with HWnd set to the newly activated window's handle. Similarly when a WM_SHOWWINDOW message is generated, indicating that a window has been uncovered on the screen, steps 1698 and 1700 of CallWndProc call MSW GetWindow with GW_OWNER If this call returns with an indication that the window is either an application window or a dialog box, step 1700 calls ApplicationTracking with HWnd set to the handle of the uncovered window. This is done because, although the uncovered window may not currently be the active window, it could become so.

CallWndProc calls ApplicationTracking in response to such WM_ACTIVATE and WM_SHOWWINDOW messages for several reasons. First, it saves time during recognition, by increasing the chance that when ApplicationTracking is called by RecSetupCallAndOutput in response to an utterance, a complete entry for the currently active window will already exist in the HWndToAppTable and the ApplicationTracking routine will have nothing more to do than look this entry up and return with it as the SelectedEntry in step 1602. It is also done because ApplicationTracking is used by DDWin for purposes other than automatically varying the active vocabulary in response to changes in which window is active. For example, the HWndTo-AppTable includes the ShiftKeyn, ControlKeyOn, or AltKeyOn states of each application window. This, information is used by DDWin to pop up a window indicating if the next dictated character will be a capitalized key, a control key, or an alt key, respectively. If the user says "ShiftKey" in a first active window, a "Shiftey" window will pop up. If he then switches to a second active window, the "ShiftKey" window will disappear because it is not applicable to the new active window. If he switches back to the first active window, the WM_ACTIVATE message generated by the switch back will cause a call to ApplicationTracking which will return the entry of the first active window as the SelectedEntry and step 1693 of CallWndProc will pop back up the "Shift Key" window appropriate for that window.

Although the application tracking techniques mentioned above should accurately track most of MS Windows' changes in active windows, MS Windows is a complex operation system which can be caused to act in a tremendous number of different ways by different programs, combinations of programs, combinations of programs states and user inputs, and different hardware. In an effort to minimize the possibility that the HWndToAppTable will get out of synchronism with which application and dialog box windows are on the screen, CallWndProc also monitors the MSW Windows' WM_NCDESTROY and WM_CREATE messages.

When a WM_NCDESTROY message is received, indicating that a window is being closed, steps 1686–1688 test to see if the handle of the window being closed is in the HWndToAppTable. If so step 1688 removes that handle's associated entry from the HWndTo-AppTable, since, once a window is closed, the numerical value of its handle is freed for future use by MS Windows to identify another window.

Similarly when a WM_CREATE message is received, indicating that a new window is being created, steps 1694–1696 check to see if the window handle of the window being created is in the HWndToAppTable. If so, an error has occurred and the HWndToAppTable entry having the handle of the just created window will refer to a no longer existing window formerly associated with the same handle. Such a previous entry should have been destroyed in association with a WM_NCDESTROY message associated with the closing of that previous window, but in some unusual cases this might not happen.

Returning to FIG. 54A, once the call in step 1186 of the RecSetupCallAndOutput routine to the ApplicationTracking routine returns, step 1188 sets a CurrentAppState variable equal to the AppState field of the SelectedEntry in the HWndToAppTable returned by the ApplicationTracking routine. It also sets CurrentMode equal to the AppMode field in the SelectedEntry. Then step 1190 adds the CurrentAppState to the StateList.

If the CurrentNode is DictateMode, step 1192 causes steps 1193–1198 to be performed. Step 1193 tests to see if the ChoiceList procedure of FIG. 65, described below, is currently running, and if not it calls MSW CreateWindow for the choice list window shown in FIG. 66, with parameters which prevent the window from being initially displayed. This initializes that window's associated procedure, the ChoiceList procedure, and causes it to enter a message loop in which it lies dormant waiting for a message to display the choice list window. Step 1194 tests to see if a choice lists is currently operative, that is, is currently displayed and able to receive user input. If so it adds the Choice List state 1712, shown in FIGS. 70A and 70B to the StateList. This is done, so that if an operative choice is up, the user can give voice commands, such as "[Choose 1]", "[Choose 2]", etc. to select words from the choice list and otherwise operate the choice list. Step 1196 adds the DictateMode state to the StateList. The DictateMode state has between five thousand and sixty thousand words in current versions of DDWin, depending on the model of DDWin purchased. It provides enough words to enables a user to dictate normal text. Finally state 1198 calls LanguageContextTracking to set the value of LanguageContext with which the call to the recognizer for the current utterance will be made.

FIG. 75 illustrates the LanguageContextTracking routine 1714. Its purpose is to detect the verbal context, if any, in which the current utterance has been dictated, as indicated by the text surrounding the cursor location in which the word corresponding to that utterance is to be inserted. This routine is comprised of steps 1716–1750.

Step 1716 calls MSW GetFocus to get the handle of the window which, in MS Windows' terminology, has the "focus". As stated above, in MS Windows, the term "focus" is used to describe the particular window or sub-window which will receive input which, by its content, is not specifically associated with any particular window. For example, it is the window to which most alphanumeric keystrokes corresponding to text input will be sent. Since the purpose of DictateMode is to dictate text, the focus window is the window to which the spelling of most words recognized during that mode will be sent. In most applications, the focus window is a sub-window of the active window. For example, if the active window is that associated with a word processor application, the focus window would normally be the particular document window into which text can currently be entered. When a dialog box is the active window, the focus window can include an edit box into which the user can type or dictate text, if the edit control has been selected by the user.

Once step 1716 has returned with the handle of the focus window, step 1718 calls MSW SendMessage to send the focus window the WM_GETDLGCODE message to find out if the focus window is a multi-line edit control, or MLE.

An MLE is one of the standard types of control windows provided by MS Windows. It has an associated window procedure provided by the MS Windows operating system which causes it to function as a simple multi-line text-editor. Programmers can incorporate such MLEs into their MS Window compatible programs to allow users to enter and edit text. An MLE's window procedure includes means for storing a body of text, for defining a cursor location relative to that body of text, and for inserting keystrokes into the body of text at the cursor location. Much of the functionality of the Notepad desk accessory, a simple word processor which comes standard with MS Windows, is performed by such an MLE.

MS Windows provides predefined finctions that allow the LanguageContextTracking routine to read an MLE's text and its cursor location relative to that text. It allows this even if the MLE is part of another application. If step 1718 indicates the focus window is an MLE, step 1720 causes steps 1722–1738 to use these predefined functions to get the MLE's current language context.

Step 1722 calls MSW SendMessage to send an EM_GETSEL message to the MLE. This returns the character index of the starting position of the current selection in the MLE. The MLE stores a selection, which is a location of zero or more characters within its associated text. For the purpose's of DDWin's DictateMode, the start of the selection can be treated as the cursor position because, if the user dictates a word, the recognized word will replace the entire selection and because the only language context the LanguageContextTracking routine currently finds is that of the word preceding the current cursor location.

Once the index of the MLE's cursor has been found, step 1724 calls MSW SendMessage to send EM_LINEFROMCHAR to the MLE with that index. This returns the line number in the MLE of the line on which the current selection starts. Then step 1726 calls MSW SendMessage to send EM_GETLINE to the MLE with this line number. This returns a copy of the current line of text in the MLE, that in which the cursor is located. Next step 1728 calls MSW SendMessage to send EM_LINEINDEX to the MLE with the line number of the current line. This returns the character index of the first character in the MLE's current line. Then step 1730 subtracts the index of the start of the current line from the index of the start of the current selection to determine the position in the copy of the current line of the start of the current selection.

Once the position of the cursor in the copy of the MLE's current line has been found, step 1732 starts backward from that position in the copy of the current line looking for the last complete word before the start of the current selection. If that last complete word extends back into the previous line, it uses EM_LINEFROMCHAR and EM_GETLINE, as in steps 1724 and 1726, to get the text from the prior line so it can find that last complete word. If there is such a last complete word, step 1734 sets LanguageContext equal to it. Otherwise step 1736 sets LanguageContext to Null, indicating there is no language context available. Once this is done, step 1738 returns with the value of the LanguageContext set in either step 1734 or 1736.

If the call to MSW GetFocus in step 1716 of the LanguageContextTracking routine indicates that the current focus window is not an MLE, step 1740 tests to see if CurrentAppState is that of an external application which has a predefined interface for providing the LanguageContextTracking routine with a language context. If so step 1742 sends a message to that predefined interface asking for the language context, step 1744 sets LanguageContext equal to the language context returned by the other application according to the predefined interface, and then step 1746 returns with that LanguageContext.

MS Windows has defined a plurality of well known mechanisms such as Dynamic Data Exchange (DDE) and Object Linking and Embedding (OLE) which enable different applications running under MS Windows at the same time to exchange information with each other. It would be a very simple task for one skilled in DDE or OLE programming to design an interface allowing the LanguageContextTracking routine to ask for, and an external application to supply, such language context information.

If the current focus window is not an MLE nor part of an application having a predefined interface for providing language context, the tests of step 1720 and 1740 both fail, and the program execution will advance to step 1748 and 1750 which set LanguageContext to Null and return.

In the LanguageContextTracking routine just described, the LanguageContext only includes the single word which precedes the cursor in the focus window. In other embodiments of the invention the language context can be more complex. For example, it can include many words which precede the cursor and these many words could be used with the Context Language Model described in the parent patent application of this present application, U.S. patent application Ser. No. 07/976,413, entitled "Apparatus And Methods For Training Speech Recognition Systems And Their Users And Otherwise Improving Speech Recognition Performance" filed on Nov. 13, 1992 by Gould et al. This parent application has been assigned to the assignee of the present application, and is hereby incorporated by reference herein. The LanguageContext could also include one or more words following the cursor in the text of the focus window. Similarly, it could take into account punctuation marks. For example, it could respond to a period preceding the cursor by causing the word inserted at the cursor to start with a capital letter.

It can be seen that the LanguageContextTracking routine can automatically find information reflecting the language context of the cursor in the application into which the user is dictating text. In the embodiment shown it automatically initiates the transfer of this information by making calls to the MS Windows operating system. The language context information is used in steps 1116 and 1142 of the Recognize routine of FIG. 55 to increases recognition accuracy, by increasing the chance that the words selected by the Recognize routine are words which a user is likely to dictate given the cursor's context.

Returning to FIGS. 54A and 54B's RecSetupCallAndOutput routine, once the call to the LanguageContextTracking routine in step 1198 returns, program execution will advance to step 1200, which tests to see if the CurrentMode is CommandMode. When DDWin is in DictateMode, as it must be if step 1198 made a call to LanguageContextTracking, this test will fail and the program execution will advance to step 1208 which calls the Recognize routine for the current utterance with the value of LanguageContext set by the LanguageContextTracking routine and with the StateList containing the Always Active, Global Commands, DictateMode, and, if there is an operative choice list, Choice List states.

If DDWin is in CommandMode rather than DictateMode, the test of step 1200 will succeed, causing steps 1202–1206 to be performed instead of steps 1193–1198. Step 1202 calls the CommandTracking routine 1752 of FIGS. 76A and 76B to determine the CurrentTrackingState. The CurrentTrackingState is a temporaay VOC. file state whose vocabulary words correspond to the names of currently visible menu items and to the names of currently visible control windows, such as push buttons, radio buttons, check boxes, group boxes, and edit boxes. Step 1204 adds the CurrentTrackingState returned by the CommandTracking routine to the StateList, so its commands will be part of the active vocabulary. Then step 1206 sets the LanguageContext to Null, since in CommandMode the user is not dictating natural language text in which the LanguageContext is meaningful. Once steps 1202–1206 have been performed, step 1208 calls the Recognize routine for the current utterance with the current values of LanguageContext and StateList.

FIGS. 76A and 76B illustrates the CommandTracking routine 1752.

The CommandTracking routine's first step 1754 clears the CommandPhraseList 1842 shown in FIG. 77. The CommandPhraseList is a list of CommandPhraseEntries 1844, each of which contains information about one of the menu items or control windows associated with the active window. After the CommandTracking routine creates such an entry for each active menu item or control window, the routine will check to see if a tracking state already exists having a command corresponding to each such entry. If so, that tracking state will be made the CommandTrackingState. Otherwise, a new tracking state will be created having a vocabulary word corresponding to each entry in the CommandPhraseList.

Each CommandPhraseEntry contains a CommandPhrase field 1846 for storing a copy of the text which the active window uses to generate the on-screen label for the entry's corresponding menu item or control window. The entry's CommandOutput field 1848 stores the accelerator keystroke or macro script to be output when the vocabulary word formed from the CommandPhraseEntry is recognized. This is the output which will cause the menu item or control window associated with that vocabulary word to be selected. The CommandPhraseEntry also includes MenuHandle and MenuItemPosition fields, 1850 and 1852, respectively, which are used if the entry is associated with a menu item. The MenuHandle 1850 records the menu handle of the menu in which the entry's associated menu item occurs, and the MenuItemPosition 1852 records the position of that item within its menu.

Once step 1754 of the CommandTracking routine has cleared the CommandPhraseList, step 1756 calls MSW GetSystemDebugState. If this call returns SDS_MENU, a menu is currently active and has the focus, meaning the only active commands are menu commands. If this is the case, step 1756 causes the loop of step 1758 to be performed. This loop causes a step 1760 to call the GetMenuCommandPhrase routine 1860 of FIG. 78 for each MenuEntry in the MenuStack shown in FIG. 51, so as to create a CommandPhraseEntry for each item in the menu associated with each such MenuEntry.

FIG. 51 shows the MenuStack data structure used by GetMenuCommandPhrases. When any menus are active, this data structure should represent the current hierarchy of one or more currently active menus. It contains a list of zero or more MenuEntry structures 1854. In this list, any first entry corresponds to the top level menu which is active, any second entry corresponds to the second level sub-menu which is active, any third entry corresponds to the third level sub-menu which is active, and so on. The MenuHandle field 1856 of each MenuEntry gives the menu handle of its corresponding menu. The MenuItemID field 1858 gives the ID of the menu item in the entry's associated menu from which an active sub-menu, if any, depends. If no active sub-menu depends from the entry's menu, the MenuItemID field is Null.

FIGS. 49's CallWndProc procedure keeps the MenuStack updated by changing it in response to any WM_INITMENU, WM_INITMENUPOPUP, and WM_MENUSELECT messages which it receives.

A WM_INITMENU message indicates that a menu is about to become active. In most MS Window applications this happens, for example, when the user presses and then releases the Alt key before pressing any other key, presses the Alt key in combination with a character which selects a menu item, or clicks a mouse on a menu item. When a WM_INITMENU message is generated by any program, MS Windows calls CallWndProc with that message. In response, step 1664 of CallWndProc causes steps 1666 and 1668 to be performed. Step 1666 clears the MenuStack because WM_INITMENU is only generated when a top level menu is being activated, meaning that any previous entries in the menu stack are no longer valid. Step 1668 places a MenuEntry in the first, or top level, position in the menu stack, and sets its MenuHandle to that of the menu which the WM_INITMENU message indicates is being activated.

A WM_INITMENUPOPUP message is generated when a popup menu is about to become active. Such a popup menu is often a sub-menu associated with the selection of an item in a higher level menu. The message is normally generated by an application when a user selects a menu item which has such a popup sub-menu associated with it. When CallWndProc receives such a message, the test of step 1670 is met and step 1672 is performed. This step tests to see if a MenuEntry with a MenuHandle equal the menu handle of the popup menu contained in the WM_INITMENUPOPUP message is currently at the end of the MenuStack. If not, it adds such a MenuEntry to the MenuStack. It also sets the MenuItemID in the preceding entry in the MenuStack equal to the ID of the menu item from which the WM_INITMENUPOPUP message indicates the pop-up menu descends. Thus, as each successive sub-menu within a given menu hierarchy is displayed on screen, a MenuEntry corresponding to that entry will be added to the MenuStack, and the MenuItemID in the menu stack will provide an indication of which displayed sub-menus descend from which items in their parent menus.

The WM_MENUSELECT message indicates the user has selected a menu item, such as by typing a keystroke associated with it or by clicking in it with a mouse. When CallWndProc is called with this message, the test of step 1674 is met, causing steps 1676–1684 to be performed. Step 1676 scans the MenuStack for an entry with a MenuHandle matching the handle of the menu which the WM_MENUSELECT message indicates has had one of its menu items selected.

If a match is found, step 1678 causes steps 1680 and 1682 to be performed. If the matching MenuEntry is at other than the end of the MenuStack, step 1680 deletes any MenuEntries which follow it. This is done because once a user selects an item on a higher level menu in a hierarchy of displayed menus, all lower level menus should be made inactive and removed from the screen. Step 1682 records the ID of the menu item which the WM_MENUSELECT message indicates was selected. It records this ID in the MenuItemED field of the MenuEntry having a MenuHandle matching that in the WM_MENUSELECT message. It does this so the MenuStack will reflect the currently selected menu item.

If step 1676 fails to find a MenuEntry having a MenuHandle matching that contained in the WM_MENUSELECT message, the MenuStack has gotten out of synchronization with the current state of the active menu. In this case, step 1684 rewrites the MenuStack to make it be in synchronism. It does this by calling MSW GetMenu for the currently active window, to get the top level menu for that window. Then it makes zero or more calls to MSW GetSubMenu to perform a tree search for all possible lower level sub-menus associated with that top level menu, until a menu having the menu handled received in the WM_MENUSELECT message is found. Once such a menu is found by the tree search, step 1684 reestablishes the MenuStack, by first clearing it and then by creating one entry, starting with the active window's top level menu, for each menu in the path created in the tree search between that top level menu and the menu with the menu handle contained in the WM_MENUSELECT message.

It can be seen that the MenuStack should contain a MenuEntry for each currently active menus, if there are any. Thus, when step 1756 of the CommandTracking routine of FIGS. 76A and 76B finds a menu is currently active, steps 1758 and 1760 of that routine cause the GetMenuCommandPhrases routine to be called for each such currently active menu.

FIG. 78 illustrates the GetMenuCommandPhrases routine 1860. As stated above, this routine adds an entry to the CommandPhraseList for each item in the menu for which it is called.

Step 1862 of the GetMenuCommandPhrases routine sets the variables NumberOK and LastItemWasSeparatorOrNumber to False. NumberOK is used when GetMenuCommandPhrases calls the StripControlOr-MenuItemName routine 1904, shown in FIG. 79, whose function is to strip unpronounceable characters from the text associated with a control or menu item so the text is more likely to be pronounceable and more likely to correspond to one or more words already in DDWin's vocabulary. NumberOK indicates whether or not it is okay for this routine to strip a menu item's text down to nothing more than a numeral, if that numeral appears as an accelerator key underscored at the start of the menu item's displayed text. This is done because in many window applications the "File" menu can contain a collection of successive menu items whose text starts with an underlined numeral, as an accelerator key, followed by a file name. Since most file names are not words DDWin is likely to have in its vocabulary, DDWin has been programmed to treat the accelerator-key numeral associated with each such file name as its associated voice command. In almost all applications in which such a succession of file names appear, the menu items corresponding to them immediately follows a separator, that is, a menu item which is a horizontal bar.

As is explained below, GetMenuCommandPhrase sets NumberOK to True, so StripControlOrMenuItemName will strip a menu item's whose text start with an accelerator-key numeral down to just that numeral if the following condition is met: either 1) the menu item is immediately preceded in its menu by a separator or 2) the menu item is immediately preceded in its menu by a continuous succession of one more other menu items starting with such an accelerator key numeral which immediately follows such a separator. The LastItemWasSeparatorOrNumber variable is used by GetMenuCommandPhrase to keep track of whether or not this condition is met for the current menu item.

Once step 1862 of GetMenuCommandPhrases has set NumberOK and LastItemWasSeparatorOrNumber to False, step 1864 calls MSW GetMenuItemCount to get the number of items in the menu for which GetMenuCommandPhrases has been called. Then step 1866 performs a loop comprised of steps 1868–1900 for each of that number of menu items. Step 1868 calls MSW GetMenuItemID to get the menu item's ID. If this call returns an indication that the current menu item of loop 1866 is a separator, step 1870 sets LastItemWasSeparatorOrNumber to True. Otherwise step 1872 causes steps 1874–1900 to be performed. Step 1874 creates an additional CommandPhraseEntry in the CommandPhraseList. Step 1876 calls MSW GetMenuString to get the current menu item's associated text. This is the text that appears on the screen when the menu item is displayed. Then either step 1878 sets NumberOK to True if LastItemWasSeparatorOrNumber is True, or step 1880 sets NumberOK to False if it is not. Step 1882 calls StripControlOr- MenuItemName for the menu item's spelling returned by step 1876, with the current value of NumberOk, and with TextType equal to Menu, so StripControlOrMenuItemName will know that it its stripping a menu item's text rather than that of a control window.

FIG. 79 illustrates the StripControlOrMenuItemName routine. As stated above, this routine seeks to strip the string representing a menu item or control window's text down to one or more words which might be in DDWin's vocabulary, so that it can be converted into a voice command DDWin can recognize.

Step 1908 of the StripControlOrMenuItemName routine tests to see if the following three conditions are met: 1) the value of TextType with which that routine has been called equals Menu, meaning the String with which it has been called corresponds to a menu item's text; 2) NumberOK is True, meaning it is okay to strip a string starting with an accelerator-key numeral down to just that numeral; and 3) the first character of String is "&" followed by a numeral and then a space or tab, in which case the menu item, when displayed starts with an underlined, accelerator-key numeral. If all three of these conditions are met, steps 1910 to 1916 are performed. Step 1910 sets String equal to the spelling of the numeral represented by the second character of string. Step 1912 places String in the ReturnStringList, which is a list of one or more strings with which StripControlOrMenuItemName will return. Step 1914 sets LastItemWasSeparatorOrNumber to True, because if NumberOK is True and the current menu item text starts with an underlined character then a condition for setting NumberOK to True for the next menu item will be met. Then step 1916 returns with the ReturnStringList containing the spelling of the underlined numeral in the current menu item's text.

If the three conditions of step 1908 are not met, the remainder of the StripControlOrMenuItemName routine is performed. Step 1917 sets LastItemWasSeparatorOrNumber to False. It does so because, if this step is reached the conditions required for NumberOK to be True on the next call by GetMenuCommandPhrase to StripControlOrMenuItemName will not been met. Next step 1918 tests to see of the string with which the StripControlOrMenuItemName has been called contains a top level matching pair of parentheses. If so, it is possible that the command may have two names associated with it, and step 1920 will place two strings in the ReturnStringList, one corresponding to the characters of String before the first parenthesis and one corresponding to the entire string, including the parentheses and the text within it. If String does not have a top level pair of parentheses, step 1922 places all of String in the ReturnStringList.

Once String, or its two subparts, have been placed in the ReturnStringList, step 1924 performs a loop comprised of steps 1926–1934 for each of the one or two strings in the ReturnStringList. Step 1926 strips away any "&" from the current string. An "&" character is used in a menu item's or control window's text to cause the following character in that text to be an accelerator key. Such "&" characters are stripped from the current string in step 1926 because they are not part of the menu item or control window's pronounced name. Then step 1928 strips away any leading spaces from the current string, and step 1930 strips away any spaces, periods, colons, or exclamation marks which follow the last of any other type of character in the string. This is done because such leading spaces or trailing periods, colons, or exclamation marks are not pronounced. Similarly step 1932 strips away from the string any character, such as a tab, which has a value of 20 hexadecimal, and any characters which follow any character having such a low hexadecimal number. This is done because characters of 20 Hex or below are not pronounceable or viewable, and presumably whatever follows them is not part of the menu item or control window's name. Finally step 1934 tests to see if the string contains three or more numeric fields separated by non-numeric characters. If so, the current string is removed from the ReturnStringList because it probably represents a date or time and not a command to be handled by command tracking. Once each of the strings in the ReturnStringList has been stripped of any unwanted characters, step 1938 returns with the ReturnStringList.

Returning to FIG. 78's GetMenuCommandPhrases routine, once step 1882's call to StripControlOrMenuItemName returns, step 1884 tests to see if that call returned with an empty ReturnStringList. If so, it deletes the CommandPhraseEntry created for the current menu item and starts the iteration of loop 1866 for the next menu item, if any. On the other hand, if the call to StripControlOrMenuItemName did return with one or two strings in the ReturnStringList, step 1886 causes steps 1888–1900 to be performed. Step 1888 encloses the first string in the ReturnStringList in "[]" to indicate it is a command and places it in the CommandPhrase field of the current menu item's CommandPhraseEntry. Step 1890 places the string "MenuPickfirst string]", preceded by a character indicating it is a macro script, in the CommandOutput field of the current menu item's CommandPhraseEntry, where "first string" is the first string in the ReturnStringList. Then steps 1892 places the menu handle of the current menu item's menu in the CommandPhraseEntry's MenuHandle field and the current menu item's position in its menu in the entry's MenuItemPosition field.

Once the CommandPhraseEntry for the first string in the ReturnStringList has been made, step 1894 tests to see if there is a second string in the ReturnStringList. As is explained above, this can happen if the menu item's text had some of its characters in parentheses. If so, steps 1896–1900 are performed. Step 1896 adds a duplicate of the menu item's first CommandPhraseEntry to the CommandPhraseList. Step 1898 places the ReturnStringList's second string, enclosed in "[]" into the copy's CommandPhrase field. Step 1900 fills the copy's CommandOutput field with "MenuPick[second string]" preceded by a character indicating it is a script command, where "second string" equals the second string in the ReturnStringList.

Once the loop 1866 has been completed for all the menu items in the menu for which GetMenuCommandPhrases has been called, the execution of the routine advances to step 1902, which returns to its calling program. It can be seen by the time GetMenuCommandPhrases returns, it will have added at least one CommandPhraseEntry to the CommandPhraseList for each menu item which has an associated text that might be pronounceable.

Returning to FIGS. 76A and 76B's CommandTracking routine, it can be seen that when step 1756 detects a menu is currently active, steps 1758 and 1760 will create a CommandPhraseEntry for each menu item which appears to have a pronounceable text in each menu in the hierarchy of active menus represented by the MenuStack.

If, however, the test of step 1756 does not find that a menu is currently active, step 1762 causes steps 1764–1810 to be performed. Step 1764 calls MSW GetActiveWindow to get the handle of the currently active window. Step 1766 test to see if a call to MSW GetMenu for the active window returns a menu handle. If so, it calls the GetMenuCommandPhrases routine, just described with regard to FIG. 78, to have a CommandPhraseEntry added to the CommandPhraseList for each pronounceable menu item in that menu. It should be noted that if step 1756 did not find a menu was currently active, there should be no other menus displayed in the active window other than its top level, or main, menu, if it has one.

Step 1768 tests to see if a call to MSW GetSystemMenu returns a menu handle to a copy of the system menu. This is the menu which is activated by clicking on the button at the left-hand end of the title bar of most MS Window compatible application windows. It normally has the "Restore", "Move", "Size", "Minimize", "Maximize", "Close", and "Switch To" menu items in it. If step 1768 finds the current active window has a system menu, it calls the GetMenuCommandPhrases routine to add a CommandPhraseEntry for each of the system menu's pronounceable menu items to the CommandPhraseList.

Once steps 1766 and 1768 have obtained CommandPhraseEntries for the active window's main and system menus, if it has them, steps 1770–1810 get CommandPhraseEntries for the window controls of the active window. Step 1770 uses one or more calls to MSW GetWindow to perform a tree search for the handles of all sub-windows, if any, contained within the currently active window. Then step 1772 performs a loop comprised of steps 1774–1810 to attempt to obtain a CommandPhraseEntry for each such sub-window found in that tree search.

Step 1774 tests if using MSW SendMessage to send the current window of loop 1772 a WM_GETDLGCODE message returns an indication that the current window is not a control window. Control windows are a predefined type of window provided by MS Windows to receive user input. They include radio buttons, push buttons, check boxes, edit boxes, list boxes, comboboxes, which function as both list and edit boxes, scrollbars, and static controls. Static controls, such as group boxes, are windows with can have text that can be used to encircle and group a set of other control windows. If the current window for which the loop 1772 is being performed is not such a control window, step 1774 skips to the iteration of that loop for the next sub-window in the active window, if any. It does this because commands are normally only associated with control windows.

If the current window is a control window, step 1776 attempts to test if the control window is sufficiently uncovered that it can be selected by a mouse click. It does this by calling the IsWindowClickable routine 1940.

FIG. 80 illustrates the IsWindowClickable routine. This routine is called for a window indicated by the window handle HWnd. Step 1942 of IsWindowClickable calls MSW GetWindowRect to get the screen coordinates of the bounding rectangle which defines the outer limits of HWnd's window. Step 1944 then performs a loop, comprised of steps 1946–1950 for each of five test points, the center point and four corner points of the window's bounding rectangle. Step 1946 tests to see if a call to MSW WindowFromPoint for the current test point for which the loop of step 1944 is being performed indicates that the window is the top window at that point. If so, it returns with that test point, indicating the window can be selected by clicking at that point.

If HWnd's window is not the top window at the current test point, step 1948 and 1950 test to see if using MSW SendMessage to send the WM_NCHITTEST message to the top window indicated by the call to MSW WindowFromPoint in step 1946 returns HTTRANSPARENT, indicating that the top window is probably a transparent group box, a type of static control window used to group together other control windows. For example, the Resulting Action box 1321 described above with regard to FIG. 62 is a group box used to group together two radio buttons 1325 and 1327 and an edit control window 1323. Such a group box is not only transparent in the sense that you can see though it, but also in the sense that you can click through it. Thus, if the test point is covered by such a transparent window, step 1950 returns from IsWindowClickable with that test point.

If neither the tests of step 1946 or 1950 are met for the current test point, the loop of step 1944 is repeated for the next of the five test points. This is done until one of those tests returns with a clickable test point in step 1946 or 1950, or until the loop 1944 is completed unsuccessfully for each of the five test points. If this is the case, step 1952 returns with an indication that there is probably no clickable point within the control window.

Returning to FIG. 76's CommandTracking routine, if the call by step 1776 to IsWindowClickable finds the current window of loop 1772 does not appear to be selectable by mouse, that step terminates the iteration of loop 1772 for the current window and starts the iteration for the next of the currently active window's sub-windows, if any.

If, however, the current window for which the loop 1772 is being performed is a clickable control window, step 1778 causes steps 1780–1810 to be performed for it. Step 1780 adds an empty CommandPhraseEntry to the CommandPhraseList for the current window. Step 1782 uses MSW SendMessage to send the current window a WM_GETTEXT message to get the current control window's associated text.

Step 1784 then tests to see if the value returned in response to the WM_GETDLGCODE message sent to the current window in step 1774 indicates the window is a static control, such as a group box which is used for grouping together or labeling other controls. If so, it causes steps 1788–1794 to be performed. Step 1788 tests to see if the static control window's text has an accelerator. This is done by testing to see if a call to MSW GetWindowLong with the GWL_STYLE message returns an SS_NOPREFIX value. If not, any "&" character in the window's text other than such characters occurring in the combination "&&" indicates the following key is an accelerator. As stated above, an accelerator is a character which will appear underlined in the display of the control window's text on screen and which, if typed, either directly or as an "Alt" key should cause the control window to be selected. If the current window is a static control having an accelerator character in its text, that means it can be selected by the typing of an accelerator key, and, thus, step 1788 saves a string corresponding to that accelerator key in the CommandOutput field of the CommandPhraseEntry created for the current window.

If the current control window is a static control whose text does not contain an accelerator, there is no point in making a voice command for the current window, because there is no way for DDWin to reliably select that window. In this case, steps 1790–1794 delete the ConmmandPhraseEntry created for the current window in step 1780 and skip to the iteration of loop 1772 for the active window's next control window, if any.

If the execution of the loop 1772 gets to step 1796, the current window for which that loop is being performed is a selectable control window. Step 1796 calls the StripControlOrMenuItemName routine, described above with regard to FIG. 79 for the control window's text, with TextType equal Control. If the call to StripControlOrMenuItemName returns with an empty ReturnStringList, step 1798 deletes the current window's associated CommandPhraseEntry and skips to the iteration of loop 1772 for the next window, if any. This is done because if StripControlOrMenuItemName returns no strings, it indicates the control windows text is not pronounceable, and thus no voice command can be made for it.

If, however, StripControlOrMenuItemName does return with one or more strings in ReturnStringList, the current control window might well have a pronounceable name, and step 1800 causes steps 1802–1810 to be performed. Step 1802 enclosed the first string in ReturnStringList in "[]", to indicate it is a command word, and place that bracketed string in the CommandPhrase field of the current window's CommandPhraseEntry. Step 1804 test to see the ConmmandPhraseEntry's CommandOutput field has already been filled by a command to generate an accelerator key in step 1788. If not, it fills that field with the string "ControlPick [first string]", preceded by a character to indicate the string is a macro script, where "first string" is the first string in the ReturnStringList. Once this is done step 1806 tests to see if the ReturnStringList has a second string in it. If so, it causes steps 1808–810 to create a second CommandPhraseEntry for the current window corresponding to that second string. Step 1808 adds a copy of current window's CommandPhraseEntry to the end of the CommandPhraseList and copies the second string, enclosed in "[]" into that copy's CommandPhrase field. Then step 1810 tests to see if the copied CommandPhraseEntry's CommandOutput is empty. If so it fills it in with the string "ControlPick[secondstring]", preceded by a character to indicate it is a macro script, where "second string" is the second string in the ReturnStringList.

Once the loop of step 1772 has been completed for every sub-window in the currently active window, the CommandPhraseList should have a CommandPhraseEntry for every pronounceable menu item in the active windows top level menu, if it has one, for every pronounceable menu item in the active window's system menu, if it has one, and for almost every pronounceable control window in the active window which is selectable. At this point step 1812 scans to see if there is currently any tracking state in a tracking state cache which includes the exact same collection of command phrases as the active window's CommandPhraseList. If so, steps 1814–1818 make the matching tracking state the CurrentTrackingState and set the matching tracking state's LastUsedTime to the current time.

The tracking state cache is a data structure in memory which stores a specified number, such as twelve, of the CommandTrackingStates which have the most recent LastUsedTimes. These tracking states are cached to prevent unnecessarily duplication of the computation required by steps 1822–1838 of the CommandTrackingState if that computation has be performed before for the same active window and the same CommandPhraseList The computation to calculate the CommandPhraseList is performed on each call to CommandTracking since events, such as the resizing or moving of an application window or the changing of an application's state, can change which menu items and control windows are currently available in a given application.

If step 1812 fails to find a tracking state in the tracking state cache whose commands match those in the active window's current CommandPhraseList, step 1820 causes steps 1822–1838 to be performed. Step 1822 creates a new, empty, tracking state. Then step 1824 performs a loop comprised of steps 1826–1830 for each CommandPhraseEntry in the CommandPhraseList. Step 1826 calls the FindOrMakeMatchingWord routine for the CommandPhrase string of the current CommandPhraseEntry of loop 1824. As described above with regard to FIG. 72, this routine returns with the word ID of a vocabulary word having the spelling of the string with which it is called. If it finds such a vocabulary word already existing, it merely returns with its ID. If not, it creates a new vocabulary word for the spelling and seeks to find a pronunciation for it by searching for, and concatenating the phonetic spellings of, one or more previously defined vocabulary words whose spellings match the pronounceable portion of the string with which FindOrMakeMatchingWord is called. FindOrMakeMatchingWord enables command tracking to create voice commands corresponding to the pronunciation of the names of most menu items and control windows, regardless of the application in which they occur, and regardless of whether the designers of DDWin have ever seen that application before.

After the call to FindOrMakeMatchingWord for the CommandPhrase of the current CommandPhraseEntry returns, step 1828 places the word ID returned by FindOrMakeMatchingWord in the new tracking state created in step 1822. Then step 1830 loads the word ID's associated ExtraData field in the new tracking state with the value of the current CommandPhraseEntry's CommandOutput field.

Once the loop 1824 has been completed for each CommandPhraseEntry in the CommandPhraseList, the new tracking state should have a word ID corresponding to each ConmmandPhraseEntry. This word ID will have associated with it a vocabulary word having the spelling contained in its associated CommandPhraseEntry's CommandPhrase field. This spelling should corresponds to the pronounceable portion of its corresponding menu item's or control window's text, placed in "[]" to indicate the name is a command. Each such word ID will have an ExtraData field corresponding to the string contained in the CommandPhraseEntry's CommandOutput field, which string will cause its associated menu item or control window to be selected, either by an accelerator key, or the MenuPick or ControlPick macro script functions, which are described in more detail below. Finally, if FindOrMakeMatchingWord was able to find a pre-defined vocabulary word whose spelling matched the spelling of the CommandPhraseEntry's CommandPhrase, or was able to find one or more vocabulary words with phonetic models which match the spelling of the portion of the Word D's corresponding CommandPhrase contained in"[]", the word ID will have an associated acoustic model which will enable a user to select the word D's associated menu item or control window by voice, without ever needing to train up an acoustic model of the word. If FindOrMakeMatchingWord does not return a word ID with a an acoustic model, the user will have to use the Train Word dialog box or the OOPs buffer to train an acoustic model for the new word ID before being able to select its associated menu item or control window by voice.

Once the new tracking state is complete, step 1832 tests to see if the tracking state cache already has the maximum number of tracking states stored in it. If so, it deletes from the tracking state cache the tracking state with the oldest LastUsedTime. In either case, step 1834 stores the new tracking state in the tracking state cache, step 1836 makes the new tracking state the CurrentTrackingState, and step 1838 sets the new tracking state's LastUsedTime to the current time, so the new tracking state will be marked as the most recently used tracking state in the tracking state cache. Once all this is done, step 1840 returns with the CurrentTrackingState.

It can be seen that DDWin's command tracking feature automatically initiates the transfer to it of information about the commands available in another program running on the same computer as DDWin and about the outputs necessary to cause those commands to be executed by that other program. It does this by making calls to the MS Windows operating system. DDWin's command tracking feature also automatically increasing the chance that such commands can be recognized by DDWin by making words corresponding to such commands part of the active vocabulary. This greatly increases a user's ability to control a computer by voice, since it automatically causes the commands in the active vocabulary to reflect commands available in the active window. Furthermore, it can do this without having to have any specific knowledge about the application in the active window and without that application having to have been programmed to specifically support this feature.

Returning again to FIGS. 54A and 54B's RecSetupCallAndOutput routine, when the call made during CommandMode to CommandTracking in step 1202 returns, step 1204 adds the CurrentTrackingState set by that call to the StateList. Then step 1206 sets the LanguageContext to Null and step 1208 calls Recognize for the Utterance.

In either DictateMode or CommandMode, after the call to the Recognize routine in step 1208 returns, step 1210 stores the utterance just recognized, the LanguageContext and StateList for that utterance, and the up to nine best scoring words selected by the Recognize routine and their associated states in a WordHistoryBuffer, which is DDWin's equivalent of the Oops buffer shown in FIGS. 8 and 9. The data stored in the WordHistoryBuffer enables users of DDWin to use the Oops command to correct errors in a manner similar to that in which users of the MS-DOS version of DragonDictate can use the Oops command to correct errors.

After step 1210 stores data for the utterance just recognized in the WordHistoryBuffer, step 1212 calls the PerformWordsOutput routine, described above with regard to FIG. 64, for the best scoring word and state from that recognition. The call also contain a pointer to the entry in the WordHistoryBuffer for the just recognized utterance, so that, if the system is in DictateMode, PerformWordsOutput will be able to display a choice list for the utterance which shows the other best scoring words selected by Recognize for the utterance.

Once PerformWordsOutput produces the output associated with the recognized word in the recognized state, RecSetupCallAndOutput is complete, and step 1214 returns to the program which called it, which is normally the FastDemon routine shown in FIG. 53.

As stated above, CommandTracking associates "MenuPick[string]" and "ControlPick[string]" macro scripts, respectively, with the command vocabulary words created for menu items and control windows other than static controls. When such a command vocabulary word is recognized, step 1398 of PerformWordsOutput calls the MacroInterpreter of FIG. 67 with that word's associated MenuPick or ControlPick script. When this is done, step 1442 or 1444 will call the MenuPick routine of FIG. 81 or the ControlPick routine of FIG. 82.

FIG. 81 illustrates the MenuPick routine. This routine is called with the String parameter corresponding to the characters "string" in the MacroInterpreter's "MenuPick[string]" command. Stated briefly, MenuPick searches for a menu item having a text corresponding to String, in a manner somewhat similar to that in which CommandTracking and GetMenuCommandPhrases search for menu item command phrases. While it performs this search, MenuPick records the simulated keystrokes necessary to select such a matching menu item. If it finds a menu item whose text corresponds to String, it uses the JournalPlaybackProc to send the keystrokes it has recorded for that menu item to the active window, to cause the active window to select the matching menu item.

The MenuPick routine starts in Step 1958 by clearing KeystrokeHistoryString. The KeystrokeHistoryString a string variable used to record the sequence of keystrokes needed to select the menu item corresponding to String.

Step 1960 then tests if a call to MSW GetSystemDebugState returns, SDS_MENU, indicating that a menu is currently active. If so, all the currently active menus should be represented by MenuEntries in the MenuStack Thus, step 1962 performs a loop comprised of steps 1964–1982 for each such MenuEntry, starting with the last, or lowest level menu.

Step 1964 clears the CommandPhraseList and step 1966 calls GetMenuCommandPhrase for the menu identified by the current MenuEntry of loop 1962. When GetMenuCommandPhrases returns, the CommandPhraseList contains a CommandPhraseEntry for each pronounceable menu item in the current MenuEntry's associated menu.

Step 1968 performs a loop for each successive CommandPhraseEntry in the CommandPhraseList. Each iteration of this loop tests in step 1970 to see if the text within "[]" in the CommandPhrase field of the current CommandPhraseEntry of loop 1968 matches the String with which MenuPick has been called. If so it, it has found the matching menu item, and, thus, it performs steps 1972–1978.

Step 1972 adds to the KeystrokeHistoryString the number and direction of arrow keystrokes necessary to move within the menu represented by the current MenuEntry of loop 1962 from the position of the MenuItemID of that current MenuEntry to the position of the menu item with the matching spelling, as indicated by the MenuItemPosition field of the current CommandPhraseEntry of loop 1968. This is done because the Position in the current MenuEntry's MenuItemID represents the currently highlighted item in that menu, and MenuPick has to determining how many arrow keystrokes will be required to move from that currently highlighted menu item to the menu item whose CommandPhrase matches MenuPick's String.

Once this is done, step 1974 adds the "enter" keystroke to the KeystrokeHistoryString, so that once the simulated keystrokes contained in the KeystrokeHistoryString move the highliting to the matching menu item, the simulated "enter" keystroke will actually select the function associated with that highlighted menu item.

Then step 1976 copies the KeystrokeHistoryString, preceded by a message group header indicating the keystrokes are not associated with the "Choice List" vocabulary state, to the JournalPlaybackProc's message queue and calls MSW SetWindowsHookEx with WH_JOURNALPLAYBACKPROC to install the hook for the JournalPlaybackProc. This causes the keystrokes in the KeystrokeHistoryString to be fed as simulated keystrokes to the currently active application, which should select the menu item whose text corresponds to String. Once this has been done, step 1978 returns, since the work of MenuPick will have been completed.

If the test of step 1970 is not met for any CommandPhraseEntry in the current MenuEntry of loop 1962, no menu item matching the String with which MenuPick was called exists in the lowest level menu currently represented in the MenuStack. In this case, MenuPick searches for such a matching menu item in the next highest menu, if any, represented in the MenuStack. It does this by having step 1980 add an "escape" character to the KeystrokeHistoryString and step 1982 delete the current MenuEntry from the end of the MenuStack. Step 1980 adds "escape" to the KeystrokeHistoryString so that, if a matching menu item is found at a higher level menu represented in the MenuStack by step 1970 in a successive iteration of loop 1964, the keystroke sequence played back by step 1976 will start with the number of escape characters necessary to escape out from the lower level menu at which the user's menu navigation has placed him and navigate back up the menu hierarchy to the menu containing the matching menu item.

If the call to MSW GetSystemDebug in step 1960 indicates that a menu is active, and causes loop 1962 to be performed, but that loop fails to find a menu item with a CommandPhrase matching String in the MenuStack, the "else" condition of step 1984 will not be met, and program execution will skip to steps 2016 and 2018. These steps will display an error message indicating that no matching menu item could be found, and MenuPick will return unsuccessfully to the program which called it.

If the call to MSW GetSystemDebug in step 1960 indicates that no menu is active when MenuPick is called, step 1984 causes steps 1986–2014 to be performed. Step 1986 calls the MSW GetActiveWindow, MSW GetMenu, and MSW GetSystemMenu functions in a fashion similar to the CommandTracking routine to get the handles of the active windows main menu, if any, and its system menu, if any. Step 1988 clears the CommandPhraseList, and then steps 2000 and 2002 call GetMenuCommandPhrases for the active window's main menu and system menu, respectively. This causes the CommandPhraseList to contain at least one CommandPhraseEntry for each possibly pronounceable menu item in both the main and system menus. Once this is done, step 2004 performs a loop which tests in step 2006 if the spelling within"[]" in the CommandPhrase of each such CommandPhraseEntry equals the String with which MenuPick has been called. If it finds such a match for any such CommandPhraseEntry, steps 2008–2014 are performed.

Step 2008 test to see if the matching CommandPhraseEntry's MenuHandle is that of the active window's main menu. If so, it adds the following sequence of characters to the KeystrokeHistoryString: 1) an "Alt" character; 2) the number of arrow keystroke characters necessary to go from the first item in the menu to the MenuItemPosition of the ConmmandPhraseEntry representing the matching menu item; and 3) the "enter" character. If, on the other hand, the matching CommandPhraseEntry's MenuHandle is that of the active window's system menu, step 2010 adds the following sequence of characters to the KeystrokeHistoryString: 1) an "AltSpacebar" keystroke; 2) the arrow keystrokes necessary to go from the first item in the system menu to the item represented by the MenuItemID of the matching CommandPhraseEntry; and 3) an "enter" keystroke. The sequence of keystrokes added by either step 2008 or 2010 is, respectively, the sequence, which when fed to the active window by the JournalPlaybackProc, will cause the active window to select the matching menu item from either the active window's main menu or system menu.

Once such a sequence of keystrokes has been placed in the KeystrokeHistoryString, step 2012 uses the JournalPlaybackProc to play the keystrokes back to the active window, so the matching menu item will be selected, and then step 2016 returns.

If a matching menu item is not found by the loop 2004 within the CommandPhraseList, step 2016 will display an error message stating as much and step 2018 will return.

FIG. 82 illustrates the ControlPick routine. This routine is called by step 1444 of the MacroInterpreter in response to a statement of the form "ControlPick[string]" in a macro script. It is roughly similar in function to the MenuPick routine, except that it is used to select a control window having text corresponding to the String with which it is called.

Step 2020 of the ControlPick routine calls MSW GetActiveWindow to get the handle of the currently active window. Then step 2022 uses one or more calls to MSW GetWindow to perform a tree search for the handles of all child windows, if any, included in the active window. Step 2024 performs a loop comprised of steps 2026–2036 for each child window handle obtained.

Step 2026 uses MSW SendMessage to send the current child window of loop 2024 the WM_GETDLGCODE message. If this returns an indication that the current child window is not a control window, or is a static control window, loop 2024 skips to the iteration for the next child window. It does this because ControlPick is only used to select non-static control windows.

If the current window is such a non-static control window, step 2028 uses MSW SendMessage to send that window a WM_GETTEXT message, which returns the window's associated text. Step 2030 then calls StripControlOrMenuItemName with this window text and with TextType equal Control, to strip out unwanted, mainly, unpronounceable characters from the window's text, and to split it into two portions if it includes a pair of parentheses.

If any string in the ReturnStringList returned by StripControlOrMenuItemName matches the String with which ControlPick was called, a matching control window has been found and step 2032 causes steps 2034–2036 to be performed. Step 2034 calls IsWindowClickable for the matching window. If this call returns a clickable point, step 2034 uses the JournalPlaybackProc to send the window a WM_LBUTTONDOWN message followed by a WM_LBUTTONUP message at that clickable point. This simulates a mouse click on the matching control window and causes that window's associated function, if any, to be performed. Once this is done step 2036 returns from ControlPick, since its mission will have been accomplished.

If the loop of step 2024 cannot find any control window in the active window which has text which, after calling StripControlOrMenuItemName, matches the String ControlPick was called with, step 2038 displays an error message indicated the recognized word's corresponding control window cannot be found, and then step 2040 returns.

It can be seen that MenuPick and ControlPick, in conjunction with CommandTracking allow DDWin to automatically provide voice commands for selecting virtually any displayed menu item or control window in the active window which has a pronounceable display text associated with it.

Figure 83:
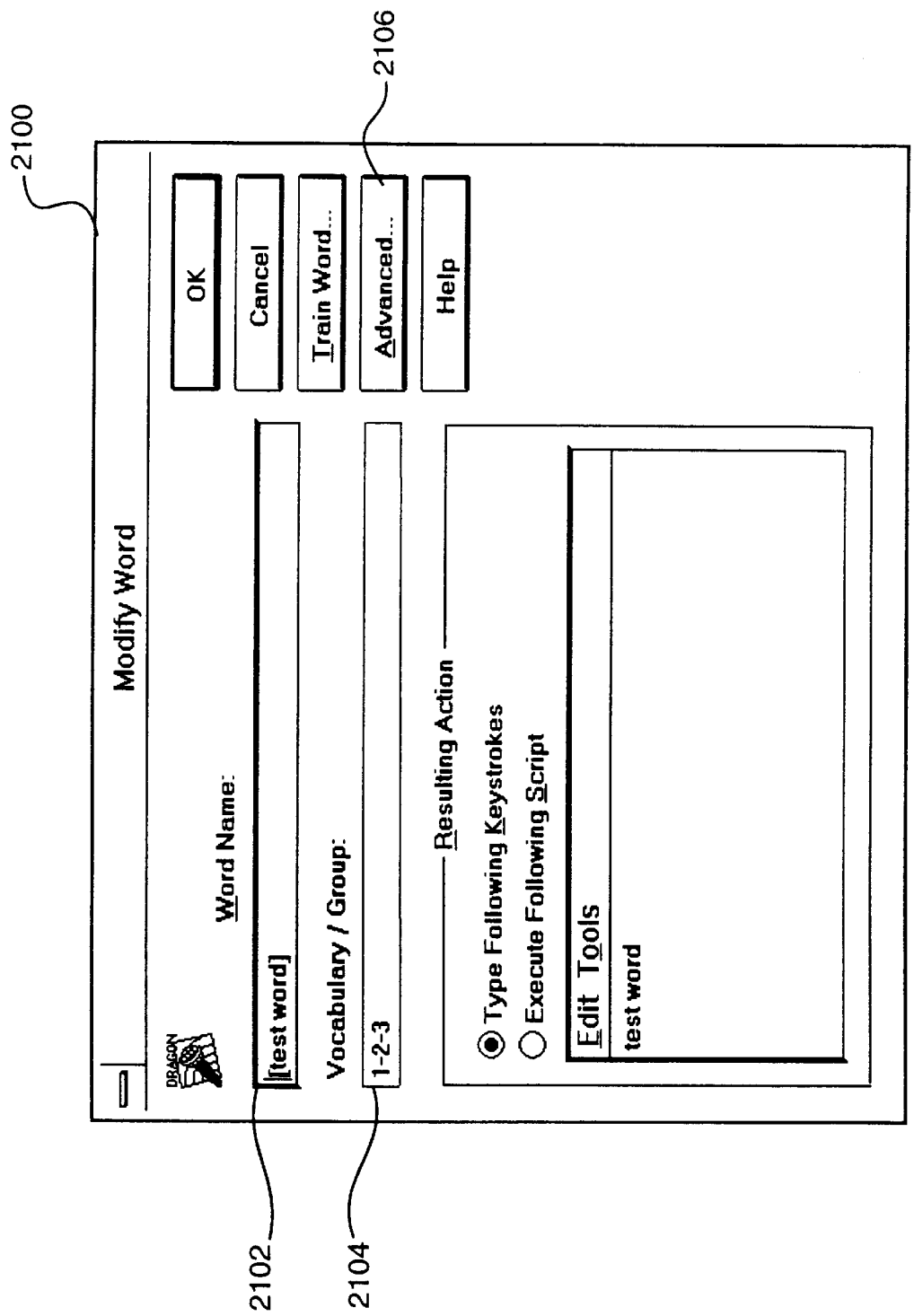
FIG. 83 is a partial screen image showing the Modify Word dialog box, which DDWin utilizes to allow a user to select a word whose custom word model he wants the system to forget.
Figure 84:
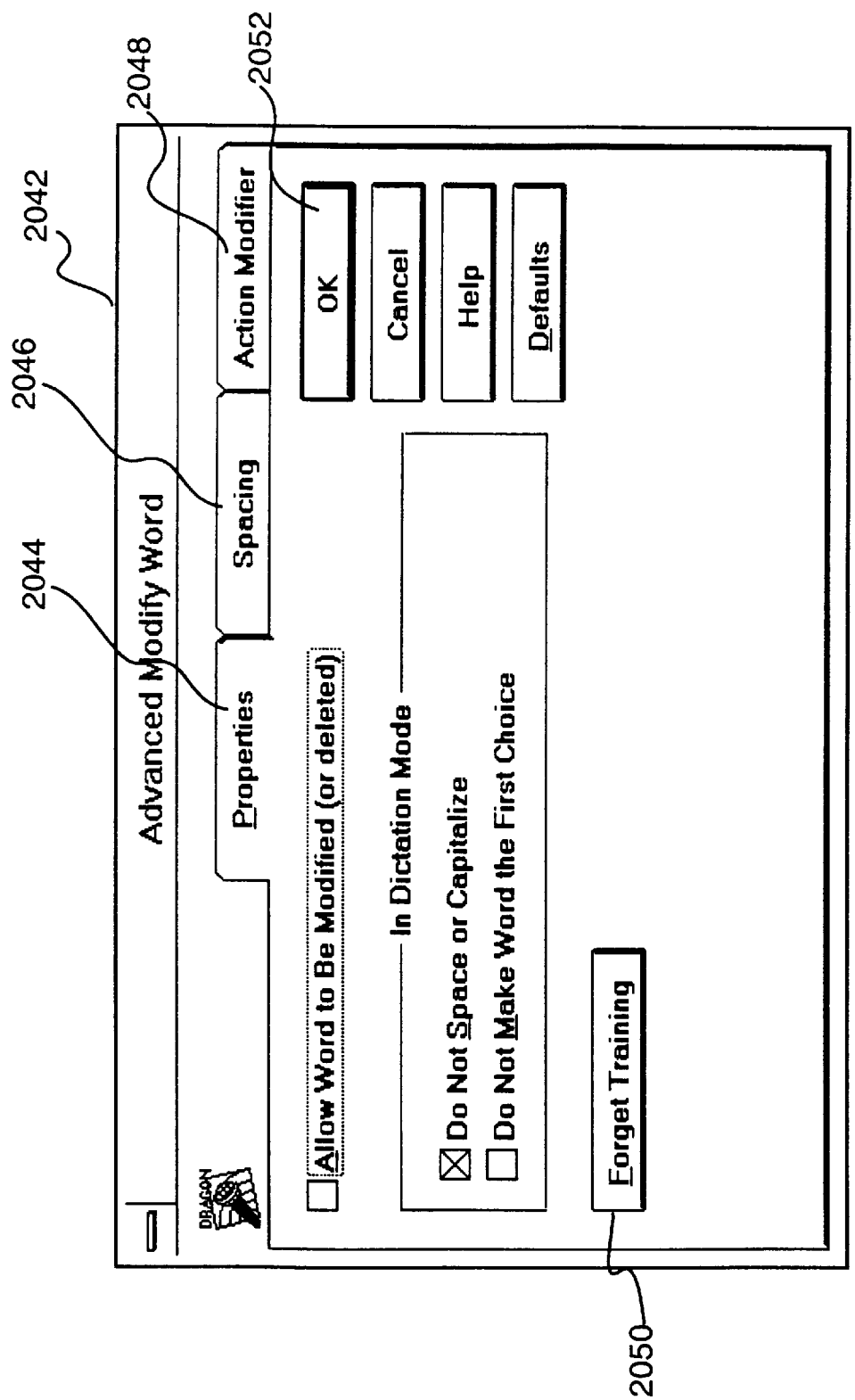
FIG. 84 is a partial screen image showing the Properties tab of the Advanced Modify Word dialog box, which DDWin utilizes to allow a user to instruct the system to forget the custom word model for a word selected by the Modify Word dialog box of FIG. 83.

FIGS. 83–85 illustrate the "Forget Training" aspect of the present invention. This allows a user to cause any and all helper models trained for a given word to be deleted. This is important because if the training performed with the TrainWordDialog routine of FIG. 60 and the WordTraining routine of FIG. 69 is based on bad training tokens, a so-called "rogue helper model" might be created. This is a helper model having an acoustic model which does not represent the sound of its associated word, and which, thus, causes poor recognition results. For example, if a user is performing training and speaks one or more words other than the prompted word, such other words might be used to train a helper model for the word being trained. If so, in the future when the user speaks such other words, the word being trained might mistakenly be recognized. If the user finds DDWin is repeatedly recognizing a given word when he or she is saying a totally different word, chances are the given word has a rogue helper model, and the user should select the Forget Training feature of the invention to erase it. If the given word has a phonetic spelling associated with it, the acoustic model generated from that phonetic spelling from PIC and PEL models will still be available for use. If not, the user will have to train a new helper model for the word using the Train Word Dialog Box.

FIG. 84 illustrates the Advanced Modify Word dialog box, which can be used to cause the system to forget helper models associated with a particular vocabulary word. The user can reach this dialog box for a given vocabulary word by selecting the word in the Find Word dialog box, described above with regard to FIG. 63, and then pressing the Find Word dialog box's Modify Word button 2101. This will cause the Modify Word dialog box 2100 of FIG. 83 to appear for the selected word. Then the user can press the Advanced push button 2106 of the Modify Word dialog box, which will cause the Advanced Modify Word dialog box of FIG. 84 to appear for the selected word.

When the Advanced Modify Word dialog box first appears, one of its three tab will be selected. The dialog box's three tabs include the Properties tab, shown in FIG. 84, and two tabs which are not selected in that figure, the Spacing tab 2046 and an Action Modifier tab 2048. Each of the three tabs looks something like a card in a Rolodex™, and each contains a different collection of control windows which functions like a separate dialog box when selected. The user can selects a given tab by clicking on it.

The Properties tab contains a Forget Training push button 2050. The user can select this by clicking on it, by typing its accelerator character or by saying "Forget Training", the command vocabulary word automatically created for the push button by the CommandTracking routine. If, after doing this, the user depresses the "OK" push button 2052, the procedure 2054 associated with the Properties tab, a fragment of which is shown in FIG. 85, will cause step 2064 to be performed. This step will remove the helper model, if any, associated the current word selected in the Modify Word dialog box.

FIG. 85A shows a version of step 2064, step 2064A, which is used in an alternate embodiment of the invention. In step 2064A, if the Forget Training button is pressed, not only is the word's helper model removed from the .USR file, but also the PIC and PEL counts for the word are reset to a lower value to increase the rate at which the word's PICs and PELs will adapt to subsequent training utterances. This is done because usually when the user selects the Forget Training button, the word has received on or more eroneous training utterances. These eroneous training utterances will not only produce an inappropriate helper model, but they will also cause inappropriate information to be combined into the PICs and PELs associated with the word. Resetting the counts of the PICs and PELs associated with the word increases the rate at which new training utterances will dilute, and effectively replace, this inappropriate information.

PEL counts have been discussed above with regard to FIG. 13. As stated there, a PEL's count reflects the amount of training the PEL has previously received, and the amount which adaptive training incorporates data from a given training utterance into a corresponding PEL varies inversely with the this count. PIC counts are used to determine the weight with which utterance data time aliged with the PEL's of a given PIC will be used to update the duration values associated with each PEL within a given PIC. These weighting vary as a function of PIC counts in a manner similar to that in which the weightings used to update PEL values vary as a function of PEL.

FIGS. 86–89 illustrate another feature of the invention. It prevents RecognizerOn from accidentally being set to False, which would prevent DDWin from responding to voice inputs. This is very important for users, such as many handicapped users, who, for one reason or another, would find it inconvenient or impossible to manually set RecognizerOn back to True once it has been set to False, such as by pressing on the Microphone button 2108 which is on the VoiceBar shown in FIG. 46.

Figure 86:
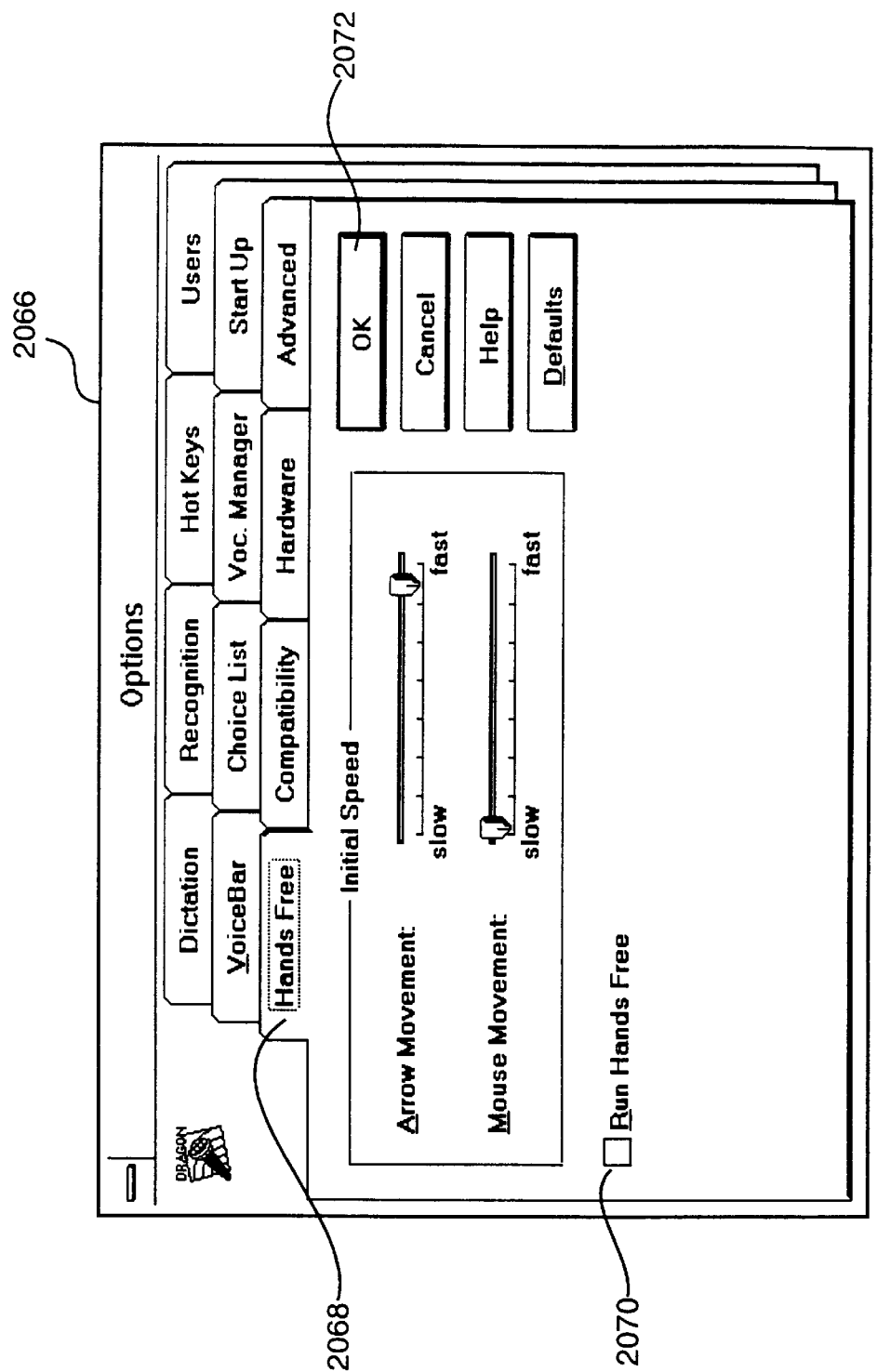
FIG. 86 is a partial screen image showing the Hands Free tab of the Options dialog box, which DDWin uses to allow users to select hands free operation which requires user confirmation to turn DDWin's voice response off.
Figure 89:
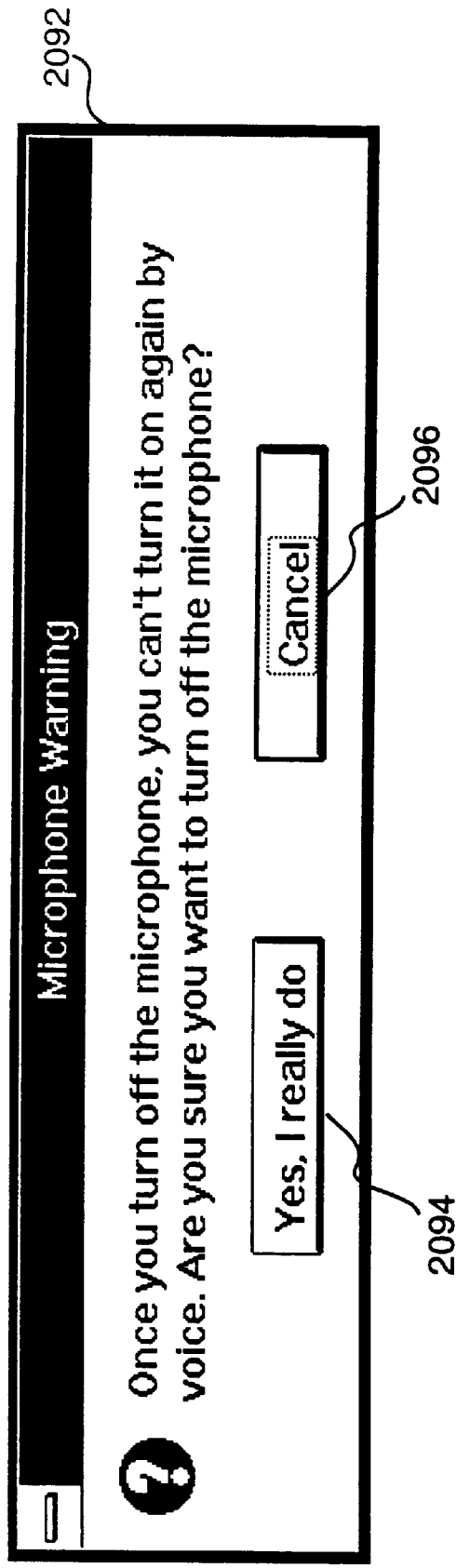
FIG. 89 is a partial screen image showing the Microphone Warning message box, which DDWin utilizes to ask a user for confirmation that DDWin's voice response is to be shut off.

FIG. 86 illustrates DDWin's Options dialog box 2066, when its Hands Free tab 2068 has been selected. The Hands Free tab contains a Run Hands Free check box 2070. The default is for this check box to be unselected, in which case a variable HandsFree is set to False. But if the user, or someone helping the user, selects this check box by clicking on it, typing its "R" accelerator key, or saying the "Run Hands Free" command generated by CommandTracking when the Hands Free tab is displayed, the HandsFree variable will be set to True.

DDWin includes a SlowDemon 2074 shown in FIG. 87. This demon is like the FastDemon, described above with regard to FIG. 53, in that it is constantly being called at a predefined frequency. But SlowDemon is called at a much lower frequency than FastDemon, only about once per second. SlowDemon has a step 2076 which determines if the user should be prompted to confirm whether or not he wants to turn off DDWin's voice response, that is, its ability to respond to a voice input by performing an associated function. It decides to prompt for such a confirmation if the following four conditions are met: 1) the HandsFree variable described in the preceding paragraph is true; 2) RecognizerOn is False, indicating DDWin's voice response has been turned off, 3) MicOffConfirmed is False, indicating the setting of RecognizerOn to False has not been confirmed by the user, and 4) there are no MacroInstances created by step 1434 of the MacroInterpreter of FIG. 67 currently in existence, indicating that a macro command is currently being run by the MacroInterpreter, or, if there are any such MacroInstances in existence, at least one of them is waiting for user input.

The fourth condition is used because it is common for some of the longer macro scripts used by DDWin to use the "MicrophoneOff" statement 1464 and the "MicrophoneOn" statement 1470 shown in FIG. 67 to temporarily turn RecognizerOn to False during the execution of some multi-statement macro scripts. This is done so the macro will not be interrupted by user input until it is done executing. If such a macro script is being executed, step 2076 assumes that if RecognizerOn is False it may have been set to that state temporarily by the execution of a macro script, and, thus, it does not ask for confirmation that speech response should be turned off. If, however, one of the macro scripts currently being executed has set a variable associated with its MacroInstance indicating it is waiting for user input (by a process not shown in the figures) step 2076 will ask for confirmation if voice response has been turned off, because the user may want to enter the input being asked for by the macro script by voice.

FIG. 88 illustrates the MicrophoneWarning routine which is called if the four conditions of the SlowDemon's step 2076 are met. Step 2080 of the MicrophoneWarning routine sets CurrentMode to CommandMode. Step 2082 sets RecognizerOn to True, so the user can respond to the microphone warning by voice. Then step 2084 calls the MSW MessageBox function to display the Microphone Warning message box 2092 shown in FIG. 89. This message box display the text message "Once you turn off the microphone, you can't turn it on again by voice. Are you sure you want to turn off the microphone?". Beneath this message are two push buttons beneath it. One of them, push button 2094 is labeled "Yes, I really do", the other, push button 2096, is labeled "Cancel". The user can select one of these two buttons by saying the "Yes, I really do" or the "Cancel" voice command provided by CommandTracking, or by clicking on one of these buttons with the mouse or by pressing the "escape" key to select the Cancel push button.

Once the user has selected such a push button, the call to MSW MessageBox will remove the Microphone Warning message box and will return with an indication of whether the "Yes" or "Cancel" button was selected. If it returns with an indication the "Yes" button 2094 was selected, steps 2086–2090 set RecognizerOn to False, turning off DDWin's voice response, and set MicOffConfirmed to True, to indicate that the turning off of DDWin's voice response has been confirmed and, thus, that SlowDemon should not call the MicrophoneWarning routine. After this is done, step 2092 will return from the MicrophoneWarning routine.

If the call to MSW MessageBox does not return with an indication the user selected the "Yes" button to confirm the turning off of voice response, step 2092 exits the MicrophoneWarning routine with RecognizerOn set to True, which will cause voice response to remain on, since the user did not confirm that he or she wanted it left off.

It should be understood that the foregoing description and drawings are given merely to explain and illustrate the invention and that the invention is not limited thereto except insofar as the interpretation of the appended claims are so limited. Those skilled in the art who have the disclosure before them will be able to make modifications and variations therein without departing from the scope of the invention.

For example, the broad functions described in the claims below, like virtually all computer functions, can be performed by many different programming and data structures, using many different and sequential organization. This is because programming is an extremely flexible art form in which a given idea of any complexity, once understood by those skilled in the art, can be manifested in a virtually unlimited number of ways.

Furthermore, it should be understood that the invention of the present application is not limited to use with the DragonDictate Speech Recognition System, to the MS-DOS or MS Windows operating systems, or to operation upon IBM compatible computers. It can be used with a broad variety of speech recognition software, a broad variety of operating systems, and any of the broad variety of computing systems.

For example, many of its features are not limited to use with large vocabulary speech discrete utterance recognition systems, and could as well be used with small vocabulary recognition systems. The present invention could be used with speech recognition systems which use other schemes for representing utterances to be recognized and for representing models of vocabulary words. For example, it is common in other speech recognition systems to use different numbers and types of parameters than those described with regard to the DragonDictate System. The present invention is meant to include not only systems which include explicit word models, but also those which use implicit word models, such as neural network based models. Many of the aspects of the present invention could be used with continuous speech recognition systems as well as with discrete speech recognition systems, such as the two DragonDictate systems described above.

The present invention could be used with other types of operating systems and other types of user interfaces than those of the MS-DOS or MS Windows systems described above. For example, certain features in the invention could be used in a system that provides audio rather than video output. Although some features of the invention require multi-tasking operating systems, others do not. Furthermore, the invention could be used with a preemptive multi-tasking operating system, such as Microsoft NT, OS/2 or UNIX rather than MS Windows.

The present invention could be used on many different types of computers. For example, it is not limited to use on Von Neumann computers, but could be used on non-Von Neumann computers as well. Its features can be used on multi-processing computers, including massively parallel ones, neural net computers, as well as computers using different types of device physics, such as quantum effect devices or biochemical devices, to accomplish their computations.

It should be understood the invention has many features which are not limited to speech recognition, and which could be used in other type of word recognition systems, where by "word recognition" we mean the recognition of virtually any symbol which can be used in linguistic communication. This includes handwriting and gesture recognition systems.

It should be understood than the case independent alphabetic filtering of the present invention, described above with regard to the ChoiceList routine of FIG. 65, the KeyboardProc of FIG. 50, and the Recognition routine of FIG. 55, could take many different forms in other embodiments of the invention. For example, in some embodiments the user might enter the one or more letters to be used for such filtering before the word to be recognized is entered, rather than after, enabling the alphabetic filtering to be used in the first attempt to recognize the word. In other embodiments, the user might be offered an option by the choice list, or other user interface device used to control alphabetic filtering, to selected an output corresponding to the spelling of the word recognized by case independent filtering with the cases of the corresponding letters of the StartString.

The aspect of the invention relating to scoring training samples generated in response to prompts for a particular vocabulary word against one or more vocabulary words other than the prompted word has many different possible embodiments. For examples, it includes the scoring of training utterances against a large vocabulary of possible word candidates so that its score against the prompted word is a relative score and so that its chance of being used for training is reduced if its relative score is below a certain threshold, as is indicated by steps 536 and 542 of the Get Allowed Response routine of FIGS. 21A and 21B as well as by steps 1286–1300 of the TrainWordDialog of FIG. 60 and 1118–1144 of the Recognize routine of FIG. 55. It also includes the command recognition during training indicated by the event stack of FIG. 32, the Get Expected Response routine of FIG. 20, and the Get Allowed Response of FIGS. 21A and 21B and by step 1287 of the TrainWordDialog.

The aspect of the invention relating to varying the number of training samples a user is prompted to generate based on how well such samples score against pattern information for the prompted word can have many embodiments and be used in many different contexts. For example, in the Get Allowed Response routine of FIGS. 21A and 21B it covers step 536's scoring of post-prompt utterances against a large vocabulary including the prompted word, and the use by the Utterance Loop 528 in determining whether to continue to prompt for a that vocabulary word if step 542 does not find best scoring word returned by such recognition to include one of the allowed response words, which include the prompted word. This aspect of the invention also includes the use in steps 566–574 of this same routine of an indication that three or more post-prompt utterances compare closely with each other to terminate further prompting for a word. Furthermore this aspect of the invention also includes the use in step 1288–1300 of the TrainWordDialog of FIG. 60 to vary the number times a user is prompted to say a word as a function of how well tokens score against the prompted word. The number of tokens that must score well against the prompted word can be varied by the Training Console of FIG. 61. In other embodiments of this aspect of the invention many different measures could be used to determine if the score of the training sample against information for the prompted word. For example, instead of being simply based on how many tokens score better than a given threshold relative to the prompted word, the decision could be based on a combination of such scores.

The aspect of the invention relating to automatically creating an acoustic model of a phrase by concatenating the acoustic models of each of a succession of individual vocabulary words can have many other embodiments besides that shown in the FindOrMakeMatchingWord routine FIG. 72. For example, it could be used with word models other than the PIC and PEL models used by DDWin. For example, where non-phoneme-in-context phonetic spellings or non-spelled acoustic models (such as DDWin's helper models) were used to represent word models, the system could concatenate such word models without altering the concatenated word model to reflect coarticulation at word boundaries, although this would be inferior to the automatic coarticulation with takes place in DDWin.

The aspect of the invention which relates to initializing the transfer of information to the speech recognizer about the state of another program running on the same computer and using that information to dynamically vary the probability of which word it will recognize also can have many different embodiments. For example, it is embodied separately in DDWin's ApplicationTracking, LanguageContextTracking, and CommandTracking routines of FIGS. 74, 75, and 76, respectively. In these embodiments the information transfers are initiated by calling MS Windows finctions. It should be understood that in embodiments of the invent using other operating systems, other functions could be called to allow similar information to be obtained. Also, when used with applications using different types of control windows or different types of menus, different methods could be used for obtaining the names to be used for voice commands than that described above for use with standard MS Windows controls and menus. Furthermore, as object oriented programming advances, additional ways will be developed for a speech recognition program to obtain information from other programs running on the same computer for use in varying the probability of which words will be recognized. It should be understood varying the probability of which word are recognized in response to information obtained from another program can vary from incrementally increasing or decreasing the chance that a given word will be recognized in response to such information to causing the word to be added or removed from the active vocabulary.

The aspect of the invention which relates to a word recognition system which finds items in text adjacent to a cursor and uses the items found to vary recognition probabilities is not limited to such a system in which the speech recognizer initiates the transfer of information to it from a separate program. For example, it is meant to include such alternate embodiments as a word processor which has a built in speech recognition system and a word processor program which initiates transfers of language context information to a separate speech recognition program. As stated above, the language information involved can include much more than the prior word which is used in the LanguageContextTracking routine.

The aspect of the invention relating to detecting available computational resources and altering the instructions it executes in response is specifically illustrated above in steps 1008–1026 of the Initialization routine of FIG. 47, the DSP code of FIG. 4, steps 1074–1100 of the FastDemon routine of FIG. 53, and steps 1120 and 1144 of the Recognize routine of FIG. 55. These steps detect not only the presence of a DSP board but also the speed of the CPU. In alternate embodiments they could detect the presence of a math co-processor, multiple processors, or the speed of such multiple processors allocated to the speech recognition system. The changing of the instructions executed in response to the detection of available computational resources can include controlling what sections of code are executed, controlling what code is loaded, and altering variables. The detection of available computational resource need not take place only at initialization of the recognizer, but could be performed dynamically as speech recognition is being performed, to compensate for fluctuations in computational resources available to the recognizer.

The aspect of the invention relating to turning on a speech recognition system's voice response when it has been turned off without confirmation is illustrated most specifically by FIGS. 86–89. It should be understood that in other embodiments of this aspect of the invention the turning on and off of voice response could be performed by turning on and off the microphone, the storage of frames, utterance detection, recognition in response to utterance detection, or the production of outputs in response to recognitions.

The aspect of the invention relating to using two sets of pattern information or models for each of a plurality of vocabulary words and for providing a user interface that enables the user to prevent the use of the second set of pattern information for a selected word is illustrated most specifically above with regard to FIGS. 84–85. In these figures the first and second sets of word models are the specific types of spelled and custom word models used by both version of DragonDictate. In other embodiments other types of spelled and custom word models, different types of spelled model, and different types of custom models could correspond the to first and second sets of pattern information. For example, the first set of pattern information could correspond to spelled or custom word models which have been trained over a long period of time and the second class of pattern information could correspond to such models that have been trained in the current session, or the last week. In other embodiments more than two classes of such pattern information could be associated with a given word and the user interface could be designed to selectively deactivate more than one such class.

The aspect of the invention relating to selecting a word model set based on how well word signals score against word models from such different sets is most specifically illustrated by the Batch Training program of FIG. 15 and the BaseVocabSelection routine of FIG. 56. In both of these two embodiments such base vocabulary selection is performed separately from normal recognition. It should be understood, however, that model set selection could be performed in an on-going basis as recognition is being performed. This could be done, for example, by attempting to recognize each of the N best scoring words returned by the recognizer from each of a plurality of base vocabularies, and by changing the model set or group of model sets which are currently active in response to which set's corresponding words score best. This could be used to dynamically adjust for changes in acoustics or speakers. It should also be understood that the model set selection process need not be used to limit recognition to models of the selected set or sets, but could be used to give some other sort of computational preferential to use of models from the selected set.

What we claim is:

1. A computerized method of performing word recognition comprising the steps of:

receiving user generated word signals representing words to be recognized;

performing pattern matching upon the word signals to select which one or more of a plurality of vocabulary words appears, according to said pattern matching, to most probably correspond to each such word signal;

producing an output, at a movable cursor position in a body of text, corresponding to the one or more vocabulary words selected by said pattern matching for each of said word signals;

obtaining information about the linguistic context of the current cursor position in said body of text and using said information to define a current language context and using said information to define a current language context; and varying the probability of which one or more words is selected by said pattern matching as appearing to most probably corresponding to a given word signals as a function of said current language context.

2. A computerized method as in claim 1 wherein:

said word signals are acoustic signals representing the sound of spoken words; and said pattern matching performs speech recognition on said acoustic word signals.

3. A computerized method as in claim 1 wherein:

said method is executed on a computer system capable of running a plurality of active computer programs at one time;

said step of producing an output includes supplying the spelling of vocabulary words selected by said pattern matching to another program running on said computer system for insertion at a cursor position into a body of text represented by that other program; and said step of obtaining information about the linguistic context of the current cursor position includes obtaining such information from data structures created by said other program.

4. A computer program stored in machine readable memory for performing word recognition comprising the following program instructions:

instructions for receiving user generated word signals representing words to be recognized;

pattern matching instructions for performing pattern matching upon the word signals to select which one or more of a plurality of vocabulary words appears, according to said pattern matching, to most probably correspond to each such word signal output instructions for producing an output, at a movable cursor position in a body of text, corresponding to the one or more vocabulary words selected by said pattern matching for each of said word signals;

context detecting program instructions for obtaining information about the linguistic context of the current cursor position in said body of text and using said information to define a current language context; and probability altering instructions for varying the probability of which one or more words is selected by said pattern matching as appearing to most probably corresponding to a given word signals as a function of said current language context.

5. A computer program as in claim 4 wherein:

said word signals are acoustic signals representing the sound of spoken words; and said pattern matching instructions include instructions for performing speech recognition on said acoustic word signals.

6. A computer program as in claim 4 wherein:

said output instructions includes instructions which supply the spelling of vocabulary words selected by said pattern matching instructions to another program running on said computer system for insertion at a cursor position into a body of text represented by that other program; and said context detecting instructions include instructions for obtaining information about the textual context of the current cursor position in said other program.

7. A computer system capable of performing word recognition comprising:

means for receiving user generated word signals representing words to be recognized;

means for performing pattern matching upon the word signals to select which one or more of a plurality of vocabulary words appears, according to said pattern matching, to most probably correspond to each such word signal means for producing an output, at a movable cursor position in a body of text, corresponding to the one or more vocabulary words selected by said pattern matching for each of said word signals;

means for obtaining information about the linguistic context of the current cursor position in said body of text and using said information to define a current language context; and means for varying the probability of which one or more words is selected by said pattern matching as appearing to most probably corresponding to a given word signals as a function of said current language context.

8. A computer system as in claim 7 wherein:

said word signals are acoustic signals representing the sound of spoken words; and said means for performing pattern matching include means for performing speech recognition on said acoustic word signals.

9. A computer program as in claim 7 wherein:

said output instructions includes instructions which supply the spelling of vocabulary words selected by said pattern matching instructions to another program running on said computer system for insertion at a cursor position into a body of text represented by that other program; and said context detecting instructions include instructions for obtaining information about the textual context of the current cursor position in said other program.

* * * * *

EX PARTE REEXAMINATION CERTIFICATE (7001st)

United States Patent
Gould et al.

(10) Number: US 5,920,836 C1
(45) Certificate Issued: Aug. 18, 2009

(54) WORD RECOGNITION SYSTEM USING LANGUAGE CONTEXT AT CURRENT CURSOR POSITION TO AFFECT RECOGNITION PROBABILITIES

(75) Inventors: Joel M. Gould, Winchester, MA (US); Frank J. McGrath, Wellesley, MA (US)

(73) Assignee: USB AG. Stamford Branch, Stamford, CT (US)

Reexamination Request:
No. 90/008,308, Oct. 23, 2006

Reexamination Certificate for:
Patent No.: 5,920,836
Issued: Jul. 6, 1999
Appl. No.: 08/882,813
Filed: Jun. 26, 1997

Related U.S. Application Data

(60) Division of application No. 08/382,752, filed on Feb. 1, 1995, now abandoned, which is a continuation-in-part of application No. 07/976,413, filed on Nov. 13, 1992, now Pat. No. 5,428,707.

(51) Int. Cl.
  G10L 15/26 (2006.01)
  G10L 15/00 (2006.01)
  G10L 15/18 (2006.01)
  G10L 15/28 (2006.01)
  G10L 15/06 (2006.01)
  G10L 15/22 (2006.01)
  G09B 19/04 (2006.01)

(52) U.S. Cl. .................. 704/251; 704/240; 704/243; 704/255; 704/257; 704/E15.008; 704/E15.018; 704/E15.04; 704/E15.044; 704/E15.048

(58) Field of Classification Search .................. None
See application file for complete search history.

(56) References Cited

U.S. PATENT DOCUMENTS 4,783,803 A  11/1988  Baker et al. .................. 381/42

OTHER PUBLICATIONS

IBM Archives: 4341 Processor—the excerpted text of an IBM Data Processing Division technical press release distributed on Jan. 30, 1979. Source: http://www–03.ibm.com/ibm/history/exhibits/mainframe/mainframe_PP4341.htm.*
Cole, Alan; "Speech System Design," Speech Tech '86, IBM Thomas J. Watson Research Center, Yorktown Heights, NY, pp. 149–153.
Averbuch, A., et al., "Experiments With the Tangora 20,000 Word Speech Recognizer," 1987, Speech Recognition Group, Department of Computer Sciences, IBM Thomas J. Watson Research Center, Yorktown Heights, NY, pp. 17.3.1–17.3.4.

* cited by examiner

Primary Examiner—Christopher E Lee

(57) ABSTRACT

A computerized system performs word recognition. It does pattern matching to select which vocabulary words appears, according to the pattern matching, to most probably correspond to word signals it seeks to recognize. It produces an output corresponding to the vocabulary words selected at a movable cursor position in a body of text. The system improves its recognition by obtaining information about the linguistic context of the current cursor position in the body of text and using that information to vary probability of which one or more words is selected by its pattern matching. The pattern matching can be speech recognition performed on signals representing the sound of spoken words. In some embodiments, the words recognition is executed on a computer system capable of running multiple programs at once; the recognized word is output to another program for insertion at a cursor position in that other program; and the linguistic context information is obtained from data structures created by the other program.

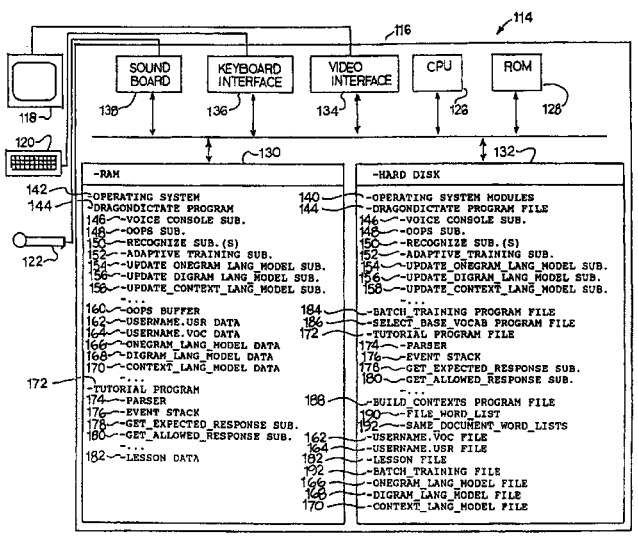

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–9 are cancelled.

* * * * *